US012646188B2

(12) United States Patent
Ding et al.

(10) Patent No.: US 12,646,188 B2
(45) Date of Patent: Jun. 2, 2026

(54) MODIFYING DIGITAL IMAGES VIA DEPTH-AWARE OBJECT MOVE

(71) Applicant: Adobe Inc., San Jose, CA (US)

(72) Inventors: Zhihong Ding, Fremont, CA (US);
Scott Cohen, Sunnyvale, CA (US);
Matthew Joss, Seattle, WA (US);
Jianming Zhang, Campbell, CA (US);
Darshan Prasad, San Jose, CA (US);
Celso Gomes, Bellevue, WA (US);
Jonathan Brandt, Santa Cruz, CA (US)

(73) Assignee: Adobe Inc., San Jose, CA (US)

( * ) Notice: Subject to any disclaimer, the term of this patent is extended or adjusted under 35 U.S.C. 154(b) by 241 days.

(21) Appl. No.: 18/320,714

(22) Filed: May 19, 2023

(65) Prior Publication Data

US 2024/0135561 A1 Apr. 25, 2024

Related U.S. Application Data

(63) Continuation-in-part of application No. 18/190,500, filed on Mar. 27, 2023, now Pat. No. 12,333,691,
(Continued)

(51) Int. Cl.
| | |
|---|---|
| *G06T 7/50* | (2017.01) |
| *G06T 5/77* | (2024.01) |
| *G06V 10/26* | (2022.01) |

(52) U.S. Cl.
CPC ................. *G06T 7/50* (2017.01); *G06T 5/77* (2024.01); *G06V 10/26* (2022.01); *G06T 2207/20084* (2013.01)

(58) Field of Classification Search
CPC ... G06T 7/50; G06T 5/77; G06T 2207/20084; G06V 10/26
See application file for complete search history.

(56) References Cited

U.S. PATENT DOCUMENTS

| | | | |
|---|---|---|---|
| 6,204,840 | B1 | 3/2001 | Petelycky et al. |
| 6,750,890 | B1 | 6/2004 | Sugimoto |
(Continued)

FOREIGN PATENT DOCUMENTS

| | | |
|---|---|---|
| CA | 3158287 A1 | 5/2021 |
| CN | 1512403 A | 7/2004 |
(Continued)

OTHER PUBLICATIONS

Jaemin Cho et al., Fine-grained Image Captioning with CLIP Reward, arXiv:2205.13115, 2022.
(Continued)

*Primary Examiner* — Mia M Thomas
(74) *Attorney, Agent, or Firm* — Keller Preece PLLC

(57) ABSTRACT

The present disclosure relates to systems, methods, and non-transitory computer-readable media that implement depth-aware object move operations for digital image editing. For instance, in some embodiments, the disclosed systems determine a first object depth for a first object portrayed within a digital image and a second object depth for a second object portrayed within the digital image. Additionally, the disclosed systems move the first object to create an overlap area between the first object and the second object within the digital image. Based on the first object depth and the second object depth, the disclosed systems modify the digital image to occlude the first object or the second object within the overlap area.

20 Claims, 79 Drawing Sheets

Related U.S. Application Data which is a continuation-in-part of application No. 18/058,601, filed on Nov. 23, 2022, and a continuation-in-part of application No. 18/058,630, filed on Nov. 23, 2022, now Pat. No. 12,045,963, and a continuation-in-part of application No. 18/058,575, filed on Nov. 23, 2022, and a continuation-in-part of application No. 18/058,554, filed on Nov. 23, 2022, and a continuation-in-part of application No. 18/058, 622, filed on Nov. 23, 2022, and a continuation-in-part of application No. 18/058,538, filed on Nov. 23, 2022, now Pat. No. 12,288,279.

(60) Provisional application No. 63/378,616, filed on Oct. 6, 2022.

(56) References Cited

U.S. PATENT DOCUMENTS

| | | | | |
|---|---|---|---|---|
| 6,950,104 | B1 * | 9/2005 | Marschner | G06T 15/04 |
| | | | | 345/473 |
| 8,125,492 | B1 * | 2/2012 | Wainwright | G06T 19/20 |
| | | | | 345/551 |
| 8,199,151 | B2 * | 6/2012 | Spencer | G06T 13/40 |
| | | | | 345/475 |
| 8,733,951 | B2 * | 5/2014 | Gruen | H04N 9/75 |
| | | | | 353/97 |
| 9,077,891 | B1 * | 7/2015 | Baldwin | H04N 23/673 |
| 9,256,621 | B2 | 2/2016 | Lessin | |
| 9,405,463 | B2 | 8/2016 | Won et al. | |
| 10,192,129 | B2 | 1/2019 | Price et al. | |
| 10,249,044 | B2 | 4/2019 | Cheung et al. | |
| 10,460,214 | B2 | 10/2019 | Lu et al. | |
| 10,515,160 | B1 * | 12/2019 | Jarvis | G06F 3/0482 |
| 10,692,221 | B2 | 6/2020 | Pao et al. | |
| 10,748,324 | B2 | 8/2020 | Shechtman et al. | |
| 10,755,447 | B2 | 8/2020 | Chhaya et al. | |
| 11,016,492 | B2 * | 5/2021 | Gier | G06V 20/56 |
| 11,055,566 | B1 | 7/2021 | Pham et al. | |
| 11,094,083 | B2 | 8/2021 | Eisenmann et al. | |
| 11,100,917 | B2 | 8/2021 | Bui et al. | |
| 11,107,219 | B2 | 8/2021 | Cohen et al. | |
| 11,126,890 | B2 | 9/2021 | Lin et al. | |
| 11,238,362 | B2 | 2/2022 | Jin et al. | |
| 11,373,390 | B2 | 6/2022 | Zhao et al. | |
| 11,462,040 | B2 | 10/2022 | Lin et al. | |
| 11,514,244 | B2 | 11/2022 | Cohen et al. | |
| 11,538,216 | B2 | 12/2022 | Sunkavalli et al. | |
| 11,568,627 | B2 | 1/2023 | Price et al. | |
| 11,676,390 | B2 | 6/2023 | Tang et al. | |
| 11,682,105 | B2 | 6/2023 | Duan et al. | |
| 12,026,845 | B2 | 7/2024 | Pardeshi | |
| 12,175,619 | B2 | 12/2024 | Joachim | |
| 12,210,800 | B2 | 1/2025 | Soni et al. | |
| 12,223,523 | B2 | 2/2025 | Bhole et al. | |
| 2003/0222923 | A1 | 12/2003 | Li | |
| 2006/0214953 | A1 | 9/2006 | Crew et al. | |
| 2008/0109717 | A1 | 5/2008 | Krauter | |
| 2009/0316957 | A1 | 12/2009 | Chen et al. | |
| 2013/0076773 | A1 | 3/2013 | Chen et al. | |
| 2013/0167087 | A1 | 6/2013 | Tighe et al. | |
| 2014/0081625 | A1 | 3/2014 | Wilensky et al. | |
| 2014/0375656 | A1 | 12/2014 | Butler et al. | |
| 2015/0356343 | A1 | 12/2015 | Jain et al. | |
| 2015/0365591 | A1 | 12/2015 | Aronsson et al. | |
| 2016/0180201 | A1 | 6/2016 | Aubert et al. | |
| 2017/0032551 | A1 | 2/2017 | Fried et al. | |
| 2017/0123641 | A1 | 5/2017 | Lance | |
| 2017/0147892 | A1 | 5/2017 | Ishii et al. | |
| 2017/0347024 | A1 * | 11/2017 | Yanagi | H04N 25/61 |
| 2017/0358092 | A1 | 12/2017 | Bleibel et al. | |
| 2018/0302606 | A1 * | 10/2018 | Lee | H04N 13/239 |
| 2019/0019416 | A1 * | 1/2019 | Perko | G05D 1/0011 |
| 2019/0042871 | A1 | 2/2019 | Pogorelik | |

| | | | | |
|---|---|---|---|---|
| 2019/0058836 | A1 | 2/2019 | Lee et al. | |
| 2019/0205643 | A1 | 7/2019 | Liu et al. | |
| 2019/0340798 | A1 * | 11/2019 | Garg | G06T 7/143 |
| 2019/0384994 | A1 * | 12/2019 | Frossard | G06V 10/25 |
| 2020/0042286 | A1 | 2/2020 | Bui et al. | |
| 2020/0051561 | A1 | 2/2020 | Lai | |
| 2020/0104646 | A1 | 4/2020 | Eno et al. | |
| 2020/0143838 | A1 | 5/2020 | Peleg et al. | |
| 2020/0151860 | A1 | 5/2020 | Safdarnejad et al. | |
| 2020/0160042 | A1 | 5/2020 | Bui et al. | |
| 2020/0302656 | A1 | 9/2020 | Kumar et al. | |
| 2020/0312298 | A1 | 10/2020 | Bui et al. | |
| 2021/0004576 | A1 | 1/2021 | Bui et al. | |
| 2021/0027448 | A1 | 1/2021 | Cohen et al. | |
| 2021/0027471 | A1 | 1/2021 | Cohen et al. | |
| 2021/0027497 | A1 | 1/2021 | Ding et al. | |
| 2021/0067344 | A1 | 3/2021 | Drake et al. | |
| 2021/0073267 | A1 | 3/2021 | Chopra et al. | |
| 2021/0103607 | A1 | 4/2021 | Fisher | |
| 2021/0142091 | A1 * | 5/2021 | Kampel | G06N 3/04 |
| 2021/0142497 | A1 | 5/2021 | Pugh et al. | |
| 2021/0263962 | A1 | 8/2021 | Chang et al. | |
| 2021/0283496 | A1 | 9/2021 | Mandella et al. | |
| 2021/0319578 | A1 * | 10/2021 | Casser | G06N 3/045 |
| 2021/0349674 | A1 | 11/2021 | Britton | |
| 2021/0374905 | A1 | 12/2021 | Duan et al. | |
| 2022/0058001 | A1 | 2/2022 | Chang et al. | |
| 2022/0068037 | A1 | 3/2022 | Pardeshi | |
| 2022/0129670 | A1 | 4/2022 | Lin et al. | |
| 2022/0129682 | A1 | 4/2022 | Tang et al. | |
| 2022/0237799 | A1 | 7/2022 | Price et al. | |
| 2022/0254097 | A1 | 8/2022 | Baidya et al. | |
| 2022/0270215 | A1 | 8/2022 | Lee | |
| 2022/0284613 | A1 | 9/2022 | Yin et al. | |
| 2022/0337709 | A1 | 10/2022 | Tsuruta | |
| 2022/0383037 | A1 | 12/2022 | Pham et al. | |
| 2023/0014448 | A1 * | 1/2023 | Gonzalez Morin | G06V 10/26 |
| 2023/0103305 | A1 | 4/2023 | Xu et al. | |
| 2023/0122293 | A1 * | 4/2023 | Nagarajan | B60W 60/00 |
| | | | | 382/103 |
| 2023/0127460 | A1 * | 4/2023 | Xie | G06T 15/503 |
| | | | | 715/764 |
| 2023/0147722 | A1 | 5/2023 | Ramirez de Chanlatte et al. | |
| 2023/0245337 | A1 * | 8/2023 | Lee | G06V 10/255 |
| | | | | 382/103 |
| 2023/0252637 | A1 * | 8/2023 | Xu | G06V 10/771 |
| | | | | 382/173 |
| 2023/0252752 | A1 | 8/2023 | Cheng et al. | |
| 2023/0260127 | A1 | 8/2023 | Baruch et al. | |
| 2023/0326028 | A1 | 10/2023 | Zhang et al. | |
| 2023/0406031 | A1 | 12/2023 | Jain et al. | |
| 2024/0005535 | A1 * | 1/2024 | Lee | G06T 7/11 |
| 2024/0135511 | A1 | 4/2024 | Singh et al. | |
| 2024/0135514 | A1 * | 4/2024 | Pakhomov | G06T 7/11 |
| 2024/0135613 | A1 * | 4/2024 | Ding | G06T 11/60 |
| 2024/0153047 | A1 | 5/2024 | Smith et al. | |
| 2024/0168617 | A1 * | 5/2024 | Lin | G06F 3/04886 |
| 2024/0169502 | A1 | 5/2024 | Cohen et al. | |
| 2024/0169624 | A1 * | 5/2024 | Brandt | G06T 11/60 |
| 2024/0169685 | A1 * | 5/2024 | Figueroa | G06T 11/60 |
| 2024/0171848 | A1 * | 5/2024 | Figueroa | G06V 10/764 |
| 2024/0212184 | A1 * | 6/2024 | Du | G06T 15/00 |
| 2024/0249422 | A1 * | 7/2024 | Jampani | G06T 5/77 |
| 2024/0273742 | A1 * | 8/2024 | Das | G06V 10/768 |
| 2024/0290075 | A1 * | 8/2024 | Yuille | G06V 10/25 |
| 2024/0324852 | A1 * | 10/2024 | Bouhnik | A61B 34/25 |
| 2024/0331322 | A1 | 10/2024 | Smith | |
| 2024/0355107 | A1 | 10/2024 | Liba et al. | |
| 2024/0361891 | A1 * | 10/2024 | Bagnall | G06F 3/04845 |
| 2024/0386579 | A1 * | 11/2024 | Danielsson | G06V 10/40 |
| 2024/0394839 | A1 * | 11/2024 | Schroers | G06T 7/50 |
| 2024/0412458 | A1 | 12/2024 | Jampani et al. | |
| 2025/0218109 | A1 * | 7/2025 | Kontkanen | G06T 7/187 |

FOREIGN PATENT DOCUMENTS

| | | |
|---|---|---|
| GB | 2623620 A | 4/2024 |
| JP | 2014235553 A | 12/2014 |

(56)         References Cited

FOREIGN PATENT DOCUMENTS

WO      WO-2014124870 A1 *   8/2014   ............. G06T 15/60
WO         2023/027681 A1      3/2023
WO      WO-2023105800 A1 *   6/2023   ........... G06V 10/764
WO         2023/250088 A1     12/2023

OTHER PUBLICATIONS

Chen, Hsiang-Ting et al. ACM Digital Library: Data-driven adaptive history for image editing, published Feb. 27, 2016, pp. 1-9. https://dl.acm.org/doi/10.1145/2856400.2856417 (Year: 2016).
Combined Search and Examination Report received in application No. GB2314585.7 dated Feb. 28, 2024.
Combined Search and Examination Report received in application No. GB2314323.3 dated Feb. 28, 2024.
Combined Search and Examination Report received in application No. GB2316991.5 dated May 8, 2024.
Combined Search and Examination Report received in application No. GB2317196.0 dated May 21, 2024.
Dhamo H, Farshad A, Laina I, Navab N, Hager GD, Tombari F, Rupprecht C. "Semantic Image Manipulation Using Scene Graphs", 2020, IEEE/CVF Conf on Computer Vision and Pattern Recognition (CVPR), Jun. 13, 2020-Jun. 19, 2020, Seattle, WA, pp. 5212-5221.
Draftback Replays a Google Document's Changes in Video Format!, Published Sep. 27, 2019, pp. 1-10, https://web.archive.org/web/20220902104215/https://terrystechtipscchs.blogspot.com/2019/09/draftback-replays-google-documents.html (Year: 2019).
M. Choi, "Referring Object Manipulation of Natural Images with Conditional Classifier-free guidance", Computer Vision ECCV 2022. ECCV 2022, Lecture Notes in Computer Science, vol. 13696. Springer Cham. https://doi.org/.
P.K. Saha et al., "Data Augmentation Technique to Expand Road Dataset Using Mask RCNN and Image Inpainting," 2021 International Conference on Intelligent Technologies (CONIT), Hubli, India, 2021, pp. 1-6, doi: 10.1109/CONIT51480.2021.9498505.
U.S. Appl. No. 18/058,622, Mar. 21, 2024, Office Action.
U.S. Appl. No. 18/311,705, Mar. 27, 2024, Office Action.
Combined Search and Examination Report received in application GB 2403915.8 dated Aug. 9, 2024.
Search Report received in GB2402982.9 dated Jul. 10, 2024.
U.S. Appl. No. 18/058,538, Aug. 19, 2024, Office Action.
U.S. Appl. No. 18/058,554, Aug. 6, 2024, Office Action.
U.S. Appl. No. 18/311,705, Sep. 13, 2024, Office Action.
Xiaohang Zhan, Xingang Pan, Bo Dai, Ziwei Liu, Dahua Lin, Chen Change Loy, "Self-Supervised Scene De-occlusion", arXiv:2004.02788v1, Apr. 6, 2020, 11 pages.
Office Action as Received in CN Application No. 202311286113.8 dated Nov. 16, 2023.
U.S. Appl. No. 18/058,630, Nov. 15, 2023, Office Action.
U.S. Appl. No. 18/311,713, Jan. 4, 2024, Office Action.
Combined Search and Examination Report received in application No. GB2314323.3 dated Dec. 11, 2024.
"10 things we love about Affinity Photo 1.7", available on Jul. 25, 2021, pp. 1-6 https://web. archive.org/web/20210725082242/https://affinityspotlight. com/article/10-things-we-love-about-affi nity-photo-17 / (Year: 2021).
U.S. Appl. No. 18/058,554, Dec. 6, 2024, Office Action.
U.S. Appl. No. 18/058,622, Oct. 8, 2024, Office Action.
U.S. Appl. No. 18/311,705, Dec. 6, 2024, Office Action.
U.S. Appl. No. 18/311,713, Nov. 21, 2024, Notice of Allowance.
Combined Search and Examination Report received in application No. GB2317072.3 dated May 16, 2024.
Search Report received in GB2318128.2 dated Jun. 4, 2024.
Search Report received in GB2318199.3 dated Jun. 5, 2024.
Combined Search and Examination Report received in application No. GB2403106.4 dated Jul. 12, 2024.
U.S. Appl. No. 18/311,713, Jul. 5, 2024, Office Action.
U.S. Appl. No. 18/404,648, Jul. 17, 2024, Office Action.
Bin Ding, Chengjiang Long, Ling Zhang, Chunxia Xiao. "ARGAN: Attentive Recurrent Generative Adversarial Network for Shadow Detection and Removal." 2019 IEEE/CVF International Conference on Computer Vision (ICCV), 2019, pp. 10212-10221.
Bin Liao, Yao Zhu, Chao Liang, Fei Luo, Chunxia Xiao: "Illumination animating and editing in a single picture using scene structure estimation." Computers & Graphics (2019).
Bin Liu, Kun Xu, Ralph R. Martin: "Static scene illumination estimation from videos with applications." Journal of Computer Science and Technology (2017).
Chao Tan, Xin Feng. "Unsupervised Shadow Removal Using Target Consistency Generative Adversarial Network." arXiv preprint; arXiv:2010.01291v2, 14 pages, 2021.
Daquan Liu, Chengjiang Long, Hongpan Zhang, Hanning Yu, Xinzhi Dong, Chunxia Xiao: "ARshadowGAN: Shadow generative adversarial network for augmented reality in single light scenes." CVPR (2020). In Proceedings of the IEEE Conference on Computer Vision and Pattern Recognition. pp. 8139-8148, 2020.
Daquan Liu, Chengjiang Long, Hongpan Zhang, Hanning Yu, Xinzhi Dong, Chunxia Xiao. (2020). "ARShadowGAN." [dataset]. The IEEE Conference on Computer Vision and Pattern Recognition (CVPR). https://github.com/ldq9526/ARShadowGAN.
Fangneng Zhan, Shijian Lu, Changgong Zhang, Feiying Ma, Xuansong Xie: "Adversarial Image Composition with Auxiliary Illumination." ACCV 17 Pages. (2020).
Florin-Alexandru Vasluianu, Andres Romero, Luc Van Gool, and Radu Timofte. "Self-Supervised Shadow Removal." arXiv preprint; arXiv:2010.11619v1. 10 pages, 2021.
Haitian Zheng, Zhe Lin, Jingwan Lu, Scott Cohen, Eli Shechtman, Connelly Barnes, Jianming Zhang, Ning Xu, Sohrab Amirghodsi, and Jiebo Luo. "Image Inpainting with Cascaded Modulation GAN and Object-Aware Training". arXiv preprint, arXiv:2203.11947v3, 32 pages, 2022.
Hieu Le and Dimitris Samaras. "Physics-based Shadow Image Decomposition for Shadow Removal." IEEE Transactions on Pattern Analysis and Machine Intelligence. 14 Pages. 2021.
Hieu Le and Dimitris Samaras. "From Shadow Segmentation to Shadow Removal." In proceedings of the European Conference on Computer Vision. 18 pages, 2020.
Hieu Le, Dimitris Samaras. "Shadow Removal via Shadow Image Decomposition." International Conference on Computer Vision 2019. (ICCV). pp. 8578-8587. 2019.
Jiawei Liu; Qiang Wang; Huijie Fan; Jiandong Tian; Yandong Tang. "A Shadow Imaging Bilinear Model and Three-Branch Residual Network for Shadow Removal," in IEEE Transactions on Neural Networks and Learning Systems, 2023, doi: 10.1109/TNNLS.2023.3290078.
Jiawei Liu; Qiang Wang; Huijie Fan; Wentao Li; Liangqiong Qu; Yandong Tang. "A Decoupled Multi-Task Network for Shadow Removal," in IEEE Transactions on Multimedia, vol. 25, pp. 9449-9463, 2023, doi: 10.1109/TMM.2023.3252271.
Jifeng Wang, Xiang Li, Le Hui, Jian Yang. "Stacked Conditional Generative Adversarial Networks for Jointly Learning Shadow Detection and Shadow Removal." 2018 IEEE Conference on Computer Vision and Pattern Recognition (CVPR) pp. 10. 2018.
Jin Wan, Hui Yin, Zhenyao Wu, Xinyi Wu, Yanting Liu, and Song Wan. "Style-Guided Shadow Removal." In proceedings of European Conference on Computer Vision 2022. 17 Pages. 2022.
Jin Wan, Hui Yin, Zhenyao Wu, Xinyi Wu, Zhihao Liu, Song Wang. "CRFormer: A Cross-Region Transformer for Shadow Removal." arXiv preprint., arXiv:2207.01600v1. 11 Pages. 2022.
Kevin Karsch, Kalyan Sunkavalli, Sunil Hadap, Nathan Carr, Hailin Jin, Rafael Fonte, Michael Sittig, David Forsyth: "Automatic scene inference for 3d object compositing." ACM Transactions on Graphics (2014).
Kevin Karsch, Varsha Hedau, David Forsyth, Derek Hoiem: "Rendering synthetic objects into legacy photographs." ACM Transactions on Graphics (2011).
Kunpeng Niu; Yanli Liu; Enhua Wu; Guanyu Xing. "A Boundary-Aware Network for Shadow Removal." IEEE Transactions on Multimedia (vol. 25), pp. 6782-6793, 2022.
Lan Fu, Changqing Zhou, Qing Guo, Felix Juefei-Xu, Hongkai Yu, Wei Feng, Yang Liu, Song Wang. "Auto-Exposure Fusion for

(56) References Cited

OTHER PUBLICATIONS

Single-Image Shadow Removal." Proceedings of the IEEE/CVF Conference on Computer Vision and Pattern Recognition (CVPR), 2021, pp. 10571-10580. 2021.

Lanqing Guo, Chong Wang, Wenhan Yang, Siyu Huang, Yufei Wang, Hanspeter Pfister, Bihan Wen. "ShadowDiffusion: When Degradation Prior Meets Diffusion Model for Shadow Removal." In CVPR 2023 pp. 14049-14058, 2023.

Lanqing Guo, Siyu Huang, Ding Liu, Hao Cheng, Bihan Wen. "ShadowFormer: Global Context Helps Image Shadow Removal." In Proceedings AAAI Conference on Artificial Intelligence, 9 pages, 2023.

Lei Zhu, Zijun Deng, Xiaowei Hu, Chi-Wing Fu, Xuemiao Xu, Jing Qin, and Pheng-Ann Heng. "Bidirectional Feature Pyramid Network with Recurrent Attention Residual Modules for Shadow Detection." Proceedings of the European Conference on Computer Vision (ECCV), 2018, pp. 121-136.

Li Niu, Wenyan Cong, Liu Liu, Yan Hong, Bo Zhang, Jing Liang, Liqing Zhang: "Making Images Real Again: A Comprehensive Survey on Deep Image Composition." arXiv preprint arXiv:2106. 14490 (2021).

Liangqiong Qu, Jiandong Tian, Shengfeng He, Yandong Tang, Rynson W. H. Lau. "DeshadowNet: A Multi-Context Embedding Deep Network for Shadow Removal." 2017 IEEE Conference on Computer Vision and Pattern Recognition (CVPR) pp. 4067-4075. 2017.

Ling Zhang, Chengjiang Long, Xiaolong Zhang, Chunxia Xiao. "RIS-GAN: Explore Residual and Illumination with Generative Adversarial Networks for Shadow Removal." The Thirty-Fourth AAAI Conference on Artificial Intelligence (AAAI-20). pp. 12829-12836. 2020.

Lucas Valença, Jinsong Zhang, Michael Gharbi, Yannick Hold-Geoffroy, Jean-François Lalonde: "Shadow Harmonization for Realistic Compositing." SIGGRAPH Asia (2023) 12 Pages.

Lvmin Zhang, Jinyue Jiang, Yi Ji, Chunping Liu. "SmartShadow: Artistic Shadow Drawing Tool for Line Drawings." 2021 IEEE/ CVF International Conference on Computer Vision (ICCV), Montreal, QC, Canada, 2021, pp. 5371-5380, doi: 10.1109/ICCV48922. 2021.00534, 2021.

Mehmet Kerim Yucel, Valia Dimaridou, Bruno Manganelli, Mete Ozay, Anastasios Drosou, Albert Saa-Garriga. "LRA&LDRA: Rethinking Residual Predictions for Efficient Shadow Detection and Removal." IEEE/CVF Winter Conference on Applications of Computer Vision, pp. 4925-4935, 2023.

Mrinmoy Sen, Sai Pradyumna Chermala, Nazrinbanu Nurmohammad Nagori, Venkat Peddigari, Praful Mathur, B H Pawan Prasad, Moonhwan Jeong. "SHARDS: Efficient SHAdow Removal using Dual Stage Network for High-Resolution Images." IEEE/CVF Winter Conference on Applications of Computer Vision, pp. 1809-1817, 2023.

Naoto Inoue, Toshihiko Yamasaki. "Learning from Synthetic Shadows for Shadow Detection and Removal." IEEE Transactions on Circuits and Systems for Video Technology (vol. 31, Issue: 11, Nov. 2021), pp. 4187-4197, 2020.

Qianhao Yu, Naishan Zheng, Jie Huang, and Feng Zhao. "CNSNet: A Cleanness-Navigated-Shadow Network for Shadow Removal." European Conference on Computer Vision Workshop 2022. 18 pages. 2022.

Qingyang Liu, Jianting Wang, Li Niu. (2023). "Object Shadow Generation Dataset—DESOBAv2." Version 2. [dataset]. AAAI 2023. https://github.com/bcmi/Object-Shadow-Generation-Dataset-DESOBAv2.

Qingyuan Zheng, Zhuoru Li, Adam Bargteil. "Learning to Shadow Hand-Drawn Sketches". The IEEE/CVF Conference on Computer Vision and Pattern Recognition (CVPR), pp. 7436-7445, 2020.

Quanling Meng, Shengping Zhang, Zonglin Li, Chenyang Wang, Weigang Zhang, Qingming Huang: "Automatic Shadow Generation via Exposure Fusion." IEEE Transactions on Multimedia, vol. 25, pp. 9044-9056, 2023, doi: 10.1109/TMM.2023.3244398.

Shengfeng He, Bing Peng; Junyu Dong; Yong Du, "Mask-ShadowNet: Toward Shadow Removal via Masked Adaptive Instance Normalization," in IEEE Signal Processing Letters, vol. 28, pp. 957-961, 2021, doi: 10.1109/LSP.2021.3074082.

Shuyang Zhang, Runze Liang, Miao Wang: "ShadowGAN: Shadow synthesis for virtual objects with conditional adversarial networks." Computational Visual Media (2019). vol. 5, No. 1, Mar. 2019, 105-115.

Subhrajyoti Dasgupta, Arindam Das, Sudip Das, Andrei Bursuc, Ujjwal Bhattacharya and Senthil Yogamani. "UnShadowNet: Illumination Critic Guided Contrastive Learning for Shadow Removal." arXiv preprint arXiv: 2203.15441v1. 13 Pages. 2022.

Tianrun Chen, Lanyun Zhu, Chaotao Ding, Runlong Cao, Yan Wang, Zejian Li, Lingyun Sun, Papa Mao, Ying Zang. "SAM Fails to Segment Anything?—SAM-Adapter: Adapting SAM in Underperformed Scenes: Camouflage, Shadow, Medical Image Segmentation, and More." arXiv preprint, arXiv:2304.09148v3, 13 pages, 2023.

Tianyanshi Liu, Yuhang Li, Youdong Ding: "Shadow Generation for Composite Image with Multi-level Feature Fusion." EITCE (2022).

Tianyu Wang, Xiaowei Hu, Chi-Wing Fu, and Pheng-Ann Heng. "Single-Stage Instance Shadow Detection with Bidirectional Relation Learning." 2021 IEEE/CVF Conference on Computer Vision and Pattern Recognition (CVPR), 11 pages, 2021.

Tianyu Wang, Xiaowei Hu, Pheng-Ann Heng, Chi-Wing Fu. "Instance Shadow Detection with a Single-Stage Detector." Institute of Electrical and Electronics Engineers (IEEE), IEEE Transactions on Pattern Analysis and Machine Intelligence, 14 pages, 2023.

Tianyu Wang, Xiaowei Hu, Qiong Wang, Pheng-Ann Heng, and Chi-Wing Fu. "Instance Shadow Detection." In Proceedings of the IEEE/CVF Conference on Computer Vision and Pattern Recognition (pp. 1880-1889). 2021.

Xiaodong Cun, Chi-Man Pun, Cheng Shi. "Towards Ghost-Free Shadow Removal via Dual Hierarchical Aggregation Network and Shadow Matting GAN." Proceedings of the AAAI Conference on Artificial Intelligence, 34(07), 10680-10687. https://doi.org/10.1609/ aaai.v34i07.6695, 2020.

Xiaowei Hu, Chi-Wing Fu, Lei Zhu, Jing Qin, and Pheng-Ann Heng. "Direction-aware Spatial Context Features for Shadow Detection and Removal." IEEE Transactions on Pattern Analysis and Machine Intelligence. 14 pages. 2019.

Xiaowei Hu, Lei Zhu, Chi-Wing Fu, Jing Qin, and Pheng-Ann Heng. "Direction-aware Spatial Context Features for Shadow Detection." 2018 IEEE/CVF Conference on Computer Vision and Pattern Recognition, pp. 7454-7462, 2018.

Xiaowei Hu, Yitong Jiang, Chi-Wing Fu, Pheng-Ann Heng, "Mask-ShadowGAN: Learning to Remove Shadows from Unpaired Data." 2019 IEEE/CVF International Conference on Computer Vision (ICCV), pp. 2472-2481, 2019.

Xinhao Tao, Junyan Cao, Yan Hong, Li Niu: "Shadow Generation with Decomposed Mask Prediction and Attentive Shadow Filling." AAAI (2024).

Xinhao Tao, Junyan Cao, Yan Hong, Li Niu. "Rendered Shadow Generation Dataset—RDSOBA." [dataset] AAAI 2024. https:// github.com/bcmi/Rendered-Shadow-Generation-Dataset-RdSOBA.

Xuaner Cecilia Zhang, Jonathan T. Barron, Yun-Ta Tsai, Rohit Pandey, Xiuming Zhang, Ren Ng, and David E. Jacobs. "Portrait Shadow Manipulation." In SIGGRAPH, CoRR abs/2005.08925, 14 pages, 2020.

Yan Hong, Li Niu, Jianfu Zhang: "Shadow Generation for Composite Image in Real-world Scenes." AAAI arXiv:2104.10338v1 14 Pages. (2022).

Yan Hong, Li Niu, Jianfu Zhang. (2022). "Object Shadow Generation Dataset—DESOBA." [dataset]. AAAI 2022. https://github.com/ bcmi/Object-Shadow-Generation-Dataset-DESOBA.

Yan Hong, Li Niu, Jianfu Zhang. "Shadow Generation for Composite Image in Real-World Scenes." AAAI. (2022). arXiv:2104. 10338v3. 16 Pages.

Yaojie Liu, Andrew Hou, Xinyu Huang, Liu Ren, Xiaoming Liu. "Blind Removal of Facial Foreign Shadows." In Proceedings of the British Machine Vision Conference 2022, 14 pages, 2022.

Yeying Jin, Aashish Sharma, and Robby T. Tan. "DC-ShadowNet: Single-Image Hard and Soft Shadow Removal Using Unsupervised

(56)        References Cited

OTHER PUBLICATIONS

Domain-Classifier Guided Network.". In Proceedings of the IEEE International Conference on Computer Vision 2021, pp. 5027-5036.

Yeying Jin, Wenhan Yang, Wei Ye, Yuan Yuan and Robby T. Tan. "ShadowDiffusion: Diffusion-based Shadow Removal using Classifier-driven Attention and Structure Preservation." arXiv preprint arXiv:2211. 08089v3. 10 pages. 2022.

Yichen Sheng, Jianming Zhang, Bedrich Benes: "SSN: Soft shadow network for image compositing." CVPR (2021). In Proceedings of the IEEE Conference on Computer Vision and Pattern Recognition. pp. 4380-4390, 2021.

Yichen Sheng, Jianming Zhang, Julien Philip, Yannick Hold-Geoffroy, Xin Sun, He Zhang, Lu Ling, Bedrich Benes: "PixHt-Lab: Pixel Height Based Light Effect Generation for Image Compositing." CVPR (2023).

Yichen Sheng, Yifan Liu, Jianming Zhang, Wei Yin, Oztireli Cengiz, He Zhang, Lin Zhe, Shechtman Eli, Bedrich Benes: "Controllable Shadow Generation Using Pixel Height Maps." ECCV (2022). arXiv:2207.05385v2. Jul. 15, 2022. 17 Pages.

Yimin Xu, Mingbao Lin, Hong Yang, Fei Chao, Rongrong Ji. "Shadow-Aware Dynamic Convolution for Shadow Removal." arXiv preprint. arXiv:2205.04908v3. 10 Pages. 2022.

Mngqing He, Yazhou Xing, Tianjia Zhang, and Qifeng Chen. 2021. "Unsupervised Portrait Shadow Removal via Generative Priors." In Proceedings of the 29th ACM Int'l Conference on Multimedia (MM '21), Oct. 20-24, 2021, Virtual Event, 9 pages. https://doi.org/10. 1145/3474085.3475663.

Yurui Zhu, Jie Huang, Xueyang Fu, Feng Zhao, Qibin Sun, Zheng-Jun Zha. "Bijective Mapping Network for Shadow Removal." 2022 IEEE Conference on Computer Vision and Pattern Recognition (CVPR). pp. 5627-5636. 2022.

Yurui Zhu, Xueyang Fu, Chengzhi Cao, Xi Wang, Qibin Sun, and Zheng-Jun Zha. 2022. "Single Image Shadow Detection via Complementary Mechanism." In Proceedings of the 30th ACM International Conference on Multimedia (MM'22), Oct. 10-14, 2022, 10 pages. https://doi.org/10.1145/3503161.3547904.

Yurui Zhu, Zeyu Xiao, Yanchi Fang, Xueyang Fu, Zhiwei Xiong, and Zheng-Jun Zha. (2022). Efficient Model-Driven Network for Shadow Removal. Proceedings of the AAAI Conference on Artificial Intelligence, 36(3), 3635-3643. https://doi.org/10.1609/aaai. v36i3.2027.

Zhenghao Xing, Tianyu Wang, Xiaowei Hu, Haoran Wu, Chi-Wing Fu, Pheng-Ann Heng. "Video Instance Shadow Detection." arXiv preprint, arXiv:2211.12827v1, 10 pages, 2023.

Zhihao Liu, Hui Yin, Xinyi Wu, Zhenyao Wu, Yang Mi, Song Wang. "From Shadow Generation to Shadow Removal." The IEEE / CVF Computer Vision and Pattern Recognition Conference (CVPR). 10 pages, 2021.

Zhihao Liu; Hui Yin; Yang Mi; Mengyang Pu; Song Wang. "Shadow Removal by a Lightness-Guided Network With Training on Unpaired Data," in IEEE Transactions on Image Processing, vol. 30, pp. 1853-1865, 2021, doi: 10.1109/TIP.2020.3048677.

Zipei Chen, Chengjiang Long, Ling Zhang, Chunxia Xiao. "CANet: A Context-Aware Network for Shadow Removal." International Conference on Computer Vision 2021 (ICCV2021). 13 Pages, 2021.

U.S. Appl. No. 18/058,630, Feb. 28, 2024, Notice of Allowance.

Combined Search and Examination Report received in application No. GB2417128.2 dated Mar. 13, 2025.

Tainyu Wang et al., "Instance Shadow Detection", In IEEE/CVF Conference on Computer Vision and Pattern Recognition (CVPR), pp. 1877-1886, 2020.

Tim Chen; Nonlinear Revision Control for Images, by Tim Chen Apr. 11, 2011, pp. 1-2 https://www.youtube.com/watch?v=RBL 1cVzlQik (Year: 2011).

U.S. Appl. No. 18/058,538, Jan. 31, 2025, Notice of Allowance.

U.S. Appl. No. 18/058,554, Mar. 12, 2025, Notice of Allowance.

U.S. Appl. No. 18/058,575, Feb. 12, 2025, Office Action.

U.S. Appl. No. 18/058,622, Feb. 27, 2025, Office Action.

U.S. Appl. No. 18/320,664, Mar. 5, 2025, Office Action.

U.S. Appl. No. 18/311,705, Mar. 28, 2025, Office Action.

U.S. Appl. No. 18/460,365, Feb. 28, 2025, Notice of Allowance.

U.S. Appl. No. 18/404,648, Jan. 30, 2025, Notice of Allowance.

U.S. Appl. No. 18/320,664, Jun. 11, 2025, Office Action.

U.S. Appl. No. 18/058,622, Sep. 4, 2025, Office Action.

B. AlBahar, J. Lu, J. Yang, Z. Shu, E. Shechtman, and J. Huang in Pose with Style: Detail-Preserving Pose-Guided Image Synthesis with Conditional StyleGAN, SIGGRAPH Asia 2021 (Pose with Style).

F. Faghri et al., Vse++: Improving visual-semantic Embeddings with Hard Negatives, arXiv:1707.05612, 2017.

G. Huang et al., Densely Connected Convolutional Networks, in IEEE Conference on Computer Vision and Pattern Recognition, 2016.

J. Ho, A. Jain, P Abbeel, Denoising Diffusion Probabilistic Models, arXiv:2006:11239.

Jiaming Song, et al. in Denoising diffusion implicit models. In ICLR, 2021.

Khoi Pham, Kushal Kafle, Zhe Lin, Zhihong Ding, Scott Cohen, Quan Tran, Abhinav Shrivastava; "Learning to Predict Visual Attributes in the Wild"; CVPR 2021.

Liang-Chieh Chen et al., Deeplab: Semantic Image Segmentation with Deep Convolutional Nets, Atrous Convolution, and Fully Connected CRFs, arXiv:1606.00915, 2016.

Liang-Chieh Chen et al., Rethinking Atrous Convolution for Semantic Image Segmentation, arXiv:1706.05587, 2017.

Lu Chi, Borui Jiang, and Yadong Mu in Fast Fourier convolution, Advances in Neural Information Processing Systems, 33 (2020).

Ning Xu et al., "Deep GrabCut for Object Selection," published Jul. 14, 2017.

O. Ronneberger, P. Fischer, and T. Brox, in U-net: Convolutional networks for biomedical image segmentation, MICCAI (3), vol. 9351 of Lecture Notes in Computer Science, p. 234-250 (2015).

R. Rombach, A. Blattmann, D. Lorenz, P. Esser, and B. Ommer, in High-Resolution Image Synthesis with Latent Diffusion Models, arXiv:2112.10752v2.

Redmon, et al., You Only Look Once: Unified, Real-Time Object Detection, CVPR 2016.

S. Ren, K. He, R. Girshick, and J. Sun, Faster r-cnn: Towards real-time object detection with region proposal networks, NIPS, 2015.

Taesung Park, Ming-Yu Liu, Ting-Chun Wang, and Jun-Yan Zhu in Semantic image synthesis with spatially-adaptive normalization, Proceedings of the IEEE Conference on Computer Vision and Pattern Recognition (2019).

Tero Karras, Samuli Laine, Miika Aittala, Janne Hellsten, Jaakko Lehtinen, and Timo Aila in Analyzing and improving the image quality of StyleGAN, Proc. CVPR (2020).

Xihui Liu, Zhe Lin, Jianming Zhang, Handong Zhao, Quan Tran, Xiaogang Wang, and Hongsheng Li; "Open-Edit: Open-Domain Image Manipulation with Open-Vocabulary Instructions"; arXiv:2008. 01576v2[cs.CV] Apr. 21, 2021.

Y. Li, W. Ouyang, B. Zhou, Y. Cui, J. Shi, and X. Wang, Factorizable net: An efficient subgraph based framework for scene graph generation, ECCV, Jun. 29, 2018.

U.S. Appl. No. 18/320,664, Oct. 8, 2025, Notice of Allowance.

U.S. Appl. No. 18/058,622, Feb. 25, 2026, Office Action.

* cited by examiner

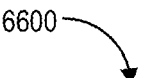

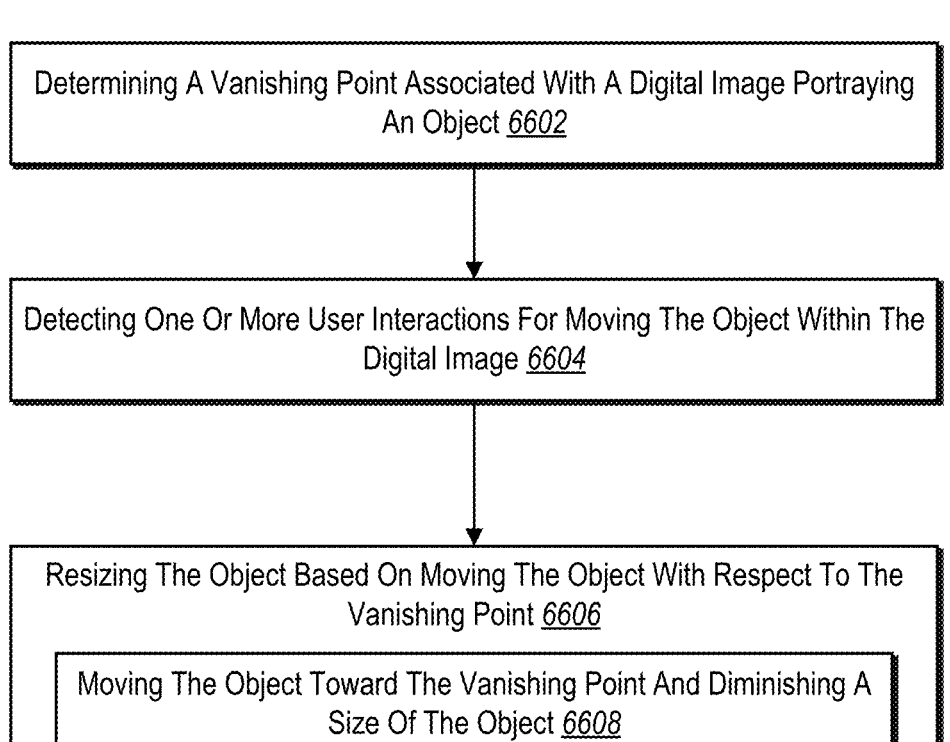

Determining A Vanishing Point Associated With A Digital Image Portraying An Object *6602*

Detecting One Or More User Interactions For Moving The Object Within The Digital Image *6604*

Resizing The Object Based On Moving The Object With Respect To The Vanishing Point *6606*

Moving The Object Toward The Vanishing Point And Diminishing A Size Of The Object *6608*

Moving The Object Away From The Vanishing Point And Increasing The Size Of The Object *6610*

*Fig. 66*

6700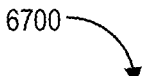

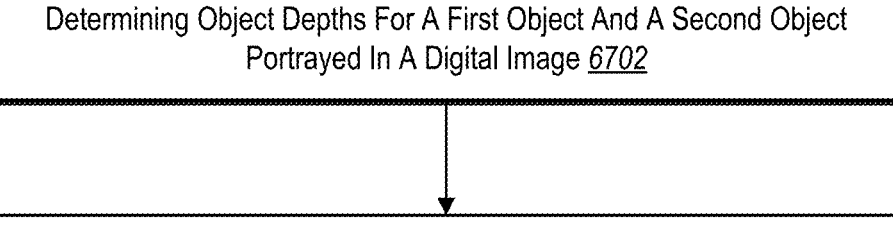

Determining Object Depths For A First Object And A Second Object Portrayed In A Digital Image *6702*

Moving The First Object To Create An Overlap Area With The Second Object *6704*

Modifying The Digital Image To Occlude One Of The Objects Within The Overlap Area Based On The Object Depths *6706*

Occluding The Second Object With The First Object Based On The Object Depth For The First Object Being Less *6708*

Occluding The First Object With The Second Object Based On The Object Depth For The First Object Being Greater *6710*

*Fig. 67*

MODIFYING DIGITAL IMAGES VIA DEPTH-AWARE OBJECT MOVE

CROSS-REFERENCE TO RELATED APPLICATIONS

This application claims priority to and the benefit of U.S. Provisional Patent Application No. 63/378,616 filed Oct. 6, 2022, which is incorporated herein by reference in its entirety. This application is a continuation-in-part of U.S. patent application Ser. No. 18/190,500, filed Mar. 27, 2023, which is a continuation-in-part of: U.S. patent application Ser. No. 18/058,538, filed Nov. 23, 2022, U.S. patent application Ser. No. 18/058,554, filed Nov. 23, 2022, U.S. patent application Ser. No. 18/058,575, filed Nov. 23, 2022, U.S. patent application Ser. No. 18/058,601, filed Nov. 23, 2022, U.S. patent application Ser. No. 18/058,622, filed Nov. 23, 2022, and U.S. patent application Ser. No. 18/058,630, filed Nov. 23, 2022. The aforementioned applications are hereby incorporated by reference in their entirety.

BACKGROUND

Recent years have seen significant advancement in hardware and software platforms for performing computer vision and image editing tasks. Indeed, systems provide a variety of image-related tasks, such as object identification, classification, segmentation, composition, style transfer, image inpainting, etc.

SUMMARY

One or more embodiments described herein provide benefits and/or solve one or more problems in the art with systems, methods, and non-transitory computer-readable media that implement artificial intelligence models to facilitate flexible and efficient scene-based image editing. To illustrate, in one or more embodiments, a system utilizes one or more machine learning models to learn/identify characteristics of a digital image, anticipate potential edits to the digital image, and/or generate supplementary components that are usable in various edits. Accordingly, the system gains an understanding of the two-dimensional digital image as if it were a real scene, having distinct semantic areas reflecting real-world (e.g., three-dimensional) conditions. Further, the system enables the two-dimensional digital image to be edited so that the changes automatically and consistently reflect the corresponding real-world conditions without relying on additional user input. Thus, the system facilitates flexible and intuitive editing of digital images while efficiently reducing the user interactions typically required to make such edits.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 66 illustrates a flowchart for a series of acts for implementing a perspective-aware object move operation on a digital image in accordance with one or more embodiments;

FIG. 67 illustrates a flowchart for a series of acts for implementing a depth-aware object move operation on a digital image in accordance with one or more embodiments.

DETAILED DESCRIPTION

Figure 1:
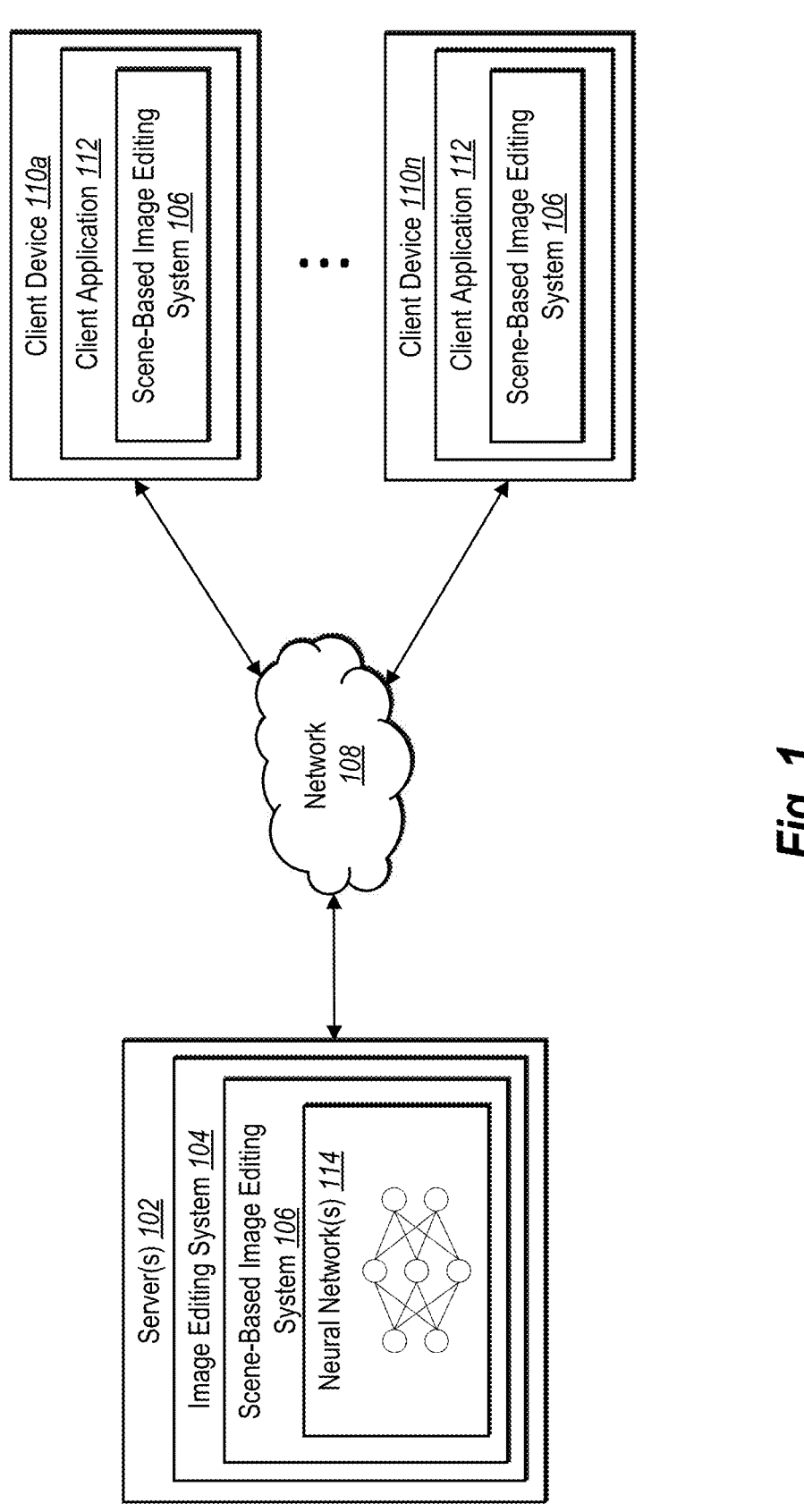
FIG. 1 illustrates an example environment in which a scene-based image editing system operates in accordance with one or more embodiments.

One or more embodiments described herein include a scene-based image editing system that implements scene-based image editing techniques using intelligent image understanding. Indeed, in one or more embodiments, the scene-based image editing system utilizes one or more machine learning models to process a digital image in anticipation of user interactions for modifying the digital image. For example, in some implementations, the scene-based image editing system performs operations that build a knowledge set for the digital image and/or automatically initiate workflows for certain modifications before receiving user input for those modifications. Based on the pre-processing, the scene-based image editing system facilitates user interactions with the digital image as if it were a real scene reflecting real-world conditions. For instance, the scene-based image editing system enables user interactions that target pre-processed semantic areas (e.g., objects that have been identified and/or masked via pre-processing) as distinct components for editing rather than target the individual underlying pixels. Further, the scene-based image editing system automatically modifies the digital image to consistently reflect the corresponding real-world conditions.

As indicated above, in one or more embodiments, the scene-based image editing system utilizes machine learning to process a digital image in anticipation of future modifications. In particular, in some cases, the scene-based image editing system employs one or more machine learning models to perform preparatory operations that will facilitate subsequent modification. In some embodiments, the scene-based image editing system performs the pre-processing automatically in response to receiving the digital image. For instance, in some implementations, the scene-based image editing system gathers data and/or initiates a workflow for editing the digital image before receiving user input for such edits. Thus, the scene-based image editing system allows user interactions to directly indicate intended edits to the digital image rather than the various preparatory steps often utilized for making those edits.

As an example, in one or more embodiments, the scene-based image editing system pre-processes a digital image to facilitate object-aware modifications. In particular, in some embodiments, the scene-based image editing system pre-processes a digital image in anticipation of user input for manipulating one or more semantic areas of a digital image, such as user input for moving or deleting one or more objects within the digital image.

To illustrate, in some instances, the scene-based image editing system utilizes a segmentation neural network to generate, for each object portrayed in a digital image, an object mask. In some cases, the scene-based image editing system utilizes a hole-filing model to generate, for each object (e.g., for each corresponding object mask), a content fill (e.g., an inpainting segment). In some implementations, the scene-based image editing system generates a completed background for the digital image by pre-filling object holes with the corresponding content fill. Accordingly, in one or more embodiments, the scene-based image editing system pre-processes the digital image in preparation for an object-aware modification, such as a move operation or a delete operation, by pre-generating object masks and/or content fills before receiving user input for such a modification.

Thus, upon receiving one or more user inputs targeting an object of the digital image for an object-aware modification (e.g., a move operation or a delete operation), the scene-based image editing system leverages the corresponding pre-generated object mask and/or content fill to complete the modification. For instance, in some cases, the scene-based image editing system detects, via a graphical user interface displaying the digital image, a user interaction with an object portrayed therein (e.g., a user selection of the object). In response to the user interaction, the scene-based image editing system surfaces the corresponding object mask that was previously generated. The scene-based image editing system further detects, via the graphical user interface, a second user interaction with the object (e.g., with the surfaced object mask) for moving or deleting the object. Accordingly, the scene-based image editing system moves or deletes the object, revealing the content fill previously positioned behind the object.

Additionally, in one or more embodiments, the scene-based image editing system pre-processes a digital image to generate a semantic scene graph for the digital image. In particular, in some embodiments, the scene-based image editing system generates a semantic scene graph to map out various characteristics of the digital image. For instance, in some cases, the scene-based image editing system generates a semantic scene graph that describes the objects portrayed in the digital image, the relationships or object attributes of those objects, and/or various other characteristics determined to be useable for subsequent modification of the digital image.

In some cases, the scene-based image editing system utilizes one or more machine learning models to determine the characteristics of the digital image to be included in the semantic scene graph. Further, in some instances, the scene-based image editing system generates the semantic scene graph utilizing one or more predetermined or pre-generated template graphs. For instance, in some embodiments, the scene-based image editing system utilizes an image analysis graph, a real-world class description graph, and/or a behavioral policy graph in generating the semantic scene.

Thus, in some cases, the scene-based image editing system uses the semantic scene graph generated for a digital image to facilitate modification of the digital image. For instance, in some embodiments, upon determining that an object has been selected for modification, the scene-based image editing system retrieves characteristics of the object from the semantic scene graph to facilitate the modification. To illustrate, in some implementations, the scene-based image editing system executes or suggests one or more additional modifications to the digital image based on the characteristics from the semantic scene graph.

As one example, in some embodiments, upon determining that an object has been selected for modification, the scene-based image editing system provides one or more object attributes of the object for display via the graphical user interface displaying the object. For instance, in some cases, the scene-based image editing system retrieves a set of object attributes for the object (e.g., size, shape, or color) from the corresponding semantic scene graph and presents the set of object attributes for display in association with the object.

In some cases, the scene-based image editing system further facilitates user interactivity with the displayed set of object attributes for modifying one or more of the object attributes. For instance, in some embodiments, the scene-based image editing system enables user interactions that change the text of the displayed set of object attributes or select from a provided set of object attribute alternatives. Based on the user interactions, the scene-based image editing system modifies the digital image by modifying the one or more object attributes in accordance with the user interactions.

As another example, in some implementations, the scene-based image editing system utilizes a semantic scene graph to implement relationship-aware object modifications. To illustrate, in some cases, the scene-based image editing system detects a user interaction selecting an object portrayed in a digital image for modification. The scene-based image editing system references the semantic scene graph previously generated for the digital image to identify a relationship between that object and one or more other objects portrayed in the digital image. Based on the identified relationships, the scene-based image editing system also targets the one or more related objects for the modification.

For instance, in some cases, the scene-based image editing system automatically adds the one or more related objects to the user selection. In some instances, the scene-based image editing system provides a suggestion that the one or more related objects be included in the user selection and adds the one or more related objects based on an acceptance of the suggestion. Thus, in some embodiments, the scene-based image editing system modifies the one or more related objects as it modifies the user-selected object.

In one or more embodiments, in addition to pre-processing a digital image to identify objects portrayed as well as their relationships and/or object attributes, the scene-based image editing system further pre-processes a digital image to aid in the removal of distracting objects. For example, in some cases, the scene-based image editing system utilizes a distractor detection neural network to classify one or more objects portrayed in a digital image as subjects of the digital image and/or classify one or more other objects portrayed in the digital image as distracting objects. In some embodiments, the scene-based image editing system provides a visual indication of the distracting objects within a display of the digital image, suggesting that these objects be removed to present a more aesthetic and cohesive visual result.

Further, in some cases, the scene-based image editing system detects the shadows of distracting objects (or other selected objects) for removal along with the distracting objects. In particular, in some cases, the scene-based image editing system utilizes a shadow detection neural network to identify shadows portrayed in the digital image and associate those shadows with their corresponding objects. Accordingly, upon removal of a distracting object from a digital image, the scene-based image editing system further removes the associated shadow automatically.

In some embodiments, the scene-based image editing system modifies objects within a digital image using three-dimensional effects. For instance, in some cases, the scene-based image editing system moves an object within a digital image relative to a perspective associated with the digital image. In some cases, the scene-based image editing system further resizes the object based on the movement. In some instances, the scene-based image editing system provides occlusion for an object that has been moved to overlap with another object within a digital image based on object depths determined for those objects (e.g., determined via pre-processing).

Additionally, in some implementations, the scene-based image editing system tracks the semantic history of a digital image that has been edited. For example, in some cases, the scene-based image editing system generates and maintains a semantic history log that reflects the semantic states of a digital image resulting from various edits. In some instances, the scene-based image editing system further facilitates interaction with the semantic history log (e.g., via a graphical user interface) to enable a user to view and/or modify previous semantic states.

In some embodiments, the scene-based image editing system utilizes multi-modal interactions for modifying a digital image. To illustrate, in some embodiments, the scene-based image editing system uses speech input and gesture interactions (e.g., touch interactions with a touch screen of a client device) in editing a digital image. Based on both inputs received, the scene-based image editing system determines a targeted edit for the digital image.

The scene-based image editing system provides advantages over conventional systems. Indeed, conventional image editing systems suffer from several technological shortcomings that result in inflexible and inefficient operation. To illustrate, conventional systems are typically inflexible in that they rigidly perform edits on a digital image on the pixel level. In particular, conventional systems often perform a particular edit by targeting pixels individually for the edit. Accordingly, such systems often rigidly require user interactions for editing a digital image to interact with individual pixels to indicate the areas for the edit. Additionally, many conventional systems (e.g., due to their pixel-based editing) require users to have a significant amount of deep, specialized knowledge in how to interact with digital images, as well as the user interface of the system itself, to select the desired pixels and execute the appropriate workflow to edit those pixels.

Additionally, conventional image editing systems often fail to operate efficiently. For example, conventional systems typically require a significant amount of user interaction to modify a digital image. Indeed, in addition to user interactions for selecting individual pixels, conventional systems typically require a user to interact with multiple menus, sub-menus, and/or windows to perform the edit. For instance, many edits may require multiple editing steps using multiple different tools. Accordingly, many conventional systems require multiple interactions to select the proper tool at a given editing step, set the desired parameters for the tool, and utilize the tool to execute the editing step.

The scene-based image editing system operates with improved flexibility when compared to conventional systems. In particular, the scene-based image editing system implements techniques that facilitate flexible scene-based editing. For instance, by pre-processing a digital image via machine learning, the scene-based image editing system allows a digital image to be edited as if it were a real scene, in which various elements of the scene are known and are able to be interacted with intuitively on the semantic level to perform an edit while continuously reflecting real-world conditions. Indeed, where pixels are the targeted units under many conventional systems and objects are generally treated as groups of pixels, the scene-based image editing system allows user interactions to treat whole semantic areas (e.g., objects) as distinct units. Further, where conventional systems often require deep, specialized knowledge of the tools and workflows needed to perform edits, the scene-based editing system offers a more intuitive editing experience that enables a user to focus on the end goal of the edit.

Further, the scene-based image editing system operates with improved efficiency when compared to conventional systems. In particular, the scene-based image editing system implements a graphical user interface that reduces the user interactions required for editing. Indeed, by pre-processing a digital image in anticipation of edits, the scene-based image editing system reduces the user interactions that are required to perform an edit. Specifically, the scene-based image editing system performs many of the operations required for an edit without relying on user instructions to perform those operations. Thus, in many cases, the scene-based image editing system reduces the user interactions typically required under conventional systems to select pixels to target for editing and to navigate menus, sub-menus, or other windows to select a tool, select its corresponding parameters, and apply the tool to perform the edit. By implementing a graphical user interface that reduces and simplifies user interactions needed for editing a digital image, the scene-based image editing system offers improved user experiences on computing devices-such as tablets or smart phone devices-having relatively limited screen space.

Additional detail regarding the scene-based image editing system will now be provided with reference to the figures. For example, FIG. 1 illustrates a schematic diagram of an exemplary system 100 in which a scene-based image editing system 106 operates. As illustrated in FIG. 1, the system 100 includes a server(s) 102, a network 108, and client devices 110a-110n.

Although the system 100 of FIG. 1 is depicted as having a particular number of components, the system 100 is capable of having any number of additional or alternative components (e.g., any number of servers, client devices, or other components in communication with the scene-based image editing system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n are communicatively coupled with each other either directly or indirectly (e.g., through the network 108 discussed in greater detail below in relation to FIG. 66). Moreover, the server(s) 102 and the client devices 110a-110n include one or more of a variety of computing devices (including one or more computing devices as discussed in greater detail with relation to FIG. 66).

As mentioned above, the system 100 includes the server(s) 102. In one or more embodiments, the server(s) 102 generates, stores, receives, and/or transmits data including digital images and modified digital images. In one or more embodiments, the server(s) 102 comprises a data server. In some implementations, the server(s) 102 comprises a communication server or a web-hosting server.

In one or more embodiments, the image editing system 104 provides functionality by which a client device (e.g., a user of one of the client devices 110a-110n) generates, edits, manages, and/or stores digital images. For example, in some instances, a client device sends a digital image to the image editing system 104 hosted on the server(s) 102 via the network 108. The image editing system 104 then provides options that the client device may use to edit the digital image, store the digital image, and subsequently search for, access, and view the digital image. For instance, in some cases, the image editing system 104 provides one or more options that the client device may use to modify objects within a digital image.

In one or more embodiments, the client devices 110a-110n include computing devices that access, view, modify, store, and/or provide, for display, digital images. For example, the client devices 110a-110n include smartphones, tablets, desktop computers, laptop computers, head-mounted-display devices, or other electronic devices. The client devices 110a-110n include one or more applications (e.g., the client application 112) that can access, view, modify, store, and/or provide, for display, digital images. For example, in one or more embodiments, the client application 112 includes a software application installed on the client devices 110a-110n. Additionally, or alternatively, the client application 112 includes a web browser or other application that accesses a software application hosted on the server(s) 102 (and supported by the image editing system 104).

To provide an example implementation, in some embodiments, the scene-based image editing system 106 on the server(s) 102 supports the scene-based image editing system 106 on the client device 110n. For instance, in some cases, the scene-based image editing system 106 on the server(s) 102 learns parameters for a neural network(s) 114 for analyzing and/or modifying digital images. The scene-based image editing system 106 then, via the server(s) 102, provides the neural network(s) 114 to the client device 110n. In other words, the client device 110n obtains (e.g., downloads) the neural network(s) 114 with the learned parameters from the server(s) 102. Once downloaded, the scene-based image editing system 106 on the client device 110*n* utilizes the neural network(s) 114 to analyze and/or modify digital images independent from the server(s) 102.

In alternative implementations, the scene-based image editing system 106 includes a web hosting application that allows the client device 110*n* to interact with content and services hosted on the server(s) 102. To illustrate, in one or more implementations, the client device 110*n* accesses a software application supported by the server(s) 102. In response, the scene-based image editing system 106 on the server(s) 102 modifies digital images. The server(s) 102 then provides the modified digital images to the client device 110*n* for display.

Indeed, the scene-based image editing system 106 is able to be implemented in whole, or in part, by the individual elements of the system 100. Indeed, although FIG. 1 illustrates the scene-based image editing system 106 implemented with regard to the server(s) 102, different components of the scene-based image editing system 106 are able to be implemented by a variety of devices within the system 100. For example, one or more (or all) components of the scene-based image editing system 106 are implemented by a different computing device (e.g., one of the client devices 110*a*-110*n*) or a separate server from the server(s) 102 hosting the image editing system 104. Indeed, as shown in FIG. 1, the client devices 110*a*-110*n* include the scene-based image editing system 106. Example components of the scene-based image editing system 106 will be described below with regard to FIG. 65.

Figure 2:
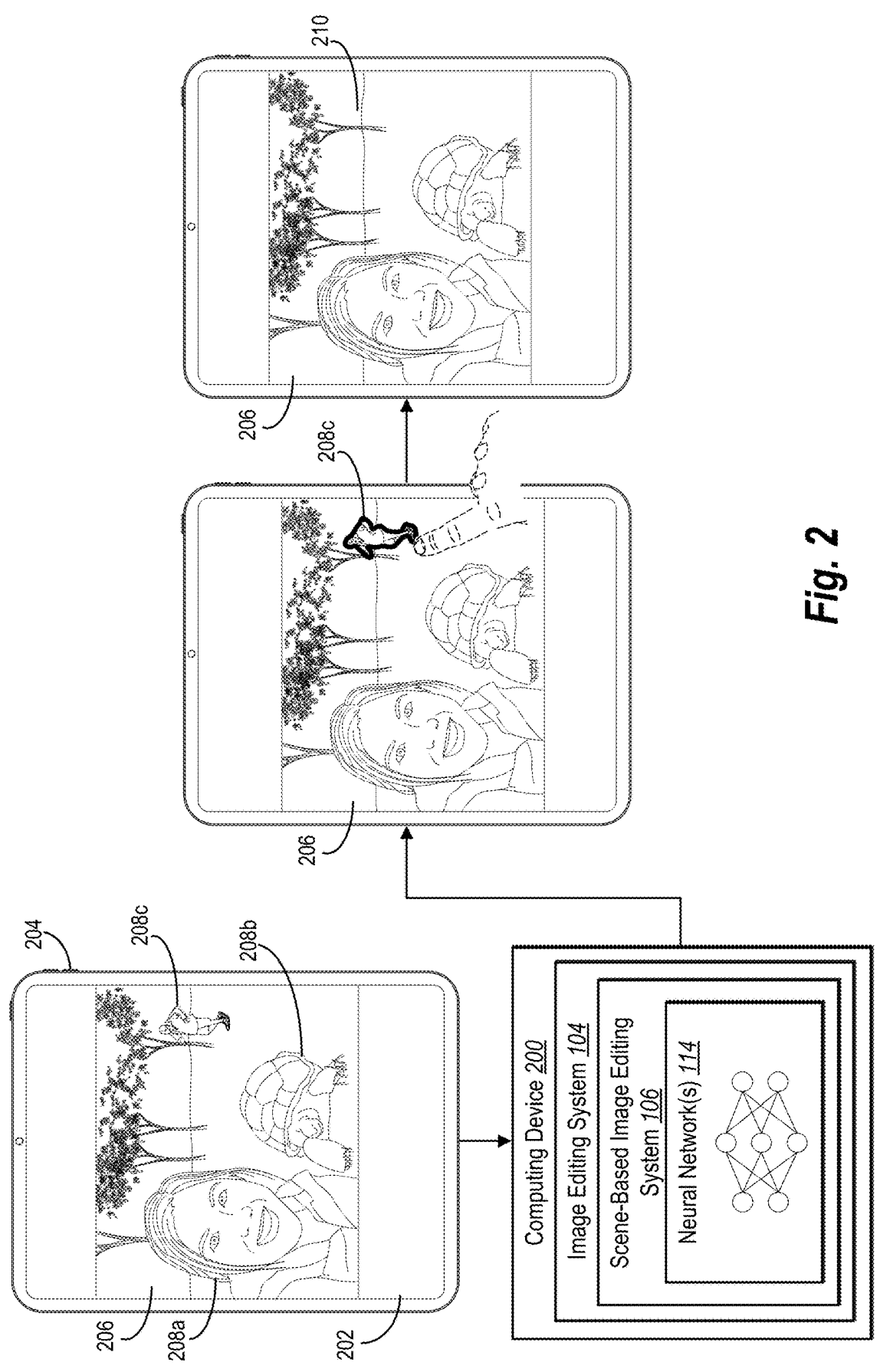
FIG. 2 illustrates an overview diagram of the scene-based image editing system editing a digital image as a real scene in accordance with one or more embodiments.

As mentioned, in one or more embodiments, the scene-based image editing system 106 manages a two-dimensional digital image as a real scene reflecting real-world conditions. In particular, the scene-based image editing system 106 implements a graphical use interface that facilitates the modification of a digital image as a real scene. FIG. 2 illustrates an overview diagram of the scene-based image editing system 106 managing a digital image as a real scene in accordance with one or more embodiments.

As shown in FIG. 2, the scene-based image editing system 106 provides a graphical user interface 202 for display on a client device 204. As further shown, the scene-based image editing system 106 provides, for display within the graphical user interface 202, a digital image 206. In one or more embodiments, the scene-based image editing system 106 provides the digital image 206 for display after the digital image 206 is captured via a camera of the client device 204. In some instances, the scene-based image editing system 106 receives the digital image 206 from another computing device or otherwise accesses the digital image 206 at some storage location, whether local or remote.

As illustrated in FIG. 2, the digital image 206 portrays various objects. In one or more embodiments, an object includes a distinct visual component portrayed in a digital image. In particular, in some embodiments, an object includes a distinct visual element that is identifiable separately from other visual elements portrayed in a digital image. In many instances, an object includes a group of pixels that, together, portray the distinct visual element separately from the portrayal of other pixels. An object refers to a visual representation of a subject, concept, or sub-concept in an image. In particular, an object refers to a set of pixels in an image that combine to form a visual depiction of an item, article, partial item, component, or element. In some cases, an object is identifiable via various levels of abstraction. In other words, in some instances, an object includes separate object components that are identifiable individually or as part of an aggregate. To illustrate, in some embodiments, an object includes a semantic area (e.g., the sky, the ground, water, etc.). In some embodiments, an object comprises an instance of an identifiable thing (e.g., a person, an animal, a building, a car, or a cloud, clothing, or some other accessory). In one or more embodiments, an object includes sub-objects, parts, or portions. For example, a person's face, hair, or leg can be objects that are part of another object (e.g., the person's body). In still further implementations, a shadow or a reflection comprises part of an object. As another example, a shirt is an object that can be part of another object (e.g., a person).

As shown in FIG. 2, the digital image 206 portrays a static, two-dimensional image. In particular, the digital image 206 portrays a two-dimensional projection of a scene that was captured from the perspective of a camera. Accordingly, the digital image 206 reflects the conditions (e.g., the lighting, the surrounding environment, or the physics to which the portrayed objects are subject) under which the image was captured; however, it does so statically. In other words, the conditions are not inherently maintained when changes to the digital image 206 are made. Under many conventional systems, additional user interactions are required to maintain consistency with respect to those conditions when editing a digital image.

Further, the digital image 206 includes a plurality of individual pixels that collectively portray various semantic areas. For instance, the digital image 206 portrays a plurality of objects, such as the objects 208*a*-208*c*. While the pixels of each object are contributing to the portrayal of a cohesive visual unit, they are not typically treated as such. Indeed, a pixel of a digital image is typically inherently treated as an individual unit with its own values (e.g., color values) that are modifiable separately from the values of other pixels. Accordingly, conventional systems typically require user interactions to target pixels individually for modification when making changes to a digital image.

As illustrated in FIG. 2, however, the scene-based image editing system 106 manages the digital image 206 as a real scene, consistently maintaining the conditions under which the image was captured when modifying the digital image. In particular, the scene-based image editing system 106 maintains the conditions automatically without relying on user input to reflect those conditions. Further, the scene-based image editing system 106 manages the digital image 206 on a semantic level. In other words, the digital image 206 manages each semantic area portrayed in the digital image 206 as a cohesive unit. For instance, as shown in FIG. 2 and as will be discussed, rather than requiring a user interaction to select the underlying pixels in order to interact with a corresponding object, the scene-based image editing system 106 enables user input to target the object as a unit and the scene-based image editing system 106 automatically recognizes the pixels that are associated with that object.

To illustrate, as shown in FIG. 2, in some cases, the scene-based image editing system 106 operates on a computing device 200 (e.g., the client device 204 or a separate computing device, such as the server(s) 102 discussed above with reference to FIG. 1) to pre-process the digital image 206. In particular, the scene-based image editing system 106 performs one or more pre-processing operations in anticipation of future modification to the digital image. In one or more embodiments, the scene-based image editing system 106 performs these pre-processing operations automatically in response to receiving or accessing the digital image 206 before user input for making the anticipated modifications have been received. As further shown, the scene-based image editing system 106 utilizes one or more machine learning models, such as the neural network(s) 114 to perform the pre-processing operations.

In one or more embodiments, the scene-based image editing system 106 pre-processes the digital image 206 by learning characteristics of the digital image 206. For instance, in some cases, the scene-based image editing system 106 segments the digital image 206, identifies objects, classifies objects, determines relationships and/or attributes of objects, determines lighting characteristics, and/or determines depth/perspective characteristics. In some embodiments, the scene-based image editing system 106 pre-processes the digital image 206 by generating content for use in modifying the digital image 206. For example, in some implementations, the scene-based image editing system 106 generates an object mask for each portrayed object and/or generates a content fill for filling in the background behind each portrayed object. Background refers to what is behind an object in an image. Thus, when a first object is positioned in front of a second object, the second object forms at least part of the background for the first object. Alternatively, the background comprises the furthest element in the image (often a semantic area like the sky, ground, water, etc.). The background for an object, in or more embodiments, comprises multiple object/semantic areas. For example, the background for an object can comprise part of another object and part of the furthest element in the image. The various pre-processing operations and their use in modifying a digital image will be discussed in more detail below with reference to the subsequent figures.

As shown in FIG. 2, the scene-based image editing system 106 detects, via the graphical user interface 202, a user interaction with the object 208c. In particular, the scene-based image editing system 106 detects a user interaction for selecting the object 208c. Indeed, in one or more embodiments, the scene-based image editing system 106 determines that the user interaction targets the object even where the user interaction only interacts with a subset of the pixels that contribute to the object 208c based on the pre-processing of the digital image 206. For instance, as mentioned, the scene-based image editing system 106 pre-processes the digital image 206 via segmentation in some embodiments. As such, at the time of detecting the user interaction, the scene-based image editing system 106 has already partitioned/segmented the digital image 206 into its various semantic areas. Thus, in some instances, the scene-based image editing system 106 determines that the user interaction selects a distinct semantic area (e.g., the object 208c) rather than the particular underlying pixels or image layers with which the user interacted.

As further shown in FIG. 2, the scene-based image editing system 106 modifies the digital image 206 via a modification to the object 208c. Though FIG. 2 illustrates a deletion of the object 208c, various modifications are possible and will be discussed in more detail below. In some embodiments, the scene-based image editing system 106 edits the object 208c in response to detecting a second user interaction for performing the modification.

As illustrated, upon deleting the object 208c from the digital image 206, the scene-based image editing system 106 automatically reveals background pixels that have been positioned in place of the object 208c. Indeed, as mentioned, in some embodiments, the scene-based image editing system 106 pre-processes the digital image 206 by generating a content fill for each portrayed foreground object. Thus, as indicated by FIG. 2, the scene-based image editing system 106 automatically exposes the content fill 210 previously generated for the object 208c upon removal of the object 208c from the digital image 206. In some instances, the scene-based image editing system 106 positions the content fill 210 within the digital image so that the content fill 210 is exposed rather than a hole appearing upon removal of object 208c.

Thus, the scene-based image editing system 106 operates with improved flexibility when compared to many conventional systems. In particular, the scene-based image editing system 106 implements flexible scene-based editing techniques in which digital images are modified as real scenes that maintain real-world conditions (e.g., physics, environment, or object relationships). Indeed, in the example shown in FIG. 2, the scene-based image editing system 106 utilizes pre-generated content fills to consistently maintain the background environment portrayed in the digital image 206 as though the digital image 206 had captured that background in its entirety. Thus, the scene-based image editing system 106 enables the portrayed objects to be moved around freely (or removed entirely) without disrupting the scene portrayed therein.

Further, the scene-based image editing system 106 operates with improved efficiency. Indeed, by segmenting the digital image 206 and generating the content fill 210 in anticipation of a modification that would remove the object 208c from its position in the digital image 206, the scene-based image editing system 106 reduces the user interactions that are typically required to perform those same operations under conventional systems. Thus, the scene-based image editing system 106 enables the same modifications to a digital image with less user interactions when compared to these conventional systems.

As just discussed, in one or more embodiments, the scene-based image editing system 106 implements object-aware image editing on digital images. In particular, the scene-based image editing system 106 implements object-aware modifications that target objects as cohesive units that are interactable and can be modified. FIGS. 3-9B illustrate the scene-based image editing system 106 implementing object-aware modifications in accordance with one or more embodiments.

Indeed, many conventional image editing systems are inflexible and inefficient with respect to interacting with objects portrayed in a digital image. For instance, as previously mentioned, conventional systems are often rigid in that they require user interactions to target pixels individually rather than the objects that those pixels portray. Thus, such systems often require a rigid, meticulous process of selecting pixels for modification. Further, as object identification occurs via user selection, these systems typically fail to anticipate and prepare for potential edits made to those objects.

Further, many conventional image editing systems require a significant amount of user interactions to modify objects portrayed in a digital image. Indeed, in addition to the pixel-selection process for identifying objects in a digital image-which can require a series of user interactions on its own-conventional systems may require workflows of significant length in which a user interacts with multiple menus, sub-menus, tool, and/or windows to perform the edit. Often, performing an edit on an object requires multiple preparatory steps before the desired edit is able to be executed, requiring additional user interactions.

The scene-based image editing system 106 provides advantages over these systems. For instance, the scene-based image editing system 106 offers improved flexibility via object-aware image editing. In particular, the scene-based image editing system 106 enables object-level-rather than pixel-level or layer level-interactions, facilitating user interactions that target portrayed objects directly as cohesive units instead of their constituent pixels individually.

Further, the scene-based image editing system 106 improves the efficiency of interacting with objects portrayed in a digital image. Indeed, previously mentioned, and as will be discussed further below, the scene-based image editing system 106 implements pre-processing operations for identifying and/or segmenting for portrayed objects in anticipation of modifications to those objects. Indeed, in many instances, the scene-based image editing system 106 performs these pre-processing operations without receiving user interactions for those modifications. Thus, the scene-based image editing system 106 reduces the user interactions that are required to execute a given edit on a portrayed object.

Figure 3:
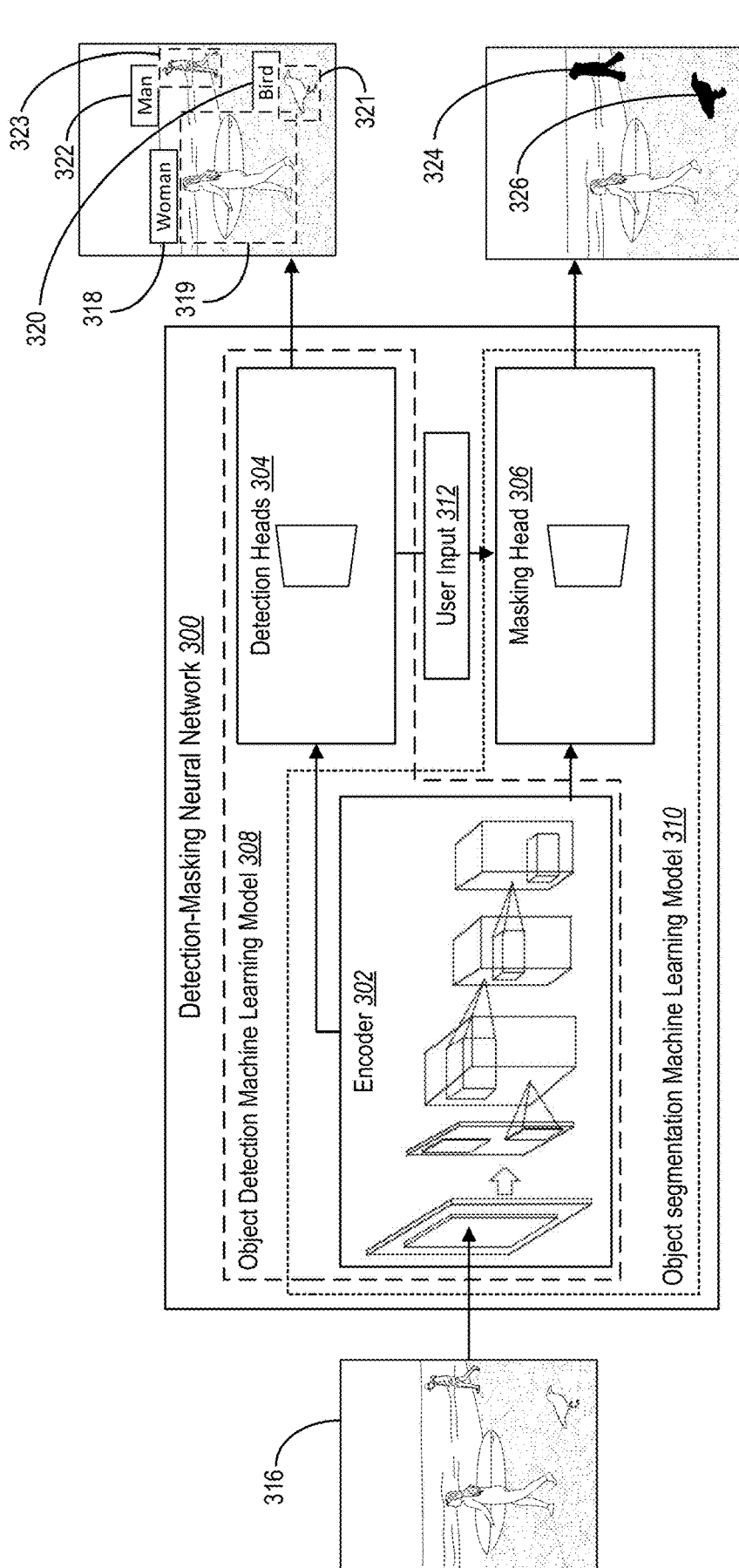
FIG. 3 illustrates a segmentation neural network utilized by the scene-based image editing system to generate object masks for objects in accordance with one or more embodiments.

In some embodiments, the scene-based image editing system 106 implements object-aware image editing by generating an object mask for each object/semantic area portrayed in a digital image. In particular, in some cases, the scene-based image editing system 106 utilizes a machine learning model, such as a segmentation neural network, to generate the object mask(s). FIG. 3 illustrates a segmentation neural network utilized by the scene-based image editing system 106 to generate object masks for objects in accordance with one or more embodiments.

In one or more embodiments, an object mask includes a map of a digital image that has an indication for each pixel of whether the pixel corresponds to part of an object (or other semantic area) or not. In some implementations, the indication includes a binary indication (e.g., a "1" for pixels belonging to the object and a "0" for pixels not belonging to the object). In alternative implementations, the indication includes a probability (e.g., a number between 1 and 0) that indicates the likelihood that a pixel belongs to an object. In such implementations, the closer the value is to 1, the more likely the pixel belongs to an object and vice versa.

In one or more embodiments, a machine learning model includes a computer representation that is tunable (e.g., trained) based on inputs to approximate unknown functions used for generating the corresponding outputs. In particular, in some embodiments, a machine learning model includes a computer-implemented model that utilizes algorithms to learn from, and make predictions on, known data by analyzing the known data to learn to generate outputs that reflect patterns and attributes of the known data. For instance, in some instances, a machine learning model includes, but is not limited to a neural network (e.g., a convolutional neural network, recurrent neural network or other deep learning network), a decision tree (e.g., a gradient boosted decision tree), association rule learning, inductive logic programming, support vector learning, Bayesian network, regression-based model (e.g., censored regression), principal component analysis, or a combination thereof.

In one or more embodiments, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

In one or more embodiments, a segmentation neural network includes a computer-implemented neural network that generates object masks for objects portrayed in digital images. In particular, in some embodiments, a segmentation neural network includes a computer-implemented neural network that detects objects within digital images and generates object masks for the objects. Indeed, in some implementations, a segmentation neural network includes a neural network pipeline that analyzes a digital image, identifies one or more objects portrayed in the digital image, and generates an object mask for the one or more objects. In some cases, however, a segmentation neural network focuses on a subset of tasks for generating an object mask.

As mentioned, FIG. 3 illustrates one example of a segmentation neural network that the scene-based image editing system 106 utilizes in one or more implementations to generate object masks for objects portrayed in a digital image. In particular, FIG. 3 illustrates one example of a segmentation neural network used by the scene-based image editing system 106 in some embodiments to both detect objects in a digital image and generate object masks for those objects. Indeed, FIG. 3 illustrates a detection-masking neural network 300 that comprises both an object detection machine learning model 308 (in the form of an object detection neural network) and an object segmentation machine learning model 310 (in the form of an object segmentation neural network). Specifically, the detection-masking neural network 300 is an implementation of the on-device masking system described in U.S. patent application Ser. No. 17/589,114, "DETECTING DIGITAL OBJECTS AND GENERATING OBJECT MASKS ON DEVICE," filed on Jan. 31, 2022, the entire contents of which are hereby incorporated by reference.

Although FIG. 3 illustrates the scene-based image editing system 106 utilizing the detection-masking neural network 300, in one or more implementations, the scene-based image editing system 106 utilizes different machine learning models to detect objects, generate object masks for objects, and/or extract objects from digital images. For instance, in one or more implementations, the scene-based image editing system 106 utilizes, as the segmentation neural network (or as an alternative to a segmentation neural network), one of the machine learning models or neural networks described in U.S. patent application Ser. No. 17/158,527, entitled "Segmenting Objects In Digital Images Utilizing A Multi-Object Segmentation Model Framework," filed on Jan. 26, 2021; or U.S. patent application Ser. No. 16/388,115, entitled "Robust Training of Large-Scale Object Detectors with Noisy Data," filed on Apr. 8, 2019; or U.S. patent application Ser. No. 16/518,880, entitled "Utilizing Multiple Object Segmentation Models To Automatically Select User-Requested Objects In Images," filed on Jul. 22, 2019; or U.S. patent application Ser. No. 16/817,418, entitled "Utilizing A Large-Scale Object Detector To Automatically Select Objects In Digital Images," filed on Mar. 20, 2020; or Ren, et al., *Faster r-cnn: Towards real-time object detection with region proposal networks*, NIPS, 2015; or Redmon, et al., *You Only Look Once: Unified, Real-Time Object Detection*, CVPR 2016, the contents of each of the foregoing applications and papers are hereby incorporated by reference in their entirety.

Similarly, in one or more implementations, the scene-based image editing system 106 utilizes, as the segmentation neural network (or as an alternative to a segmentation neural network), one of the machine learning models or neural networks described in Ning Xu et al., "Deep GrabCut for Object Selection," published Jul. 14, 2017; or U.S. Patent Application Publication No. 2019/0130229, entitled "Deep Salient Content Neural Networks for Efficient Digital Object Segmentation," filed on Oct. 31, 2017; or U.S. patent application Ser. No. 16/035,410, entitled "Automatic Trimap Generation and Image Segmentation," filed on Jul. 13, 2018; or U.S. Pat. No. 10,192,129, entitled "Utilizing Interactive Deep Learning To Select Objects In Digital Visual Media," filed Nov. 18, 2015, each of which are incorporated herein by reference in their entirety.

In one or more implementations the segmentation neural network is a panoptic segmentation neural network. In other words, the segmentation neural network creates object mask for individual instances of a given object type. Furthermore, the segmentation neural network, in one or more implementations, generates object masks for semantic regions (e.g., water, sky, sand, dirt, etc.) in addition to countable things. Indeed, in one or more implementations, the scene-based image editing system 106 utilizes, as the segmentation neural network (or as an alternative to a segmentation neural network), one of the machine learning models or neural networks described in U.S. patent application Ser. No. 17/495,618, entitled "PANOPTIC SEGMENTATION REFINEMENT NETWORK," filed on Oct. 2, 2021; or U.S. patent application Ser. No. 17/454,740, entitled "MULTI-SOURCE PANOPTIC FEATURE PYRAMID NETWORK," filed on Nov. 12, 2021, each of which are incorporated herein by reference in their entirety.

Returning now to FIG. 3, in one or more implementations, the scene-based image editing system 106 utilizes a detection-masking neural network 300 that includes an encoder 302 (or neural network encoder) having a backbone network, detection heads 304 (or neural network decoder head), and a masking head 306 (or neural network decoder head). As shown in FIG. 3, the encoder 302 encodes a digital image 316 and provides the encodings to the detection heads 304 and the masking head 306. The detection heads 304 utilize the encodings to detect one or more objects portrayed in the digital image 316. The masking head 306 generates at least one object mask for the detected objects.

As just mentioned, the detection-masking neural network 300 utilizes both the object detection machine learning model 308 and the object segmentation machine learning model 310. In one or more implementations, the object detection machine learning model 308 includes both the encoder 302 and the detection heads 304 shown in FIG. 3. While the object segmentation machine learning model 310 includes both the encoder 302 and the masking head 306.

Furthermore, the object detection machine learning model 308 and the object segmentation machine learning model 310 are separate machine learning models for processing objects within target and/or source digital images. FIG. 3 illustrates the encoder 302, detection heads 304, and the masking head 306 as a single model for detecting and segmenting objects of a digital image. For efficiency purposes, in some embodiments the scene-based image editing system 106 utilizes the network illustrated in FIG. 3 as a single network. The collective network (i.e., the object detection machine learning model 308 and the object segmentation machine learning model 310) is referred to as the detection-masking neural network 300. The following paragraphs describe components relating to the object detection machine learning model 308 of the network (such as the detection heads 304) and transitions to discussing components relating to the object segmentation machine learning model 310.

As just mentioned, in one or more embodiments, the scene-based image editing system 106 utilizes the object detection machine learning model 308 to detect and identify objects within the digital image 316 (e.g., a target or a source digital image). FIG. 3 illustrates one implementation of the object detection machine learning model 308 that the scene-based image editing system 106 utilizes in accordance with at least one embodiment. In particular, FIG. 3 illustrates the scene-based image editing system 106 utilizing the object detection machine learning model 308 to detect objects. In one or more embodiments, the object detection machine learning model 308 comprises a deep learning convolutional neural network (CNN). For example, in some embodiments, the object detection machine learning model 308 comprises a region-based (R-CNN).

As shown in FIG. 3, the object detection machine learning model 308 includes lower neural network layers and higher neural network layers. In general, the lower neural network layers collectively form the encoder 302 and the higher neural network layers collectively form the detection heads 304 (e.g., decoder). In one or more embodiments, the encoder 302 includes convolutional layers that encodes a digital image into feature vectors, which are outputted from the encoder 302 and provided as input to the detection heads 304. In various implementations, the detection heads 304 comprise fully connected layers that analyze the feature vectors and output the detected objects (potentially with approximate boundaries around the objects).

In particular, the encoder 302, in one or more implementations, comprises convolutional layers that generate a feature vector in the form of a feature map. To detect objects within the digital image 316, the object detection machine learning model 308 processes the feature map utilizing a convolutional layer in the form of a small network that is slid across small windows of the feature map. The object detection machine learning model 308 further maps each sliding window to a lower-dimensional feature. In one or more embodiments, the object detection machine learning model 308 processes this feature using two separate detection heads that are fully connected layers. In some embodiments, the first head comprises a box-regression layer that generates the detected object and an object-classification layer that generates the object label.

As shown by FIG. 3, the output from the detection heads 304 shows object labels above each of the detected objects. For example, the detection-masking neural network 300, in response to detecting objects, assigns an object label to each of the detected objects. In particular, in some embodiments, the detection-masking neural network 300 utilizes object labels based on classifications of the objects. To illustrate, FIG. 3 shows a label 318 for woman, a label 320 for bird, and a label 322 for man. Though not shown in FIG. 3, the detection-masking neural network 300 further distinguishes between the woman and the surfboard held by the woman in some implementations. Additionally, the detection-masking neural network 300 optionally also generates object masks for the semantic regions shown (e.g., the sand, the sea, and the sky).

As mentioned, the object detection machine learning model 308 detects the objects within the digital image 316. In some embodiments, and as illustrated in FIG. 3, the detection-masking neural network 300 indicates the detected objects utilizing approximate boundaries (e.g., bounding boxes 319, 321, and 323). For example, each of the bounding boxes comprises an area that encompasses an object. In some embodiments, the detection-masking neural network 300 annotates the bounding boxes with the previously mentioned object labels such as the name of the detected object, the coordinates of the bounding box, and/or the dimension of the bounding box.

As illustrated in FIG. 3, the object detection machine learning model 308 detects several objects for the digital image 316. In some instances, the detection-masking neural network 300 identifies all objects within the bounding boxes. In one or more embodiments, the bounding boxes comprise the approximate boundary area indicating the detected object. In some cases, an approximate boundary refers to an indication of an area including an object that is larger and/or less accurate than an object mask. In one or more embodiments, an approximate boundary includes at least a portion of a detected object and portions of the digital image 316 not comprising the detected object. An approximate boundary includes various shape, such as a square, rectangle, circle, oval, or other outline surrounding an object. In one or more embodiments, an approximate boundary comprises a bounding box.

Upon detecting the objects in the digital image 316, the detection-masking neural network 300 generates object masks for the detected objects. Generally, instead of utilizing coarse bounding boxes during object localization, the detection-masking neural network 300 generates segmentations masks that better define the boundaries of the object. The following paragraphs provide additional detail with respect to generating object masks for detected objects in accordance with one or more embodiments. In particular, FIG. 3 illustrates the scene-based image editing system 106 utilizing the object segmentation machine learning model 310 to generate segmented objects via object masks in accordance with some embodiments.

As illustrated in FIG. 3, the scene-based image editing system 106 processes a detected object in a bounding box utilizing the object segmentation machine learning model 310 to generate an object mask, such as an object mask 324 and an object mask 326. In alternative embodiments, the scene-based image editing system 106 utilizes the object detection machine learning model 308 itself to generate an object mask of the detected object (e.g., segment the object for selection).

In one or more implementations, prior to generating an object mask of a detected object, scene-based image editing system 106 receives user input 312 to determine objects for which to generate object masks. For example, the scene-based image editing system 106 receives input from a user indicating a selection of one of the detected objects. To illustrate, in the implementation shown, the scene-based image editing system 106 receives user input 312 of the user selecting bounding boxes 321 and 323. In alternative implementations, the scene-based image editing system 106 generates objects masks for each object automatically (e.g., without a user request indicating an object to select).

As mentioned, the scene-based image editing system 106 processes the bounding boxes of the detected objects in the digital image 316 utilizing the object segmentation machine learning model 310. In some embodiments, the bounding box comprises the output from the object detection machine learning model 308. For example, as illustrated in FIG. 3, the bounding box comprises a rectangular border about the object. Specifically, FIG. 3 shows bounding boxes 319, 321 and 323 which surround the woman, the bird, and the man detected in the digital image 316.

In some embodiments, the scene-based image editing system 106 utilizes the object segmentation machine learning model 310 to generate the object masks for the aforementioned detected objects within the bounding boxes. For example, the object segmentation machine learning model 310 corresponds to one or more deep neural networks or models that select an object based on bounding box parameters corresponding to the object within the digital image 316. In particular, the object segmentation machine learning model 310 generates the object mask 324 and the object mask 326 for the detected man and bird, respectively.

In some embodiments, the scene-based image editing system 106 selects the object segmentation machine learning model 310 based on the object labels of the object identified by the object detection machine learning model 308. Generally, based on identifying one or more classes of objects associated with the input bounding boxes, the scene-based image editing system 106 selects an object segmentation machine learning model tuned to generate object masks for objects of the identified one or more classes. To illustrate, in some embodiments, based on determining that the class of one or more of the identified objects comprises a human or person, the scene-based image editing system 106 utilizes a special human object mask neural network to generate an object mask, such as the object mask 324 shown in FIG. 3.

As further illustrated in FIG. 3, the scene-based image editing system 106 receives the object mask 324 and the object mask 326 as output from the object segmentation machine learning model 310. As previously discussed, in one or more embodiments, an object mask comprises a pixel-wise mask that corresponds to an object in a source or target digital image. In one example, an object mask includes a segmentation boundary indicating a predicted edge of one or more objects as well as pixels contained within the predicted edge.

In some embodiments, the scene-based image editing system 106 also detects the objects shown in the digital image 316 via the collective network, i.e., the detection-masking neural network 300, in the same manner outlined above. For example, in some cases, the scene-based image editing system 106, via the detection-masking neural network 300 detects the woman, the man, and the bird within the digital image 316. In particular, the scene-based image editing system 106, via the detection heads 304, utilizes the feature pyramids and feature maps to identify objects within the digital image 316 and generates object masks via the masking head 306.

Furthermore, in one or more implementations, although FIG. 3 illustrates generating object masks based on the user input 312, the scene-based image editing system 106 generates object masks without user input 312. In particular, the scene-based image editing system 106 generates object masks for all detected objects within the digital image 316. To illustrate, in at least one implementation, despite not receiving the user input 312, the scene-based image editing system 106 generates object masks for the woman, the man, and the bird.

Figure 4:
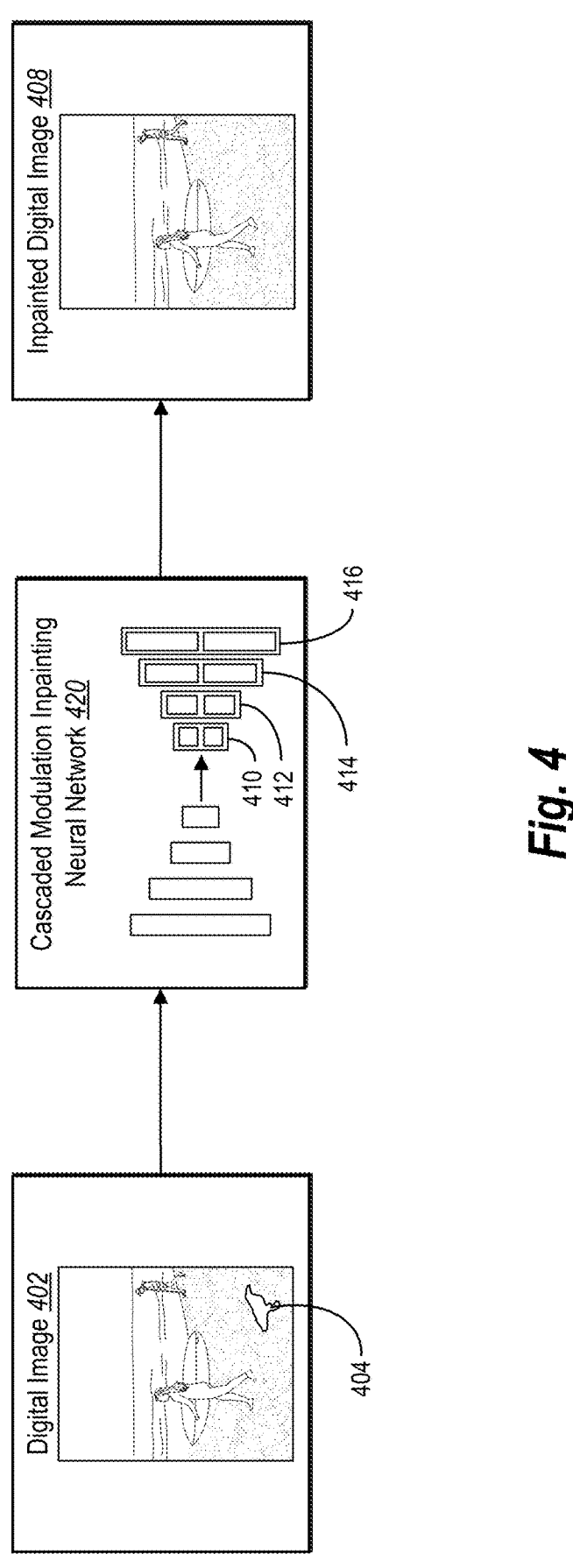
FIG. 4 illustrates utilizing a cascaded modulation inpainting neural network to generate an inpainted digital image in accordance with one or more embodiments.
Figure 5:
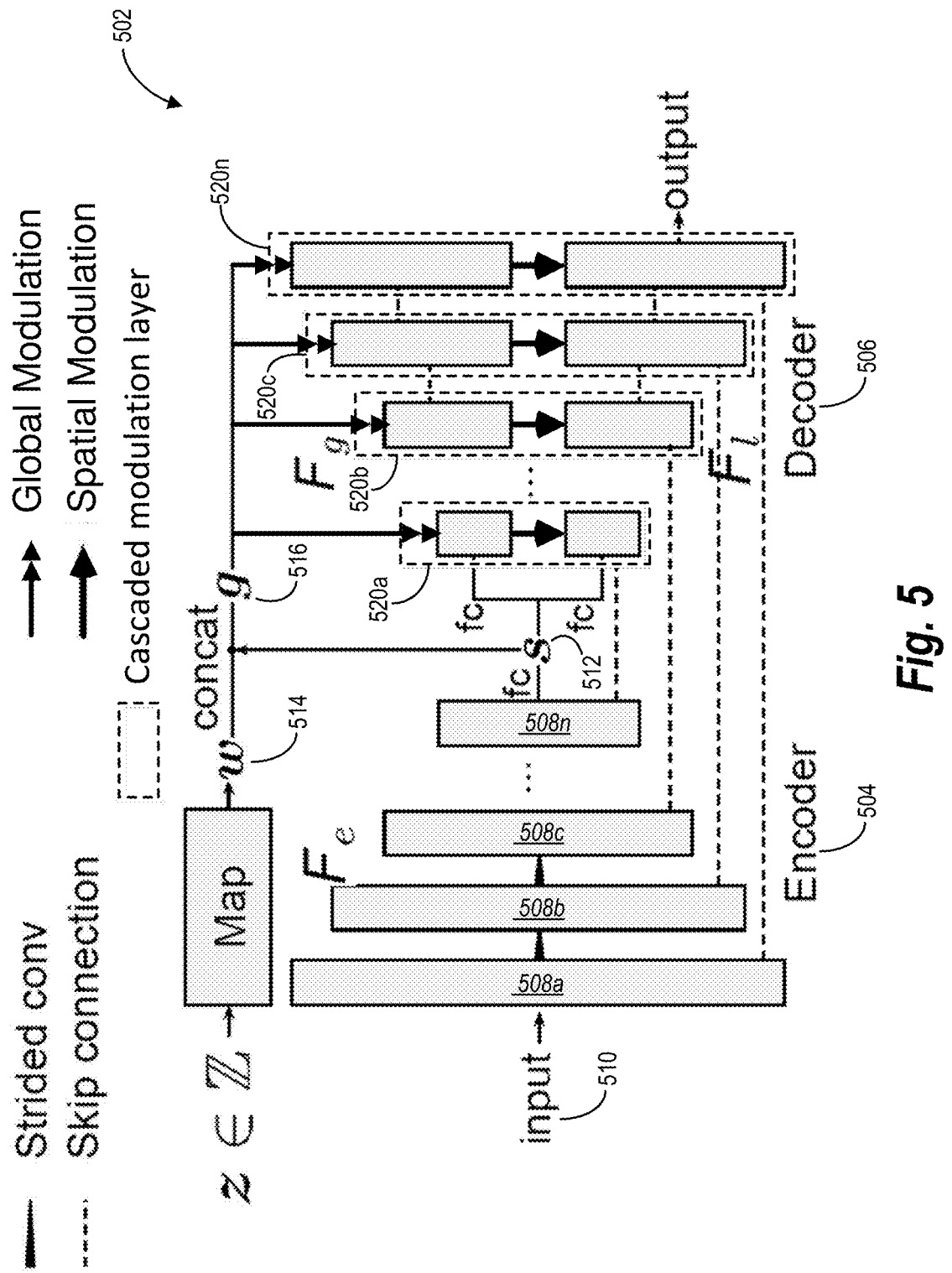
FIG. 5 illustrates an example architecture of a cascaded modulation inpainting neural network in accordance with one or more embodiments.
Figure 6:
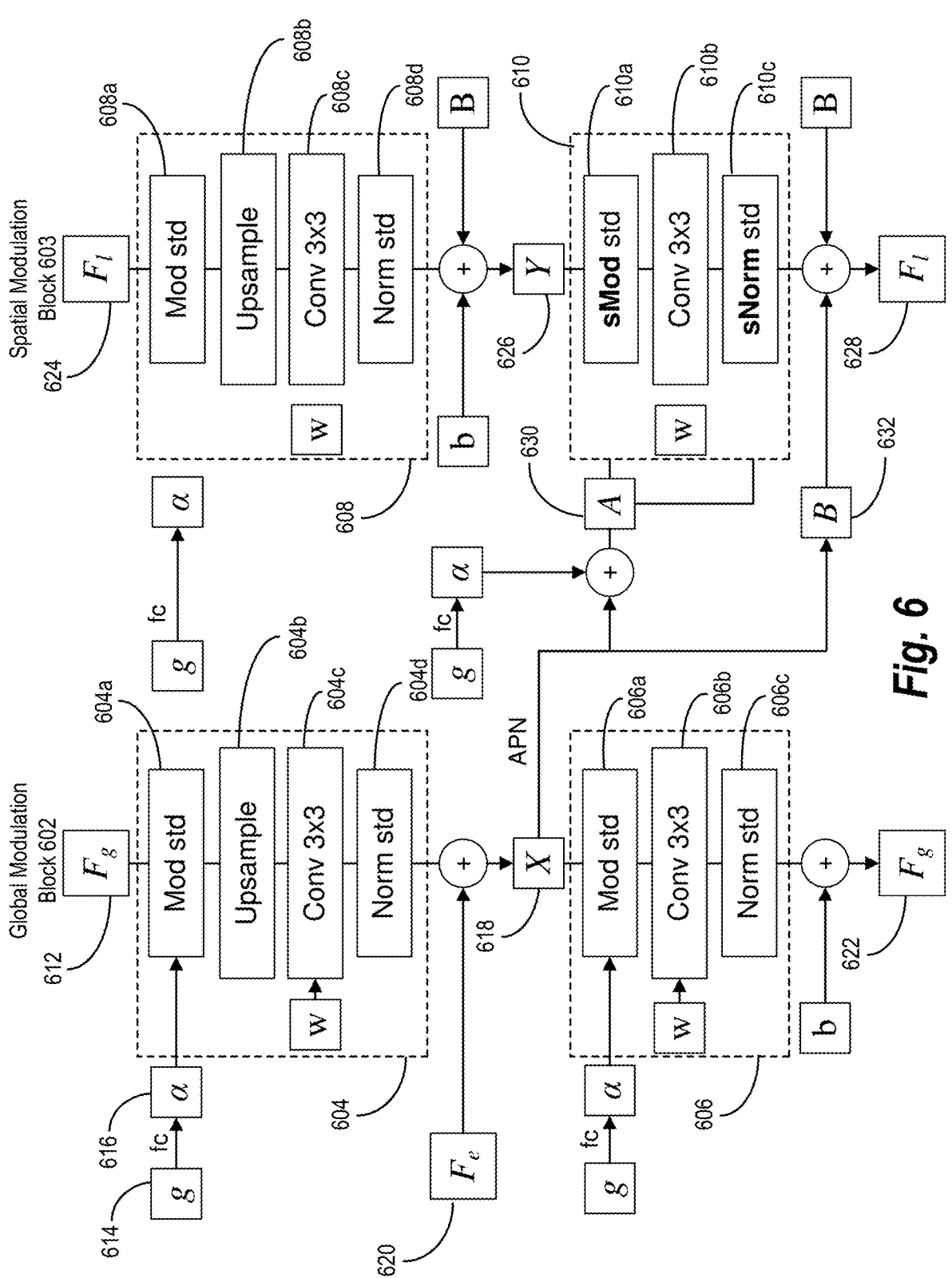
FIG. 6 illustrates global modulation blocks and spatial modulation blocks implemented in a cascaded modulation inpainting neural network in accordance with one or more embodiments.

In one or more embodiments, the scene-based image editing system 106 implements object-aware image editing by generating a content fill for each object portrayed in a digital image (e.g., for each object mask corresponding to portrayed objects) utilizing a hole-filing model. In particular, in some cases, the scene-based image editing system 106 utilizes a machine learning model, such as a content-aware hole-filling machine learning model to generate the content fill(s) for each foreground object. FIGS. 4-6 illustrate a content-aware hole-filling machine learning model utilized by the scene-based image editing system 106 to generate content fills for objects in accordance with one or more embodiments.

In one or more embodiments, a content fill includes a set of pixels generated to replace another set of pixels of a digital image. Indeed, in some embodiments, a content fill includes a set of replacement pixels for replacing another set of pixels. For instance, in some embodiments, a content fill includes a set of pixels generated to fill a hole (e.g., a content void) that remains after (or if) a set of pixels (e.g., a set of pixels portraying an object) has been removed from or moved within a digital image. In some cases, a content fill corresponds to a background of a digital image. To illustrate, in some implementations, a content fill includes a set of pixels generated to blend in with a portion of a background proximate to an object that could be moved/removed. In some cases, a content fill includes an inpainting segment, such as an inpainting segment generated from other pixels (e.g., other background pixels) within the digital image. In some cases, a content fill includes other content (e.g., arbitrarily selected content or content selected by a user) to fill in a hole or replace another set of pixels.

In one or more embodiments, a content-aware hole-filling machine learning model includes a computer-implemented machine learning model that generates content fill. In particular, in some embodiments, a content-aware hole-filling machine learning model includes a computer-implemented machine learning model that generates content fills for replacement regions in a digital image. For instance, in some cases, the scene-based image editing system 106 determines that an object has been moved within or removed from a digital image and utilizes a content-aware hole-filling machine learning model to generate a content fill for the hole that has been exposed as a result of the move/removal in response. As will be discussed in more detail, however, in some implementations, the scene-based image editing system 106 anticipates movement or removal of an object and utilizes a content-aware hole-filling machine learning model to pre-generate a content fill for that object. In some cases, a content-aware hole-filling machine learning model includes a neural network, such as an inpainting neural network (e.g., a neural network that generates a content fill—more specifically, an inpainting segment—using other pixels of the digital image). In other words, the scene-based image editing system 106 utilizes a content-aware hole-filling machine learning model in various implementations to provide content at a location of a digital image that does not initially portray such content (e.g., due to the location being occupied by another semantic area, such as an object).

FIG. 4 illustrates the scene-based image editing system 106 utilizing a content-aware machine learning model, such as a cascaded modulation inpainting neural network 420, to generate an inpainted digital image 408 from a digital image 402 with a replacement region 404 in accordance with one or more embodiments.

Indeed, in one or more embodiments, the replacement region 404 includes an area corresponding to an object (and a hole that would be present if the object were moved or deleted). In some embodiments, the scene-based image editing system 106 identifies the replacement region 404 based on user selection of pixels (e.g., pixels portraying an object) to move, remove, cover, or replace from a digital image. To illustrate, in some cases, a client device selects an object portrayed in a digital image. Accordingly, the scene-based image editing system 106 deletes or removes the object and generates replacement pixels. In some case, the scene-based image editing system 106 identifies the replacement region 404 by generating an object mask via a segmentation neural network. For instance, the scene-based image editing system 106 utilizes a segmentation neural network (e.g., the detection-masking neural network 300 discussed above with reference to FIG. 3) to detect objects with a digital image and generate object masks for the objects. Thus, in some implementations, the scene-based image editing system 106 generates content fill for the replacement region 404 before receiving user input to move, remove, cover, or replace the pixels initially occupying the replacement region 404

As shown, the scene-based image editing system 106 utilizes the cascaded modulation inpainting neural network 420 to generate replacement pixels for the replacement region 404. In one or more embodiments, the cascaded modulation inpainting neural network 420 includes a generative adversarial neural network for generating replacement pixels. In some embodiments, a generative adversarial neural network (or "GAN") includes a neural network that is tuned or trained via an adversarial process to generate an output digital image (e.g., from an input digital image). In some cases, a generative adversarial neural network includes multiple constituent neural networks such as an encoder neural network and one or more decoder/generator neural networks. For example, an encoder neural network extracts latent code from a noise vector or from a digital image. A generator neural network (or a combination of generator neural networks) generates a modified digital image by combining extracted latent code (e.g., from the encoder neural network). During training, a discriminator neural network, in competition with the generator neural network, analyzes a generated digital image to generate an authenticity prediction by determining whether the generated digital image is real (e.g., from a set of stored digital images) or fake (e.g., not from the set of stored digital images). The discriminator neural network also causes the scene-based image editing system 106 to modify parameters of the encoder neural network and/or the one or more generator neural networks to eventually generate digital images that fool the discriminator neural network into indicating that a generated digital image is a real digital image.

Along these lines, a generative adversarial neural network refers to a neural network having a specific architecture or a specific purpose such as a generative inpainting neural network. For example, a generative inpainting neural network includes a generative adversarial neural network that inpaints or fills pixels of a digital image with a content fill (or generates a content fill in anticipation of inpainting or filling in pixels of the digital image). In some cases, a generative inpainting neural network inpaints a digital image by filling hole regions (indicated by object masks). Indeed, as mentioned above, in some embodiments an object mask defines a replacement region using a segmentation or a mask indicating, overlaying, covering, or outlining pixels to be removed or replaced within a digital image.

Accordingly, in some embodiments, the cascaded modulation inpainting neural network 420 includes a generative inpainting neural network that utilizes a decoder having one or more cascaded modulation decoder layers. Indeed, as illustrated in FIG. 4, the cascaded modulation inpainting neural network 420 includes a plurality of cascaded modulation decoder layers 410, 412, 414, 416. In some cases, a cascaded modulation decoder layer includes at least two connected (e.g., cascaded) modulations blocks for modulating an input signal in generating an inpainted digital image. To illustrate, in some instances, a cascaded modulation decoder layer includes a first global modulation block and a second global modulation block. Similarly, in some cases, a cascaded modulation decoder layer includes a first global modulation block (that analyzes global features and utilizes a global, spatially-invariant approach) and a second spatial modulation block (that analyzes local features utilizing a spatially-varying approach). Additional detail regarding modulation blocks will be provided below (e.g., in relation to FIGS. 5-6).

As shown, the scene-based image editing system 106 utilizes the cascaded modulation inpainting neural network 420 (and the cascaded modulation decoder layers 410, 412, 414, 416) to generate the inpainted digital image 408. Specifically, the cascaded modulation inpainting neural network 420 generates the inpainted digital image 408 by generating a content fill for the replacement region 404. As illustrated, the replacement region 404 is now filled with a content fill having replacement pixels that portray a photo-realistic scene in place of the replacement region 404.

As mentioned above, the scene-based image editing system 106 utilizes a cascaded modulation inpainting neural network that includes cascaded modulation decoder layers to generate inpainted digital images. FIG. 5 illustrates an example architecture of a cascaded modulation inpainting neural network 502 in accordance with one or more embodiments.

As illustrated, the cascaded modulation inpainting neural network 502 includes an encoder 504 and a decoder 506. In particular, the encoder 504 includes a plurality of convolutional layers 508a-508n at different scales/resolutions. In some cases, the scene-based image editing system 106 feeds the digital image input 510 (e.g., an encoding of the digital image) into the first convolutional layer 508a to generate an encoded feature vector at a higher scale (e.g., lower resolution). The second convolutional layer 508b processes the encoded feature vector at the higher scale (lower resolution) and generates an additional encoded feature vector (at yet another higher scale/lower resolution). The cascaded modulation inpainting neural network 502 iteratively generates these encoded feature vectors until reaching the final/highest scale convolutional layer 508n and generating a final encoded feature vector representation of the digital image.

As illustrated, in one or more embodiments, the cascaded modulation inpainting neural network 502 generates a global feature code from the final encoded feature vector of the encoder 504. A global feature code includes a feature representation of the digital image from a global (e.g., high-level, high-scale, low-resolution) perspective. In particular, a global feature code includes a representation of the digital image that reflects an encoded feature vector at the highest scale/lowest resolution (or a different encoded feature vector that satisfies a threshold scale/resolution).

As illustrated, in one or more embodiments, the cascaded modulation inpainting neural network 502 applies a neural network layer (e.g., a fully connected layer) to the final encoded feature vector to generate a style code 512 (e.g., a style vector). In addition, the cascaded modulation inpainting neural network 502 generates the global feature code by combining the style code 512 with a random style code 514. In particular, the cascaded modulation inpainting neural network 502 generates the random style code 514 by utilizing a neural network layer (e.g., a multi-layer perceptron) to process an input noise vector. The neural network layer maps the input noise vector to a random style code 514. The cascaded modulation inpainting neural network 502 combines (e.g., concatenates, adds, or multiplies) the random style code 514 with the style code 512 to generate the global feature code 516. Although FIG. 5 illustrates a particular approach to generate the global feature code 516, the scene-based image editing system 106 is able to utilize a variety of different approaches to generate a global feature code that represents encoded feature vectors of the encoder 504 (e.g., without the style code 512 and/or the random style code 514).

As mentioned above, in some embodiments, the cascaded modulation inpainting neural network 502 generates an image encoding utilizing the encoder 504. An image encoding refers to an encoded representation of the digital image. Thus, in some cases, an image encoding includes one or more encoding feature vectors, a style code, and/or a global feature code.

In one or more embodiments, the cascaded modulation inpainting neural network 502 utilizes a plurality of Fourier convolutional encoder layer to generate an image encoding (e.g., the encoded feature vectors, the style code 512, and/or the global feature code 516). For example, a Fourier convolutional encoder layer (or a fast Fourier convolution) comprises a convolutional layer that includes non-local receptive fields and cross-scale fusion within a convolutional unit. In particular, a fast Fourier convolution can include three kinds of computations in a single operation unit: a local branch that conducts small-kernel convolution, a semi-global branch that processes spectrally stacked image patches, and a global branch that manipulates image-level spectrum. These three branches complementarily address different scales. In addition, in some instances, a fast Fourier convolution includes a multi-branch aggregation process for cross-scale fusion. For example, in one or more embodiments, the cascaded modulation inpainting neural network 502 utilizes a fast Fourier convolutional layer as described by Lu Chi, Borui Jiang, and Yadong Mu in Fast Fourier convolution, Advances in Neural Information Processing Systems, 33 (2020), which is incorporated by reference herein in its entirety.

Specifically, in one or more embodiments, the cascaded modulation inpainting neural network 502 utilizes Fourier convolutional encoder layers for each of the encoder convolutional layers 508a-508n. Thus, the cascaded modulation inpainting neural network 502 utilizes different Fourier convolutional encoder layers having different scales/resolutions to generate encoded feature vectors with improved, non-local receptive field.

Operation of the encoder 504 can also be described in terms of variables or equations to demonstrate functionality of the cascaded modulation inpainting neural network 502. For instance, as mentioned, the cascaded modulation inpainting neural network 502 is an encoder-decoder network with proposed cascaded modulation blocks at its decoding stage for image inpainting. Specifically, the cascaded modulation inpainting neural network 502 starts with an encoder E that takes the partial image and the mask as inputs to produce multi-scale feature maps from input resolution to resolution 4×4:

$$F_e^{(1)}, \dots, F_e^{(L)} = E(x \odot (1 - m), m),$$

where $$F_e^{(i)}$$

are the generated feature at scale 1≤i≤L (and L is the highest scale or resolution). The encoder is implemented by a set of stride-2 convolutions with residual connection.

After generating the highest scale feature $$F_e^{(L)},$$

a fully connected layer followed by a $\ell_2$ normalization products a global style code $$s = fc(F_e^{(L)})/\|fc(F_e^{(L)})\|_2$$

to represent the input globally. In parallel to the encoder, an MLP-based mapping network produces a random style code w from a normalized random Gaussian noise z, simulating the stochasticity of the generation process. Moreover, the scene-based image editing system 106 joins w with s to produce the final global code g=[s; w] for decoding. As mentioned, in some embodiments, the scene-based image editing system 106 utilizes the final global code as an image encoding for the digital image.

Similarly, the node cluster 1108a includes object attributes 1110a-1110d associated with the node 1104a for the side table class and an additional object attributes 1112a-1112g associated with the node 1104b for the table class. Thus, the node cluster 1108a indicates that the object attributes 1110a-1110d are specific to the side table class while the additional object attributes 1112a-1112g are more generally associated with the table class (e.g., associated with all object classes that fall within the table class). In one or more embodiments, the object attributes 1110a-1110d and/or the additional object attributes 1112a-1112g are attributes that have been arbitrarily assigned to their respective object class (e.g., via user input or system defaults). For instance, in some cases, the scene-based image editing system 106 determines that all side tables can support one hundred pounds as suggested by FIG. 11 regardless of the materials used or the quality of the build. In some instances, however, the object attributes 1110a-1110d and/or the additional object attributes 1112a-1112g represent object attributes that are common among all objects that fall within a particular class, such as the relatively small size of side tables. In some implementations, however, the object attributes 1110a-1110d and/or the additional object attributes 1112a-1112g are indicators of object attributes that should be determined for an object of the corresponding object class. For instance, in one or more embodiments, upon identifying a side table, the scene-based image editing system 106 determines at least one of the capacity, size, weight, or supporting weight of the side table.

It should be noted that there is some overlap between object attributes included in a real-world class description graph and characteristic attributes included in an image analysis graph in some embodiments. Indeed, in many implementations, object attributes are characteristic attributes that are specific towards objects (rather than attributes for the setting or scene of a digital image). Further, it should be noted that the object attributes are merely exemplary and do not necessarily reflect the object attributes that are to be associated with an object class. Indeed, in some embodiments, the object attributes that are shown and their association with particular object classes are configurable to accommodate different needs in editing a digital image.

In some cases, a node cluster corresponds to one particular class of objects and presents a hierarchy of class descriptions and/or object components for that one particular class. For instance, in some implementations, the node cluster 1108a only corresponds to the side table class and presents a hierarchy of class descriptions and/or object components that are relevant to side tables. Thus, in some cases, upon identifying a side table within a digital image, the scene-based image editing system 106 refers to the node cluster 1108a for the side table class when generating a semantic scene graph but refers to a separate node cluster upon identifying another subclass of table within the digital image. In some cases, this separate node cluster includes several similarities (e.g., similar nodes and edges) with the node cluster 1108a as the other type of table would be included in a subclass of the table class and include one or more table legs.

In some implementations, however, a node cluster corresponds to a plurality of different but related object classes and presents a common hierarchy of class descriptions and/or object components for those object classes. For instance, in some embodiments, the node cluster 1108a includes an additional node representing a dining table class that is connected to the node 1104b representing the table class via an edge indicating that dining tables are also a subclass of tables. Indeed, in some cases, the node cluster 1108a includes nodes representing various subclasses of a table class. Thus, in some instances, upon identifying a table from a digital image, the scene-based image editing system 106 refers to the node cluster 1108a when generating a semantic scene graph for the digital image regardless of the subclass to which the table belongs.

Figure 11:
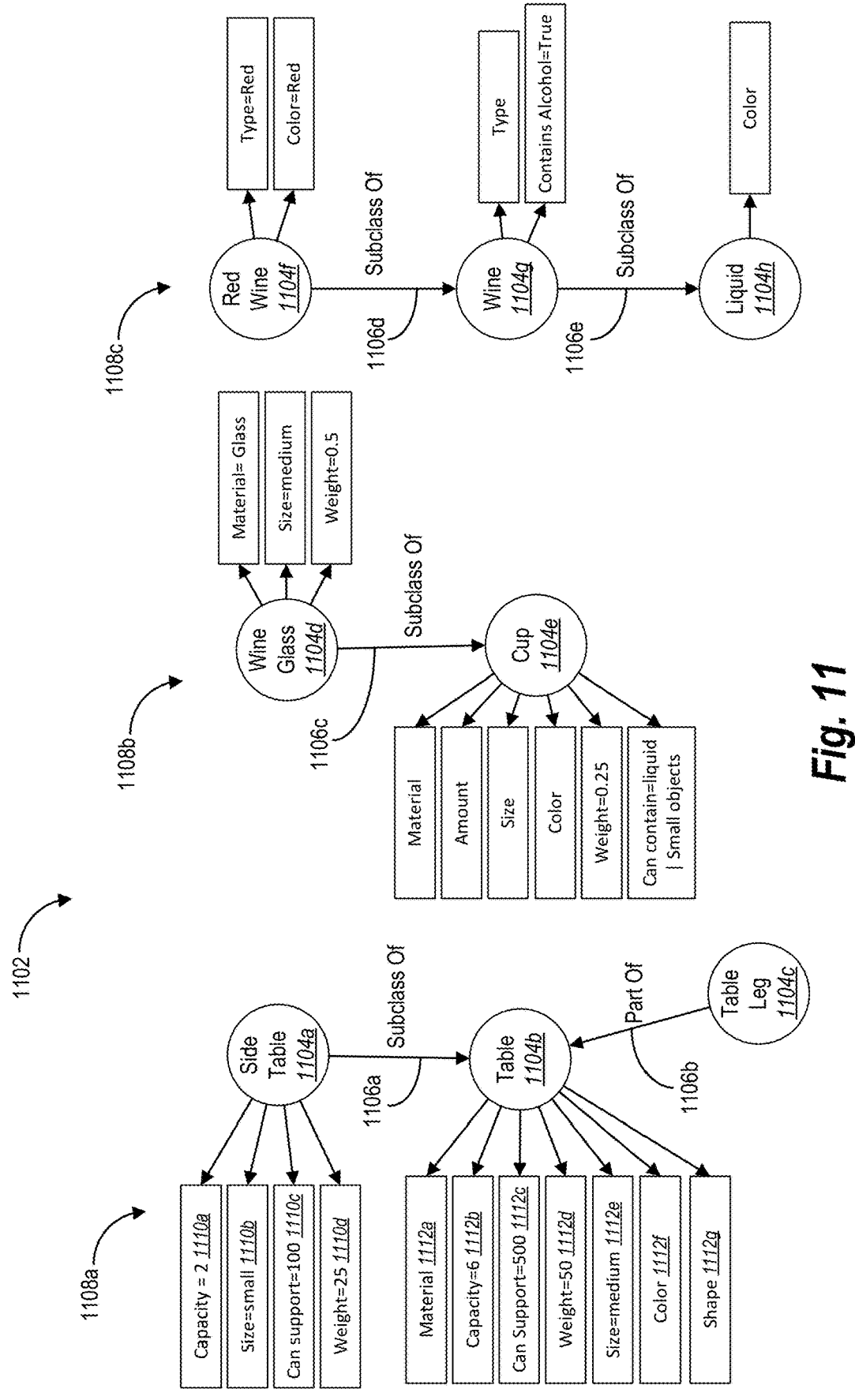
FIG. 11 illustrates a real-world class description graph utilized by the scene-based image editing system in generating a semantic scene graph in accordance with one or more embodiments.

As will be described, in some implementations, utilizing a common node cluster for multiple related subclasses facilitates object interactivity within a digital image. For instance, as noted, FIG. 11 illustrates multiple separate node clusters. As further mentioned however, the scene-based image editing system 106 includes a classification (e.g., an entity classification) that is common among all represented objects within the real-world class description graph 1102 in some instances. Accordingly, in some implementations, the real-world class description graph 1102 does include a single network of interconnected nodes where all node clusters corresponding to separate object classes connect at a common node, such as a node representing an entity class. Thus, in some embodiments, the real-world class description graph 1102 illustrates the relationships among all represented objects.

In one or more embodiments, the scene-based image editing system 106 generates a real-world class description graph, such as the real-world class description graph 1102 of FIG. 11, for use in generating semantic scene graphs for digital images. For instance, in some cases, the scene-based image editing system 106 generates a real-world class description graph by generating hierarchies of object classifications for objects potentially represented in digital images. Thus, in some instances, when generating a semantic scene graph for a digital image, the scene-based image editing system 106 determines an object class for an object portrayed therein and associates a hierarchy of object classifications that corresponds to the object class with the object based on the real-world class description graph. In some implementations, to generate a hierarchy of object classifications within a real-world class description graph, the scene-based image editing system 106 generates a node representing an object class, generates one or more nodes representing subclasses of the object class, and generates edges connecting the nodes. In some cases, the scene-based image editing system 106 generates nodes representing subclasses of the subclasses and/or generates nodes that are higher than the object class within the hierarchy (e.g., the nodes represent object class of which the object class is a subclass).

In some implementations, the scene-based image editing system 106 further generates a real-world class description graph by generating representations of anatomies for objects potentially portrayed in a digital image. For instance, in some cases, the scene-based image editing system 106 generates nodes representing components of an object class (e.g., the components comprising components of the objects included in the object class, such as a table leg that is a component of a table). In some cases, the scene-based image editing system 106 generates edges connecting these nodes representing components to the nodes representing the respective object classes.

Figure 12:
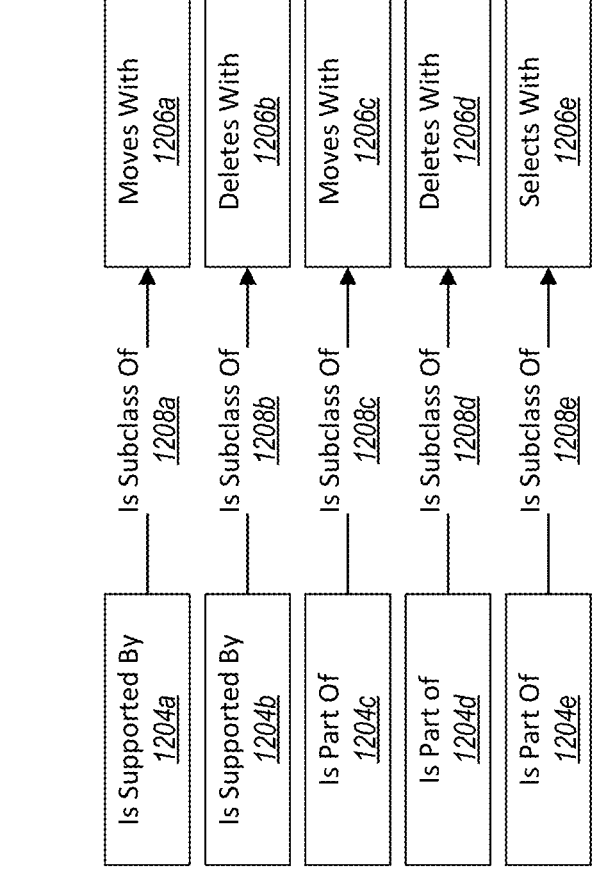
FIG. 12 illustrates a behavioral policy graph utilized by the scene-based image editing system in generating a semantic scene graph in accordance with one or more embodiments.

In one or more embodiments, the scene-based image editing system 106 utilizes a behavioral policy graph in generating a semantic scene graph for a digital image. FIG. 12 illustrates a behavioral policy graph 1202 utilized by the scene-based image editing system 106 in generating a semantic scene graph in accordance with one or more embodiments.

In one or more embodiments, a behavioral policy graph includes a template graph that describes the behavior of an object portrayed in a digital image based on the context in which the object is portrayed. In particular, in some embodiments, a behavioral policy graph includes a template graph that assigns behaviors to objects portrayed in a digital image based on a semantic understanding of the objects and/or their relationships to other objects portrayed in the digital image. Indeed, in one or more embodiments, a behavioral policy graph includes various relationships among various types of objects (e.g., object classes) and designates behaviors for those relationships. Thus, in some embodiments, a behavioral policy graph assigns behaviors to object classes based on object relationships. In some cases, the scene-based image editing system 106 includes a behavioral policy graph as part of a semantic scene graph. In some implementations, as will be discussed further below, a behavioral policy is separate from the semantic scene graph but provides plug-in behaviors based on the semantic understanding and relationships of objects represented in the semantic scene graph.

As shown in FIG. 12, the behavioral policy graph 1202 includes a plurality of relationship indicators 1204a-1204e and a plurality of behavior indicators 1206a-1206e that are associated with the relationship indicators 1204a-1204e. In one or more embodiments, the relationship indicators 1204a-1204e reference a relationship subject (e.g., an object in the digital image that is the subject of the relationship) and a relationship object (e.g., an object in the digital image that is the object of the relationship). For example, the relationship indicators 1204a-1204e of FIG. 12 indicate that the relationship subject "is supported by" or "is part of" the relationship object. Further, in one or more embodiments the behavior indicators 1206a-1206e assign a behavior to the relationship subject (e.g., indicating that the relationship subject "moves with" or "deletes with" the relationship object). In other words, the behavior indicators 1206a-1206e provide modification instructions for the relationship subject when the relationship object is modified.

FIG. 12 provides a small subset of the relationships recognized by the scene-based image editing system 106 in various embodiments. For instance, in some implementations, the relationships recognized by the scene-based image editing system 106 and incorporated into generated semantic scene graphs include, but are not limited to, relationships described as "above," "below," "behind," "in front of," "touching," "held by," "is holding," "supporting," "standing on," "worn by," "wearing," "leaning on," "looked at by," or "looking at." Indeed, as suggested by the foregoing, the scene-based image editing system 106 utilizes relationship pairs to describe the relationship between objects in both directions in some implementations. For instance, in some cases, where describing that a first object "is supported by" a second object, the scene-based image editing system 106 further describes that the second object "is supporting" the first object. Thus, in some cases, the behavioral policy graph 1202 includes these relationship pairs, and the scene-based image editing system 106 includes the information in the semantic scene graphs accordingly.

As further shown, the behavioral policy graph 1202 further includes a plurality of classification indicators 1208a-1208e associated with the relationship indicators 1204a-1204e. In one or more embodiments, the classification indicators 1208a-1208e indicate an object class to which the assigned behavior applies. Indeed, in one or more embodiments, the classification indicators 1208a-1208e reference the object class of the corresponding relationship object. As shown by FIG. 12, the classification indicators 1208a-1208e indicate that a behavior is assigned to object classes that are a subclass of the designated object class. In other words, FIG. 12 shows that the classification indicators 1208a-1208e reference a particular object class and indicate that the assigned behavior applies to all objects that fall within that object class (e.g., object classes that are part of a subclass that falls under that object class).

The level of generality or specificity of a designated object class referenced by a classification indicator within its corresponding hierarchy of object classification varies in various embodiments. For instance, in some embodiments, a classification indicator references a lowest classification level (e.g., the most specific classification applicable) so that there are no subclasses, and the corresponding behavior applies only to those objects having that particular object lowest classification level. On the other hand, in some implementations, a classification indicator references a highest classification level (e.g., the most generic classification applicable) or some other level above the lowest classification level so that the corresponding behavior applies to objects associated with one or more of the multiple classification levels that exist within that designated classification level.

To provide an illustration of how the behavioral policy graph 1202 indicates assigned behavior, the relationship indicator 1204a indicates a "is supported by" relationship between an object (e.g., the relationship subject) and another object (e.g., the relationship object). The behavior indicator 1206a indicates a "moves with" behavior that is associated with the "is supported by" relationship, and the classification indicator 1208a indicates that this particular behavior applies to objects within some designated object class. Accordingly, in one or more embodiments, the behavioral policy graph 1202 shows that an object that falls within the designated object class and has a "is supported by" relationship with another object will exhibit the "moves with" behavior. In other words, if a first object of the designated object class is portrayed in a digital image being supported by a second object, and the digital image is modified to move that second object, then the scene-based image editing system 106 will automatically move the first object with the second object as part of the modification in accordance with the behavioral policy graph 1202. In some cases, rather than moving the first object automatically, the scene-based image editing system 106 provides a suggestion to move the first object for display within the graphical user interface in use to modify the digital image.

As shown by FIG. 12, some of the relationship indicators (e.g., the relationship indicators 1204a-1204b or the relationship indicators 1204c-1204e) refer to the same relationship but are associated with different behaviors. Indeed, in some implementations, the behavioral policy graph 1202 assigns multiple behaviors to the same relationship. In some instances, the difference is due to the difference in the designated subclass. In particular, in some embodiments, the scene-based image editing system 106 assigns an object of one object class a particular behavior for a particular relationship but assigns an object of another object class a different behavior for the same relationship. Thus, in configuring the behavioral policy graph 1202, the scene-based image editing system 106 manages different object classes differently in various embodiments.

In one or more embodiments, the scene-based image editing system 106 generates a behavioral policy graph, such as the behavioral policy graph 1202 of FIG. 12, for use in generating semantic scene graphs for digital images. For instance, in some cases, the scene-based image editing system 106 generates relationships indicators corresponding to object relationships, classification indicators corresponding to object classes, and behavior indicators corresponding to behaviors. The scene-based image editing system 106 associates the various indicators within the behavioral policy graph. In particular, the scene-based image editing system 106 associates the various indicators to represent relationships of an object class and behaviors assigned to the object class based on those relationships. To illustrate, in some cases, the scene-based image editing system 106 associates each object class with at least one behavior based on a relationship between the object class and some other object class (e.g., where the relationship is specified but the other object class is not).

As shown in FIG. 12, in some cases, the scene-based image editing system 106 assigns multiple behaviors to an object class based on different relationships associated with that object class. Further, in some instances, the scene-based image editing system 106 assigns multiple behaviors to an object class based on a single relationship associated with that object class. Thus, the number and type of behaviors assigned to an object class based on its associated object relationships varies in various embodiments.

In some cases, the scene-based image editing system 106 generates different behavioral policy graphs for use in different editing contexts. Indeed, in some embodiments, the scene-based image editing system 106 generates different behavioral policy graphs that assign different sets of behaviors to object classes based on their object relationships. For example, in some implementations, the scene-based image editing system 106 generates different behavioral policy graphs for use by different client devices or for use in different editing contexts of a particular client device. To illustrate, in some cases, the scene-based image editing system 106 generates a first behavioral policy graph for a first set of user preferences and generates a second behavioral policy graph for a second set of user preferences. Thus, even when editing is performed on the same client device, the scene-based image editing system 106 determines which behavioral policy graph is to be used based on the set of user preferences that are active. Accordingly, in some cases, the scene-based image editing system 106 generates a behavioral policy graph in response to user input establishing a corresponding set of user preferences. As another example, in some implementations, the scene-based image editing system 106 generates a first behavioral policy graph for use with a first editing application and generates a second behavioral policy graph for use with a second editing application. Thus, the scene-based image editing system 106 can associate a behavioral policy graph with a particular editing context (e.g., a particular set of user preferences, a particular editing application, or a particular client device) and invokes that behavioral policy graph when its corresponding editing context applies.

Though much of the discussion regarding behavioral policies graphs is provided in the context of generating semantic scene graphs for a digital image, the scene-based image editing system 106 utilizes behavioral policy graphs themselves (e.g., without using a semantic scene graph) when modifying digital images in some instances. For example, in some embodiments, the scene-based image editing system 106 generates a behavioral policy graph, receives a digital image, determines behaviors of objects portrayed in the digital image using the behavioral policy graph, and modifies one or more objects within the digital image based on those behaviors. In particular, the scene-based image editing system 106 modifies an object based on a relationship with another object (and its associated behavior) that is being targeted for modification.

Figure 13:
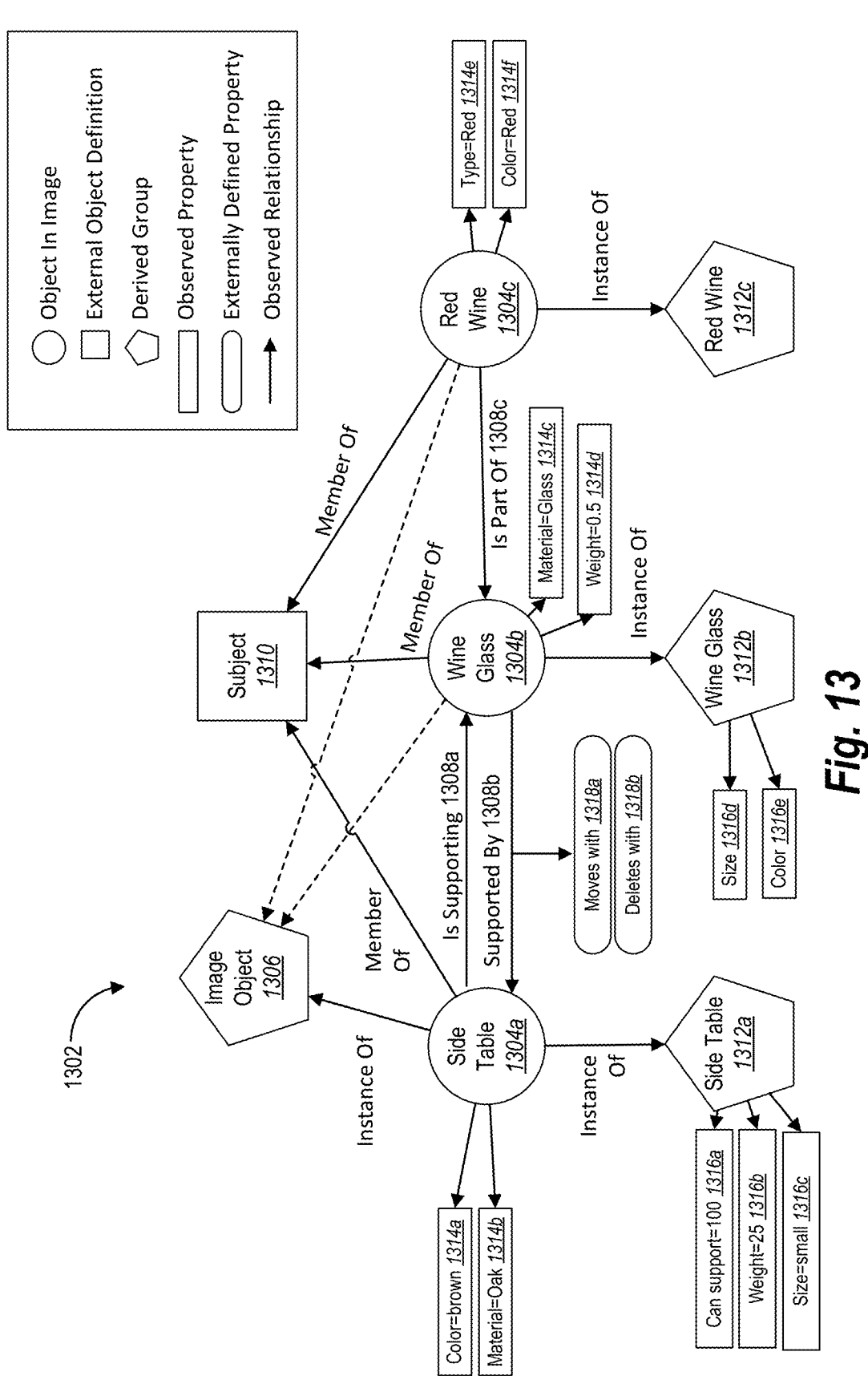
FIG. 13 illustrates a semantic scene graph generated by the scene-based image editing system for a digital image in accordance with one or more embodiments.

FIG. 13 illustrates a semantic scene graph 1302 generated by the scene-based image editing system 106 for a digital image in accordance with one or more embodiments. In particular, the semantic scene graph 1302 shown in FIG. 13 is a simplified example of a semantic scene graph and does not portray all the information included in a semantic scene graph generated by the scene-based image editing system 106 in various embodiments.

As shown in FIG. 13, the semantic scene graph 1302 is organized in accordance with the image analysis graph 1000 described above with reference to FIG. 10. In particular, the semantic scene graph 1302 includes a single network of interconnected nodes that reference characteristics of a digital image. For instance, the semantic scene graph 1302 includes nodes 1304a-1304c representing portrayed objects as indicated by their connection to the node 1306. Further, the semantic scene graph 1302 includes relationship indicators 1308a-1308c representing the relationships between the objects corresponding to the nodes 1304a-1304c. As further shown, the semantic scene graph 1302 includes a node 1310 representing a commonality among the objects (e.g., in that the objects are all included in the digital image, or the objects indicate a subject or topic of the digital image). Additionally, as shown, the semantic scene graph 1302 includes the characteristic attributes 1314a-1314f of the objects corresponding to the nodes 1304a-1304c.

As further shown in FIG. 13, the semantic scene graph 1302 includes contextual information from the real-world class description graph 1102 described above with reference to FIG. 11. In particular, the semantic scene graph 1302 includes nodes 1312a-1312c that indicate the object class to which the objects corresponding to the nodes 1304a-1304c belong. Though not shown in FIG. 11, the semantic scene graph 1302 further includes the full hierarchy of object classifications for each of the object classes represented by the nodes 1312a-1312c. In some cases, however, the nodes 1312a-1312c each include a pointer that points to their respective hierarchy of object classifications within the real-world class description graph 1102. Additionally, as shown in FIG. 13, the semantic scene graph 1302 includes object attributes 1316*a*-1316*e* of the object classes represented therein.

Additionally, as shown in FIG. 13, the semantic scene graph 1302 includes behaviors from the behavioral policy graph 1202 described above with reference to FIG. 12. In particular, the semantic scene graph 1302 includes behavior indicators 1318*a*-1318*b* indicating behaviors of the objects represented therein based on their associated relationships.

Figure 14:
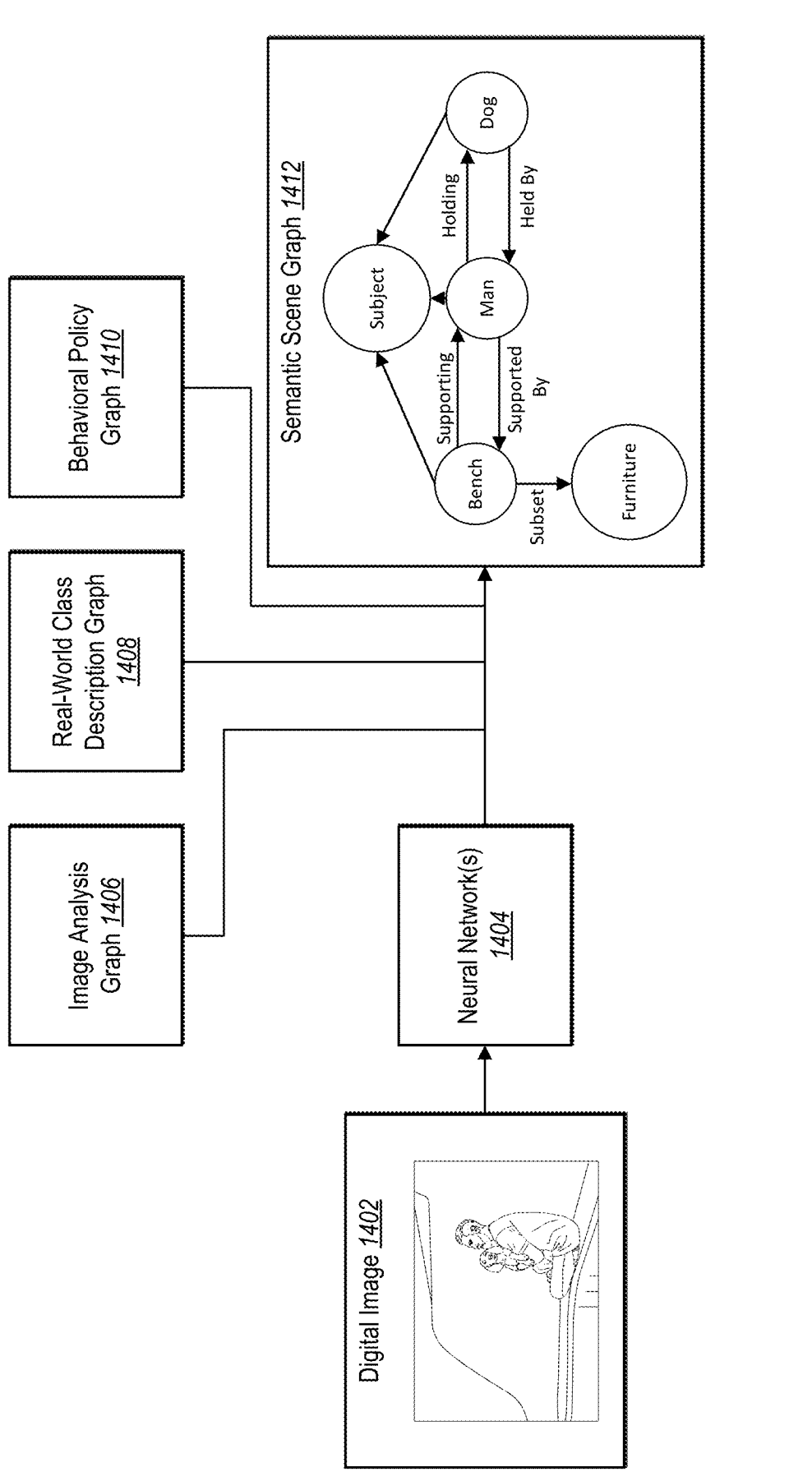
FIG. 14 illustrates a diagram for generating a semantic scene graph for a digital image utilizing template graphs in accordance with one or more embodiments.

FIG. 14 illustrates a diagram for generating a semantic scene graph for a digital image utilizing template graphs in accordance with one or more embodiments. Indeed, as shown in FIG. 14, the scene-based image editing system 106 analyzes a digital image 1402 utilizing one or more neural networks 1404. In particular, in one or more embodiments, the scene-based image editing system 106 utilizes the one or more neural networks 1404 to determine various characteristics of the digital image 1402 and/or their corresponding characteristic attributes. For instance, in some cases, the scene-based image editing system 106 utilizes a segmentation neural network to identify and classify objects portrayed in a digital image (as discussed above with reference to FIG. 3). Further, in some embodiments, the scene-based image editing system 106 utilizes neural networks to determine the relationships between objects and/or their object attributes as will be discussed in more detail below.

In one or more implementations, the scene-based image editing system 106 utilizes a depth estimation neural network to estimate a depth of an object in a digital image and stores the determined depth in the semantic scene graph 1412. For example, the scene-based image editing system 106 utilizes a depth estimation neural network as described in U.S. application Ser. No. 17/186,436, filed Feb. 26, 2021, titled "GENERATING DEPTH IMAGES UTILIZING A MACHINE-LEARNING MODEL BUILT FROM MIXED DIGITAL IMAGE SOURCES AND MULTIPLE LOSS FUNCTION SETS," which is herein incorporated by reference in its entirety. Alternatively, the scene-based image editing system 106 utilizes a depth refinement neural network as described in U.S. application Ser. No. 17/658,873, filed Apr. 12, 2022, titled "UTILIZING MACHINE LEARNING MODELS TO GENERATE REFINED DEPTH MAPS WITH SEGMENTATION MASK GUIDANCE," which is herein incorporated by reference in its entirety. The scene-based image editing system 106 then accesses the depth information (e.g., average depth for an object) for an object from the semantic scene graph 1412 when editing an object to perform a realistic scene edit. For example, when moving an object within an image, the scene-based image editing system 106 then accesses the depth information for objects in the digital image from the semantic scene graph 1412 to ensure that the object being moved is not placed in front an object with less depth.

In one or more implementations, the scene-based image editing system 106 utilizes a depth estimation neural network to estimate lighting parameters for an object or scene in a digital image and stores the determined lighting parameters in the semantic scene graph 1412. For example, the scene-based image editing system 106 utilizes a source-specific-lighting-estimation-neural network as described in U.S. application Ser. No. 16/558,975, filed Sep. 3, 2019, titled "DYNAMICALLY ESTIMATING LIGHT-SOURCE-SPECIFIC PARAMETERS FOR DIGITAL IMAGES USING A NEURAL NETWORK," which is herein incorporated by reference in its entirety. The scene-based image editing system 106 then accesses the lighting parameters for an object or scene from the semantic scene graph 1412 when editing an object to perform a realistic scene edit. For example, when moving an object within an image or inserting a new object in a digital image, the scene-based image editing system 106 accesses the lighting parameters for from the semantic scene graph 1412 to ensure that the object being moved/placed within the digital image has realistic lighting.

In one or more implementations, the scene-based image editing system 106 utilizes a depth estimation neural network to estimate lighting parameters for an object or scene in a digital image and stores the determined lighting parameters in the semantic scene graph 1412. For example, the scene-based image editing system 106 utilizes a source-specific-lighting-estimation-neural network as described in U.S. application Ser. No. 16/558,975, filed Sep. 3, 2019, titled "DYNAMICALLY ESTIMATING LIGHT-SOURCE-SPECIFIC PARAMETERS FOR DIGITAL IMAGES USING A NEURAL NETWORK," which is herein incorporated by reference in its entirety. The scene-based image editing system 106 then accesses the lighting parameters for an object or scene from the semantic scene graph 1412 when editing an object to perform a realistic scene edit. For example, when moving an object within an image or inserting a new object in a digital image, the scene-based image editing system 106 accesses the lighting parameters for from the semantic scene graph 1412 to ensure that the object being moved/placed within the digital image has realistic lighting.

As further shown in FIG. 14, the scene-based image editing system 106 utilizes the output of the one or more neural networks 1404 along with an image analysis graph 1406, a real-world class description graph 1408, and a behavioral policy graph 1410 to generate a semantic scene graph 1412. In particular, the scene-based image editing system 106 generates the semantic scene graph 1412 to include a description of the digital image 1402 in accordance with the structure, characteristic attributes, hierarchies of object classifications, and behaviors provided by the image analysis graph 1406, the real-world class description graph 1408, and the behavioral policy graph 1410.

As previously indicated, in one or more embodiments, the image analysis graph 1406, the real-world class description graph 1408, and/or the behavioral policy graph 1410 are predetermined or pre-generated. In other words, the scene-based image editing system 106 pre-generates, structures, or otherwise determines the content and organization of each graph before implementation. For instance, in some cases, the scene-based image editing system 106 generates the image analysis graph 1406, the real-world class description graph 1408, and/or the behavioral policy graph 1410 based on user input.

Further, in one or more embodiments, the image analysis graph 1406, the real-world class description graph 1408, and/or the behavioral policy graph 1410 are configurable. Indeed, the graphs can be re-configured, re-organized, and/or have data represented therein added or removed based on preferences or the needs of editing a digital image. For instance, in some cases, the behaviors assigned by the behavioral policy graph 1410 work in some image editing contexts but not others. Thus, when editing an image in another image editing context, the scene-based image editing system 106 implements the one or more neural networks 1404 and the image analysis graph 1406 but implements a different behavioral policy graph (e.g., one that was configured to satisfy preferences for that image editing context). Accordingly, in some embodiments, the scene-based image editing system 106 modifies the image analysis graph 1406, the real-world class description graph 1408, and/or the behavioral policy graph 1410 to accommodate different image editing contexts.

For example, in one or more implementations, the scene-based image editing system 106 determines a context for selecting a behavioral policy graph by identifying a type of user. In particular, the scene-based image editing system 106 generates a plurality of behavioral policy graphs for various types of users. For instance, the scene-based image editing system 106 generates a first behavioral policy graph for novice or new users. The first behavioral policy graph, in one or more implementations, includes a greater number of behavior policies than a second behavioral policy graph. In particular, for newer users, the scene-based image editing system 106 utilizes a first behavioral policy graph that provides greater automation of actions and provides less control to the user. On the other hand, the scene-based image editing system 106 utilizes a second behavioral policy graph for advanced users with less behavior policies than the first behavioral policy graph. In this manner, the scene-based image editing system 106 provides the advanced user with greater control over the relationship-based actions (automatic moving/deleting/editing) of objects based on relationships. In other words, by utilizing the second behavioral policy graph for advanced users, the scene-based image editing system 106 performs less automatic editing of related objects.

In one or more implementations the scene-based image editing system 106 determines a context for selecting a behavioral policy graph based on visual content of a digital image (e.g., types of objects portrayed in the digital image), the editing application being utilized, etc. Thus, the scene-based image editing system 106, in one or more implementations, selects/utilizes a behavioral policy graph based on image content, a type of user, an editing application being utilizes, or another context.

Moreover, in some embodiments, the scene-based image editing system 106 utilizes the graphs in analyzing a plurality of digital images. Indeed, in some cases, the image analysis graph 1406, the real-world class description graph 1408, and/or the behavioral policy graph 1410 do not specifically target a particular digital image. Thus, in many cases, these graphs are universal and re-used by the scene-based image editing system 106 for multiple instances of digital image analysis.

In some cases, the scene-based image editing system 106 further implements one or more mappings to map between the outputs of the one or more neural networks 1404 and the data scheme of the image analysis graph 1406, the real-world class description graph 1408, and/or the behavioral policy graph 1410. As one example, the scene-based image editing system 106 utilizes various segmentation neural networks to identify and classify objects in various embodiments. Thus, depending on the segmentation neural network used, the resulting classification of a given object can be different (e.g., different wording or a different level of abstraction). Thus, in some cases, the scene-based image editing system 106 utilizes a mapping that maps the particular outputs of the segmentation neural network to the object classes represented in the real-world class description graph 1408, allowing the real-world class description graph 1408 to be used in conjunction with multiple neural networks.

Figure 15:
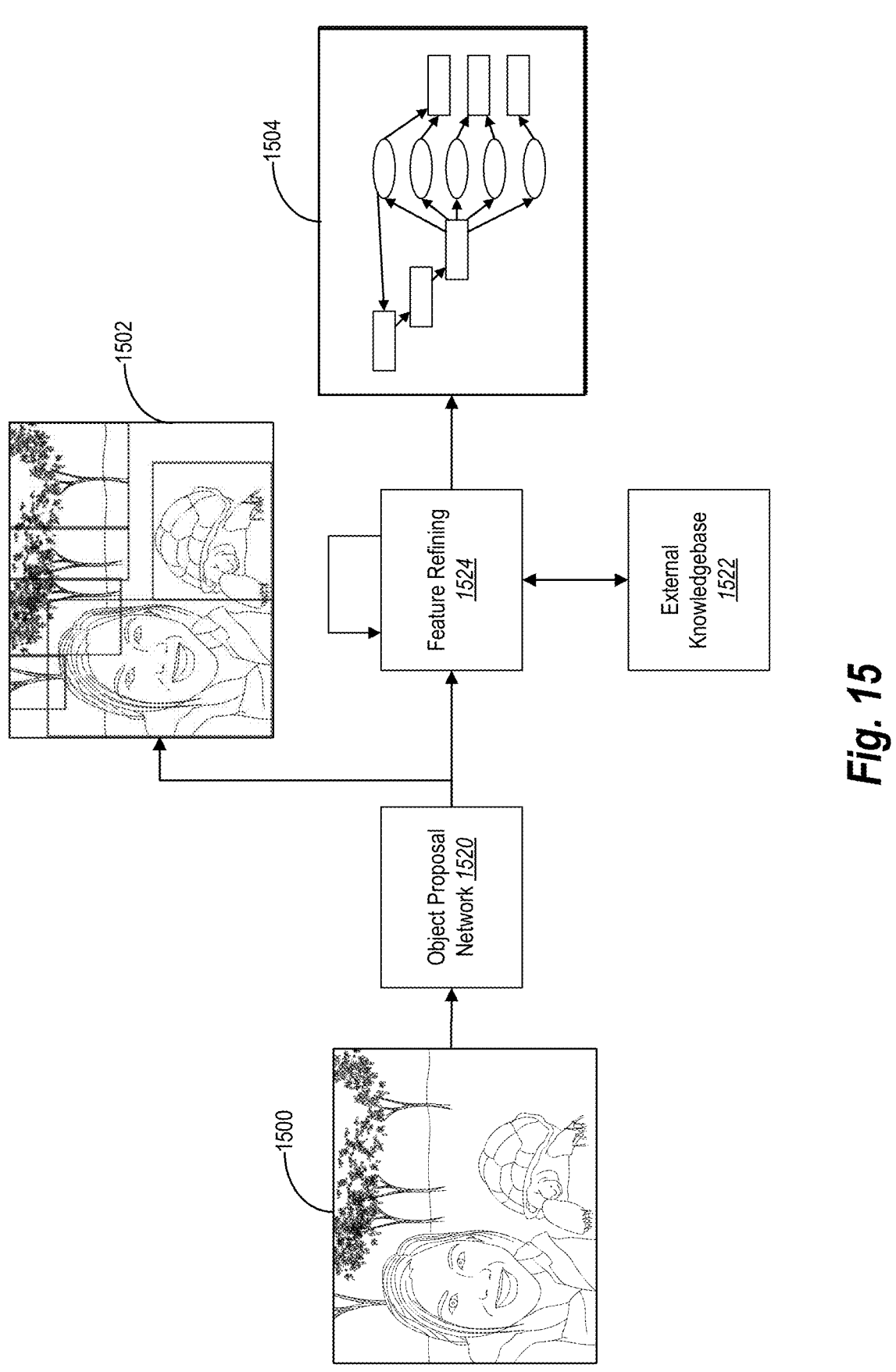
FIG. 15 illustrates another diagram for generating a semantic scene graph for a digital image in accordance with one or more embodiments.

FIG. 15 illustrates another diagram for generating a semantic scene graph for a digital image in accordance with one or more embodiments. In particular, FIG. 15 illustrates an example framework of the scene-based image editing system 106 generating a semantic scene graph in accordance with one or more embodiments.

As shown in FIG. 15, the scene-based image editing system 106 identifies an input image 1500. In some cases, the scene-based image editing system 106 identifies the input image 1500 based on a request. For instances, in some cases, the request includes a request to generate a semantic scene graph for the input image 1500. In one or more implementations the request comprises to analyze the input image comprises the scene-based image editing system 106 accessing, opening, or displaying by the input image 1500.

In one or more embodiments, the scene-based image editing system 106 generates object proposals and subgraph proposals for the input image 1500 in response to the request. For instance, in some embodiments, the scene-based image editing system 106 utilizes an object proposal network 1520 to extract a set of object proposals for the input image 1500. To illustrate, in some cases, the scene-based image editing system 106 extracts a set of object proposals for humans detected within the input image 1500, objects that the human(s) are wearing, objects near the human(s), buildings, plants, animals, background objects or scenery (including the sky or objects in the sky), etc.

In one or more embodiments, the object proposal network 1520 comprises the detection-masking neural network 300 (specifically, the object detection machine learning model 308) discussed above with reference to FIG. 3. In some cases, the object proposal network 1520 includes a neural network such as a region proposal network ("RPN"), which is part of a region-based convolutional neural network, to extract the set of object proposals represented by a plurality of bounding boxes. One example RPN is disclosed in S. Ren, K. He, R. Girshick, and J. Sun, *Faster r-cnn: Towards real-time object detection with region proposal networks*, NIPS, 2015, the entire contents of which are hereby incorporated by reference. As an example, in some cases, the scene-based image editing system 106 uses the RPN to extract object proposals for significant objects (e.g., detectable objects or objects that have a threshold size/visibility) within the input image. The algorithm below represents one embodiment of a set of object proposals:

$$[o_0, \ldots, o_{N-1}] = f_{RPN}(I)$$

where I is the input image, $f_{RPN}(\bullet)$ represents the RPN network, and $o_i$ is the i-th object proposal.

In some implementations, in connection with determining the object proposals, the scene-based image editing system 106 also determines coordinates of each object proposal relative to the dimensions of the input image 1500. Specifically, in some instances, the locations of the object proposals are based on bounding boxes that contain the visible portion (s) of objects within a digital image. To illustrate, for $o_i$, the coordinates of the corresponding bounding box are represented by $r_i=[x_i, y_i, w_i, h_i]$, with $(x_i, y_i)$ being the coordinates of the top left corner and $w_i$ and $h_i$ being the width and the height of the bounding box, respectively. Thus, the scene-based image editing system 106 determines the relative location of each significant object or entity in the input image 1500 and stores the location data with the set of object proposals.

As mentioned, in some implementations, the scene-based image editing system 106 also determines subgraph proposals for the object proposals. In one or more embodiments, the subgraph proposals indicate relations involving specific object proposals in the input image 1500. As can be appreciated, any two different objects ($o_i$, $o_j$) in a digital image can correspond to two possible relationships in opposite directions. As an example, a first object can be "on top of" a second object, and the second object can be "underneath" the first object. Because each pair of objects has two possible relations, the total number of possible relations for N object proposals is N(N−1). Accordingly, more object proposals result in a larger scene graph than fewer object proposals, while increasing computational cost and deteriorating inference speed of object detection in systems that attempt to determine all the possible relations in both directions for every object proposal for an input image.

Subgraph proposals reduce the number of potential relations that the scene-based image editing system 106 analyze. Specifically, as mentioned previously, a subgraph proposal represents a relationship involving two or more specific object proposals. Accordingly, in some instances, the scene-based image editing system 106 determines the subgraph proposals for the input image 1500 to reduce the number of potential relations by clustering, rather than maintaining the N(N−1) number of possible relations. In one or more embodiments, the scene-based image editing system 106 uses the clustering and subgraph proposal generation process described in Y. Li, W. Ouyang, B. Zhou, Y. Cui, J. Shi, and X. Wang, *Factorizable net: An efficient subgraph based framework for scene graph generation*, ECCV, Jun. 29, 2018, the entire contents of which are hereby incorporated by reference.

As an example, for a pair of object proposals, the scene-based image editing system 106 determines a subgraph based on confidence scores associated with the object proposals. To illustrate, the scene-based image editing system 106 generates each object proposal with a confidence score indicating the confidence that the object proposal is the right match for the corresponding region of the input image. The scene-based image editing system 106 further determines the subgraph proposal for a pair of object proposals based on a combined confidence score that is the product of the confidence scores of the two object proposals. The scene-based image editing system 106 further constructs the subgraph proposal as the union box of the object proposals with the combined confidence score.

In some cases, the scene-based image editing system 106 also suppresses the subgraph proposals to represent a candidate relation as two objects and one subgraph. Specifically, in some embodiments, the scene-based image editing system 106 utilizes non-maximum-suppression to represent the candidate relations as $$\langle o_i, o_j, s_k^i \rangle,$$

where i≠j and $$s_k^i$$

is the k-th subgraph of all the subgraphs associated with $o_i$, the subgraphs for $o_i$ including $o_j$ and potentially other object proposals. After suppressing the subgraph proposals, the scene-based image editing system 106 represents each object and subgraph as a feature vector, $o_i \in \mathbb{R}^D$ and a feature map $$s_k^i \in \mathbb{R}^{D \times K_a \times K_a},$$

respectively, where D and $K_a$ are dimensions.

After determining object proposals and subgraph proposals for objects in the input image, the scene-based image editing system 106 retrieves and embeds relationships from an external knowledgebase 1522. In one or more embodiments, an external knowledgebase includes a dataset of semantic relationships involving objects. In particular, in some embodiments, an external knowledgebase includes a semantic network including descriptions of relationships between objects based on background knowledge and contextual knowledge (also referred to herein as "commonsense relationships"). In some implementations, an external knowledgebase includes a database on one or more servers that includes relationship knowledge from one or more sources including expert-created resources, crowdsourced resources, web-based sources, dictionaries, or other sources that include information about object relationships.

Additionally, in one or more embodiments an embedding includes a representation of relationships involving objects as a vector. For instance, in some cases, a relationship embedding includes a vector representation of a triplet (i.e., an object label, one or more relationships, and an object entity) using extracted relationships from an external knowledgebase.

Indeed, in one or more embodiments, the scene-based image editing system 106 communicates with the external knowledgebase 1522 to obtain useful object-relationship information for improving the object and subgraph proposals. Further, in one or more embodiments, the scene-based image editing system 106 refines the object proposals and subgraph proposals (represented by the box 1524) using embedded relationships, as described in more detail below.

In some embodiments, in preparation for retrieving the relationships from the external knowledgebase 1522, the scene-based image editing system 106 performs a process of inter-refinement on the object and subgraph proposals (e.g., in preparation for refining features of the object and subgraph proposals). Specifically, the scene-based image editing system 106 uses the knowledge that each object $o_i$ is connected to a set of subgraphs $S^i$, and each subgraph $s_k$ is associated with a set of objects $O^k$ to refine the object vector (resp. the subgraphs) by attending the associated subgraph feature maps (resp. the associated object vectors). For instance, in some cases, the inter-refinement process is represented as:

$$\bar{o}_i = o_i + f_{s \to o}\left( \sum_{s_k^i \in S^i} \alpha_k^{s \to o} \cdot s_k^i \right)$$

$$\bar{s}_i = s_i + f_{o \to s}\left( \sum_{o_i^k \in O^k} \alpha_i^{o \to s} \cdot o_i^k \right)$$

where $$\alpha_k^{s \to o}(resp.\ \alpha_i^{o \to s})$$

is the output of a softmax layer indicating the weight for passing $$s_k^i \; (resp. \; o_i^k)$$

to $o_i$ (resp. to $s_k$), and $f_{s \to o}$ and $f_{o \to s}$ are non-linear mapping functions. In one or more embodiments, due to different dimensions of $o_i$ and $s_k$, the scene-based image editing system 106 applies pooling or spatial location-based attention for s→o or o→s refinement.

In some embodiments, once the inter-refinement is complete, the scene-based image editing system 106 predicts an object label from the initially refined object feature vector $\overline{\sigma}_i$ and matches the object label with the corresponding semantic entities in the external knowledgebase 1522. In particular, the scene-based image editing system 106 accesses the external knowledgebase 1522 to obtain the most common relationships corresponding to the object label. The scene-based image editing system 106 further selects a predetermined number of the most common relationships from the external knowledgebase 1522 and uses the retrieved relationships to refine the features of the corresponding object proposal/feature vector.

In one or more embodiments, after refining the object proposals and subgraph proposals using the embedded relationships, the scene-based image editing system 106 predicts object labels 1502 and predicate labels from the refined proposals. Specifically, the scene-based image editing system 106 predicts the labels based on the refined object/subgraph features. For instance, in some cases, the scene-based image editing system 106 predicts each object label directly with the refined features of a corresponding feature vector. Additionally, the scene-based image editing system 106 predicts a predicate label (e.g., a relationship label) based on subject and object feature vectors in connection with their corresponding subgraph feature map due to subgraph features being associated with several object proposal pairs. In one or more embodiments, the inference process for predicting the labels is shown as:

$$P_{i,j} \sim \mathrm{softmax}(f_{rel}([\tilde{o}_i \otimes \overline{s}_k; \tilde{o}_j \otimes \overline{s}_k; \overline{s}_k]))$$

$$V_i \sim \mathrm{softmax}(f_{node}(\tilde{o}_i))$$

where $f_{rel}(\bullet)$ and $f_{node}(\bullet)$ denote the mapping layers for predicate and object recognition, respectively, and $\otimes$ represents a convolution operation. Furthermore, $\overline{\sigma}_i$ represents a refined feature vector based on the extracted relationships from the external knowledgebase.

In one or more embodiments, the scene-based image editing system 106 further generates a semantic scene graph 1504 using the predicted labels. In particular, the scene-based image editing system 106 uses the object labels 1502 and predicate labels from the refined features to create a graph representation of the semantic information of the input image 1500. In one or more embodiments, the scene-based image editing system 106 generates the scene graph as $g = \langle V_i, P_{i,j}, V_j \rangle$, i≠j, where $g$ is the scene graph.

Thus, the scene-based image editing system 106 utilizes relative location of the objects and their labels in connection with an external knowledgebase 1522 to determine relationships between objects. The scene-based image editing system 106 utilizes the determined relationships when generating a behavioral policy graph 1410. As an example, the scene-based image editing system 106 determines that a hand and a cell phone have an overlapping location within the digital image. Based on the relative locations and depth information, the scene-based image editing system 106 determines that a person (associated with the hand) has a relationship of "holding" the cell phone. As another example, the scene-based image editing system 106 determines that a person and a shirt have an overlapping location and overlapping depth within a digital image. Based on the relative locations and relative depth information, the scene-based image editing system 106 determines that the person has a relationship of "wearing" the shirt. On other hand, the scene-based image editing system 106 determines that a person and a shirt have an overlapping location and but the shirt has a greater average depth than an average depth of the person within a digital image. Based on the relative locations and relative depth information, the scene-based image editing system 106 determines that the person has a relationship of "in front of" with the shirt.

By generating a semantic scene graph for a digital image, the scene-based image editing system 106 provides improved flexibility and efficiency. Indeed, as mentioned above, the scene-based image editing system 106 generates a semantic scene graph to provide improved flexibility as characteristics used in modifying a digital image are readily available at the time user interactions are received to execute a modification. Accordingly, the scene-based image editing system 106 reduces the user interactions typically needed under conventional systems to determine those characteristics (or generate needed content, such as bounding boxes or object masks) in preparation for executing a modification. Thus, the scene-based image editing system 106 provides a more efficient graphical user interface that requires less user interactions to modify a digital image.

Additionally, by generating a semantic scene graph for a digital image, the scene-based image editing system 106 provides an ability to edit a two-dimensional image like a real-world scene. For example, based on a generated semantic scene graph for an image generated utilizing various neural networks, the scene-based image editing system 106 determines objects, their attributes (position, depth, material, color, weight, size, label, etc.). The scene-based image editing system 106 utilizes the information of the semantic scene graph to edit an image intelligently as if the image were a real-world scene.

Indeed, in one or more embodiments, the scene-based image editing system 106 utilizes a semantic scene graph generated for a digital image to facilitate modification to the digital image. For instance, in one or more embodiments, the scene-based image editing system 106 facilitates modification of one or more object attributes of an object portrayed in a digital image utilizing the corresponding semantic scene graph. FIGS. 16-21C illustrate modifying one or more object attributes of an object portrayed in a digital image in accordance with one or more embodiments.

Many conventional systems are inflexible in that they often require difficult, tedious workflows to target modifications to a particular object attribute of an object portrayed in a digital image. Indeed, modifying an object attribute often requires manual manipulation of the object attribute under such systems. For example, modifying a shape of an object portrayed in a digital image often requires several user interactions to manually restructure the boundaries of an object (often at the pixel level), and modifying a size often requires tedious interactions with resizing tools to adjust the size and ensure proportionality. Thus, in addition to inflexibility, many conventional systems suffer from inefficiency in that the processes required by these systems to execute such a targeted modification typically involve a significant number of user interactions.

The scene-based image editing system 106 provides advantages over conventional systems by operating with improved flexibility and efficiency. Indeed, by presenting a graphical user interface element through which user interactions are able to target object attributes of an object, the scene-based image editing system 106 offers more flexibility in the interactivity of objects portrayed in digital images. In particular, via the graphical user interface element, the scene-based image editing system 106 provides flexible selection and modification of object attributes. Accordingly, the scene-based image editing system 106 further provides improved efficiency by reducing the user interactions required to modify an object attribute. Indeed, as will be discussed below, the scene-based image editing system 106 enables user interactions to interact with a description of an object attribute in order to modify that object attribute, avoiding the difficult, tedious workflows of user interactions required under many conventional systems.

Figure 16:
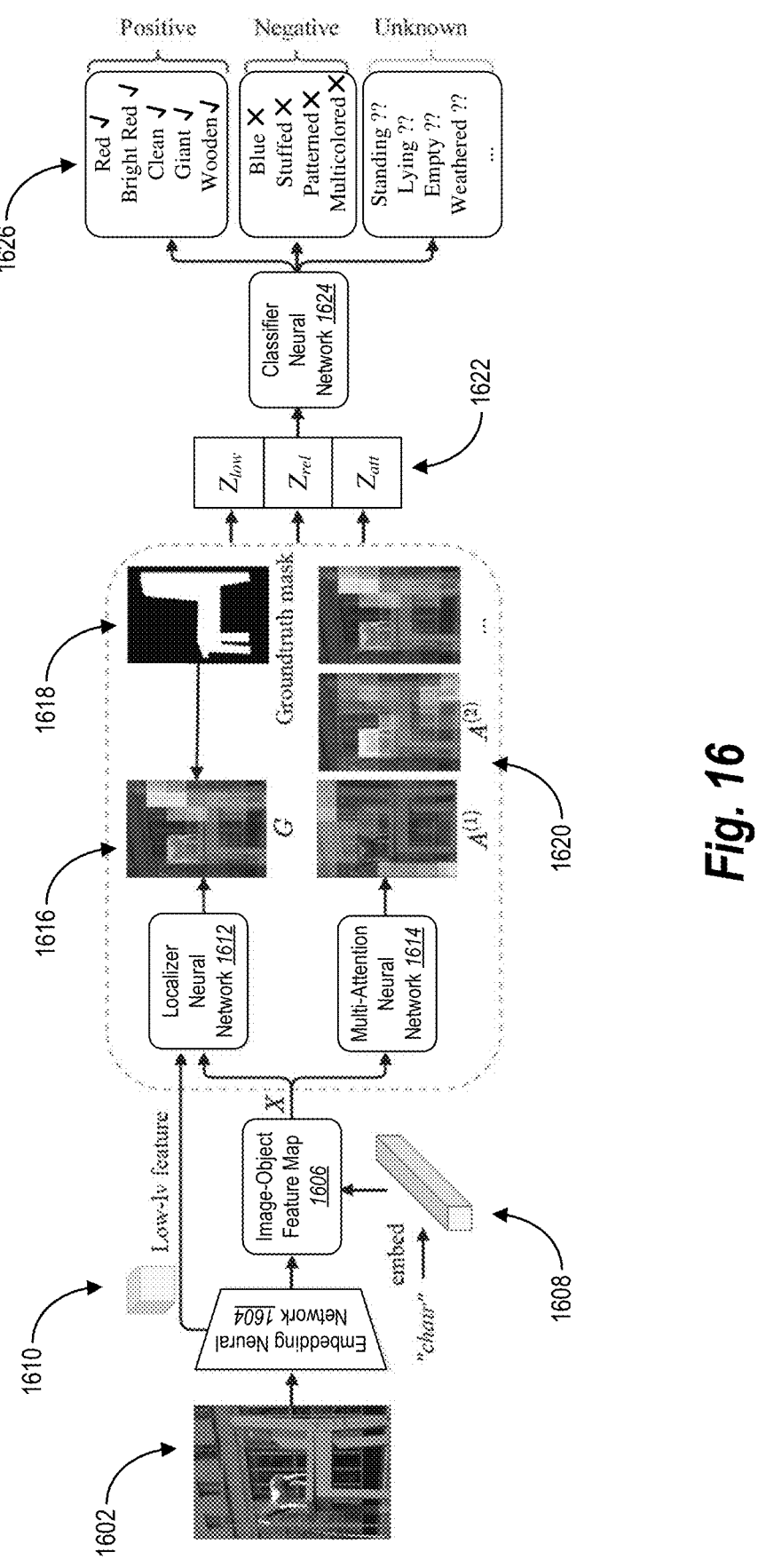
FIG. 16 illustrates an overview of a multi-attribute contrastive classification neural network in accordance with one or more embodiments.
Figure 17:
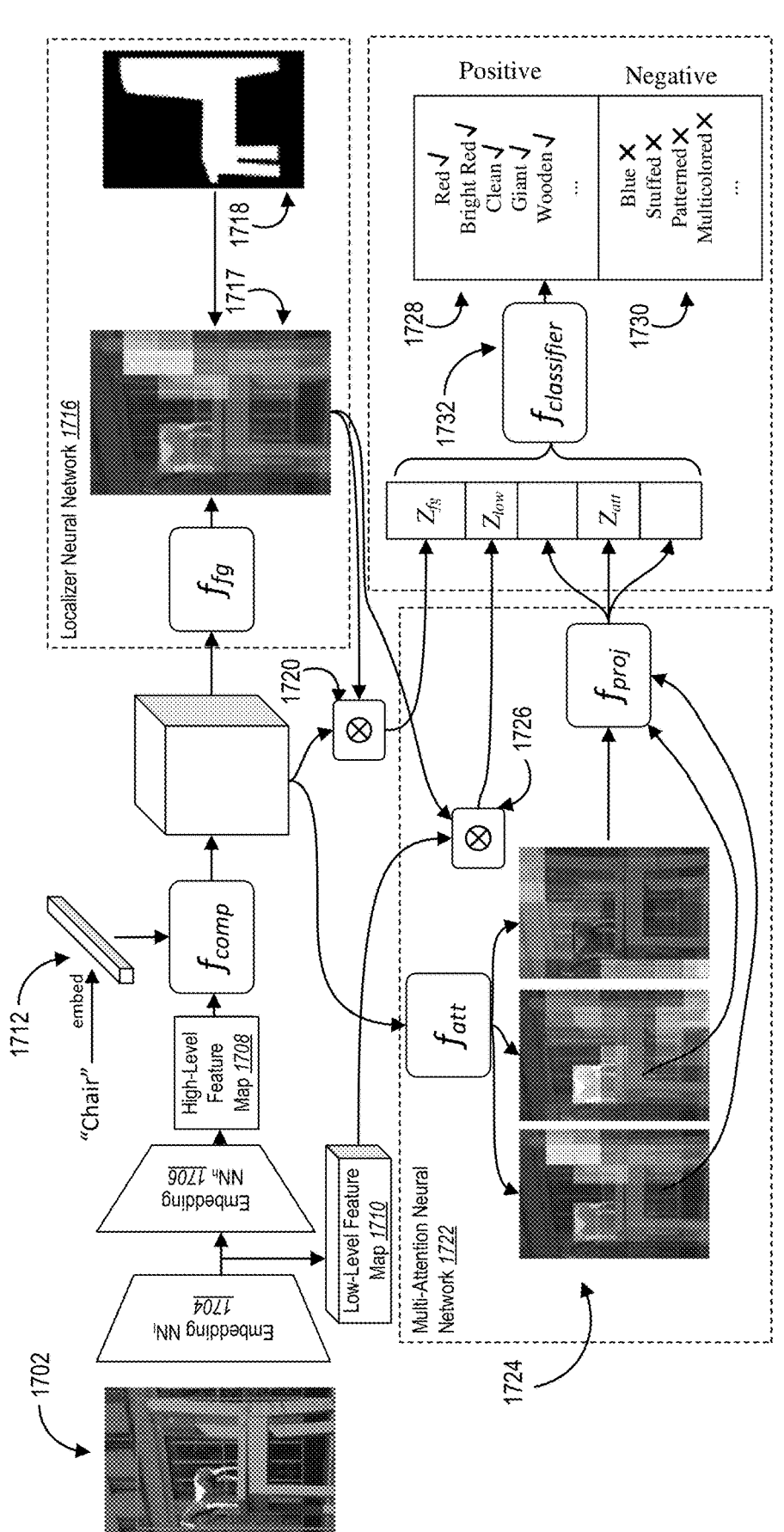
FIG. 17 illustrates an architecture of a multi-attribute contrastive classification neural network in accordance with one or more embodiments.

As suggested, in one or more embodiments, the scene-based image editing system 106 facilitates modifying object attributes of objects portrayed in a digital image by determining the object attributes of those objects. In particular, in some cases, the scene-based image editing system 106 utilizes a machine learning model, such as an attribute classification neural network, to determine the object attributes. FIGS. 16-17 illustrates an attribute classification neural network utilized by the scene-based image editing system 106 to determine object attributes for objects in accordance with one or more embodiments. In particular, FIGS. 16-17 illustrate a multi-attribute contrastive classification neural network utilized by the scene-based image editing system 106 in one or more embodiments.

In one or more embodiments, an attribute classification neural network includes a computer-implemented neural network that identifies object attributes of objects portrayed in a digital image. In particular, in some embodiments, an attribute classification neural network includes a computer-implemented neural network that analyzes objects portrayed in a digital image, identifies the object attributes of the objects, and provides labels for the corresponding object attributes in response. It should be understood that, in many cases, an attribute classification neural network more broadly identifies and classifies attributes for semantic areas portrayed in a digital image. Indeed, in some implementations, an attribute classification neural network determines attributes for semantic areas portrayed in a digital image aside from objects (e.g., the foreground or background).

FIG. 16 illustrates an overview of a multi-attribute contrastive classification neural network in accordance with one or more embodiments. In particular, FIG. 16 illustrates the scene-based image editing system 106 utilizing a multi-attribute contrastive classification neural network to extract a wide variety of attribute labels (e.g., negative, positive, and unknown labels) for an object portrayed within a digital image.

As shown in FIG. 16, the scene-based image editing system 106 utilizes an embedding neural network 1604 with a digital image 1602 to generate an image-object feature map 1606 and a low-level attribute feature map 1610. In particular, the scene-based image editing system 106 generates the image-object feature map 1606 (e.g., the image-object feature map X) by combining an object-label embedding vector 1608 with a high-level attribute feature map from the embedding neural network 1604. For instance, the object-label embedding vector 1608 represents an embedding of an object label (e.g., "chair").

Furthermore, as shown in FIG. 16, the scene-based image editing system 106 generates a localized image-object feature vector $Z_{rel}$. In particular, the scene-based image editing system 106 utilizes the image-object feature map 1606 with the localizer neural network 1612 to generate the localized image-object feature vector $Z_{rel}$. Specifically, the scene-based image editing system 106 combines the image-object feature map 1606 with a localized object attention feature vector 1616 (denoted G) to generate the localized image-object feature vector $Z_{rel}$ to reflect a segmentation prediction of the relevant object (e.g., "chair") portrayed in the digital image 1602. As further shown in FIG. 16, the localizer neural network 1612, in some embodiments, is trained using ground truth object segmentation masks 1618.

Additionally, as illustrated in FIG. 16, the scene-based image editing system 106 also generates a localized low-level attribute feature vector $Z_{low}$. In particular, in reference to FIG. 16, the scene-based image editing system 106 utilizes the localized object attention feature vector G from the localizer neural network 1612 with the low-level attribute feature map 1610 to generate the localized low-level attribute feature vector $Z_{low}$.

Moreover, as shown FIG. 16, the scene-based image editing system 106 generates a multi-attention feature vector $Z_{att}$. As illustrated in FIG. 16, the scene-based image editing system 106 generates the multi-attention feature vector $Z_{att}$ from the image-object feature map 1606 by utilizing attention maps 1620 of the multi-attention neural network 1614. Indeed, in one or more embodiments, the scene-based image editing system 106 utilizes the multi-attention feature vector $Z_{att}$ to attend to features at different spatial locations in relation to the object portrayed within the digital image 1602 while predicting attribute labels for the portrayed object.

As further shown in FIG. 16, the scene-based image editing system 106 utilizes a classifier neural network 1624 to predict the attribute labels 1626 upon generating the localized image-object feature vector $Z_{rel}$, the localized low-level attribute feature vector $Z_{low}$, and the multi-attention feature vector $Z_{att}$ (collectively shown as vectors 1622 in FIG. 16). In particular, in one or more embodiments, the scene-based image editing system 106 utilizes the classifier neural network 1624 with a concatenation of the localized image-object feature vector $Z_{rel}$, the localized low-level attribute feature vector $Z_{low}$, and the multi-attention feature vector $Z_{att}$ to determine the attribute labels 1626 for the object (e.g., chair) portrayed within the digital image 1602. As shown in FIG. 16, the scene-based image editing system 106 determines positive attribute labels for the chair portrayed in the digital image 1602, negative attribute labels that are not attributes of the chair portrayed in the digital image 1602, and unknown attribute labels that correspond to attribute labels that the scene-based image editing system 106 could not confidently classify utilizing the classifier neural network 1624 as belonging to the chair portrayed in the digital image 1602.

In some instances, the scene-based image editing system 106 utilizes probabilities (e.g., a probability score, floating point probability) output by the classifier neural network 1624 for the particular attributes to determine whether the attributes are classified as positive, negative, and/or unknown attribute labels for the object portrayed in the digital image 1602 (e.g., the chair). For example, the scene-based image editing system 106 identifies an attribute as a positive attribute when a probability output for the particular attribute satisfies a positive attribute threshold (e.g., a positive probability, a probability that is over 0.5). Moreover, the scene-based image editing system 106 identifies an attribute as a negative attribute when a probability output for the particular attribute satisfies a negative attribute threshold (e.g., a negative probability, a probability that is below −0.5). Furthermore, in some cases, the scene-based image editing system 106 identifies an attribute as an unknown attribute when the probability output for the particular attribute does not satisfy either the positive attribute threshold or the negative attribute threshold.

In some cases, a feature map includes a height, width, and dimension locations (H×W×D) which have D-dimensional feature vectors at each of the H×W image locations. Furthermore, in some embodiments, a feature vector includes a set of values representing characteristics and/or features of content (or an object) within a digital image. Indeed, in some embodiments, a feature vector includes a set of values corresponding to latent and/or patent attributes related to a digital image. For example, in some instances, a feature vector is a multi-dimensional dataset that represents features depicted within a digital image. In one or more embodiments, a feature vector includes a set of numeric metrics learned by a machine learning algorithm.

FIG. 17 illustrates an architecture of the multi-attribute contrastive classification neural network in accordance with one or more embodiments. Indeed, in one or more embodiments, the scene-based image editing system 106 utilizes the multi-attribute contrastive classification neural network, as illustrated in FIG. 17, with the embedding neural network, the localizer neural network, the multi-attention neural network, and the classifier neural network components to determine positive and negative attribute labels (e.g., from output attribute presence probabilities) for an object portrayed in a digital image.

As shown in FIG. 17, the scene-based image editing system 106 utilizes an embedding neural network within the multi-attribute contrastive classification neural network. In particular, as illustrated in FIG. 17, the scene-based image editing system 106 utilizes a low-level embedding layer 1704 (e.g., embedding NN$_l$) (e.g., of the embedding neural network 1604 of FIG. 16) to generate a low-level attribute feature map 1710 from a digital image 1702. Furthermore, as shown in FIG. 17, the scene-based image editing system 106 utilizes a high-level embedding layer 1706 (e.g., embedding NN$_h$) (e.g., of the embedding neural network 1604 of FIG. 16) to generate a high-level attribute feature map 1708 from the digital image 1702.

In particular, in one or more embodiments, the scene-based image editing system 106 utilizes a convolutional neural network as an embedding neural network. For example, the scene-based image editing system 106 generates a D-dimensional image feature map $f_{img}(I) \in \mathbb{R}^{H \times W \times D}$ with a spatial size H×W extracted from a convolutional neural network-based embedding neural network. In some instance, the scene-based image editing system 106 utilizes an output of the penultimate layer of ResNet-50 as the image feature map $f_{img}(I)$.

As shown in FIG. 17, the scene-based image editing system 106 extracts both a high-level attribute feature map 1708 and a low-level attribute feature map 1710 utilizing a high-level embedding layer and a low-level embedding layer of an embedding neural network. By extracting both the high-level attribute feature map 1708 and the low-level attribute feature map 1710 for the digital image 1702, the scene-based image editing system 106 addresses the heterogeneity in features between different classes of attributes. Indeed, attributes span across a wide range of semantic levels.

By utilizing both low-level feature maps and high-level feature maps, the scene-based image editing system 106 accurately predicts attributes across the wide range of semantic levels. For instance, the scene-based image editing system 106 utilizes low-level feature maps to accurately predict attributes such as, but not limited to, colors (e.g., red, blue, multicolored), patterns (e.g., striped, dotted, striped), geometry (e.g., shape, size, posture), texture (e.g., rough, smooth, jagged), or material (e.g., wooden, metallic, glossy, matte) of a portrayed object. Meanwhile, in one or more embodiments, the scene-based image editing system 106 utilizes high-level feature maps to accurately predict attributes such as, but not limited to, object states (e.g., broken, dry, messy, full, old) or actions (e.g., running, sitting, flying) of a portrayed object.

Furthermore, as illustrated in FIG. 17, the scene-based image editing system 106 generates an image-object feature map 1714. In particular, as shown in FIG. 17, the scene-based image editing system 106 combines an object-label embedding vector 1712 (e.g., such as the object-label embedding vector 1608 of FIG. 16) from a label corresponding to the object (e.g., "chair") with the high-level attribute feature map 1708 to generate the image-object feature map 1714 (e.g., such as the image-object feature map 1606 of FIG. 16). As further shown in FIG. 17, the scene-based image editing system 106 utilizes a feature composition module (e.g., $f_{comp}$) that utilizes the object-label embedding vector 1712 and the high-level attribute feature map 1708 to output the image-object feature map 1714.

In one or more embodiments, the scene-based image editing system 106 generates the image-object feature map 1714 to provide an extra signal to the multi-attribute contrastive classification neural network to learn the relevant object for which it is predicting attributes (e.g., while also encoding the features for the object). In particular, in some embodiments, the scene-based image editing system 106 incorporates the object-label embedding vector 1712 (as an input in a feature composition module $f_{comp}$ to generate the image-object feature map 1714) to improve the classification results of the multi-attribute contrastive classification neural network by having the multi-attribute contrastive classification neural network learn to avoid unfeasible object-attribute combinations (e.g., a parked dog, a talking table, a barking couch). Indeed, in some embodiments, the scene-based image editing system 106 also utilizes the object-label embedding vector 1712 (as an input in the feature composition module $f_{comp}$) to have the multi-attribute contrastive classification neural network learn to associate certain object-attribute pairs together (e.g., a ball is always round). In many instances, by guiding the multi-attribute contrastive classification neural network on what object it is predicting attributes for enables the multi-attribute contrastive classification neural network to focus on particular visual aspects of the object. This, in turn, improves the quality of extracted attributes for the portrayed object.

In one or more embodiments, the scene-based image editing system 106 utilizes a feature composition module (e.g., $f_{comp}$) to generate the image-object feature map 1714. In particular, the scene-based image editing system 106 implements the feature composition module (e.g., $f_{comp}$) with a gating mechanism in accordance with the following:

$$f_{comp}(f_{img}(I), \phi_o) = f_{img}(I) \odot f_{gate}(\phi_o) \text{ and}$$

$$f_{comp}(\phi_o) = \sigma(W_{g2} \cdot ReLU(W_{g1}\phi_o + b_{g1}) + b_{g2})$$

In the first function above, the scene-based image editing system 106 utilizes a channel-wise product ($\odot$) of the high-level attribute feature map $f_{img}(I)$ and a filter $f_{gate}$ of the object-label embedding vector $\phi_o \in \mathbb{R}^d$ to generate an image-object feature map $f_{comp}$ ($f_{img}(I)$, $\phi_o) \in \mathbb{R}^D$.

In addition, in the second function above, the scene-based image editing system 106 utilizes a sigmoid function a in the $f_{gate}(\phi_o)) \in \mathbb{R}^D$ that is broadcasted to match the feature map spatial dimension as a 2-layer multilayer perceptron (MLP). Indeed, in one or more embodiments, the scene-based image editing system 106 utilizes $f_{gate}$ as a filter that selects attribute features that are relevant to the object of interest (e.g., as indicated by the object-label embedding vector $\phi_o$). In many instances, the scene-based image editing system 106 also utilizes $f_{gate}$ to suppress incompatible object-attribute pairs (e.g., talking table). In some embodiments, the scene-based image editing system 106 can identify object-image labels for each object portrayed within a digital image and output attributes for each portrayed object by utilizing the identified object-image labels with the multi-attribute contrastive classification neural network.

Furthermore, as shown in FIG. 17, the scene-based image editing system 106 utilizes the image-object feature map 1714 with a localizer neural network 1716 to generate a localized image-object feature vector $Z_{rel}$ (e.g., as also shown in FIG. 16 as localizer neural network 1612 and $Z_{rel}$). In particular, as shown in FIG. 17, the scene-based image editing system 106 generates a localized object attention feature vector 1717 (e.g., G in FIG. 16) that reflects a segmentation prediction of the portrayed object by utilizing the image-object feature map 1714 with a convolutional layer $f_{rel}$ of the localizer neural network 1716. Then, as illustrated in FIG. 17, the scene-based image editing system 106 combines the localized object attention feature vector 1717 with the image-object feature map 1714 to generate the localized image-object feature vector $Z_{rel}$. As shown in FIG. 17, the scene-based image editing system 106 utilizes matrix multiplication 1720 between the localized object attention feature vector 1717 and the image-object feature map 1714 to generate the localized image-object feature vector $Z_{rel}$.

In some instances, digital images may include multiple objects (and/or a background). Accordingly, in one or more embodiments, the scene-based image editing system 106 utilizes a localizer neural network to learn an improved feature aggregation that suppresses non-relevant-object regions (e.g., regions not reflected in a segmentation prediction of the target object to isolate the target object). For example, in reference to the digital image 1702, the scene-based image editing system 106 utilizes the localizer neural network 1716 to localize an object region such that the multi-attribute contrastive classification neural network predicts attributes for the correct object (e.g., the portrayed chair) rather than other irrelevant objects (e.g., the portrayed horse). To do this, in some embodiments, the scene-based image editing system 106 utilizes a localizer neural network that utilizes supervised learning with object segmentation masks (e.g., ground truth relevant-object masks) from a dataset of labeled images (e.g., ground truth images as described below).

To illustrate, in some instances, the scene-based image editing system 106 utilizes 2-stacked convolutional layers $f_{rel}$ (e.g., with a kernel size of 1) followed by a spatial softmax to generate a localized object attention feature vector G (e.g., a localized object region) from an image-object feature map $X \in \mathbb{R}^{H \times W \times D}$ in Ct with the following:

$$g = f_{rel}(X), g \in \mathbb{R}^{H \times W},$$

$$G_{h,w} = \frac{\exp(g_h, w)}{\sum_{h,w} \exp(g_h, w)}, G \in \mathbb{R}^{H \times W}$$

For example, the localized object attention feature vector G includes a single plane of data that is H×W (e.g., a feature map having a single dimension). In some instances, the localized object attention feature vector G includes a feature map (e.g., a localized object attention feature map) that includes one or more feature vector dimensions.

Then, in one or more embodiments, the scene-based image editing system 106 utilizes the localized object attention feature vector $G_{h,w}$ and the image-object feature map $X_{h,w}$ to generate the localized image-object feature vector $Z_{rel}$ in accordance with the following:

$$Z_{rel} = \sum_{h,w} G_{h,w} X_{h,w}$$

In some instances, in the above function, the scene-based image editing system 106 pools H×W D-dimensional feature vectors $X_{h,w}$ (from the image-object feature map) in $\mathbb{R}^D$ using weights from the localized object attention feature vector $G_{h,w}$ into a single D-dimensional feature vector $Z_{rel}$.

In one or more embodiments, in reference to FIG. 17, the scene-based image editing system 106 trains the localizer neural network 1716 to learn the localized object attention feature vector 1717 (e.g., G) utilizing direct supervision with object segmentation masks 1718 (e.g., ground truth object segmentation masks 1618 from FIG. 16).

Furthermore, as shown in FIG. 17, the scene-based image editing system 106 utilizes the image-object feature map 1714 with a multi-attention neural network 1722 to generate a multi-attention feature vector $Z_{att}$ (e.g., the multi-attention neural network 1614 and $Z_{att}$ of FIG. 16). In particular, as shown in FIG. 17, the scene-based image editing system 106 utilizes a convolutional layer $f_{att}$ (e.g., attention layers) with the image-object feature map 1714 to extract attention maps 1724 (e.g., Attention 1 through Attention k) (e.g., attention maps 1620 of FIG. 16). Then, as further shown in FIG. 17, the scene-based image editing system 106 passes (e.g., via linear projection) the extracted attention maps 424 (attention 1 through attention k) through a projection layer $f_{proj}$ to extract one or more attention features that are utilized to generate the multi-attention feature vector $Z_{att}$.

In one or more embodiments, the scene-based image editing system 106 utilizes the multi-attention feature vector $Z_{att}$ to accurately predict attributes of a portrayed object within a digital image by providing focus to different parts of the portrayed object and/or regions surrounding the portrayed object (e.g., attending to features at different spatial locations). To illustrate, in some instances, the scene-based image editing system 106 utilizes the multi-attention feature vector $Z_{att}$ to extract attributes such as "barefooted" or "bald-headed" by focusing on different parts of a person (i.e., an object) that is portrayed in a digital image. Likewise, in some embodiments, the scene-based image editing system

106 utilizes the multi-attention feature vector $Z_{att}$ to distinguish between different activity attributes (e.g., jumping vs crouching) that may rely on information from surrounding context of the portrayed object.

In certain instances, the scene-based image editing system 106 generates an attention map per attribute portrayed for an object within a digital image. For example, the scene-based image editing system 106 utilizes an image-object feature map with one or more attention layers to generate an attention map from the image-object feature map for each known attribute. Then, the scene-based image editing system 106 utilizes the attention maps with a projection layer to generate the multi-attention feature vector $Z_{att}$. In one or more embodiments, the scene-based image editing system 106 generates various numbers of attention maps for various attributes portrayed for an object within a digital image (e.g., the system can generate an attention map for each attribute or a different number of attention maps than the number of attributes).

Furthermore, in one or more embodiments, the scene-based image editing system 106 utilizes a hybrid shared multi-attention approach that allows for attention hops while generating the attention maps from the image-object feature map. For example, the scene-based image editing system 106 extracts M attention maps $$\{A^{(m)}\}_{m=1}^M$$

from an image-object feature map X utilizing a convolutional layer $$f_{att}^{(m)}$$

(e.g., attention layers) in accordance with the following function:

$$E^{(m)} = f_{att}^{(m)}(X),\ E^{(m)} \in \mathbb{R}^{H \times W},\ m = 1, \ldots, M$$

and $$A_{h,w}^{(m)} = \frac{\exp\left(E_{h,w}^{(m)}\right)}{\sum_{h,w} \exp\left(E_{h,w}^{(m)}\right)},\ A_{h,w}^{(m)} \in \mathbb{R}^{H \times W}$$

In some cases, the scene-based image editing system 106 utilizes a convolutional layer $$f_{att}^{(m)}$$

that has a similar architecture to the 2-stacked convolutional layers $f_{rel}$ from function (3) above. By utilizing the approach outlined in second function above, the scene-based image editing system 106 utilizes a diverse set of attention maps that correspond to a diverse range of attributes.

Subsequently, in one or more embodiments, the scene-based image editing system 106 utilizes the M attention maps $$\text{(e.g., } A_{h,w}^{(m)})$$

to aggregate M attention feature vectors $$\left(\{r^{(m)}\}_{m=1}^M\right)$$

from the image-object feature map X in accordance with the following function:

$$r^{(m)} = \sum_{h,w} A_{h,w}^{(m)} X_{h,w},\ r^{(m)} \in \mathbb{R}^D$$

Moreover, in reference to FIG. 17, the scene-based image editing system 106 passes the M attention feature vectors $$\left(\{r^{(m)}\}_{i=1}^M\right)$$

through a projection layer $$f_{proj}^{(m)}$$

to extract one or more attention feature vectors $z^{(m)}$ in accordance with the following function:

$$z_{att}^{(m)} = f_{proj}^{(m)}\left(r^{(m)}\right),\ z_{att}^{(m)} \in \mathbb{R}^{D_{proj}}$$

Then, in one or more embodiments, the scene-based image editing system 106 generates the multi-attention feature vector $Z_{att}$ by concatenating the individual attention feature vectors $$z_{att}^{(m)}$$

in accordance with the following function:

$$Z_{att} = concat\left(\left[z_{att}^{(1)}, \ldots, z_{att}^{(M)}\right]\right)$$

In some embodiments, the scene-based image editing system 106 utilizes a divergence loss with the multi-attention neural network in the M attention hops approach. In particular, the scene-based image editing system 106 utilizes a divergence loss that encourages attention maps to focus on different (or unique) regions of a digital image (from the image-object feature map). In some cases, the scene-based image editing system 106 utilizes a divergence loss that promotes diversity between attention features by minimizing a cosine similarity (e.g., $\ell_2$-norm) between attention weight vectors (e.g., E) of attention features. For instance, the scene-based image editing system 106 determines a divergence loss $\mathcal{L}_{div}$ in accordance with the following function:

$$\mathcal{L}_{div} = \sum_{m \neq n} \frac{\left\langle E^{(m)}, E^{(n)}\right\rangle}{\left\|E^{(m)}\right\|_2 \left\|E^{(n)}\right\|_2}$$

US 12,646,188 B2

47

In one or more embodiments, the scene-based image editing system 106 utilizes the divergence loss $\mathcal{L}_{div}$ to learn parameters of the multi-attention neural network 1722 and/or the multi-attribute contrastive classification neural network (as a whole).

Furthermore, as shown in FIG. 17, the scene-based image editing system 106 also generates a localized low-level attribute feature vector $Z_{low}$ (e.g., $Z_{low}$ of FIG. 16). Indeed, as illustrated in FIG. 17, the scene-based image editing system 106 generates the localized low-level attribute feature vector $Z_{low}$ by combining the low-level attribute feature map 1710 and the localized object attention feature vector 1717. For example, as shown in FIG. 17, the scene-based image editing system 106 combines the low-level attribute feature map 1710 and the localized object attention feature vector 1717 utilizing matrix multiplication 1726 to generate the localized low-level attribute feature vector $Z_{low}$.

By generating and utilizing the localized low-level attribute feature vector $Z_{low}$, in one or more embodiments, the scene-based image editing system 106 improves the accuracy of low-level features (e.g., colors, materials) that are extracted for an object portrayed in a digital image. In particular, in one or more embodiments, the scene-based image editing system 106 pools low-level features (as represented by a low-level attribute feature map from a low-level embedding layer) from a localized object attention feature vector (e.g., from a localizer neural network). Indeed, in one or more embodiments, by pooling low-level features from the localized object attention feature vector utilizing a low-level feature map, the scene-based image editing system 106 constructs a localized low-level attribute feature vector $Z_{low}$.

As further shown in FIG. 17, the scene-based image editing system 106 utilizes a classifier neural network 1732 ($f_{classifier}$) (e.g., the classifier neural network 1624 of FIG. 16) with the localized image-object feature vector $Z_{rel}$, the multi-attention feature vector $Z_{att}$, and the localized low-level attribute feature vector $Z_{low}$ to determine positive attribute labels 1728 and negative attribute labels 1730 for the object (e.g., "chair") portrayed within the digital image 1702. In some embodiments, the scene-based image editing system 106 utilizes a concatenation of the localized image-object feature vector $Z_{rel}$, the multi-attention feature vector $Z_{att}$, and the localized low-level attribute feature vector $Z_{low}$ as input in a classification layer of the classifier neural network 1732 ($f_{classifier}$). Then, as shown in FIG. 17, the classifier neural network 1732 ($f_{classifier}$) generates positive attribute labels 1728 (e.g., red, bright red, clean, giant, wooden) and also generates negative attribute labels 1730 (e.g., blue, stuffed, patterned, multicolored) for the portrayed object in the digital image 1702.

In one or more embodiments, the scene-based image editing system 106 utilizes a classifier neural network that is a 2-layer MLP. In some cases, the scene-based image editing system 106 utilizes a classifier neural network that includes various amounts of hidden units and output logic values followed by sigmoid. In some embodiments, the classifier neural network is trained by the scene-based image editing system 106 to generate both positive and negative attribute labels. Although one or more embodiments described herein utilize a 2-layer MLP, in some instances, the scene-based image editing system 106 utilizes a linear layer (e.g., within the classifier neural network, for the $f_{gate}$, and for the image-object feature map).

Furthermore, in one or more embodiments, the scene-based image editing system 106 utilizes various combinations of the localized image-object feature vector $Z_{rel}$, the multi-attention feature vector $Z_{att}$, and the localized low-level attribute feature vector $Z_{low}$ with the classifier neural network to extract attributes for an object portrayed in a digital image. For example, in certain instances, the scene-based image editing system 106 provides the localized image-object feature vector $Z_{rel}$ and the multi-attention feature vector $Z_{att}$ to extract attributes for the portrayed object. In some instances, as shown in FIG. 17, the scene-based image editing system 106 utilizes a concatenation of each the localized image-object feature vector $Z_{rel}$, the multi-attention feature vector $Z_{att}$, and the localized low-level attribute feature vector $Z_{low}$ with the classifier neural network.

In one or more embodiments, the scene-based image editing system 106 utilizes the classifier neural network 1732 to generate prediction scores corresponding to attribute labels as outputs. For, example, the classifier neural network 1732 can generate a prediction score for one or more attribute labels (e.g., a score of 0.04 for blue, a score of 0.9 for red, a score of 0.4 for orange). Then, in some instances, the scene-based image editing system 106 utilizes attribute labels that correspond to prediction scores that satisfy a threshold prediction score. Indeed, in one or more embodiments, the scene-based image editing system 106 selects various attribute labels (both positive and negative) by utilizing output prediction scores for attributes from a classifier neural network.

Although one or more embodiments herein illustrate the scene-based image editing system 106 utilizing a particular embedding neural network, localizer neural network, multi-attention neural network, and classifier neural network, the scene-based image editing system 106 can utilize various types of neural networks for these components (e.g., CNN, FCN). In addition, although one or more embodiments herein describe the scene-based image editing system 106 combining various feature maps (and/or feature vectors) utilizing matrix multiplication, the scene-based image editing system 106, in some embodiments, utilizes various approaches to combine feature maps (and/or feature vectors) such as, but not limited to, concatenation, multiplication, addition, and/or aggregation. For example, in some implementations, the scene-based image editing system 106 combines a localized object attention feature vector and an image-object feature map to generate the localized image-object feature vector by concatenating the localized object attention feature vector and the image-object feature map.

Thus, in some cases, the scene-based image editing system 106 utilizes an attribute classification neural network (e.g., a multi-attribute contrastive classification neural network) to determine objects attributes of objects portrayed in a digital image or otherwise determined attributes of portrayed semantic areas. In some cases, the scene-based image editing system 106 adds object attributes or other attributes determined for a digital image to a semantic scene graph for the digital image. In other words, the scene-based image editing system 106 utilizes the attribute classification neural network in generating semantic scene graphs for digital images. In some implementations, however, the scene-based image editing system 106 stores the determined object attributes or other attributes in a separate storage location.

Figure 18:
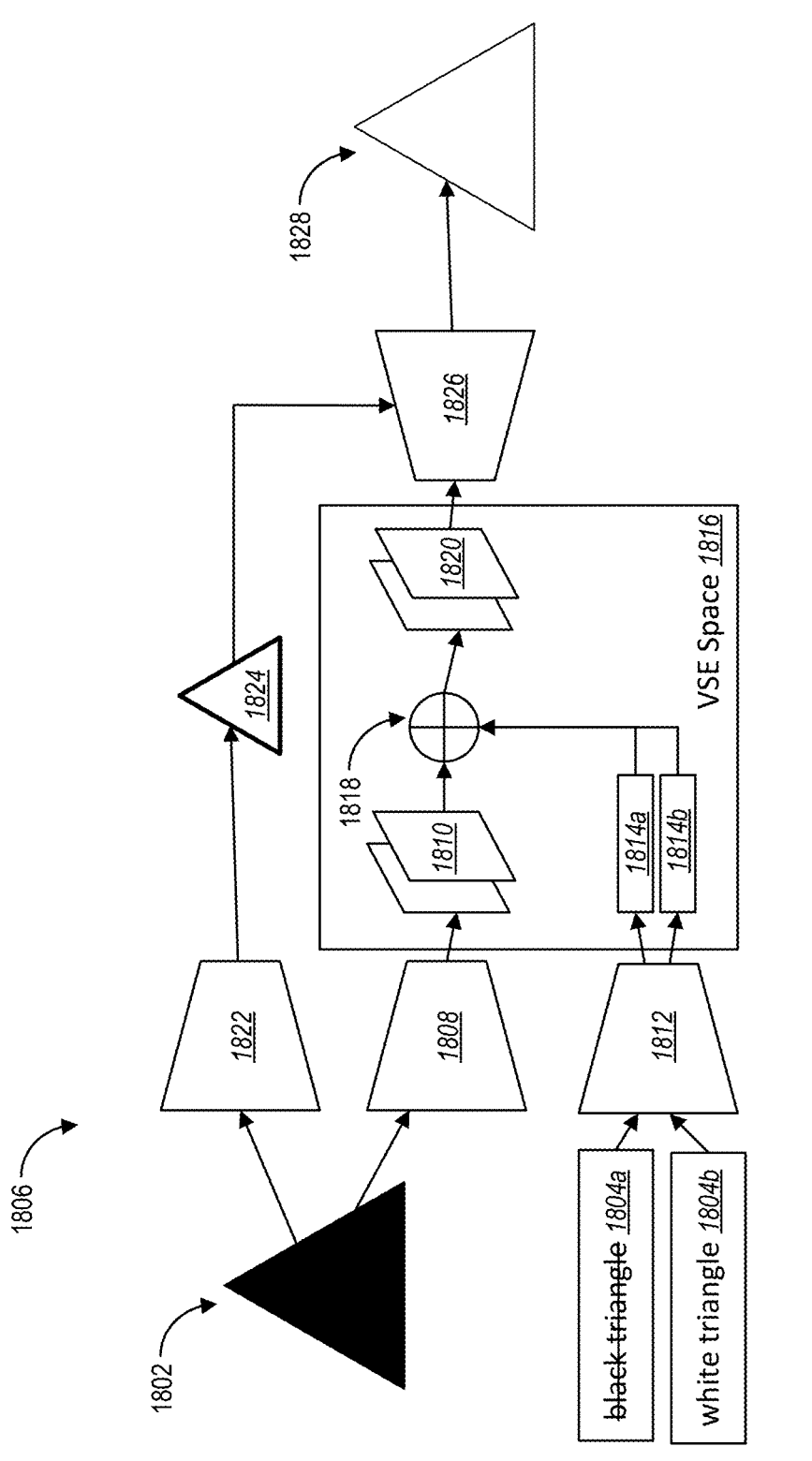
FIG. 18 illustrates an attribute modification neural network utilized by the scene-based image editing system to modify object attributes in accordance with one or more embodiments.

Further, in one or more embodiments, the scene-based image editing system 106 facilitates modifying object attributes of objects portrayed in a digital image by modifying one or more object attributes in response to user input. In particular, in some cases, the scene-based image editing system 106 utilizes a machine learning model, such as an attribute modification neural network to modify object attributes. FIG. 18 illustrates an attribute modification neural network utilized by the scene-based image editing system 106 to modify object attributes in accordance with one or more embodiments.

In one or more embodiments, an attribute modification neural network includes a computer-implemented neural network that modifies specified object attributes of an object (or specified attributes of other specified semantic areas). In particular, in some embodiments, an attribute modification neural network includes a computer-implemented neural network that receives user input targeting an object attribute and indicating a change to the object attribute and modifies the object attribute in accordance with the indicated change. In some cases, an attribute modification neural network includes a generative network.

As shown in FIG. 18, the scene-based image editing system 106 provides an object 1802 (e.g., a digital image that portrays the object 1802) and modification input 1804*a*-1804*b* to an object modification neural network 1806. In particular, FIG. 18 shows the modification input 1804*a*-1804*b* including input for the object attribute to be changed (e.g., the black color of the object 1802) and input for the change to occur (e.g., changing the color of the object 1802 to white).

As illustrated by FIG. 18, the object modification neural network 1806 utilizes an image encoder 1808 to generate visual feature maps 1810 from the object 1802. Further, the object modification neural network 1806 utilizes a text encoder 1812 to generate textual features 1814*a*-1814*b* from the modification input 1804*a*-1804*b*. In particular, as shown in FIG. 18, the object modification neural network 1806 generates the visual feature maps 1810 and the textual features 1814*a*-1814*b* within a joint embedding space 1816 (labeled "visual-semantic embedding space" or "VSE space").

In one or more embodiments, the object modification neural network 1806 performs text-guided visual feature manipulation to ground the modification input 1804*a*-1804*b* on the visual feature maps 1810 and manipulate the corresponding regions of the visual feature maps 1810 with the provided textual features. For instance, as shown in FIG. 18, the object modification neural network 1806 utilizes an operation 1818 (e.g., a vector arithmetic operation) to generate manipulated visual feature maps 1820 from the visual feature maps 1810 and the textual features 1814*a*-1814*b*.

As further shown in FIG. 18, the object modification neural network 1806 also utilizes a fixed edge extractor 1822 to extract an edge 1824 (a boundary) of the object 1802. In other words, the object modification neural network 1806 utilizes the fixed edge extractor 1822 to extract the edge 1824 of the area to be modified.

Further, as shown, the object modification neural network 1806 utilizes a decoder 1826 to generate the modified object 1828. In particular, the decoder 1826 generates the modified object 1828 from the edge 1824 extracted from the object 1802 and the manipulated visual feature maps 1820 generated from the object 1802 and the modification input 1804*a*-1804*b*.

In one or more embodiments, the scene-based image editing system 106 trains the object modification neural network 1806 to handle open-vocabulary instructions and open-domain digital images. For instance, in some cases, the scene-based image editing system 106 trains the object modification neural network 1806 utilizing a large-scale image-caption dataset to learn a universal visual-semantic embedding space. In some cases, the scene-based image editing system 106 utilizes convolutional neural networks and/or long short-term memory networks as the encoders of the object modification neural network 1806 to transform digital images and text input into the visual and textual features.

The following provides a more detailed description of the text-guided visual feature manipulation. As previously mentioned, in one or more embodiments, the scene-based image editing system 106 utilizes the joint embedding space 1816 to manipulate the visual feature maps 1810 with the text instructions of the modification input 1804*a*-1804*b* via vector arithmetic operations. When manipulating certain objects or object attributes, the object modification neural network 1806 aims to modify only specific regions while keeping other regions unchanged. Accordingly, the object modification neural network 1806 conducts vector arithmetic operations between the visual feature maps 1810 represented as $V \in \mathbb{R}^{1024 \times 7 \times 7}$ and the textual features 1814*a*-1814*b* (e.g., represented as textual feature vectors).

For instance, in some cases, the object modification neural network 1806 identifies the regions in the visual feature maps 1810 to manipulate (i.e., grounds the modification input 1804*a*-1804*b*) on the spatial feature map. In some cases, the object modification neural network 1806 provides a soft grounding for textual queries via a weighted summation of the visual feature maps 1810. In some cases, the object modification neural network 1806 uses the textual features 1814*a*-1814*b* (represented as $t \in \mathbb{R}^{1024 \times 1}$)) as weights to compute the weighted summation of the visual feature maps 1810 $g = t^T V$. Using this approach, the object modification neural network 1806 provides a soft grounding map $g \in \mathbb{R}^{7 \times 7}$, which roughly localizes corresponding regions in the visual feature maps 1810 related to the text instructions.

In one or more embodiments, the object modification neural network 1806 utilizes the grounding map as location-adaptive coefficients to control the manipulation strength at different locations. In some cases, the object modification neural network 1806 utilizes a coefficient $\alpha$ to control the global manipulation strength, which enables continuous transitions between source images and the manipulated ones. In one or more embodiments, the scene-based image editing system 106 denotes the visual feature vector at spatial location (i,j) (where i, j∈ {0, 1, . . . 6}) in the visual feature map $V \in \mathbb{R}^{1024 \times 7 \times 7}$ as $v^{i,j} \in \mathbb{R}^{1024}$.

The scene-based image editing system 106 utilizes the object modification neural network 1806 to perform various types of manipulations via the vector arithmetic operations weighted by the soft grounding map and the coefficient $\alpha$. For instance, in some cases, the scene-based image editing system 106 utilizes the object modification neural network 1806 to change an object attribute or a global attribute. The object modification neural network 1806 denotes the textual feature embeddings of the source concept (e.g., "black triangle") and the target concept (e.g., "white triangle") as $t_1$ and $t_2$, respectively. The object modification neural network 1806 performs the manipulation of image feature vector $v^{i,j}$ at location (i,j) as follows:

$$v_m^{i,j} = v^{i,j} - \alpha \langle v^{i,j}, t_1 \rangle t_1 + \alpha \langle v^{i,j}, t_1 \rangle t_2,$$

where i,j∈ {0, 1, . . . 6} and

51

$$v_m^{i,j}$$

is the manipulated visual feature vector at location (i,j) of the 7×7 feature map.

In one or more embodiments, the object modification neural network 1806 removes the source features $t_1$ and adds the target features $t_2$ to each visual feature vector $v_{i,j}$. Additionally, $\langle v^{i,j}, t_1 \rangle$ represents the value of the soft grounding map at location (i,j), calculated as the dot product of the image feature vector and the source textual features. In other words, the value represents the projection of the visual embedding $v_{i,j}$ onto the direction of the textual embedding $t_1$. In some cases, object modification neural network 1806 utilizes the value as a location-adaptive manipulation strength to control which regions in the image should be edited. Further, the object modification neural network 1806 utilizes the coefficient $\alpha$ as a hyper-parameter that controls the image-level manipulation strength. By smoothly increasing a, the object modification neural network 1806 achieves smooth transitions from source to target attributes.

In some implementations, the scene-based image editing system 106 utilizes the object modification neural network 1806 to remove a concept (e.g., an object attribute, an object, or other visual elements) from a digital image (e.g., removing an accessory from a person). In some instances, the object modification neural network 1806 denotes the semantic embedding of the concept to be removed as t. Accordingly, the object modification neural network 1806 performs the removing operation as follows:

$$v_m^{i,j} = v^{i,j} - \alpha \langle v^{i,j}, t \rangle t$$

Further, in some embodiments, the scene-based image editing system 106 utilizes the object modification neural network 1806 to modify the degree to which an object attribute (or other attribute of a semantic area) appears (e.g., making a red apple less red or increasing the brightness of a digital image). In some cases, the object modification neural network 1806 controls the strength of an attribute via the hyper-parameter $\alpha$. By smoothly adjusting $\alpha$, the object modification neural network 1806 gradually strengthens or weakens the degree to which an attribute appears as follows:

$$v_m^{i,j} = v^{i,j} \pm \alpha \langle v^{i,j}, t \rangle t$$

After deriving the manipulated feature map $V_m \in \mathbb{R}^{1024 \times 7 \times 7}$, the object modification neural network 1806 utilizes the decoder 1826 (an image decoder) to generate a manipulated image (e.g., the modified object 1828). In one or more embodiments, the scene-based image editing system 106 trains the object modification neural network 1806 as described by F. Faghri et al., *Vse++: Improving visual-semantic Embeddings with Hard Negatives*, arXiv: 1707.05612, 2017, which is incorporated herein by reference in its entirety. In some cases, the decoder 1826 takes 1024×7×7 features maps as input and is composed of seven ResNet blocks with upsampling layers in between, which generates 256×256 images. Also, in some instances, the scene-based image editing system 106 utilizes a discriminator that includes a multi-scale patch-based discriminator. In some implementations, the scene-based image editing system 106 trains the decoder 1826 with GAN loss, perceptual loss, and discriminator feature matching loss. Further, in some embodiments, the fixed edge extractor 1822 includes a bi-directional cascade network.

Figures 19A, 19B, 19C:
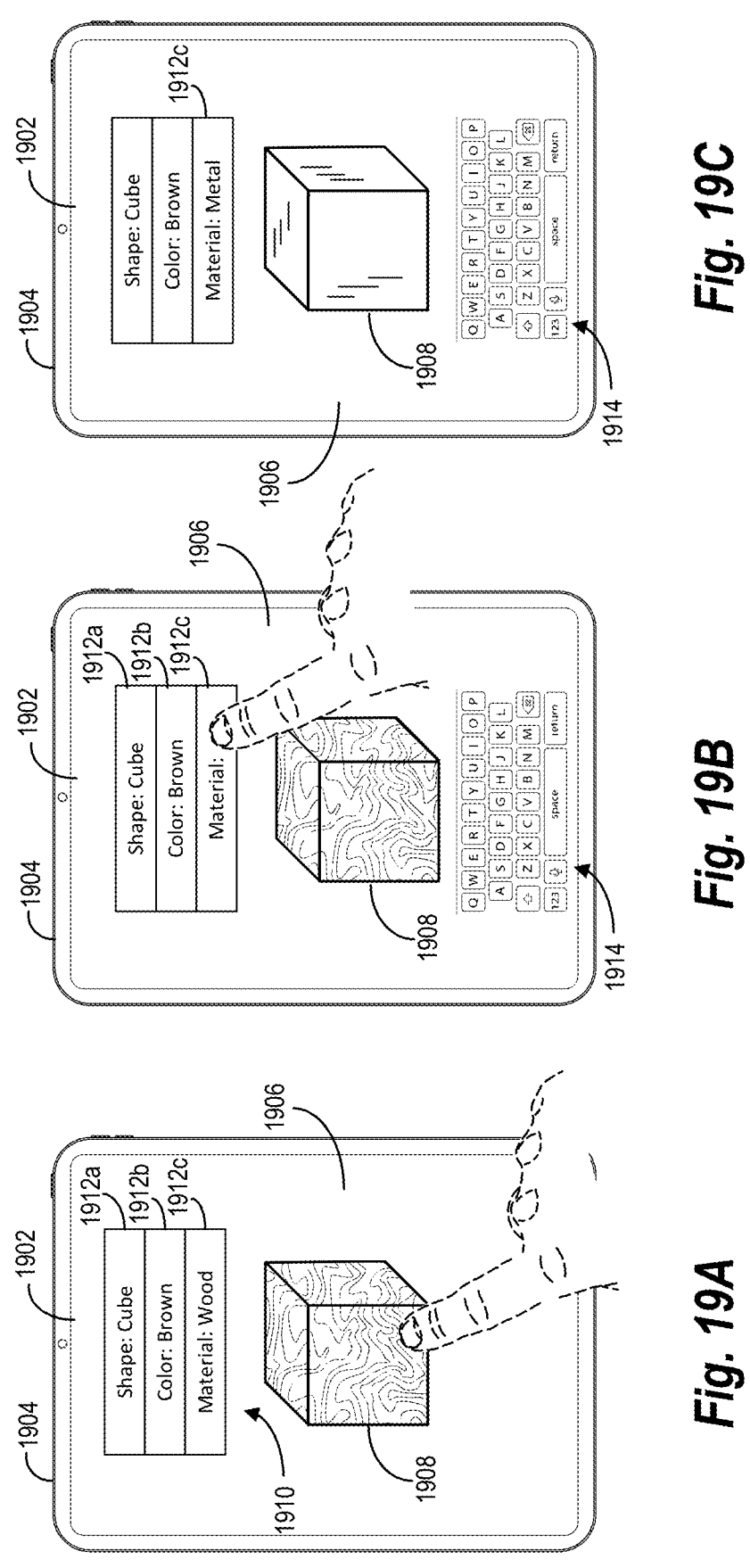
FIGS. 19A-19C illustrate a graphical user interface implemented by the scene-based image editing system to facilitate modifying object attributes of objects portrayed in a digital image in accordance with one or more embodiments.

FIGS. 19A-19C illustrate a graphical user interface implemented by the scene-based image editing system 106 to facilitate modifying object attributes of objects portrayed in a digital image in accordance with one or more embodiments. Indeed, though FIGS. 19A-19C particularly show modifying object attributes of objects, it should be noted that the scene-based image editing system 106 similarly modifies attributes of other semantic areas (e.g., background, foreground, ground, sky, etc.) of a digital image in various embodiments.

Indeed, as shown in FIG. 19A, the scene-based image editing system 106 provides a graphical user interface 1902 for display on a client device 1904 and provides a digital image 1906 for display within the graphical user interface 1902. As further shown, the digital image 1906 portrays an object 1908.

As further shown in FIG. 19A, in response to detecting a user interaction with the object 1908, the scene-based image editing system 106 provides an attribute menu 1910 for display within the graphical user interface 1902. In some embodiments, the attribute menu 1910 provides one or more object attributes of the object 1908. Indeed, FIG. 19A shows that the attribute menu 1910 provides object attributes indicators 1912a-1912c, indicating the shape, color, and material of the object 1908, respectively. It should be noted, however, that various alternative or additional object attributes are provided in various embodiments.

In one or more embodiments, the scene-based image editing system 106 retrieves the object attributes for the object attribute indicators 1912a-1912c from a semantic scene graph generated for the digital image 1906. Indeed, in some implementations, the scene-based image editing system 106 generates a semantic scene graph for the digital image 1906 (e.g., before detecting the user interaction with the object 1908). In some cases, the scene-based image editing system 106 determines the object attributes for the object 1908 utilizing an attribute classification neural network and includes the determined object attributes within the semantic scene graph. In some implementations, the scene-based image editing system 106 retrieves the object attributes from a separate storage location.

As shown in FIG. 19B, the scene-based image editing system 106 detects a user interaction with the object attribute indicator 1912c. Indeed, in one or more embodiments, the object attribute indicators 1912a-1912c are interactive. As shown, in response to detecting the user interaction, the scene-based image editing system 106 removes the corresponding object attribute of the object 1908 from display. Further, in response to detecting the user interaction, the scene-based image editing system 106 provides a digital keyboard 1914 for display within the graphical user interface 1902. Thus, the scene-based image editing system 106 provides a prompt for entry of textual user input. In some cases, upon detecting the user interaction with the object attribute indicator 1912c, the scene-based image editing system 106 maintains the corresponding object attribute for display, allowing user interactions to remove the object attribute in confirming that the object attribute has been targeted for modification.

As shown in FIG. 19C, the scene-based image editing system 106 detects one or more user interactions with the digital keyboard 1914 displayed within the graphical user interface 1902. In particular, the scene-based image editing system 106 receives textual user input provided via the digital keyboard 1914. The scene-based image editing system 106 further determines that the textual user input provides a change to the object attribute corresponding to the object attribute indicator 1912*c*. Additionally, as shown, the scene-based image editing system 106 provides the textual user input for display as part of the object attribute indicator 1912*c*.

In this case, the user interactions with the graphical user interface 1902 provide instructions to change a material of the object 1908 from a first material (e.g., wood) to a second material (e.g., metal). Thus, upon receiving the textual user input regarding the second material, the scene-based image editing system 106 modifies the digital image 1906 by modifying the object attribute of the object 1908 to reflect the user-provided second material.

In one or more embodiments, the scene-based image editing system 106 utilizes an attribute modification neural network to change the object attribute of the object 1908. In particular, as described above with reference to FIG. 18, the scene-based image editing system 106 provides the digital image 1906 as well as the modification input composed of the first material and the second material provided by the textual user input to the attribute modification neural network. Accordingly, the scene-based image editing system 106 utilizes the attribute modification neural network to provide a modified digital image portraying the object 1908 with the modified object attribute as output.

Figures 20A, 20B, 20C:
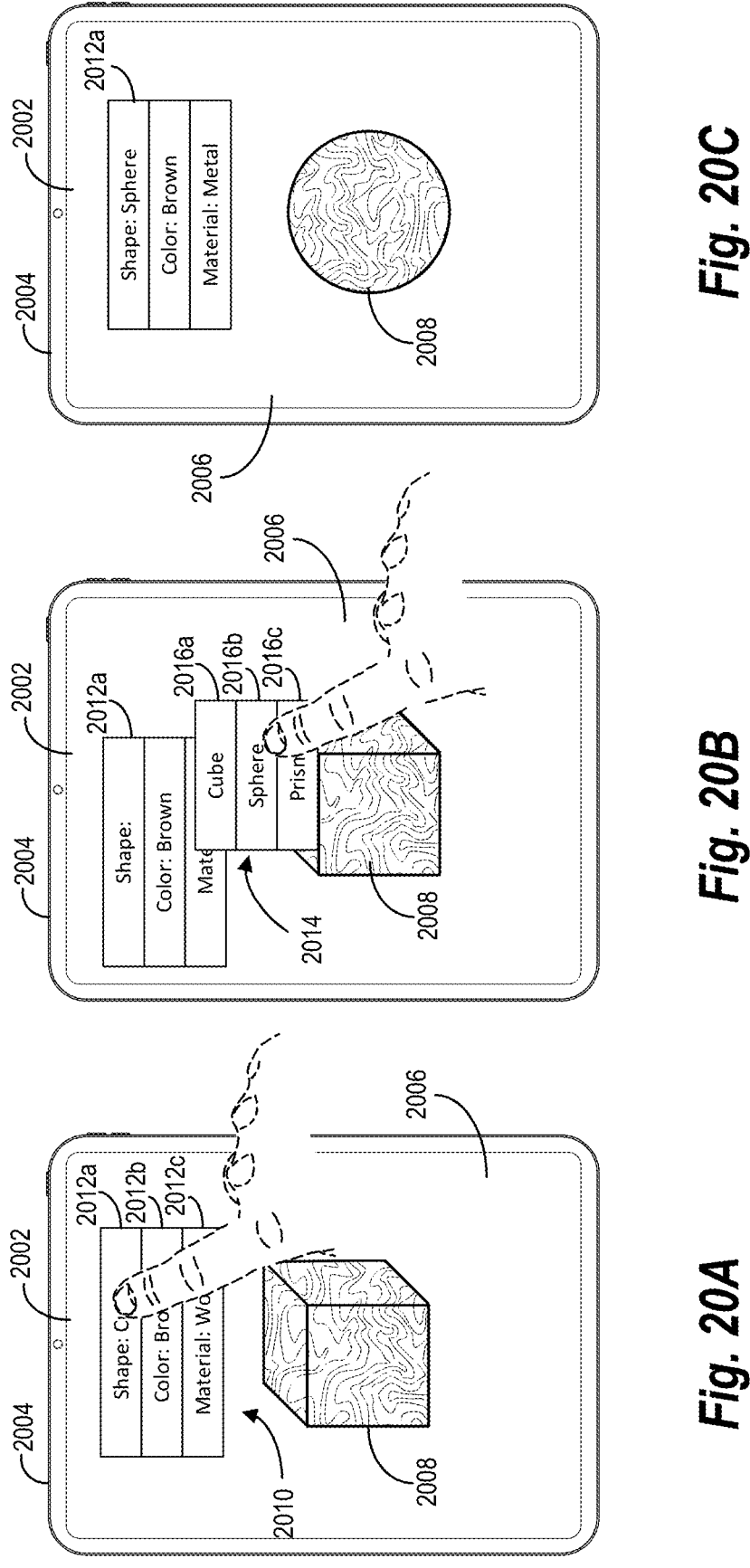
FIGS. 20A-20C illustrate another graphical user interface implemented by the scene-based image editing system to facilitate modifying object attributes of objects portrayed in a digital image in accordance with one or more embodiments.

FIGS. 20A-20C illustrate another graphical user interface implemented by the scene-based image editing system 106 to facilitate modifying object attributes of objects portrayed in a digital image in accordance with one or more embodiments. As shown in FIG. 20A, the scene-based image editing system 106 provides a digital image 2006 portraying an object 2008 for display within a graphical user interface 2002 of a client device 2004. Further, upon detecting a user interaction with the object 2008, the scene-based image editing system 106 provides an attribute menu 2010 having attribute object indicators 2012*a*-2012*c* listing object attributes of the object 2008.

As shown in FIG. 20B, the scene-based image editing system 106 detects an additional user interaction with the object attribute indicator 2012*a*. In response to detecting the additional user interaction, the scene-based image editing system 106 provides an alternative attribute menu 2014 for display within the graphical user interface 2002. In one or more embodiments, the alternative attribute menu 2014 includes one or more options for changing a corresponding object attribute. Indeed, as illustrated in FIG. 20B, the alternative attribute menu 2014 includes alternative attribute indicators 2016*a*-2016*c* that provide object attributes that could be used in place of the current object attribute for the object 2008.

As shown in FIG. 20C, the scene-based image editing system 106 detects a user interaction with the alternative attribute indicator 2016*b*. Accordingly, the scene-based image editing system 106 modifies the digital image 2006 by modifying the object attribute of the object 2008 in accordance with the user input with the alternative attribute indicator 2016*b*. In particular, the scene-based image editing system 106 modifies the object 2008 to reflect the alternative object attribute associated with the alternative attribute indicator 2016*b*.

In one or more embodiments, the scene-based image editing system 106 utilizes a textual representation of the alternative object attribute in modifying the object 2008. For instance, as discussed above, the scene-based image editing system 106 provides the textual representation as textual input to an attribute modification neural network and utilizes the attribute modification neural network to output a modified digital image in which the object 2008 reflects the targeted change in its object attribute.

Figures 21A, 21B, 21C:
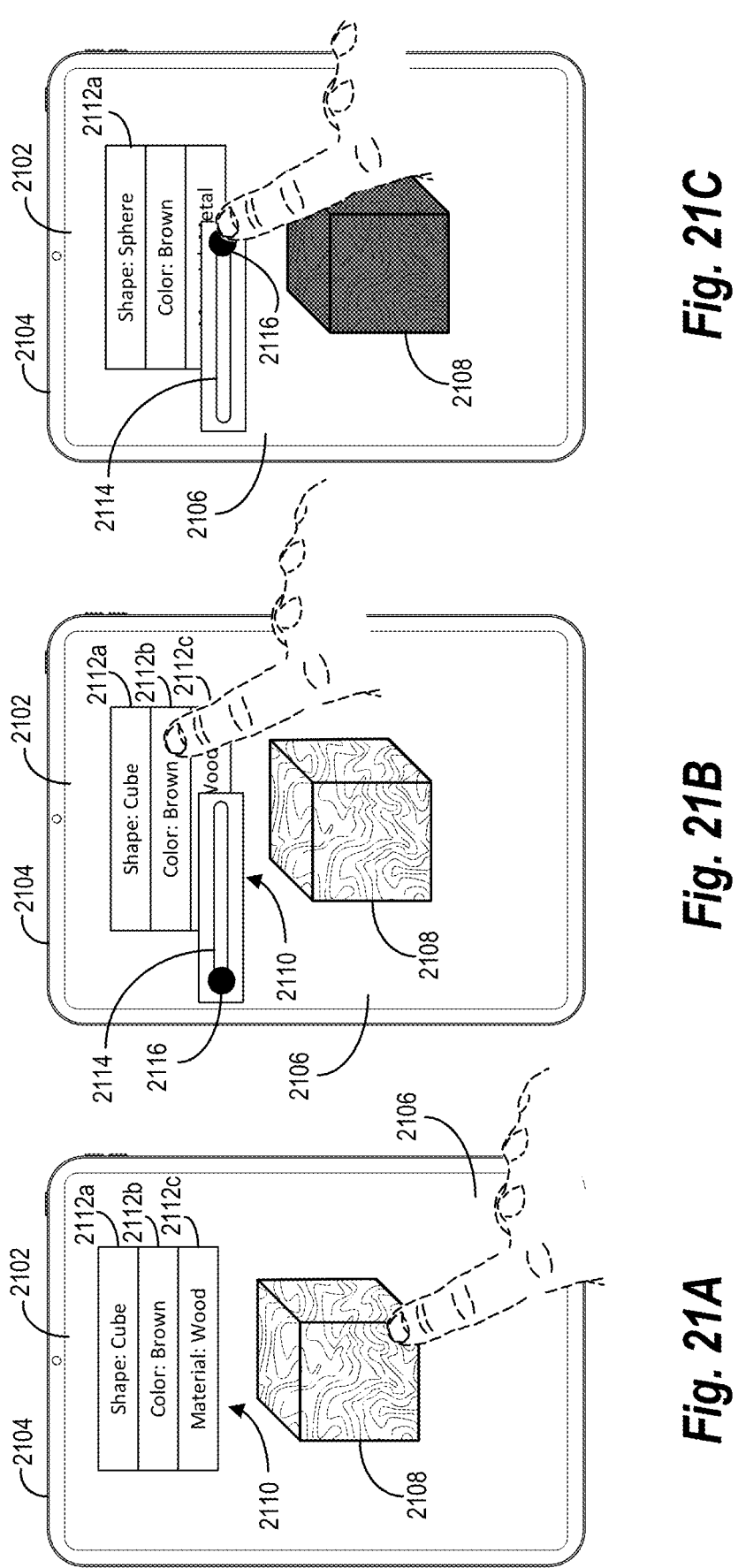
FIGS. 21A-21C illustrate yet another graphical user interface implemented by the scene-based image editing system to facilitate modifying object attributes of objects portrayed in a digital image in accordance with one or more embodiments.

FIGS. 21A-21C illustrate another graphical user interface implemented by the scene-based image editing system 106 to facilitate modifying object attributes of objects portrayed in a digital image in accordance with one or more embodiments. As shown in FIG. 21A, the scene-based image editing system 106 provides a digital image 2106 portraying an object 2108 for display within a graphical user interface 2102 of a client device 2104. Further, upon detecting a user interaction with the object 2108, the scene-based image editing system 106 provides an attribute menu 2110 having attribute object indicators 2112*a*-2012*c* listing object attributes of the object 2108.

As shown in FIG. 21B, the scene-based image editing system 106 detects an additional user interaction with the object attribute indicator 2112*b*. In response to detecting the additional user interaction, the scene-based image editing system 106 provides a slider bar 2114 for display within the graphical user interface 2102. In one or more embodiments, the slider bar 2114 includes a slider element 2116 that indicates a degree to which the corresponding object attribute appears in the digital image 2106 (e.g., the strength or weakness of its presence in the digital image 2106).

As shown in FIG. 21C, the scene-based image editing system 106 detects a user interaction with the slider element 2116 of the slider bar 2114, increasing the degree to which the corresponding object attribute appears in the digital image. Accordingly, the scene-based image editing system 106 modifies the digital image 2106 by modifying the object 2108 to reflect the increased strength in the appearance of the corresponding object attribute.

In particular, in one or more embodiments, the scene-based image editing system 106 utilizes an attribute modification neural network to modify the digital image 2106 in accordance with the user interaction. Indeed, as described above with reference to FIG. 18, the scene-based image editing system 106 is capable of modifying the strength or weakness of the appearance of an object attribute via the coefficient $\alpha$. Accordingly, in one or more embodiments, the scene-based image editing system 106 adjusts the coefficient $\alpha$ based on the positioning of the slider element 2116 via the user interaction.

By facilitating image modifications that target particular object attributes as described above, the scene-based image editing system 106 provides improved flexibility and efficiency when compared to conventional systems. Indeed, the scene-based image editing system 106 provides a flexible, intuitive approach that visually displays descriptions of an object's attributes and allows user input that interacts with those descriptions to change the attributes. Thus, rather than requiring tedious, manual manipulation of an object attribute as is typical under many conventional systems, the scene-based image editing system 106 allows user interactions to target object attributes at a high level of abstraction (e.g., without having to interact at the pixel level). Further, as scene-based image editing system 106 enables modifications to object attributes via relatively few user interactions with provided visual elements, the scene-based image editing system 106 implements a graphical user interface that provides improved efficiency.

As previously mentioned, in one or more embodiments, the scene-based image editing system 106 further uses a semantic scene graph generated for a digital image to implement relationship-aware object modifications. In particular, the scene-based image editing system 106 utilizes the semantic scene graph to inform the modification behaviors of objects portrayed in a digital image based on their relationships with one or more other objects in the digital image. FIGS. 22A-25D illustrate implementing relationship-aware object modifications in accordance with one or more embodiments.

Indeed, many conventional systems are inflexible in that they require different objects to be interacted with separately for modification. This is often the case even where the different objects are to be modified similarly (e.g., similarly resized or moved). For instance, conventional systems often require separate workflows to be executed via user interactions to modify separate objects or, at least, to perform the preparatory steps for the modification (e.g., outlining the objects and/or separating the objects from the rest of the image). Further, conventional systems typically fail to accommodate relationships between objects in a digital image when executing a modification. Indeed, these systems may modify a first object within a digital image but fail to execute a modification on a second object in accordance with a relationship between the two objects. Accordingly, the resulting modified image can appear unnatural or aesthetically confusing as it does not properly reflect the relationship between the two objects.

Accordingly, conventional systems are also often inefficient in that they require a significant number of user interactions to modify separate objects portrayed in a digital image. Indeed, as mentioned, conventional systems often require separate workflows to be performed via user interactions to execute many of the steps needed in modifying separate objects. Thus, many of the user interactions are redundant in that a user interaction is received, processed, and responded to multiple times for the separate objects. Further, when modifying an object having a relationship with another object, conventional systems require additional user interactions to modify the other object in accordance with that relationship. Thus, these systems unnecessarily duplicate the interactions used (e.g., interactions for moving an object then moving a related object) to perform separate modifications on related objects even where the relationship is suggestive as to the modification to be performed.

The scene-based image editing system 106 provides more flexibility and efficiency over conventional systems by implementing relationship-aware object modifications. Indeed, as will be discussed, the scene-based image editing system 106 provides a flexible, simplified process for selecting related objects for modification. Accordingly, the scene-based image editing system 106 flexibly allows user interactions to select and modify multiple objects portrayed in a digital image via a single workflow. Further, the scene-based image editing system 106 facilitates the intuitive modification of related objects so that the resulting modified image continues to reflect that relationship. As such, digital images modified by the scene-based image editing system 106 provide a more natural appearance when compared to conventional systems.

Further, by implementing a simplified process for selecting and modifying related objects, the scene-based image editing system 106 improves efficiency. In particular, the scene-based image editing system 106 implements a graphical user interface that reduces the user interactions required for selecting and modifying multiple, related objects. Indeed, as will be discussed, the scene-based image editing system 106 processes a relatively small number of user interactions with one object to anticipate, suggest, and/or execute modifications to other objects thus eliminating the need for additional user interactions for those modifications.

Figure 22A:
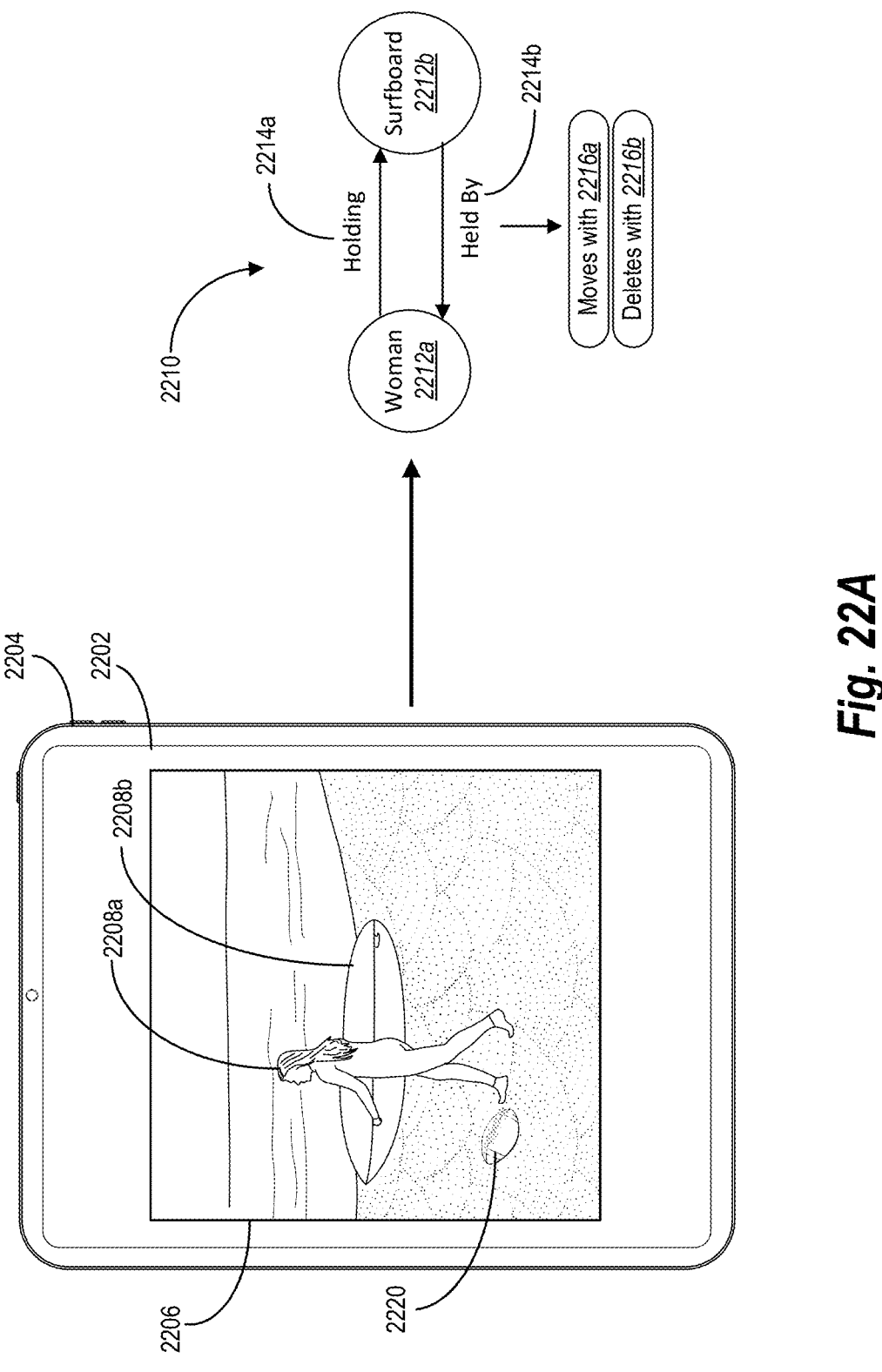
FIGS. 22A-22D illustrate a graphical user interface implemented by the scene-based image editing system to facilitate a relationship-aware object modification in accordance with one or more embodiments.

For instance, FIGS. 22A-22D illustrate a graphical user interface implemented by the scene-based image editing system 106 to facilitate a relationship-aware object modification in accordance with one or more embodiments. Indeed, as shown in FIG. 22A, the scene-based image editing system 106 provides, for display within a graphical user interface 2202 of a client device 2204, a digital image 2206 that portrays objects 2208a-2208b and object 2220. In particular, the digital image 2206 portrays a relationship between the objects 2208a-2208b in that the object 2208a is holding the object 2208b.

In one or more embodiments, the scene-based image editing system 106 references the semantic scene graph previously generated for the digital image 2206 to identify the relationship between the objects 2208a-2208b. Indeed, as previously discussed, in some cases, the scene-based image editing system 106 includes relationships among the objects of a digital image in the semantic scene graph generated for the digital image. For instance, in one or more embodiments, the scene-based image editing system 106 utilizes a machine learning model, such as one of the models (e.g., the clustering and subgraph proposal generation model) discussed above with reference to FIG. 15, to determine the relationships between objects. Accordingly, the scene-based image editing system 106 includes the determined relationships within the representation of the digital image in the semantic scene graph. Further, the scene-based image editing system 106 determines the relationship between the objects 2208a-2208b for inclusion in the semantic scene graph before receiving user interactions to modify either one of the objects 2208a-2208b.

Indeed, FIG. 22A illustrates a semantic scene graph component 2210 from a semantic scene graph of the digital image 2206. In particular, the semantic scene graph component 2210 includes a node 2212a representing the object 2208a and a node 2212b representing the object 2208b. Further, the semantic scene graph component 2210 includes relationship indicators 2214a-2214b associated with the nodes 2212a-2212b. The relationship indicators 2214a-2214b indicate the relationship between the objects 2208a-2208b in that the object 2208a is holding the object 2208b, and the object 2208b is conversely being held by the object 2208a.

As further shown, the semantic scene graph component 2210 includes behavior indicators 2216a-2216b associated with the relationship indicator 2214b. The behavior indicators 2216a-2216b assign a behavior to the object 2208b based on its relationship with the object 2208a. For instance, the behavior indicator 2216a indicates that, because the object 2208b is held by the object 2208a, the object 2208b moves with the object 2208a. In other words, the behavior indicator 2216a instructs the scene-based image editing system 106 to move the object 2208b (or at least suggest that the object 2208b be moved) when moving the object 2208a. In one or more embodiments, the scene-based image editing system 106 includes the behavior indicators 2216a-2216b within the semantic scene graph based on the behavioral policy graph used in generating the semantic scene graph. Indeed, in some cases, the behaviors assigned to a "held by" relationship (or other relationships) vary based on the behavioral policy graph used. Thus, in one or more embodiments, the scene-based image editing system 106 refers to a previously generated semantic scene graph to identify relationships between objects and the behaviors assigned based on those relationships.

It should be noted that the semantic scene graph component 2210 indicates that the behaviors of the behavior indicators 2216a-2216b are assigned to the object 2208b but not the object 2208a. Indeed, in one or more, the scene-based image editing system 106 assigns behavior to an object based on its role in the relationship. For instance, while it may be appropriate to move a held object when the holding object is moved, the scene-based image editing system 106 determines that the holding object does not have to move when the held object is moved in some embodiments. Accordingly, in some implementations, the scene-based image editing system 106 assigns different behaviors to different objects in the same relationship.

Figures 22B, 22C, 22D:
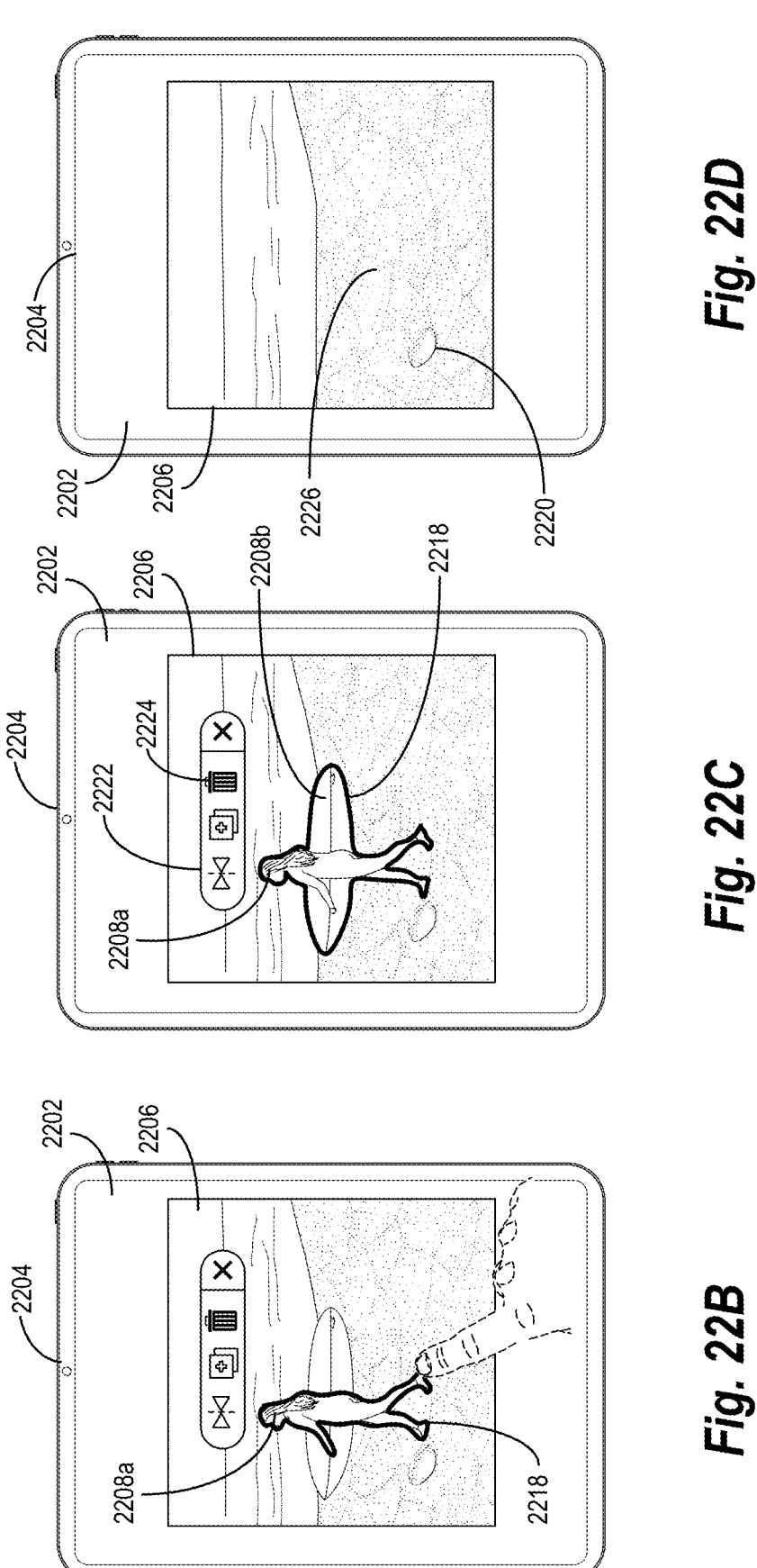

As shown in FIG. 22B, the scene-based image editing system 106 determines a user interaction selecting the object 2208a. For instance, the scene-based image editing system 106 determines that user interaction targets the object 2208a for modification. As further shown, the scene-based image editing system 106 provides a visual indication 2218 for display to indicate the selection of the object 2208a.

As illustrated by FIG. 22C, in response to detecting the user interaction selecting the object 2208a, the scene-based image editing system 106 automatically selects the object 2208b. For instance, in one or more embodiments, upon detecting the user interaction selecting the object 2208a, the scene-based image editing system 106 refers to the semantic scene graph generated for the digital image 2206 (e.g., the semantic scene graph component 2210 that corresponds to the object 2208a). Based on the information represented in the semantic scene graph, the scene-based image editing system 106 determines that there is another object in the digital image 2206 that has a relationship with the object 2208a. Indeed, the scene-based image editing system 106 determines that the object 2208a is holding the object 2208b. Conversely, the scene-based image editing system 106 determines that the object 2208b is held by the object 2208a.

Because the objects 2208a-2208b have a relationship, the scene-based image editing system 106 adds the object 2208b to the selection. As shown in FIG. 22C, the scene-based image editing system 106 modifies the visual indication 2218 of the selection to indicate that the object 2208b has been added to the selection. Though FIG. 22C illustrates an automatic selection of the object 2208b, in some cases, the scene-based image editing system 106 selects the object 2208b based on a behavior assigned to the object 2208b within the semantic scene graph in accordance with its relationship with the object 2208a. Indeed, in some cases, the scene-based image editing system 106 specifies when a relationship between objects leads to the automatic selection of one object upon the user selection of another object (e.g., via a "selects with" behavior). As shown in FIG. 22C, however, the scene-based image editing system 106 automatically selects the object 2208b by default in some instances.

In one or more embodiments, the scene-based image editing system 106 surfaces object masks for the object 2208a and the object 2208b based on their inclusion within the selection. Indeed, the scene-based image editing system 106 surfaces pre-generated object masks for the objects 2208a-2208b in anticipation of a modification to the objects 2208a-2208b. In some cases, the scene-based image editing system 106 retrieves the pre-generated object masks from the semantic scene graph for the digital image 2206 or retrieves a storage location for the pre-generated object masks. In either case, the object masks are readily available at the time the objects 2208a-2208b are included in the selection and before modification input has been received.

As further shown in FIG. 22C, the scene-based image editing system 106 provides an option menu 2222 for display within the graphical user interface 2202. In one or more embodiments, the scene-based image editing system 106 determines that at least one of the modification options from the option menu 222 would apply to both of the objects 2208a-2208b if selected. In particular, the scene-based image editing system 106 determines that, based on behavior assigned to the object 2208b, a modification selected for the object 2208a would also apply to the object 2208b.

Indeed, in one or more embodiments, in addition to determining the relationship between the objects 2208a-2208b, the scene-based image editing system 106 references the semantic scene graph for the digital image 2206 to determine the behaviors that have been assigned based on that relationship. In particular, the scene-based image editing system 106 references the behavior indicators associated with the relationship between the objects 2208a-2208b (e.g., the behavior indicators 2216a-2216b) to determine which behaviors are assigned to the objects 2208a-2208b based on their relationship. Thus, by determining the behaviors assigned to the object 2208b, the scene-based image editing system 106 determines how to respond to potential edits.

For instance, as shown in FIG. 22D, the scene-based image editing system 106 deletes the objects 2208a-2208b together. For instance, in some cases, the scene-based image editing system 106 deletes the objects 2208a-2208b in response to detecting a selection of the option 2224 presented within the option menu 2222. Accordingly, while the object 2208a was targeted for deletion via user interactions, the scene-based image editing system 106 includes the object 2208b in the deletion operation based on the behavior assigned to the object 2208b via the semantic scene graph (i.e., the "deletes with" behavior). Thus, in some embodiments, the scene-based image editing system 106 implements relationship-aware object modifications by deleting objects based on their relationships to other objects.

As previously suggested, in some implementations, the scene-based image editing system 106 only adds an object to a selection if its assigned behavior specifies that it should be selected with another object. At least, in some cases, the scene-based image editing system 106 only adds the object before receiving any modification input if its assigned behavior specifies that it should be selected with another object. Indeed, in some instances, only a subset of potential edits to a first object are applicable to a second object based on the behaviors assigned to that second object. Thus, including the second object in the selection of the first object before receiving modification input risks violating the rules set forth by the behavioral policy graph via the semantic scene graph if there is not a behavior providing for automatic selection. To avoid this risk, in some implementations, the scene-based image editing system 106 waits until modification input has been received before determining whether to add the second object to the selection. In one or more embodiments, however—as suggested by FIGS. 22A-22D—the scene-based image editing system 106 automatically adds the second object upon detecting a selection of the first object. In such embodiments, the scene-based image editing system 106 deselects the second object upon determining that a modification to the first object does not apply to the second object based on the behaviors assigned to the second object.

As further shown in FIG. 22D, the object 2220 remains in the digital image 2206. Indeed, the scene-based image editing system 106 did not add the object 2220 to the selection in response to the user interaction with the object 2208a, nor did it delete the object 2220 along with the objects 2208a-2208b. For instance, upon referencing the semantic scene graph for the digital image 2206, the scene-based image editing system 106 determines that there is not a relationship between the object 2220 and either of the objects 2208a-2208b (at least, there is not a relationship that applies in this scenario). Thus, the scene-based image editing system 106 enables user interactions to modify related objects together while preventing unrelated objects from being modified without more targeted user interactions.

Additionally, as shown in FIG. 22D, the scene-based image editing system 106 reveals content fill 2226 within the digital image 2206 upon removing the objects 2208a-2208b. In particular, upon deleting the objects 2208a-2208b, the scene-based image editing system 106 exposes a content fill previously generated for the object 2208a as well as a content fill previously generated for the object 2208b. Thus, the scene-based image editing system 106 facilitates seamless modification of the digital image 2206 as if it were a real scene.

Figures 23A, 23B, 23C:
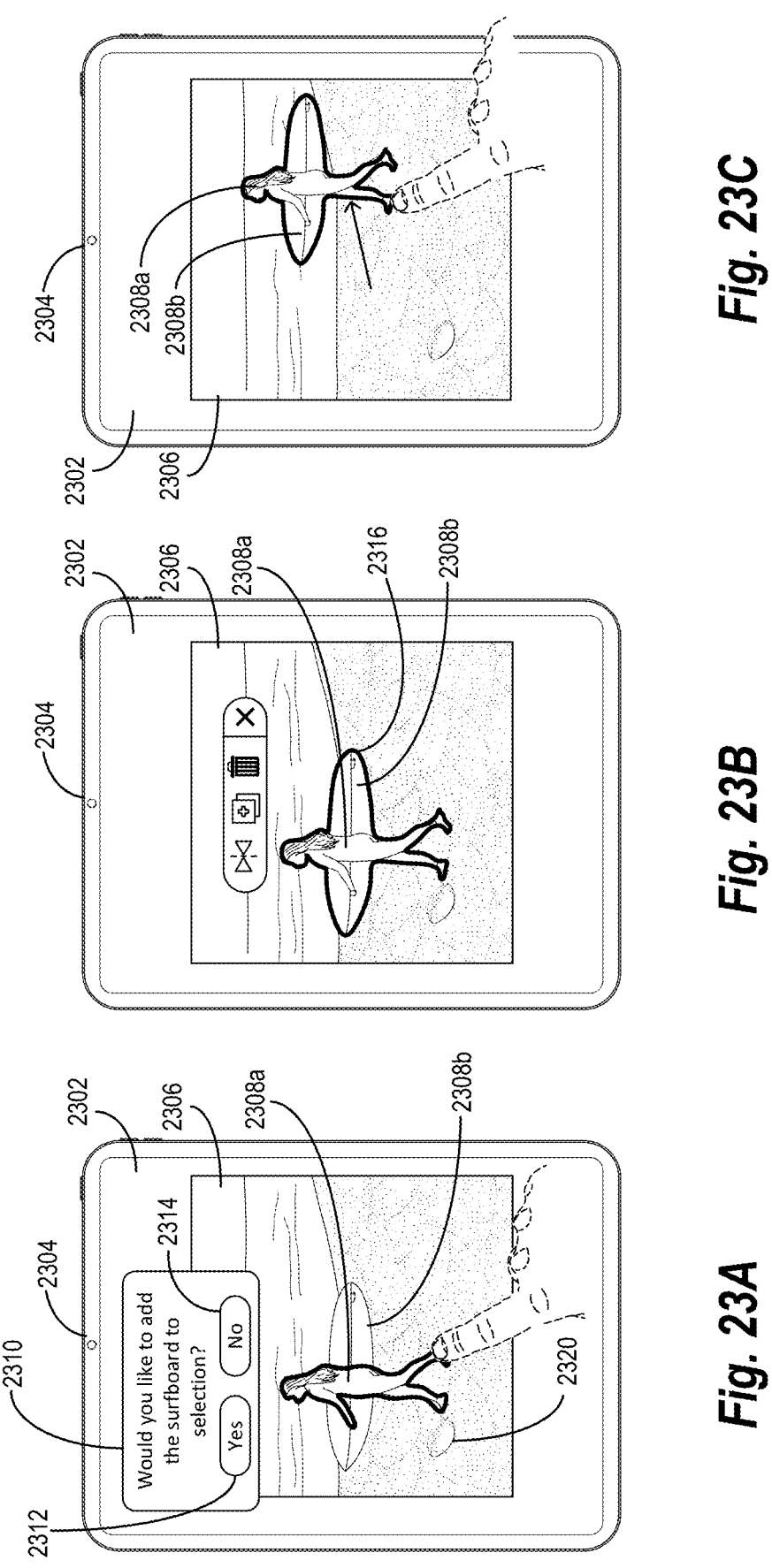
FIGS. 23A-23C illustrate another graphical user interface implemented by the scene-based image editing system to facilitate a relationship-aware object modification in accordance with one or more embodiments.

FIGS. 23A-23C illustrate another graphical user interface implemented by the scene-based image editing system 106 to facilitate a relationship-aware object modification in accordance with one or more embodiments. Indeed, as shown in FIG. 23A, the scene-based image editing system 106 provides, for display within a graphical user interface 2302 of a client device 2304, a digital image 2306 that portrays objects 2308a-2308b and object 2320. In particular, the digital image 2306 portrays a relationship between the objects 2308a-2308b in that the object 2308a is holding the object 2308b.

As further shown in FIG. 23A, the scene-based image editing system 106 detects a user interaction selecting the object 2308a. In response to detecting the user interaction, the scene-based image editing system 106 provides a suggestion that the object 2308b be added to the selection. In particular, the scene-based image editing system 106 provides a text box 2310 asking if the user wants the object 2308b to be added to the selection and provides an option 2312 for agreeing to add the object 2308b and an option 2314 for declining to add the object 2308b.

In one or more embodiments, the scene-based image editing system 106 provides the suggestion for adding the object 2308b to the selection based on determining the relationship between the objects 2308a-2308b via the semantic scene graph generated for the digital image 2306. In some cases, the scene-based image editing system 106 further provides the suggestion for adding the object 2308b based on the behaviors assigned to the object 2308b based on that relationship.

As suggested by FIG. 23A, the scene-based image editing system 106 does not suggest adding the object 2320 to the selection. Indeed, in one or more embodiments, based on referencing the semantic scene graph, the scene-based image editing system 106 determines that there is no relationship between the object 2320 and either of the objects 2308a-2308b (at least, that there is not a relevant relationship). Accordingly, the scene-based image editing system 106 determines to omit the object 2320 from the suggestion.

As shown in FIG. 23B, the scene-based image editing system 106 adds the object 2308b to the selection. In particular, in response to receiving a user interaction with the option 2312 for agreeing to add the object 2308b, the scene-based image editing system 106 adds the object 2308b to the selection. As shown in FIG. 23B, the scene-based image editing system 106 modifies a visual indication 2316 of the selection to indicate that the object 2308b has been added to the selection along with the object 2308a.

As illustrated in FIG. 23C, the scene-based image editing system 106 modifies the digital image 2306 by moving the object 2308a within the digital image 2306 in response to detecting one or more additional user interactions. Further, the scene-based image editing system 106 moves the object 2308b along with the object 2308a based on the inclusion of the object 2308b in the selection. Accordingly, the scene-based image editing system 106 implements a relationship-aware object modification by moving objects based on their relationship to other objects.

Figures 24A, 24B, 24C:
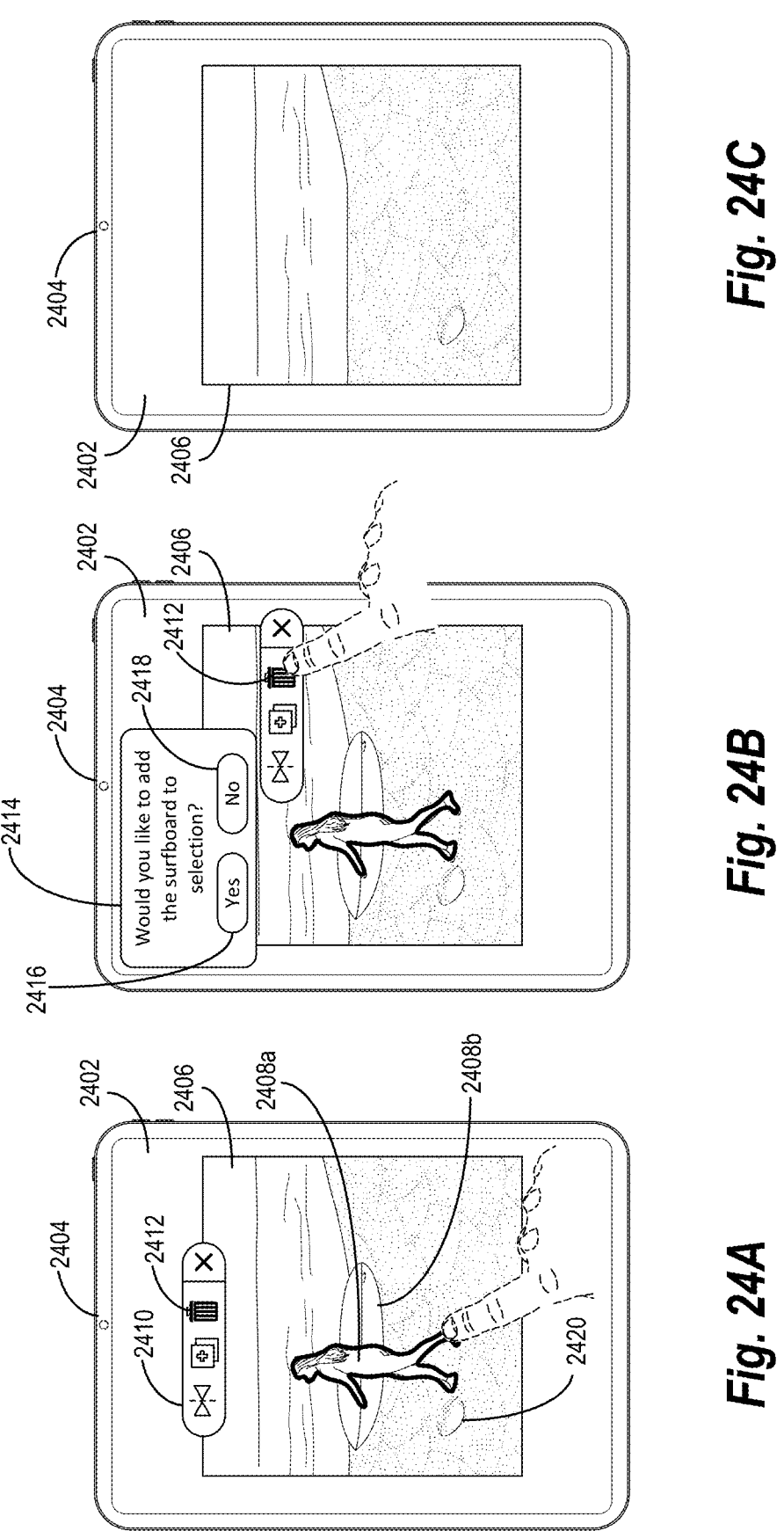
FIGS. 24A-24C illustrate yet another graphical user interface implemented by the scene-based image editing system to facilitate a relationship-aware object modification in accordance with one or more embodiments.

FIGS. 24A-24C illustrate yet another graphical user interface implemented by the scene-based image editing system 106 to facilitate a relationship-aware object modification in accordance with one or more embodiments. Indeed, as shown in FIG. 24A, the scene-based image editing system 106 provides, for display within a graphical user interface 2402 of a client device 2404, a digital image 2406 that portrays objects 2408a-2408b and an object 2420. In particular, the digital image 2406 portrays a relationship between the objects 2408a-2408b in that the object 2408a is holding the object 2408b.

As shown in FIG. 24A, the scene-based image editing system 106 detects a user interaction with the object 2408a. In response to detecting the user interaction, the scene-based image editing system 106 provides an option menu 2410 for display within the graphical user interface 2402. As illustrated, the option menu 2410 includes an option 2412 for deleting the object 2408a.

As shown in FIG. 24B, the scene-based image editing system 106 detects an additional user interaction with the option 2412 for deleting the object 2408a. In response to detecting the additional user interaction, the scene-based image editing system 106 provides, for display, a suggestion for adding the object 2408b to the selection via a text box 2414 asking if the user wants the object 2408b to be added to the selection, an option 2416 for agreeing to add the object 2408b, and an option 2418 for declining to add the object 2408b.

Indeed, as mentioned above, in one or more embodiments, the scene-based image editing system 106 waits upon receiving input to modify a first object before suggesting adding a second object (or automatically adding the second object). Accordingly, the scene-based image editing system 106 determines whether a relationship between the objects and the pending modification indicate that the second object should be added before including the second object in the selection.

To illustrate, in one or more embodiments, upon detecting the additional user interaction with the option 2412, the scene-based image editing system 106 references the semantic scene graph for the digital image 2406. Upon referencing the semantic scene graph, the scene-based image editing system 106 determines that the object 2408a has a relationship with the object 2408b. Further, the scene-based image editing system 106 determines that the behaviors assigned to the object 2408b based on that relationship indicate that the object 2408b should be deleted with the object 2408a. Accordingly, upon receiving the additional user interaction for deleting the object 2408a, the scene-based image editing system 106 determines that the object 2408b should also be deleted and then provides the suggestion to add the object 2408b (or automatically adds the object 2408b) to the selection.

As shown in FIG. 24C, the scene-based image editing system 106 deletes the object 2408a and the object 2408b from the digital image 2406 together. In particular, in response to detecting a user interaction with the option 2416 for adding the object 2408b to the selection, the scene-based image editing system 106 adds the object 2408b and executes the delete operation. In one or more embodiments, upon detecting a user interaction with the option 2418 to decline adding the object 2408b, the scene-based image editing system 106 omits the object 2408b from the selection and only deletes the object 2408a.

Though the above specifically discusses moving objects or deleting objects based on their relationships with other objects, it should be noted that the scene-based image editing system 106 implements various other types of relationship-aware object modifications in various embodiments. For example, in some cases, the scene-based image editing system 106 implements relationship-aware object modifications via resizing modifications, recoloring or retexturing modifications, or compositions. Further, as previously suggested, the behavioral policy graph utilized by the scene-based image editing system 106 is configurable in some embodiments. Thus, in some implementations, the relationship-aware object modifications implemented by the scene-based image editing system 106 change based on user preferences.

In one or more embodiments, in addition to modifying objects based on relationships as described within a behavioral policy graph that is incorporated into a semantic scene graph, the scene-based image editing system 106 modifies objects based on classification relationships. In particular, in some embodiments, the scene-based image editing system 106 modifies objects based on relationships as described by a real-world class description graph that is incorporated into a semantic scene graph. Indeed, as previously discussed, a real-world class description graph provides a hierarchy of object classifications for objects that may be portrayed in a digital image. Accordingly, in some implementations, the scene-based image editing system 106 modifies objects within digital images based on their relationship with other objects via their respective hierarchy of object classifications. For instance, in one or more embodiments, the scene-based image editing system 106 adds objects to a selection for modification based on their relationships with other objects via their respective hierarchy of object classifications. FIGS. 25A-25D illustrate a graphical user interface implemented by the scene-based image editing system 106 to add objects to a selection for modification based on classification relationships in accordance with one or more embodiments.

Figure 25A:
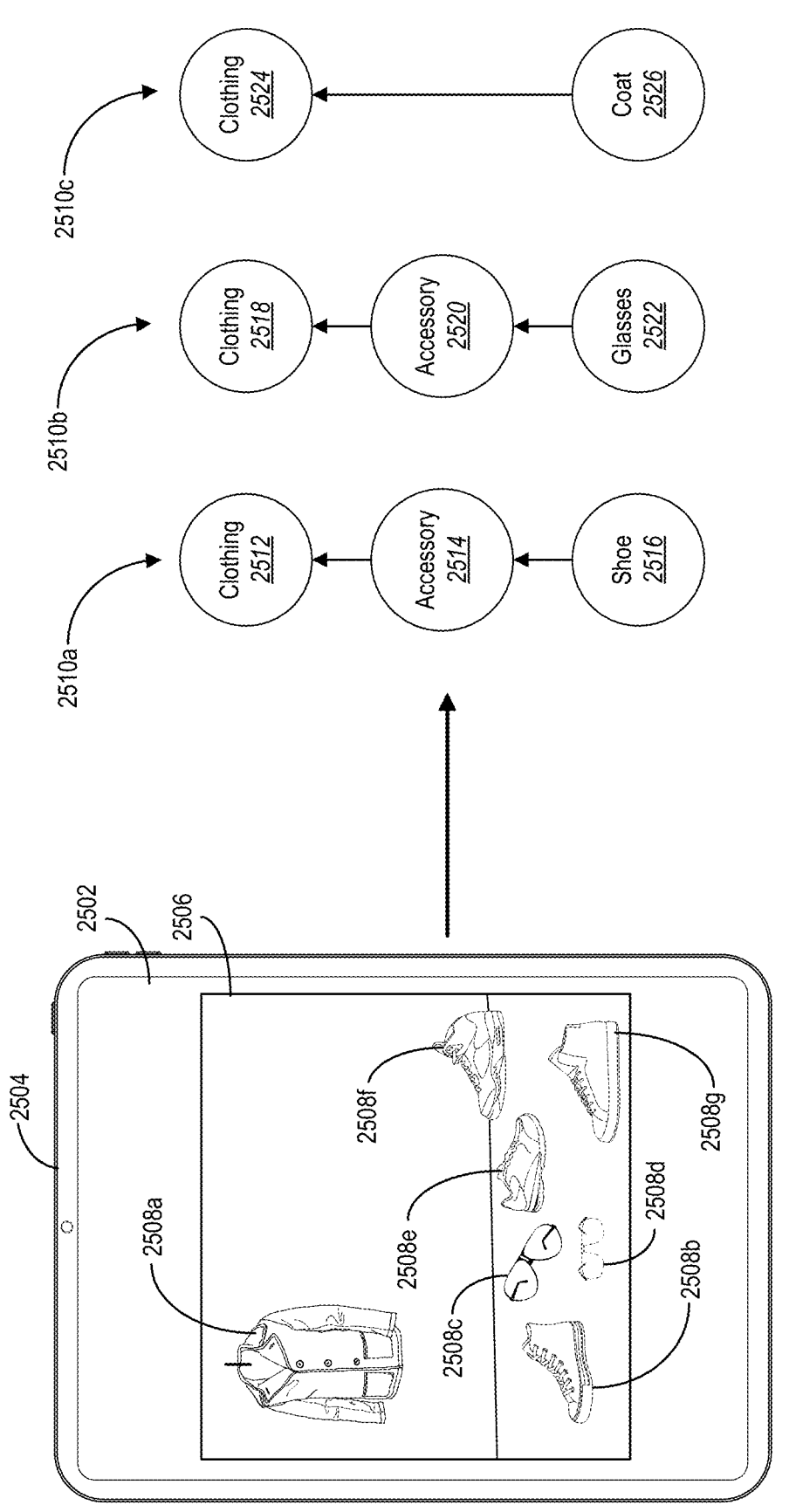
FIGS. 25A-25D illustrate a graphical user interface implemented by the scene-based image editing system to add objects to a selection for modification based on classification relationships in accordance with one or more embodiments.

In particular, FIG. 25A illustrates the scene-based image editing system 106 providing, for display in a graphical user interface 2502 of a client device 2504, a digital image 2506 portraying a plurality of objects 2508a-2508g. In particular, as shown the objects 2508a-2508g include various items, such as shoes, pairs of glasses, and a coat.

FIG. 25A further illustrates semantic scene graph components 2510a-2510c from a semantic scene graph of the digital image 2506. Indeed, the semantic scene graph components 2510a-2510c include portions of a semantic scene graph providing a hierarchy of object classifications for each of the objects 2508a-2508g. Alternatively, in some cases, the semantic scene graph components 2510a-2510c represent portions of the real-world class description graph used in making the semantic scene graph.

As shown in FIG. 25A, the semantic scene graph component 2510a includes a node 2512 representing a clothing class, a node 2514 representing an accessory class, and a node 2516 representing a shoe class. As further shown, the accessory class is a subclass of the clothing class, and the shoe class is a subclass of the accessory class. Similarly, the semantic scene graph component 2510b includes a node 2518 representing the clothing class, a node 2520 representing the accessory class, and a node 2522 representing a glasses class, which is a subclass of the accessory class. Further, the semantic scene graph component 2510c includes a node 2524 representing the clothing class and a node 2526 representing a coat class, which is another subclass of the clothing class. Thus, the semantic scene graph components 2510a-2510c provide various classifications that apply to each of the objects 2508a-2508g. In particular, the semantic scene graph component 2510a provides a hierarchy of object classifications associated with the shoes presented in the digital image 2506, the semantic scene graph component 2510b provides a hierarchy of object classifications associated with the pairs of glasses, and the semantic scene graph component 2510c provides a hierarchy of object classifications associated with the coat.

Figure 25C:
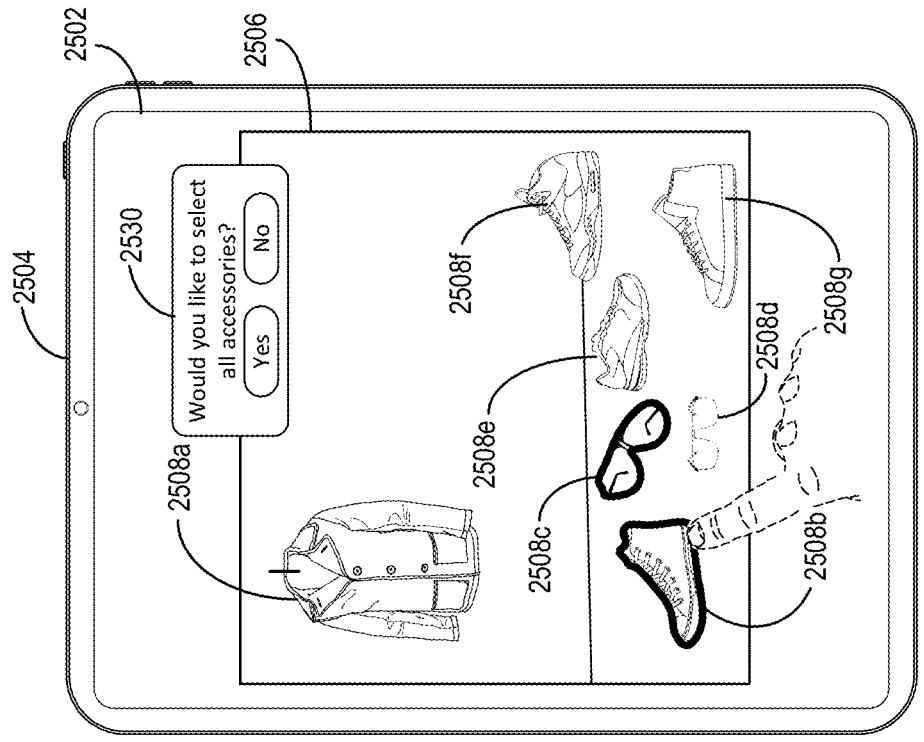
Figure 25B:
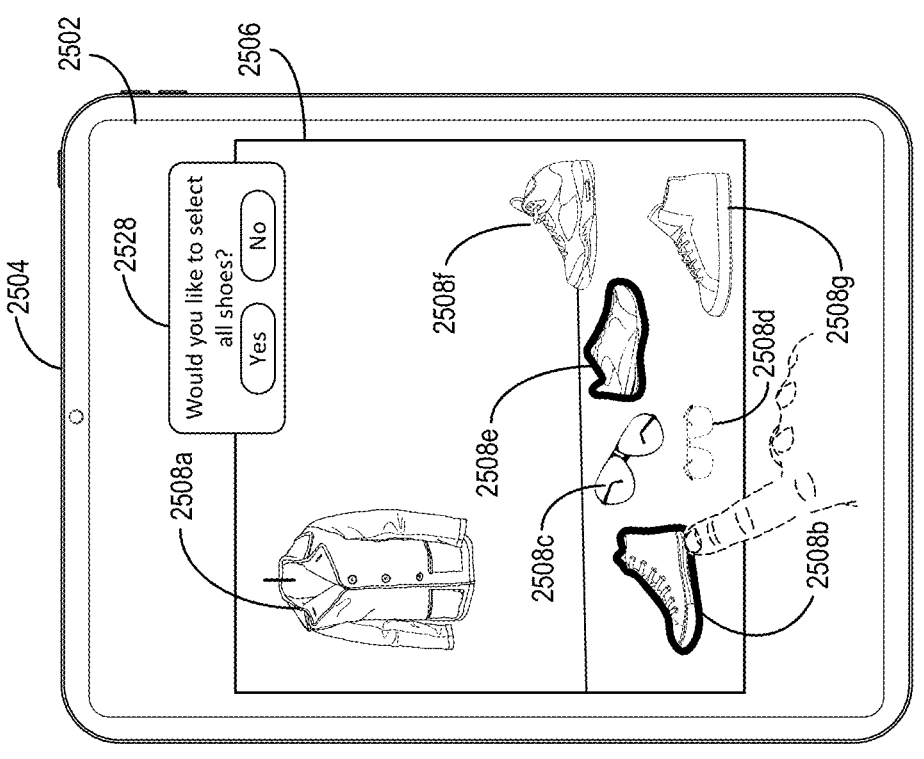

As shown in FIG. 25B, the scene-based image editing system 106 detects a user interaction selecting the object 2508e. Further, the scene-based image editing system 106 detects a user interaction selecting the object 2508b. As further shown, in response to detecting the selection of the object 2508b and the object 2508e, the scene-based image editing system 106 provides a text box 2528 suggesting all shoes in the digital image 2506 be added to the selection.

To illustrate, in some embodiments, in response to detecting the selection of the object 2508b and the object 2508e, the scene-based image editing system 106 references the semantic scene graph generated for the digital image 2506 (e.g., the semantic scene graph components that are associated with the object 2508b and the object 2508e). Based on referencing the semantic scene graph, the scene-based image editing system 106 determines that the object 2508b and the object 2508e are both part of the shoe class. Thus, the scene-based image editing system 106 determines that there is a classification relationship between the object 2508b and the object 2508e via the shoe class. In one or more embodiments, based on determining that the object 2508b and the object 2508e are both part of the shoe class, the scene-based image editing system 106 determines that the user interactions providing the selections are targeting all shoes within the digital image 2506. Thus, the scene-based image editing system 106 provides the text box 2528 suggesting adding the other shoes to the selection. In one or more embodiments, upon receiving a user interaction accepting the suggestion, the scene-based image editing system 106 adds the other shoes to the selection.

Similarly, as shown in FIG. 25C, the scene-based image editing system 106 detects a user interaction selecting the object 2508c and another user interaction selecting the object 2508b. In response to detecting the user interactions, the scene-based image editing system 106 references the semantic scene graph generated for the digital image 2506. Based on referencing the semantic scene graph, the scene-based image editing system 106 determines that the object 2508b is part of the shoe class, which is a subclass of the accessory class. In other words, the scene-based image editing system 106 determines that the object 2508b is part of the accessory class. Likewise, the scene-based image editing system 106 determines that the object 2508c is part of the glasses class, which is a subclass of the accessory class. Thus, the scene-based image editing system 106 determines that there is a classification relationship between the object 2508b and the object 2508c via the accessory class. As shown in FIG. 25C, based on determining that the object 2508b and the object 2508c are both part of the accessory class, the scene-based image editing system 106 provides a text box 2530 suggesting adding all other accessories portrayed in the digital image 2506 (e.g., the other shoes and pairs of glasses) to the selection.

Figure 25D:
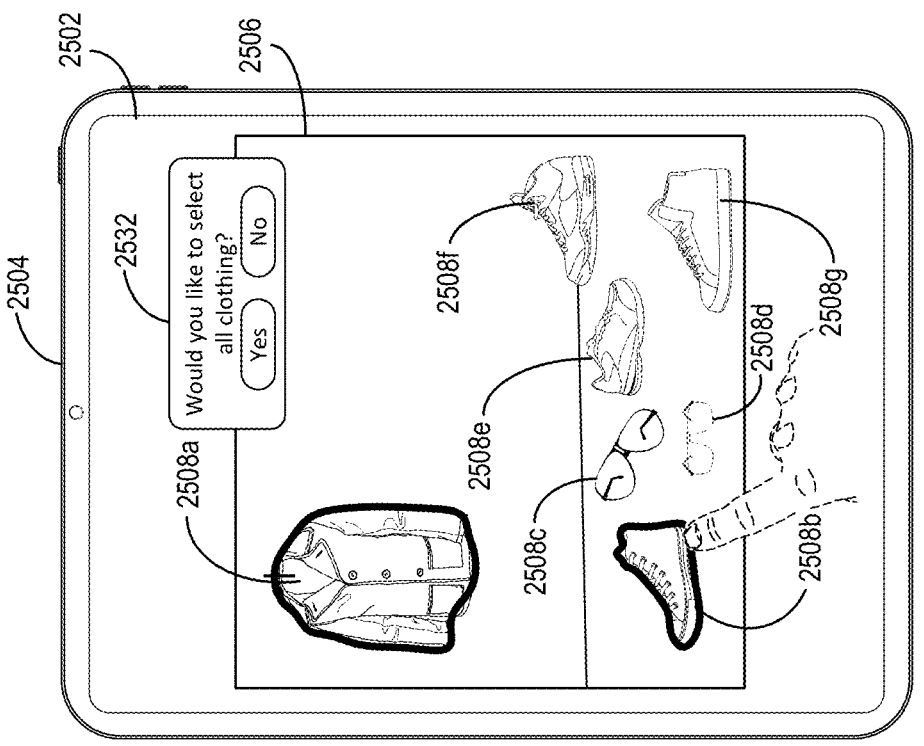

Further, as shown in FIG. 25D, the scene-based image editing system 106 detects a user interaction selecting the object 2508a and another user interaction selecting the object 2508b. In response to detecting the user interactions, the scene-based image editing system 106 references the semantic scene graph generated for the digital image 2506. Based on referencing the semantic scene graph, the scene-based image editing system 106 determines that the object 2508b is part of the shoe class, which is a subclass of the accessory class that is a subclass of the clothing class. Similarly, the scene-based image editing system 106 determines that the object 2508a is part of the coat class, which is also a subclass of the clothing class. Thus, the scene-based image editing system 106 determines that there is a classification relationship between the object 2508b and the object 2508a via the clothing class. As shown in FIG. 25D, based on determining that the object 2508b and the object 2508a are both part of the clothing class, the scene-based image editing system 106 provides a text box 2532 suggesting adding all other clothing items portrayed in the digital image 2506 to the selection.

Thus, in one or more embodiments, the scene-based image editing system 106 anticipates the objects that are targeted user interactions and facilitates quicker selection of those objects based on their classification relationships. In some embodiments, upon selection of multiple objects via provided suggestions, the scene-based image editing system 106 modifies the selected objects in response to additional user interactions. Indeed, the scene-based image editing system 106 modifies the selected objects together. Thus, the scene-based image editing system 106 implements a graphical user interface that provides a more flexible and efficient approach to selecting and modifying multiple related objects using reduced user interactions.

Indeed, as previously mentioned, the scene-based image editing system 106 provides improved flexibility and efficiency when compared to conventional systems. For instance, by selecting (e.g., automatically or via suggestion) objects based on the selection of related objects, the scene-based image editing system 106 provides a flexible method of targeting multiple objects for modification. Indeed, the scene-based image editing system 106 flexibly identifies the related objects and includes them with the selection. Accordingly, the scene-based image editing system 106 implements a graphical user interface that reduces user interactions typically required under conventional system for selecting and modifying multiple objects.

In one or more embodiments, the scene-based image editing system 106 further pre-processes a digital image to aid in the removal of distracting objects. In particular, the scene-based image editing system 106 utilizes machine learning to identify objects in a digital image, classify one or more of the objects as distracting objects, and facilitate the removal of the distracting objects to provide a resulting image that is more visually cohesive and aesthetically pleasing. Further, in some cases, the scene-based image editing system 106 utilizes machine learning to facilitate the removal of shadows associated with distracting objects. FIGS. 26-39C illustrate diagrams of the scene-based image editing system 106 identifying and removing distracting objects and their shadows from digital images in accordance with one or more embodiments.

Many conventional systems are inflexible in the methods they use for removing distracting human in that they strip control away from users. For instance, conventional systems often remove humans they have classified as distracting automatically. Thus, when a digital image is received, such systems fail to provide the opportunity for user interactions to provide input regarding the removal process. For example, these systems fail to allow user interactions to remove human from the set of humans identified for removal.

Additionally, conventional systems typically fail to flexibly remove all types of distracting objects. For instance, many conventional systems fail to flexibly remove shadows cast by distracting objects and non-human objects. Indeed, while some existing systems identify and remove distracting humans from a digital image, these systems often fail to identify shadows cast by humans or other objects within the digital image. Accordingly, the resulting digital image will still include the influence of a distracting human as its shadow remains despite the distracting human itself being removed. This further causes these conventional systems to require additional user interactions to identify and remove these shadows.

The scene-based image editing system 106 addresses these issues by providing more user control in the removal process while reducing the interactions typically required to delete an object from a digital image. Indeed, as will be explained below, the scene-based image editing system 106 presents identified distracting objects for display as a set of objects selected for removal. The scene-based image editing system 106 further enables user interactions to add objects to this set, remove objects from the set, and/or determine when the selected objects are deleted. Thus, the scene-based image editing system 106 employs a flexible workflow for removing distracting objects based on machine learning and user interactions.

Further, the scene-based image editing system 106 flexibly identifies and removes shadows associated with distracting objects within a digital image. By removing shadows associated with distracting objects, the scene-based image editing system 106 provides a better image result in that distracting objects and additional aspects of their influence within a digital image are removed. This allows for reduced user interaction when compared to conventional systems as the scene-based image editing system 106 does not require additional user interactions to identify and remove shadows.

Figure 26:
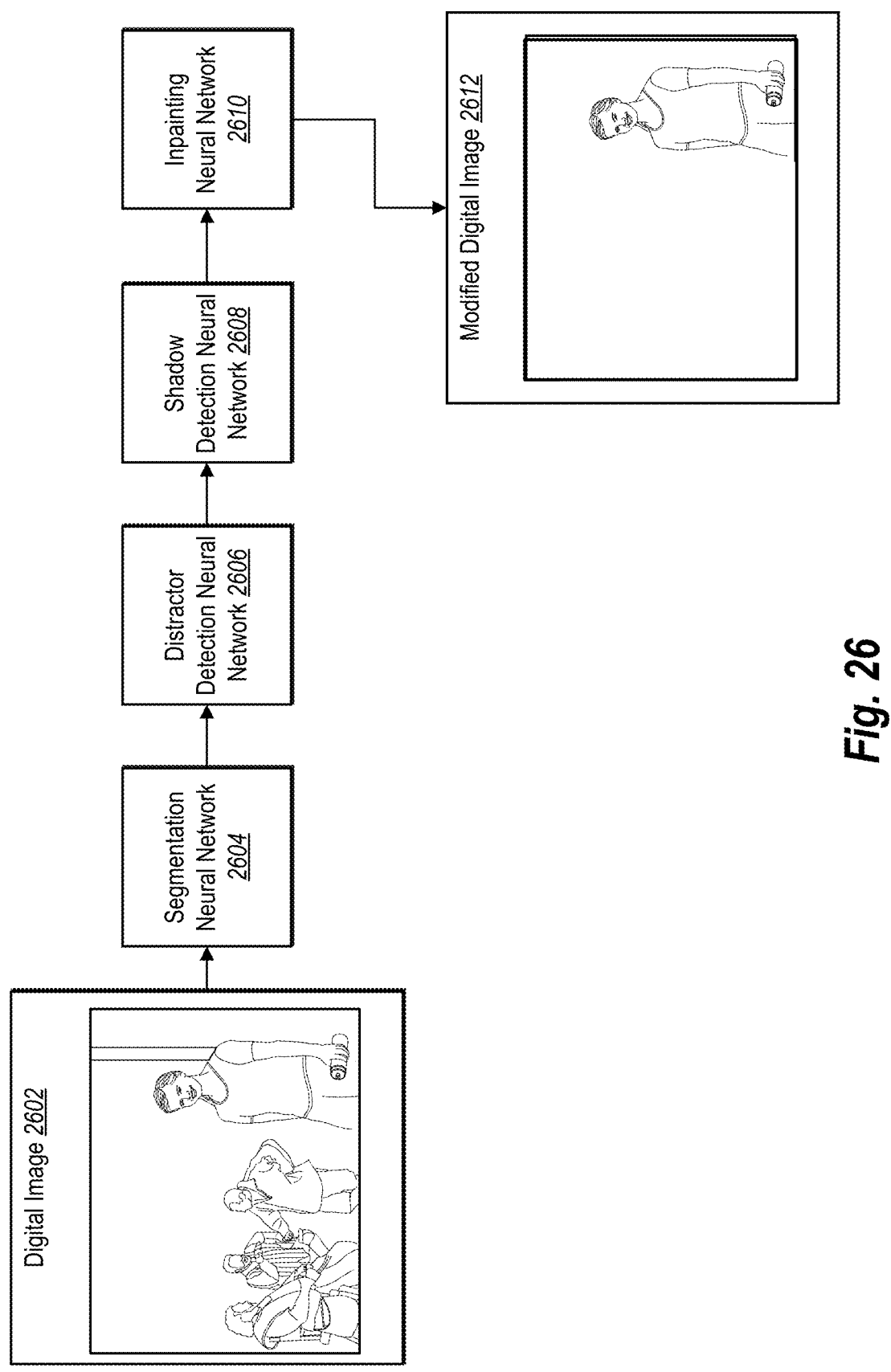
FIG. 26 illustrates a neural network pipeline utilized by the scene-based image editing system to identify and remove distracting objects from a digital image in accordance with one or more embodiments.

FIG. 26 illustrates a neural network pipeline utilized by the scene-based image editing system 106 to identify and remove distracting objects from a digital image in accordance with one or more embodiments. Indeed, as shown in FIG. 26, the scene-based image editing system 106 receives a digital image 2602 that portrays a plurality of objects. As illustrated, the scene-based image editing system 106 provides the digital image 2602 to a pipeline of neural networks comprising a segmentation neural network 2604, a distractor detection neural network 2606, a shadow detection neural network 2608, and an inpainting neural network 2610.

In one or more embodiments, the scene-based image editing system 106 utilizes, as the segmentation neural network 2604, one of the segmentation neural networks discussed above (e.g., the detection-masking neural network 300 discussed with reference to FIG. 3). In some embodiments, the scene-based image editing system 106 utilizes, as the inpainting neural network 2610, one of the content-aware machine learning models discussed above (e.g., the cascaded modulation inpainting neural network 420 discussed with reference to FIG. 4). The distractor detection neural network 2606 and the shadow detection neural network 2608 will be discussed in more detail below.

As shown in FIG. 26, the scene-based image editing system 106 utilizes the pipeline of neural networks to generate a modified digital image 2612 from the digital image 2602. In particular, the scene-based image editing system 106 utilizes the pipeline of neural networks to identify and remove distracting objects from the digital image 2602. In particular, the scene-based image editing system 106 generates an object mask for the objects in the digital image utilizing the segmentation neural network 2604. The scene-based image editing system 106 determines a classification for the objects of the plurality of objects utilizing the distractor detection neural network 2606. More specifically, the scene-based image editing system 106 assigns each object a classification of main subject object or distracting object. The scene-based image editing system 106 removes distracting objects from the digital image utilizing the object masks. Further, the scene-based image editing system 106 utilizes inpainting neural network 2610 to generate content fill for the portions of the digital image 2602 from which the distracting objects were removed to generate the modified digital image 2612. As shown, the scene-based image editing system 106 deletes a plurality of different types of distracting objects (multiple men and a pole). Indeed, the scene-based image editing system 106 is robust enough to identify non-human objects as distracting (e.g., the pole behind the girl).

In one or more embodiments, the scene-based image editing system 106 utilizes a subset of the neural networks shown in FIG. 26 to generate a modified digital image. For instance, in some cases, the scene-based image editing system 106 utilizes the segmentation neural network 2604, the distractor detection neural network 2606, and the content fill 210 to generate a modified digital image from a digital image. Further, in some cases, the scene-based image editing system 106 utilizes a different ordering of the neural networks than what is shown.

Figure 27:
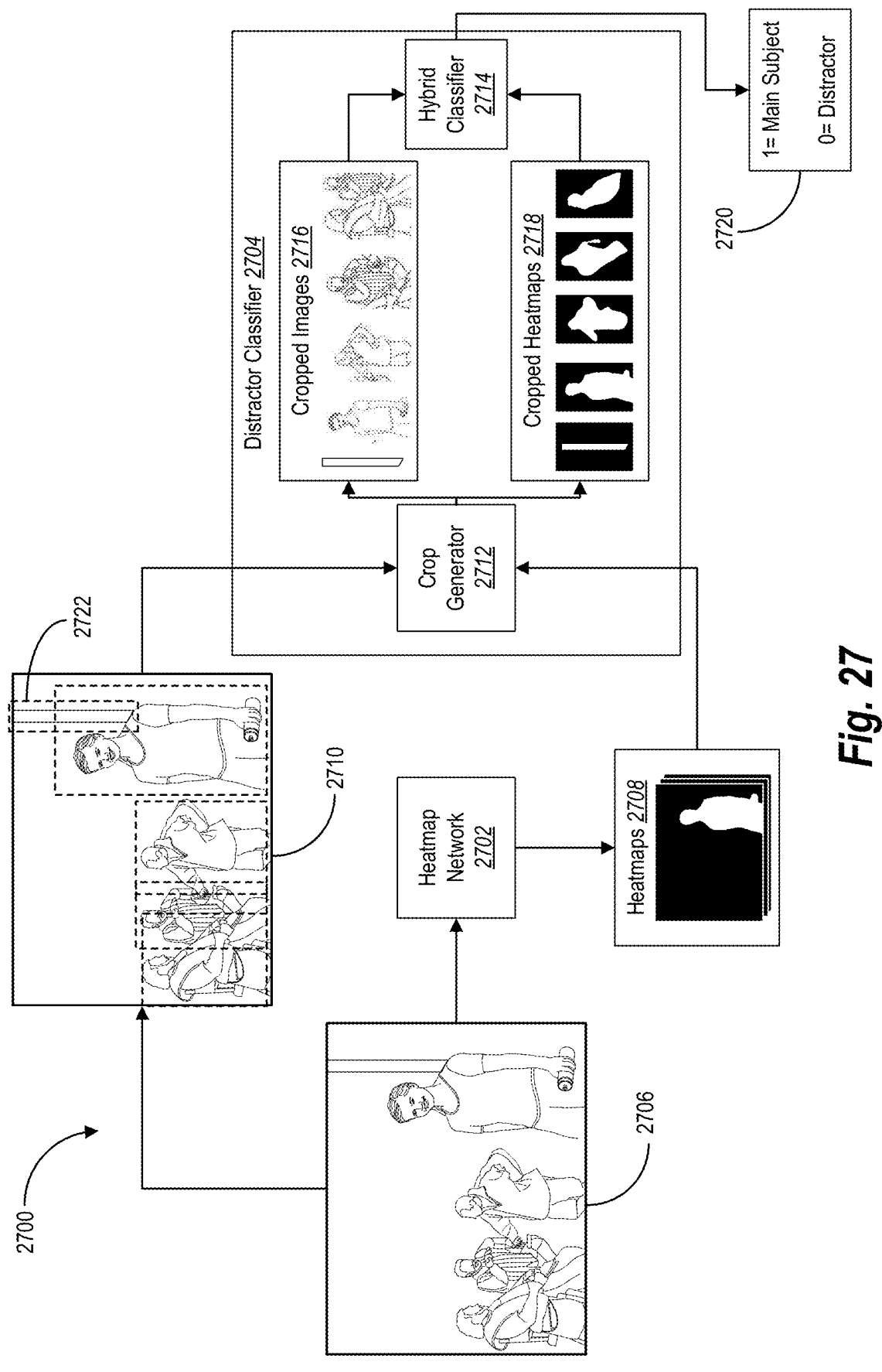
FIG. 27 illustrates an architecture of a distractor detection neural network utilized by the scene-based image editing system to identify and classify distracting objects in of a digital image in accordance with one or more embodiments.

FIG. 27 illustrates an architecture of a distractor detection neural network 2700 utilized by the scene-based image editing system 106 to identify and classify distracting objects in of a digital image in accordance with one or more embodiments. As shown in FIG. 27, the distractor detection neural network 2700 includes a heatmap network 2702 and a distractor classifier 2704.

As illustrated, the heatmap network 2702 operates on an input image 2706 to generate heatmaps 2708. For instance, in some cases, the heatmap network 2702 generates a main subject heatmap representing possible main subject objects and a distractor heatmap representing possible distracting objects. In one or more embodiments, a heatmap (also referred to as a class activation map) includes a prediction made by a convolutional neural network that indicates a probability value, on a scale of zero to one, that a specific pixel of an image belongs to a particular class from a set of classes. As opposed to object detection, the goal of a heatmap network is to classify individual pixels as being part of the same region in some instances. In some cases, a region includes an area of a digital image where all pixels are of the same color or brightness.

In at least one implementation, the scene-based image editing system 106 trains the heatmap network 2702 on whole images, including digital images where there are no distracting objects and digital images that portray main subject objects and distracting objects.

In one or more embodiments, the heatmap network 2702 identifies features in a digital image that contribute to a conclusion that that a given region is more likely to be a distracting object or more likely to be a main subject object, such as body posture and orientation. For instance, in some cases, the heatmap network 2702 determines that objects with slouching postures as opposed to standing at attention postures are likely distracting objects and also that objects facing away from the camera are likely to be distracting objects. In some cases, the heatmap network 2702 considers other features, such as size, intensity, color, etc.

In some embodiments, the heatmap network 2702 classifies regions of the input image 2706 as being a main subject or a distractor and outputs the heatmaps 2708 based on the classifications. For example, in some embodiments, the heatmap network 2702 represents any pixel determined to be part of a main subject object as white within the main subject heatmap and represents any pixel determined to not be part of a main subject object as black (or vice versa). Likewise, in some cases, the heatmap network 2702 represents any pixel determined to be part of a distracting object as white within the distractor heatmap while representing any pixel determined to not be part of a distracting object as black (or vice versa).

In some implementations, the heatmap network 2702 further generates a background heatmap representing a possible background as part of the heatmaps 2708. For instance, in some cases, the heatmap network 2702 determines that the background includes areas that are not part of a main subject object or a distracting object. In some cases, the heatmap network 2702 represents any pixel determined to be part of the background as white within the background heatmap while representing any pixel determined to not be part of the background as black (or vice versa).

In one or more embodiments, the distractor detection neural network 2700 utilizes the heatmaps 2708 output by the heatmap network 2702 as a prior to the distractor classifier 2704 to indicate a probability that a specific region of the input image 2706 contains a distracting object or a main subject object.

In one or more embodiments, the distractor detection neural network 2700 utilizes the distractor classifier 2704 to consider the global information included in the heatmaps 2708 and the local information included in one or more individual objects 2710. To illustrate, in some embodiments, the distractor classifier 2704 generates a score for the classification of an object. If an object in a digital image appears to be a main subject object based on the local information, but the heatmaps 2708 indicate with a high probability that the object is a distracting object, the distractor classifier 2704 concludes that the object is indeed a distracting object in some cases. On the other hand, if the heatmaps 2708 point toward the object being a main subject object, the distractor classifier 2704 determines that the object has been confirmed as a main subject object.

As shown in FIG. 27, the distractor classifier 2704 includes a crop generator 2712 and a hybrid classifier 2714. In one or more embodiments, the distractor classifier 2704 receives one or more individual objects 2710 that have been identified from the input image 2706. In some cases, the one or more individual objects 2710 are identified via user annotation or some object detection network (e.g., the object detection machine learning model 308 discussed above with reference to FIG. 3).

As illustrated by FIG. 27, the distractor classifier 2704 utilizes the crop generator 2712 to generate cropped images 2716 by cropping the input image 2706 based on the locations of the one or more individual objects 2710. For instance, where there are three object detections in the input image 2706, the crop generator 2712 generates three cropped images-one for each detected object. In one or more embodiments, the crop generator 2712 generates a cropped image by removing all pixels of the input image 2706 outside the location of the corresponding inferred bounding region.

As further shown, the distractor classifier 2704 also utilizes the crop generator 2712 to generate cropped heatmaps 2718 by cropping the heatmaps 2708 with respect to each detected object. For instance, in one or more embodiments, the crop generator 2712 generates—from each of the main subject heatmap, the distractor heatmap, and the background heatmap-one cropped heatmap for each of the detected objects based on a region within the heatmaps corresponding to the location of the detected objects.

In one or more embodiments, for each of the one or more individual objects 2710, the distractor classifier 2704 utilizes the hybrid classifier 2714 to operate on a corresponding cropped image (e.g., its features) and corresponding cropped heatmaps (e.g., their features) to determine whether the object is a main subject object or a distracting object. To illustrate, in some embodiments, for a detected object, the hybrid classifier 2714 performs an operation on the cropped image associated with the detected object and the cropped heatmaps associated with the detected object (e.g., the cropped heatmaps derived from the heatmaps 2708 based on a location of the detected object) to determine whether the detected object is a main subject object or a distracting object. In one or more embodiments, the distractor classifier 2704 combines the features of the cropped image for a detected object with the features of the corresponding cropped heatmaps (e.g., via concatenation or appending the features) and provides the combination to the hybrid classifier 2714. As shown in FIG. 27, the hybrid classifier 2714 generates, from its corresponding cropped image and cropped heatmaps, a binary decision 2720 including a label for a detected object as a main subject object or a distracting object.

Figure 28:
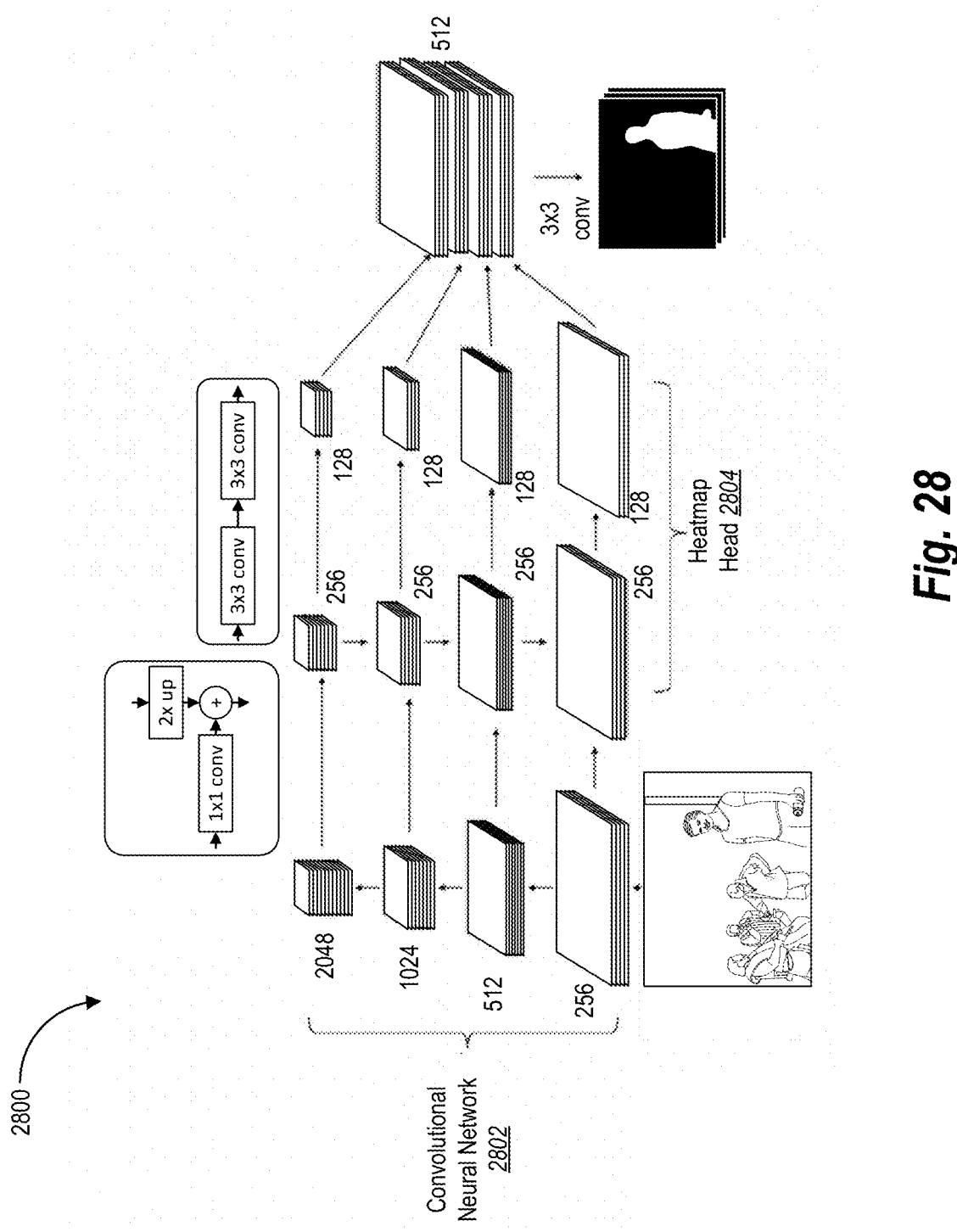
FIG. 28 illustrates an architecture of a heatmap network utilized by the scene-based image editing system as part of a distractor detection neural network in accordance with one or more embodiments.

FIG. 28 illustrates an architecture of a heatmap network 2800 utilized by the scene-based image editing system 106 as part of a distractor detection neural network in accordance with one or more embodiments. As shown in FIG. 28, the heatmap network 2800 includes a convolutional neural network 2802 as its encoder. In one or more embodiments, the convolutional neural network 2802 includes a deep residual network. As further shown in FIG. 28, the heatmap network 2800 includes a heatmap head 2804 as its decoder.

Figure 29:
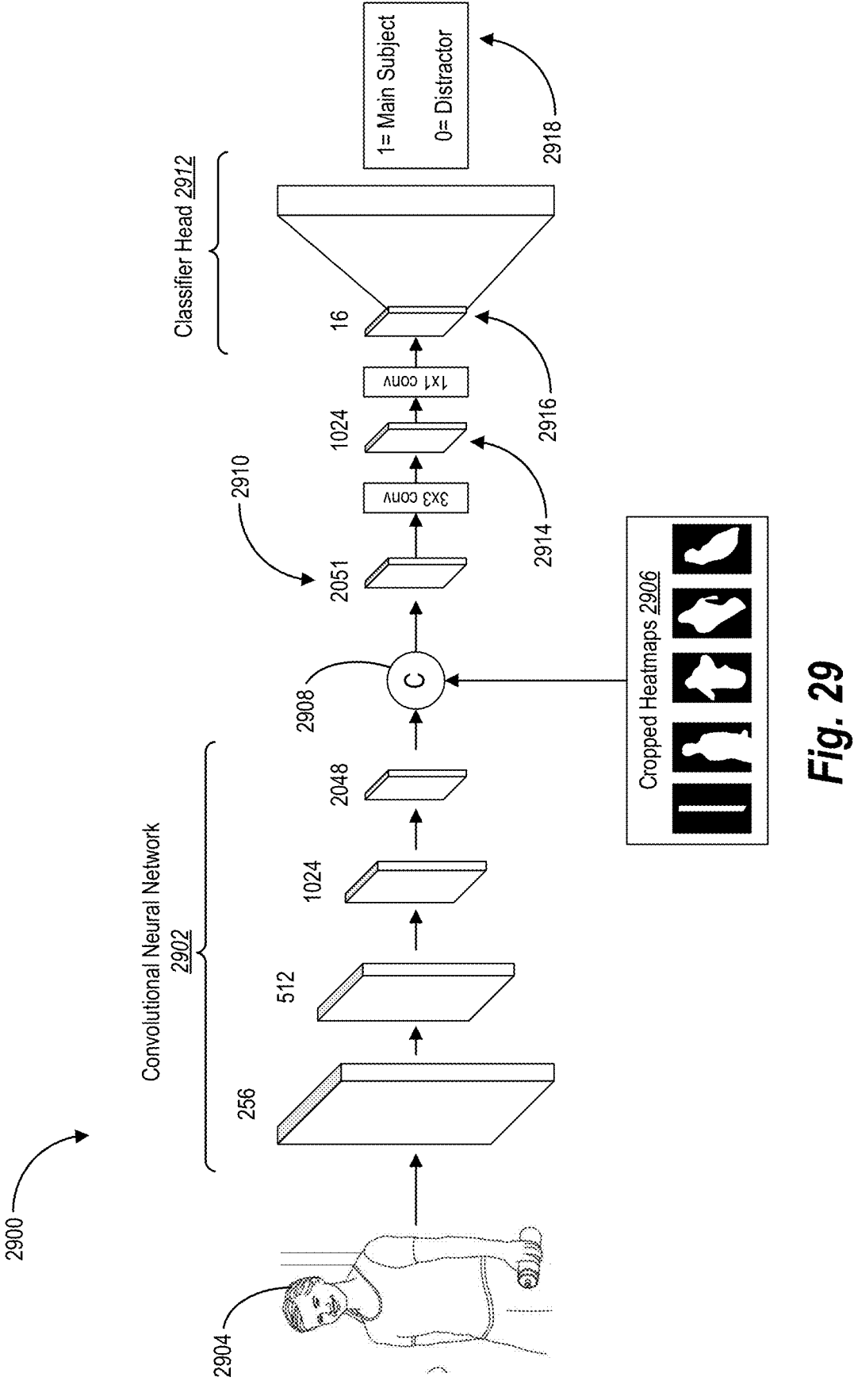
FIG. 29 illustrates an architecture of a hybrid classifier utilized by the scene-based image editing system as part of a distractor detection neural network in accordance with one or more embodiments.

FIG. 29 illustrates an architecture of a hybrid classifier 2900 utilized by the scene-based image editing system 106 as part of a distractor detection neural network in accordance with one or more embodiments. As shown in FIG. 29, the hybrid classifier 2900 includes a convolutional neural network 2902. In one or more embodiments, the hybrid classifier 2900 utilizes the convolutional neural network 2902 as an encoder.

To illustrate, in one or more embodiments, the scene-based image editing system 106 provides the features of a cropped image 2904 to the convolutional neural network 2902. Further, the scene-based image editing system 106 provides features of the cropped heatmaps 2906 corresponding to the object of the cropped image 2904 to an internal layer 2910 of the hybrid classifier 2900. In particular, as shown, in some cases, the scene-based image editing system 106 concatenates the features of the cropped heatmaps 2906 with the output of a prior internal layer (via the concatenation operation 2908) and provides the resulting feature map to the internal layer 2910 of the hybrid classifier 2900. In some embodiments, the feature map includes 2048+N channels, where N corresponds to the channels of the output of the heatmap network and 2048 corresponds to the channels of the output of the prior internal layer (though 2048 is an example).

As shown in FIG. 29, the hybrid classifier 2900 performs a convolution on the output of the internal layer 2910 to reduce the channel depth. Further, the hybrid classifier 2900 performs another convolution on the output of the subsequent internal layer 2914 to further reduce the channel depth. In some cases, the hybrid classifier 2900 applies a pooling to the output of the final internal layer 2916 before the binary classification head 2912. For instance, in some cases, the hybrid classifier 2900 averages the values of the final internal layer output to generate an average value. In some cases, where the average value is above the threshold, the hybrid classifier 2900 classifies the corresponding object as a distracting object and outputs a corresponding binary value; otherwise, the hybrid classifier 2900 classifies the corresponding object as a main subject object and outputs the corresponding binary value (or vice versa). Thus, the hybrid classifier 2900 provides an output 2918 containing a label for the corresponding object.

Figure 30B:
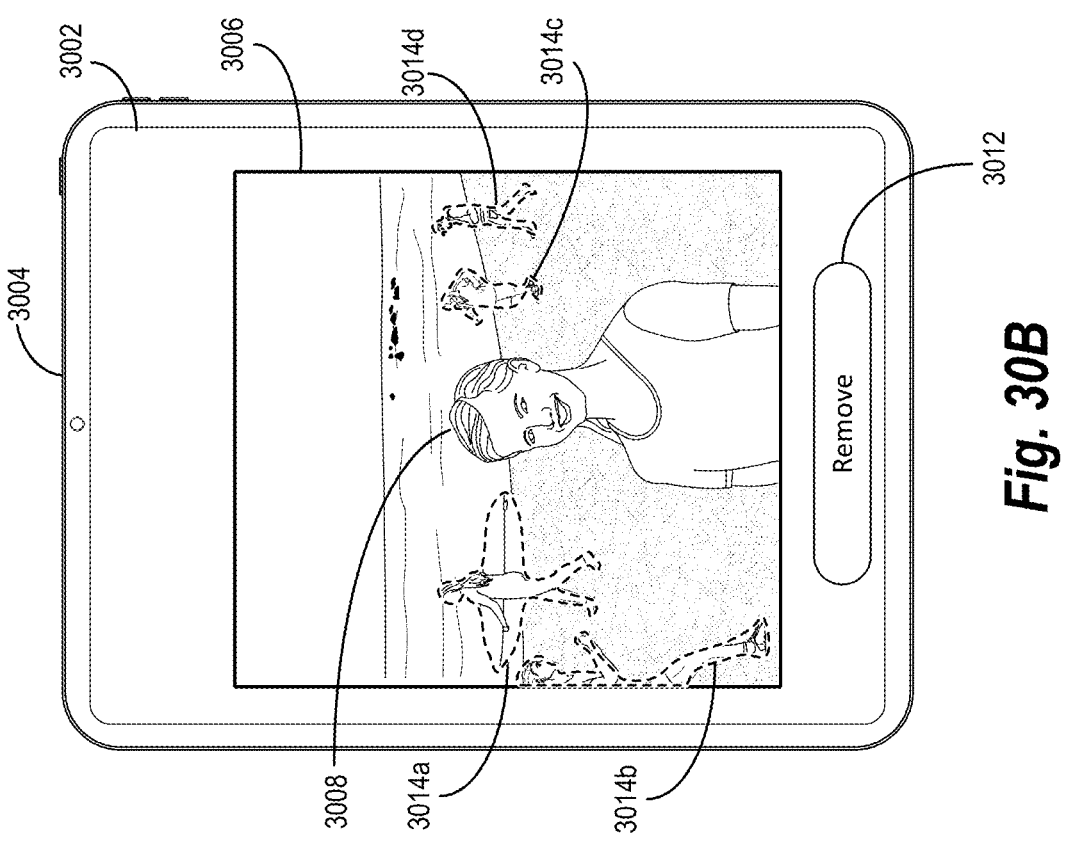
FIGS. 30A-30C illustrate a graphical user interface implemented by the scene-based image editing system to identify and remove distracting objects from a digital image in accordance with one or more embodiments.
Figure 30A:
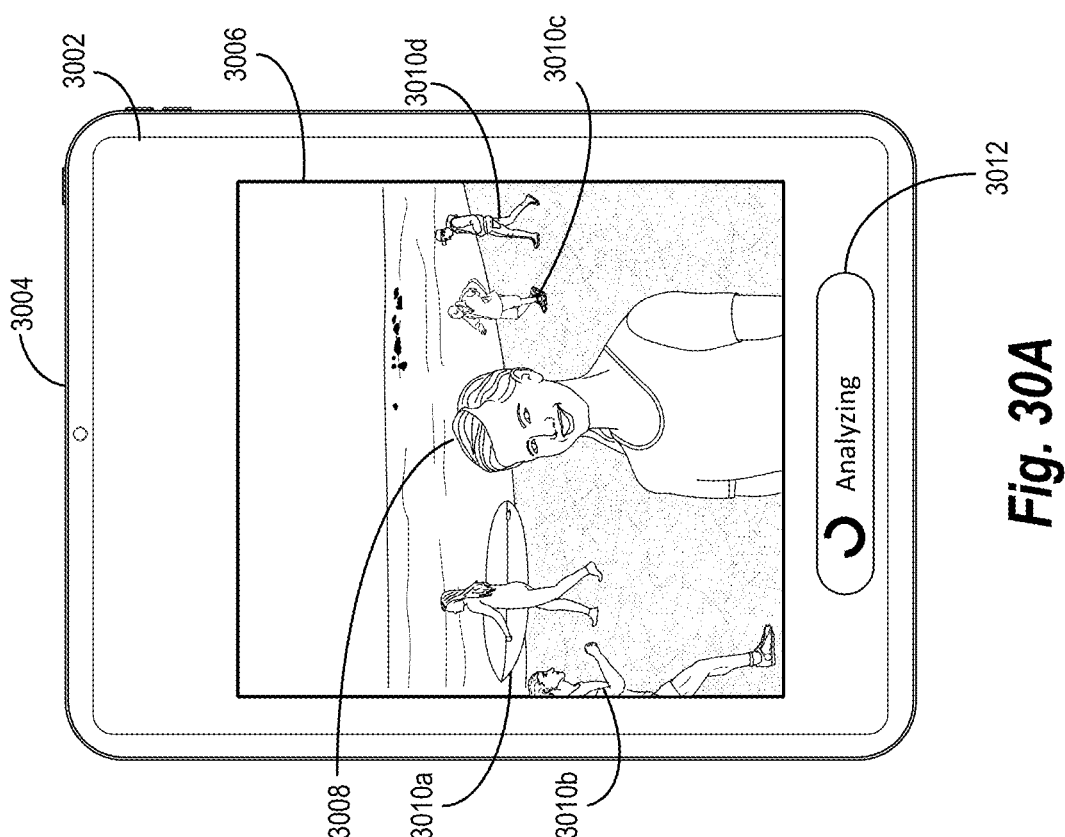
Figure 30C:
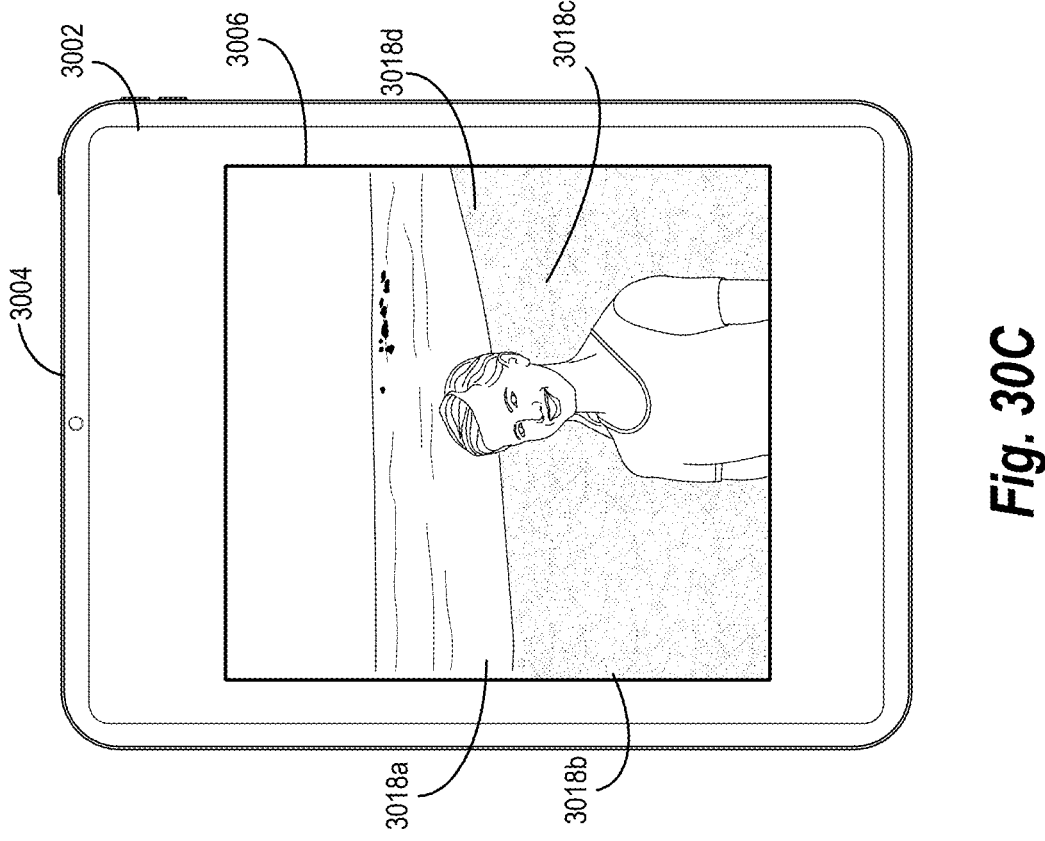

FIGS. 30A-30C illustrate a graphical user interface implemented by the scene-based image editing system 106 to identify and remove distracting objects from a digital image in accordance with one or more embodiments. For instance, as shown in FIG. 30A, the scene-based image editing system 106 provides a digital image 3006 for display within a graphical user interface 3002 of a client device 3004. As further shown, the digital image 3006 portrays an object 3008 and a plurality of additional objects 3010a-3010d.

Additionally, as shown in FIG. 30A, the scene-based image editing system 106 provides a progress indicator 3012 for display within the graphical user interface 3002. In some cases, the scene-based image editing system 106 provides the progress indicator 3012 to indicate that the digital image 3006 is being analyzed for distracting objects. For instance, in some embodiments, the scene-based image editing system 106 provides the progress indicator 3012 while utilizing a distractor detection neural network to identify and classify distracting objects within the digital image 3006. In one or more embodiments, the scene-based image editing system 106 automatically implements the distractor detection neural network upon receiving the digital image 3006 and before receiving user input for modifying one or more of the objects 3010a-3010d. In some implementations, however, the scene-based image editing system 106 waits upon receiving user input before analyzing the digital image 3006 for distracting objects.

As shown in FIG. 30B, the scene-based image editing system 106 provides visual indicators 3014a-3014d for display within the graphical user interface 3002 upon completing the analysis. In particular, the scene-based image editing system 106 provides the visual indicators 3014a-3014d to indicate that the objects 3010a-3010d have been classified as distracting objects.

In one or more embodiments, the scene-based image editing system 106 further provides the visual indicators 3014a-3014d to indicate that the objects 3010a-3010d have been selected for deletion. In some instances, the scene-based image editing system 106 also surfaces the pre-generated object masks for the objects 3010a-3010d in preparation of deleting the objects. Indeed, as has been discussed, the scene-based image editing system 106 pre-generates object masks and content fills for the objects of a digital image (e.g., utilizing the segmentation neural network 2604 and the inpainting neural network 2610 referenced above). Accordingly, the scene-based image editing system 106 has the object masks and content fills readily available for modifying the objects 3010a-3010d.

In one or more embodiments, the scene-based image editing system 106 enables user interactions to add to or remove from the selection of the objects for deletion. For instance, in some embodiments, upon detecting a user interaction with the object 3010a, the scene-based image editing system 106 determines to omit the object 3010a from the deletion operation. Further, the scene-based image editing system 106 removes the visual indication 3014a from the display of the graphical user interface 3002. On the other hand, in some implementations, the scene-based image editing system 106 detects a user interaction with the object 3008 and determines to include the object 3008 in the deletion operation in response. Further, in some cases, the scene-based image editing system 106 provides a visual indication for the object 3008 for display and/or surfaces a pre-generated object mask for the object 3008 in preparation for the deletion.

As further shown in FIG. 30B, the scene-based image editing system 106 provides a removal option 3016 for display within the graphical user interface 3002. In one or more embodiments, in response to detecting a user interaction with the removal option 3016, the scene-based image editing system 106 removes the objects that have been selected for deletion (e.g., the objects 3010a-3010d that had been classified as distracting objects). Indeed, as shown in FIG. 30C, the scene-based image editing system 106 removes the objects 3010a-3010d from the digital image 3006. Further, as shown in 30C, upon removing the objects 3010a-3010d, the scene-based image editing system 106 reveals content fills 3018a-3018d that were previously generated.

By enabling user interactions to control which objects are included in the deletion operation and to further choose when the selected objects are removed, the scene-based image editing system 106 provides more flexibility. Indeed, while conventional systems typically delete distracting objects automatically without user input, the scene-based image editing system 106 allows for the deletion of distract-ing objects in accordance with user preferences expressed via the user interactions. Thus, the scene-based image editing system 106 flexibly allow for control of the removal process via the user interactions.

Figure 31B:
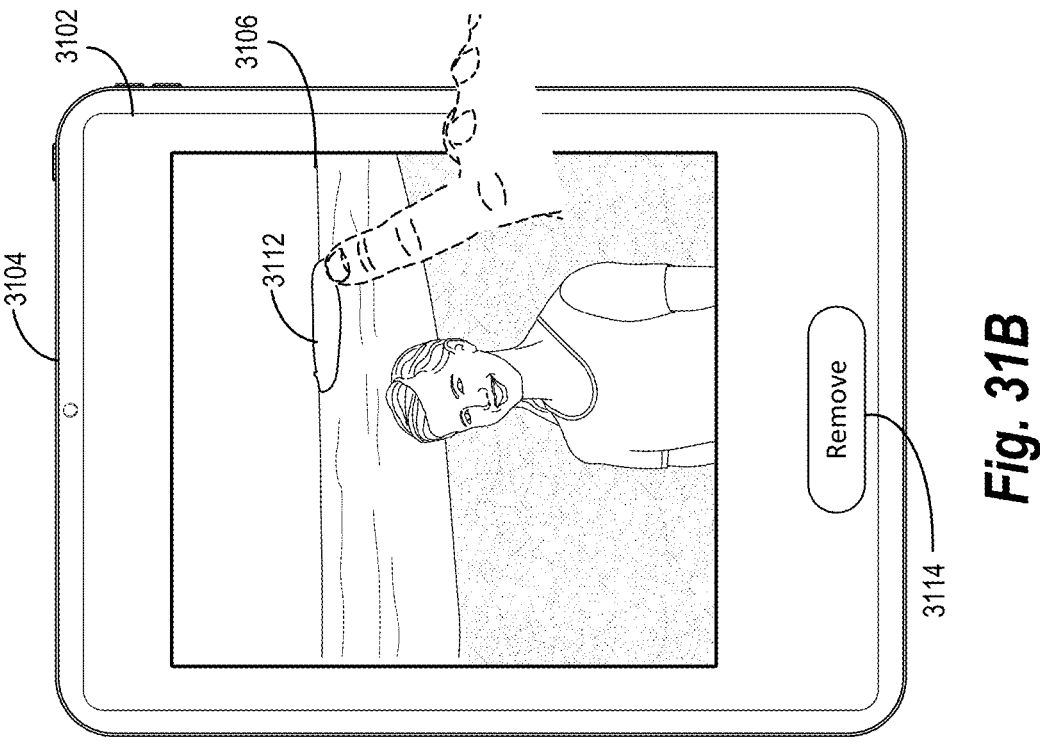
FIGS. 31A-31C illustrate another graphical user interface implemented by the scene-based image editing system to identify and remove distracting objects from a digital image in accordance with one or more embodiments.
Figure 31A:
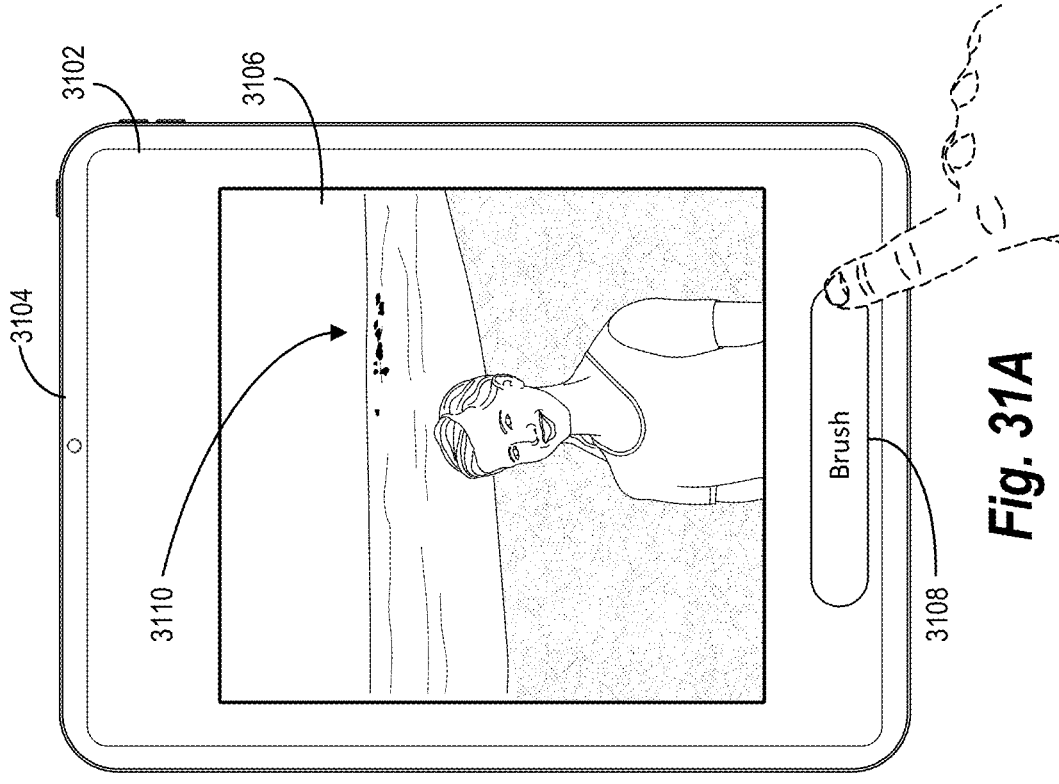
Figure 31C:
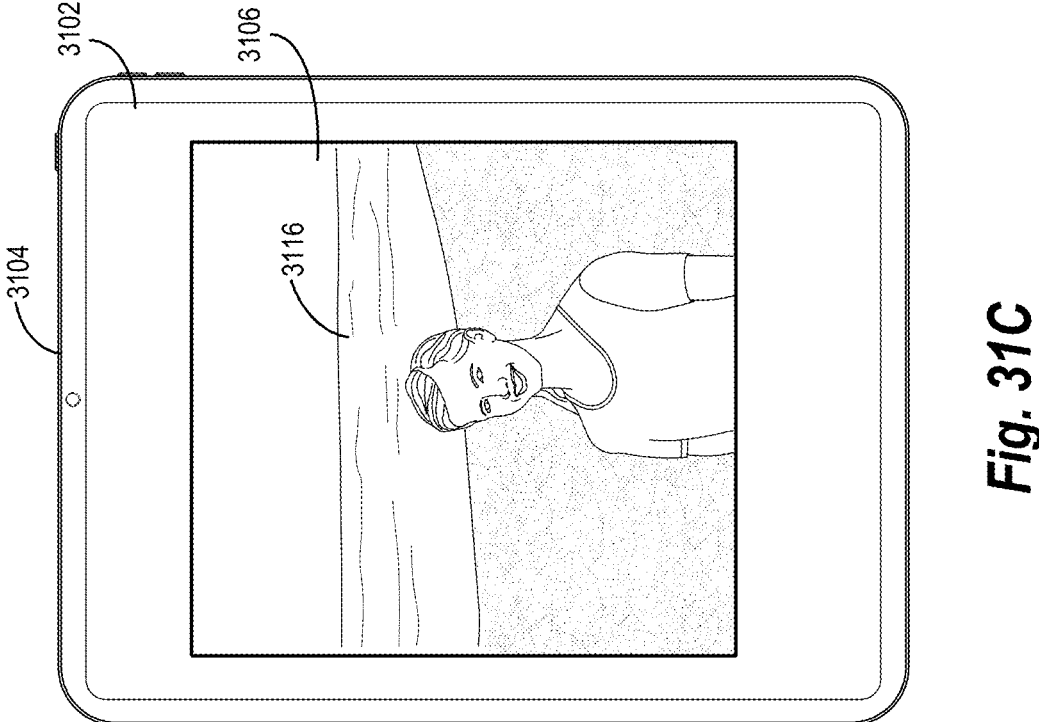

In addition to removing distracting objects identified via a distractor detection neural network, the scene-based image editing system 106 provides other features for removing unwanted portions of a digital image in various embodi-ments. For instance, in some cases, the scene-based image editing system 106 provides a tool whereby user interactions can target arbitrary portions of a digital image for deletion. FIGS. 31A-31C illustrate a graphical user interface imple-mented by the scene-based image editing system 106 to identify and remove distracting objects from a digital image in accordance with one or more embodiments.

In particular, FIG. 31A illustrates a digital image 3106 displayed on a graphical user interface 3102 of a client device 3104. The digital image 3106 corresponds to the digital image 3006 of FIG. 30C after distracting objects identified by a distractor detection neural network have been removed. Accordingly, in some cases, the objects remaining in the digital image 3106 represent those objects that were not identified and removed as distracting objects. For instance, in some cases, the collection of objects 3110 near the horizon of the digital image 3106 include objects that were not identified as distracting objects by the distractor detection neural network.

As further shown in FIG. 31A, the scene-based image editing system 106 provides a brush tool option 3108 for display within the graphical user interface 3102. FIG. 31B illustrates that, upon detecting a user interaction with the brush tool option 3108, the scene-based image editing system 106 enables one or more user interactions to use a brush tool to select arbitrary portions of the digital image 3106 (e.g., portions not identified by the distractor detection neural network) for removal. For instance, as illustrated, the scene-based image editing system 106 receives one or more user interactions with the graphical user interface 3102 that target a portion of the digital image 3106 that portrayed the collection of objects 3110.

As indicated by FIG. 31B, via the brush tool, the scene-based image editing system 106 enables free-form user input in some cases. In particular, FIG. 31B shows the scene-based image editing system 106 providing a visual indication 3112 representing the portion of the digital image 3106 selected via the brush tool (e.g., the specific pixels targeted). Indeed, rather than receiving user interactions with previously iden-tified objects or other pre-segmented semantic areas, the scene-based image editing system 106 uses the brush tool to enable arbitrary selection of various portions of the digital image 3106. Accordingly, the scene-based image editing system 106 utilizes the brush tool to provide additional flexibility whereby user interactions is able to designate undesirable areas of a digital image that may not be iden-tified by machine learning.

As further shown in FIG. 31B, the scene-based image editing system 106 provides a remove option 3114 for display within the graphical user interface 3102. As illus-trated in FIG. 31C, in response to detecting a user interaction with the remove option 3114, the scene-based image editing system 106 removes the selected portion of the digital image 3106. Further, as shown, the scene-based image editing system 106 fills in the selected portion with a content fill 3116. In one or more embodiments, where the portion removed from the digital image 3106 does not include objects for which content fill was previously selected (or otherwise includes extra pixels not included in previously generated content fill), the scene-based image editing system 106 generates the content fill 3116 after removing the portion of the digital image 3106 selected via the brush tool. In particular, the scene-based image editing system 106 utilizes a content-aware hole-filling machine learning model to generate the content fill 3116 after the selected portion is removed.

Figure 32A:
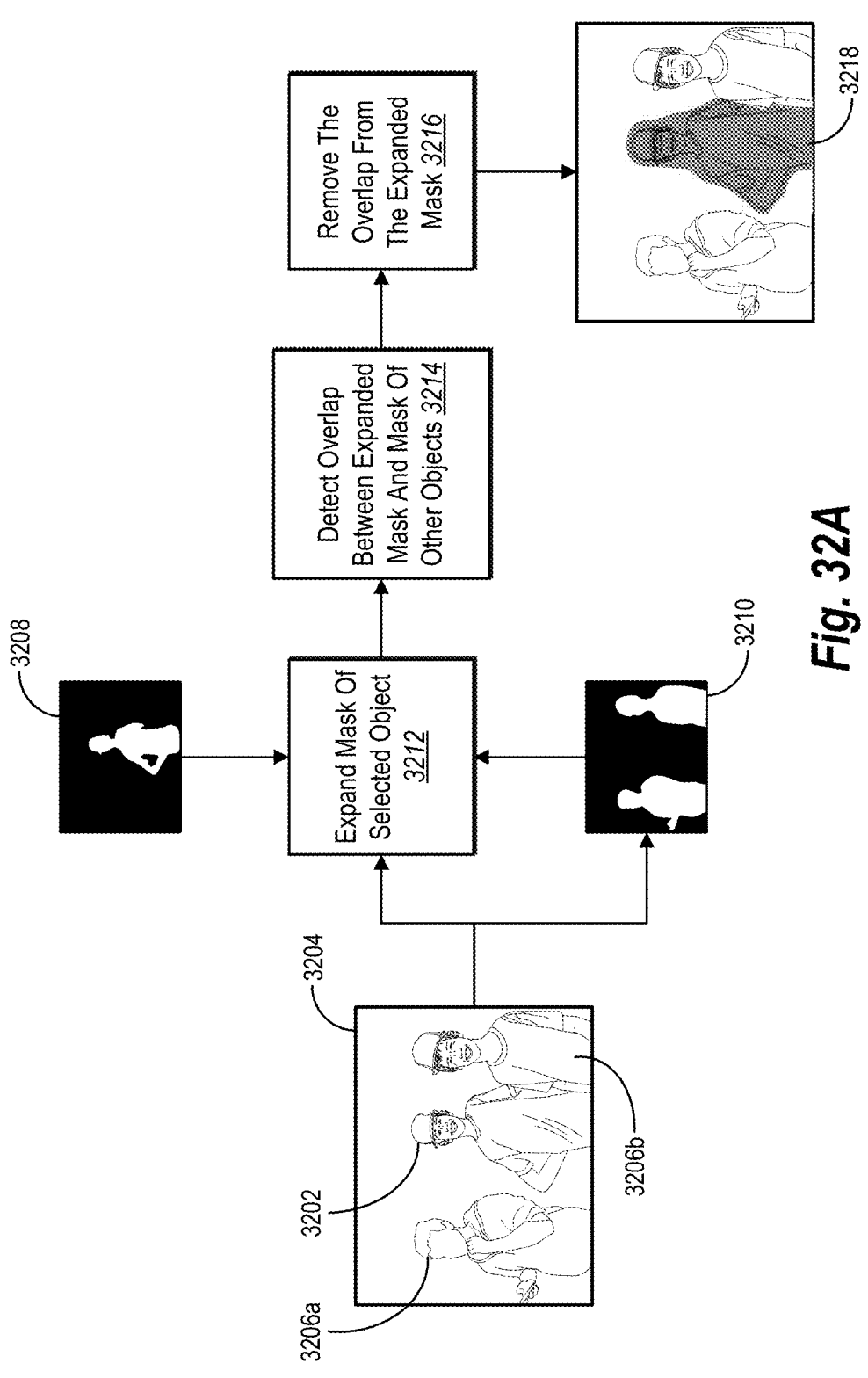
FIGS. 32A-32B illustrate the scene-based image editing system utilizing smart dilation to remove an object from a digital image in accordance with one or more embodiments.

In one or more embodiments, the scene-based image editing system 106 further implements smart dilation when removing objects, such as distracting objects, from digital images. For instance, in some cases, the scene-based image editing system 106 utilizes smart dilation to remove objects that touch, overlap, or are proximate to other objects por-trayed in a digital image. FIG. 32A illustrates the scene-based image editing system 106 utilizes smart dilation to remove an object from a digital image in accordance with one or more embodiments.

Often, conventional systems remove objects from digital images utilizing tight masks (e.g., a mask that tightly adheres to the border of the corresponding object). In many cases, however, a digital image includes color bleeding or artifacts around the border of an object. For instance, there exist some image formats (JPEG) that are particularly susceptible to having format-related artifacts around object borders. Using tight masks when these issues are present causes undesirable effects in the resulting image. For example, inpainting models are typically sensitive to these image blemishes, creating large artifacts when operating directly on the segmentation output. Thus, the resulting modified images inaccurately capture the user intent in removing an object by creating additional image noise.

Thus, the scene-based image editing system 106 dilates (e.g., expands) the object mask of an object to avoid associated artifacts when removing the object. Dilating objects masks, however, presents the risk of removing portions of other objects portrayed in the digital image. For instance, where a first object to be removed overlaps, touches, or is proximate to a second object, a dilated mask for the first object will often extend into the space occupied by the second object. Thus, when removing the first object using the dilated object mask, significant portions of the second object are often removed and the resulting hole is filled in (generally improperly), causing undesirable effects in the resulting image. Accordingly, the scene-based image editing system 106 utilizes smart dilation to avoid significantly extending the object mask of an object to be removed into areas of the digital image occupied by other objects.

As shown in FIG. 32A, the scene-based image editing system 106 determines to remove an object 3202 portrayed in a digital image 3204. For instance, in some cases, the scene-based image editing system 106 determines (e.g., via a distractor detection neural network) that the object 3202 is a distracting object. In some implementations, the scene-based image editing system 106 receives a user selection of the object 3202 for removal. The digital image 3204 also portrays the objects 3206a-3206b. As shown, the object 3202 selected for removal overlaps with the object 3206b in the digital image 3204.

As further illustrated in FIG. 32A, the scene-based image editing system 106 generates an object mask 3208 for the object 3202 to be removed and a combined object mask 3210 for the objects 3206a-3206b. For instance, in some embodiments, the scene-based image editing system 106 generates the object mask 3208 and the combined object mask 3210 from the digital image 3204 utilizing a segmentation neural network. In one or more embodiments, the scene-based image editing system 106 generates the combined object mask 3210 by generating an object mask for each of the objects 3206a-3206b and determining the union between the separate object masks.

Additionally, as shown in FIG. 32A, the scene-based image editing system 106 performs an act 3212 of expanding the object mask 3208 for the object 3202 to be removed. In particular, the scene-based image editing system 106 expands the representation of the object 3202 within the object mask 3208. In other words, the scene-based image editing system 106 adds pixels to the border of the representation of the object within the object mask 3208. The amount of expansion varies in various embodiments and, in some implementations, is configurable to accommodate user preferences. For example, in one or more implementations, the scene-based image editing system 106 expands the object mask by extending the object mask outward ten, fifteen, twenty, twenty-five, or thirty pixels.

After expanding the object mask 3208, the scene-based image editing system 106 performs an act 3214 of detecting overlap between the expanded object mask for the object 3202 and the object masks of the other detected objects 3206a-3206b (i.e., the combined object mask 3210). In particular, the scene-based image editing system 106 determines where pixels corresponding to the expanded representation of the object 3202 within the expanded object mask overlap pixels corresponding to the objects 3206a-3206b within the combined object mask 3210. In some cases, the scene-based image editing system 106 determines the union between the expanded object mask and the combined object mask 3210 and determines the overlap using the resulting union. The scene-based image editing system 106 further performs an act 3216 of removing the overlapping portion from the expanded object mask for the object 3202. In other words, the scene-based image editing system 106 removes pixels from the representation of the object 3202 within the expanded object mask that overlaps with the pixels corresponding to the object 3206a and/or the object 3206b within the combined object mask 3210.

Thus, as shown in FIG. 32A, the scene-based image editing system 106 generates a smartly dilated object mask 3218 (e.g., an expanded object mask) for the object 3202 to be removed. In particular, the scene-based image editing system 106 generates the smartly dilated object mask 3218 by expanding the object mask 3208 in areas that don't overlap with either one of the objects 3206a-3206b and avoiding expansion in areas that do overlap with at least one of the objects 3206a-3206b. At least, in some implementations, the scene-based image editing system 106 reduces the expansion in areas that do overlap. For instance, in some cases, the smartly dilated object mask 3218 still includes expansion in overlapping areas but the expansion is significantly less when compared to areas where there is no overlap. In other words, the scene-based image editing system 106 expands using less pixels in areas where there is overlap. For example, in one or more implementations, the scene-based image editing system 106 expands or dilates an object mask five, ten, fifteen, or twenty times as far into areas where there is no overlap compared to areas where there are overlaps.

To describe it differently, in one or more embodiments, the scene-based image editing system 106 generates the smartly dilated object mask 3218 (e.g., an expanded object mask) by expanding the object mask 3208 for the object 3202 into areas not occupied by the object masks for the objects 3206a-3206b (e.g., areas not occupied by the objects 3206a-3206b themselves). For instance, in some cases, the scene-based image editing system 106 expands the object mask 3208 into portions of the digital image 3204 that abut the object mask 3208. In some cases, the scene-based image editing system 106 expands the object mask 3208 into the abutting portions by a set number of pixels. In some implementations, the scene-based image editing system 106 utilizes a different number of pixels for expanding the object mask 3208 into different abutting portions (e.g., based on detecting a region of overlap between the object mask 3208 and other object masks).

To illustrate, in one or more embodiments, the scene-based image editing system 106 expands the object mask 3208 into the foreground and the background of the digital image 3204. In particular, the scene-based image editing system 106 determines foreground by combining the object masks of objects not to be deleted. The scene-based image editing system 106 expands the object mask 3208 into the abutting foreground and background. In some implementations, the scene-based image editing system 106 expands the object mask 3208 into the foreground by a first amount and expands the object mask 3208 into the background by a second amount that differs from the first amount (e.g., the second amount is greater than the first amount). For example, in one or more implementations the scene-based image editing system 106 expands the object mask by twenty pixels into background areas and two pixels into foreground areas (into abutting object masks, such as the combined object mask 3210).

In one or more embodiments, the scene-based image editing system 106 determines the first amount to use for the expanding the object mask 3208 into the foreground by expanding the object mask 3208 into the foreground by the second amount—the same amount used to expand the object mask 3208 into the background. In other words, the scene-based image editing system 106 expands the object mask 3208 as a whole into the foreground and background by the same amount (e.g., using the same number of pixels). The scene-based image editing system 106 further determines a region of overlap between the expanded object mask and the object masks corresponding to the other objects 3206a-3206b (e.g., the combined object mask 3210). In one or more embodiments, the region of overlap exists in the foreground of the digital image 3204 abutting the object mask 3208. Accordingly, the scene-based image editing system 106 reduces the expansion of the object mask 3208 into the foreground so that the expansion corresponds to the second amount. Indeed, in some instances, the scene-based image editing system 106 removes the region of overlap from the expanded object mask for the object 3202 (e.g., removes the overlapping pixels). In some cases, scene-based image editing system 106 removes a portion of the region of overlap rather than the entire region of overlap, causing a reduced overlap between the expanded object mask for the object 3202 and the object masks corresponding to the objects 3206a-3206b.

In one or more embodiments, as removing the object 3202 includes removing foreground and background abutting the smartly dilated object mask 3218 (e.g., the expanded object mask) generated for the object 3202, the scene-based image editing system 106 inpaints a hole remaining after the removal. In particular, the scene-based image editing system 106 inpaints a hole with foreground pixels and background pixels. Indeed, in one or more embodiments, the scene-based image editing system 106 utilizes an inpainting neural network to generate foreground pixels and background pixels for the resulting hole and utilizes the generated pixels to in paint the hole, resulting in a modified digital image (e.g., an inpainted digital image) where the object 3202 has been removed and the corresponding portion of the digital image 3204 has been filled in.

Figure 32B:
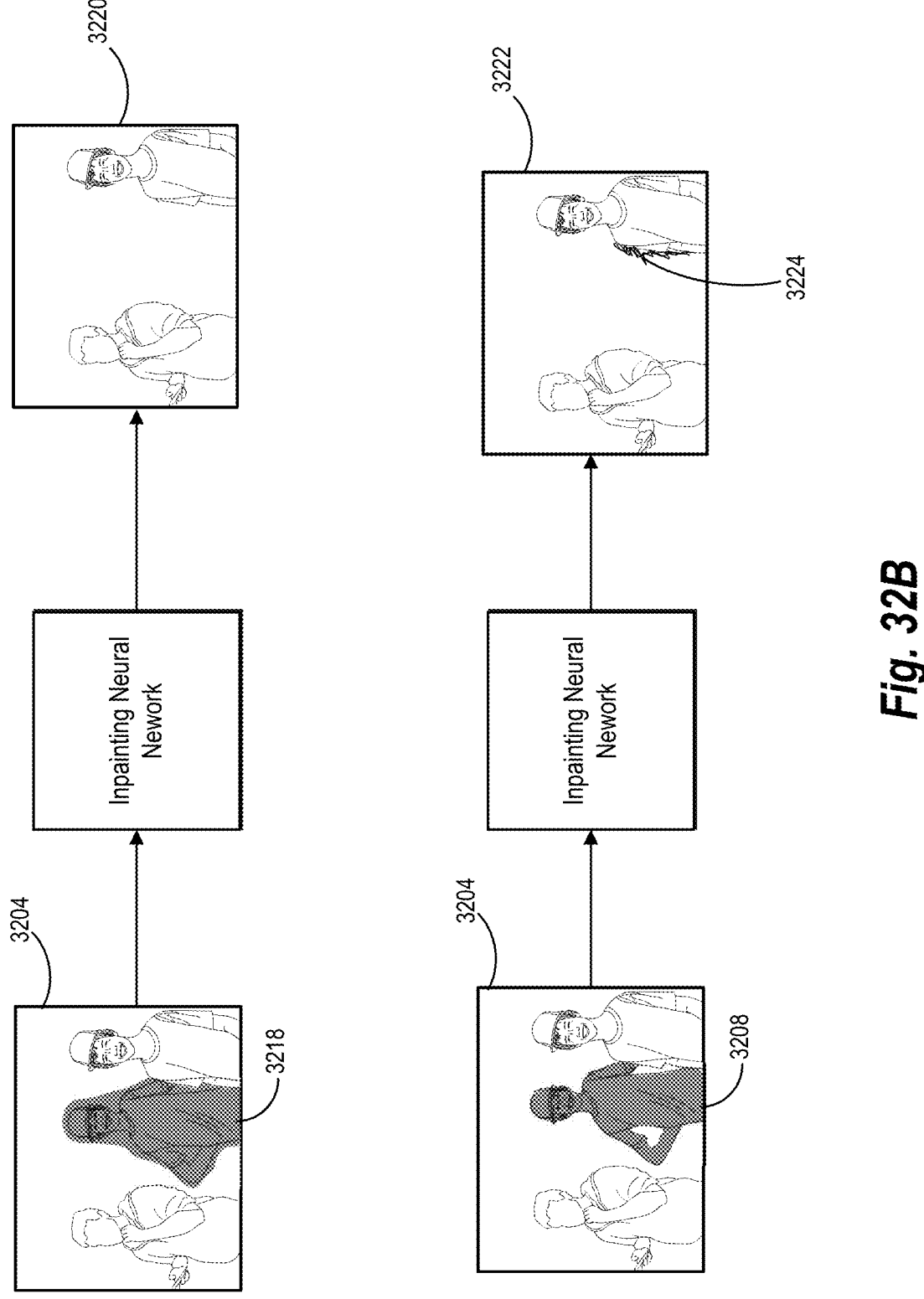

For example, FIG. 32B illustrates the advantages provided by intelligently dilating object masks prior to performing inpainting. In particular, FIG. 32B illustrates that when the smartly dilated object mask 3218 (e.g., the expanded object mask) is provided to an inpainting neural network (e.g., the cascaded modulation inpainting neural network 420) as an area to fill, the inpainting neural network generates a modified digital image 3220 with the area corresponding to the smartly dilated object mask 3218 filled with pixel generated by the inpainting neural network. As shown, the modified digital image 3220 includes no artifacts in the inpainted area corresponding to the smartly dilated object mask 3218. Indeed, the modified digital image 3220 provides a realistic appearing image.

In contrast, FIG. 32B illustrates that when the object mask 3208 (e.g., the non-expanded object mask) is provided to an inpainting neural network (e.g., the cascaded modulation inpainting neural network 420) as an area to fill, the inpainting neural network generates a modified digital image 3222 with the area corresponding to the smartly dilated object mask 3218 filled with pixel generated by the inpainting neural network. As shown, the modified digital image 3222 includes artifacts in the inpainted area corresponding to the object mask 3208. In particular, artifacts are along the back of the girl and event in the generated water.

By generating smartly dilated object masks, the scene-based image editing system 106 provides improved image results when removing objects. Indeed, the scene-based image editing system 106 leverages expansion to remove artifacts, color bleeding, or other undesirable errors in a digital image but avoids removing significant portions of other objects that are remain in the digital image. Thus, the scene-based image editing system 106 is able to fill in holes left by removed objects without enhancing present errors where possible without needlessly replacing portions of other objects that remain.

As previously mentioned, in one or more embodiments, the scene-based image editing system 106 further utilizes a shadow detection neural network to detect shadows associated with distracting objects portrayed within a digital image. FIGS. 33-38 illustrate diagrams of a shadow detection neural network utilized by the scene-based image editing system 106 to detect shadows associated with objects in accordance with one or more embodiments.

Figure 33:
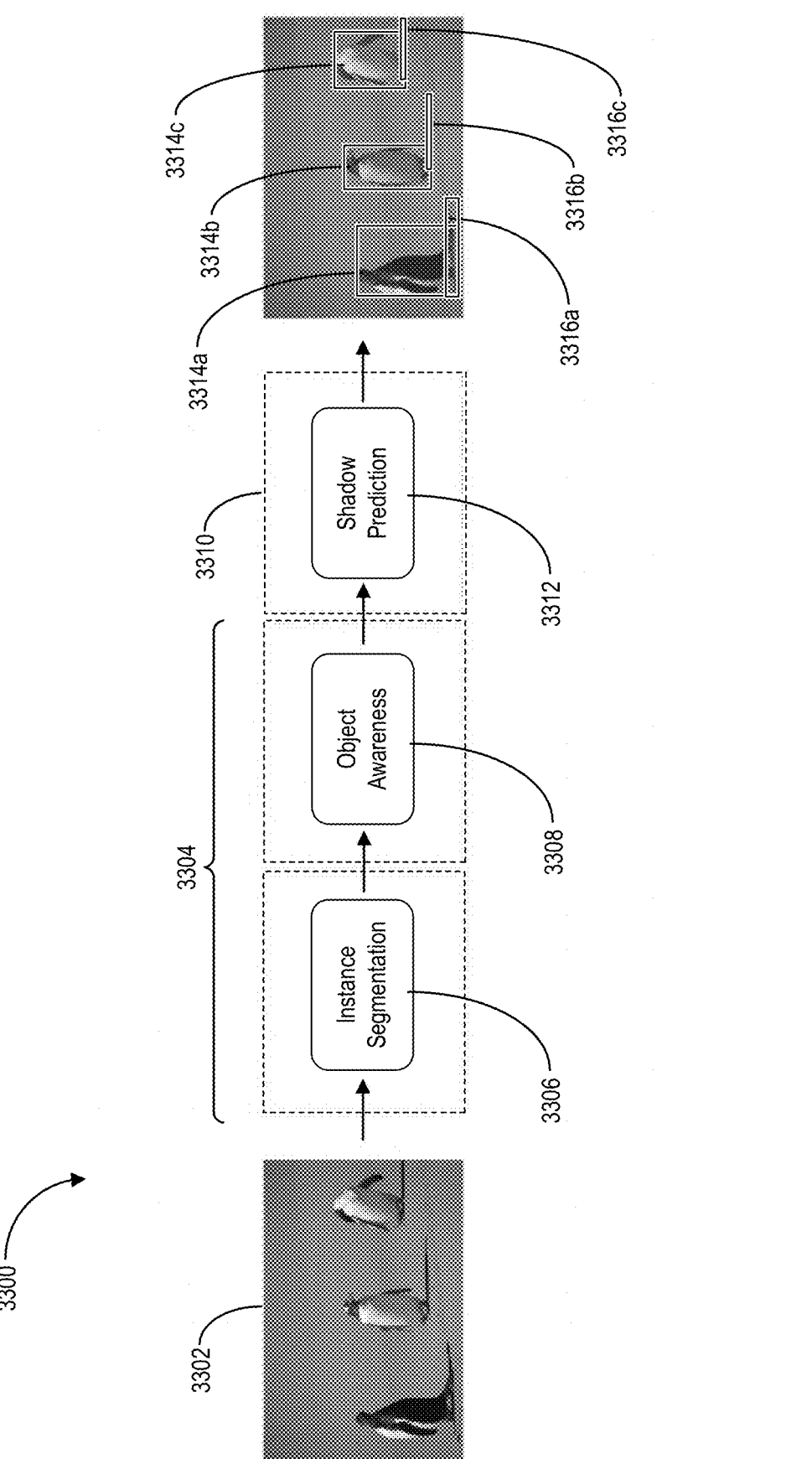
FIG. 33 illustrates an overview of a shadow detection neural network in accordance with one or more embodiments.

In particular, FIG. 33 illustrates an overview of a shadow detection neural network 3300 in accordance with one or more embodiments. Indeed, as shown in FIG. 33, the shadow detection neural network 3300 analyzes an input image 3302 via a first stage 3304 and a second stage 3310. In particular, the first stage 3304 includes an instance segmentation component 3306 and an object awareness component 3308. Further, the second stage 3310 includes a shadow prediction component 3312. In one or more embodiments, the instance segmentation component 3306 includes the segmentation neural network 2604 of the neural network pipeline discussed above with reference to FIG. 26.

As shown in FIG. 33, after analyzing the input image 3302, the shadow detection neural network 3300 identifies objects 3314a-3314c and shadows 3316a-3316c portrayed therein. Further, the shadow detection neural network 3300 associates the objects 3314a-3314c with their respective shadows. For instance, the shadow detection neural network 3300 associates the object 3314a with the shadow 3316a and likewise for the other objects and shadows. Thus, the shadow detection neural network 3300 facilitates inclusion of a shadow when its associated object is selected for deletion, movement, or some other modification.

Figure 34:
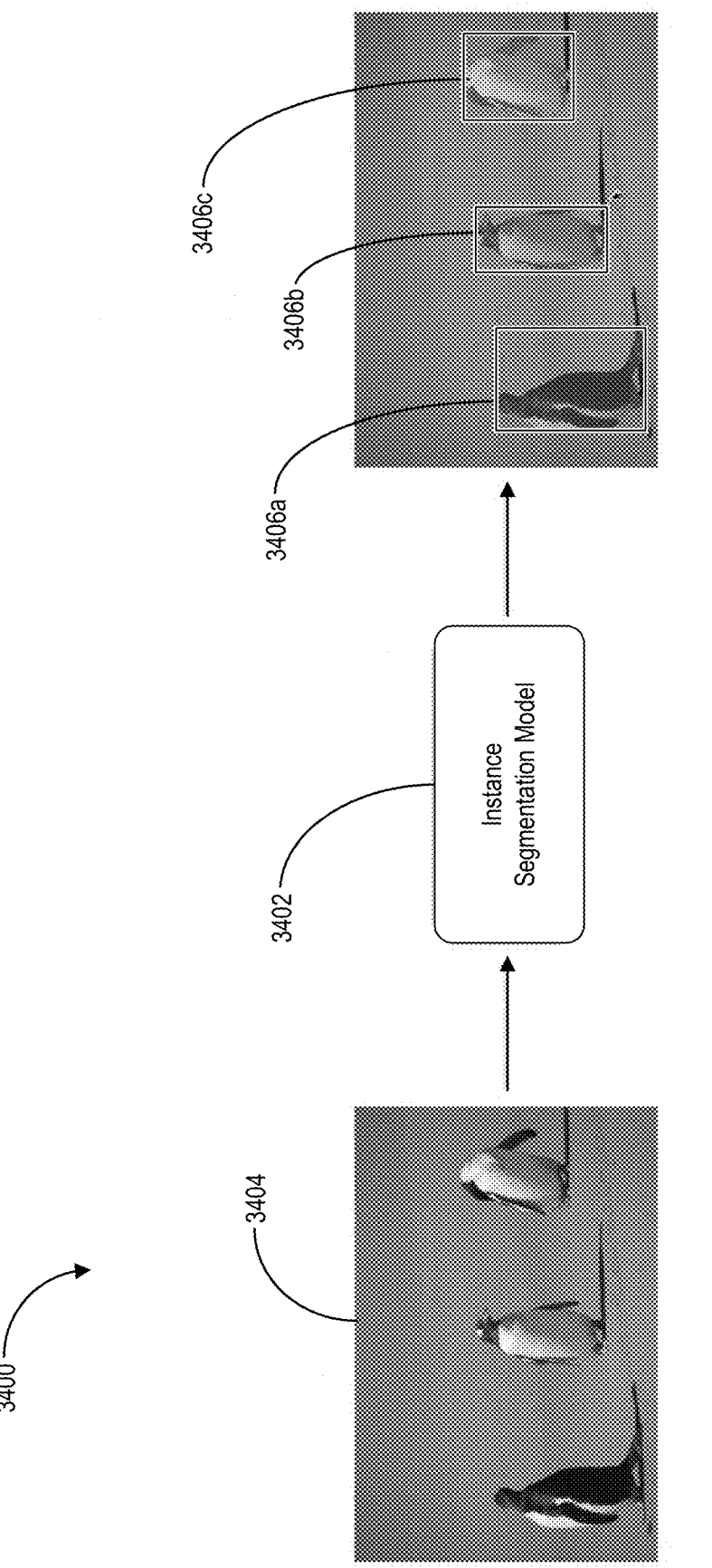
FIG. 34 illustrates an overview of an instance segmentation component of a shadow detection neural network in accordance with one or more embodiments.

FIG. 34 illustrates an overview of an instance segmentation component 3400 of a shadow detection neural network in accordance with one or more embodiments. As shown in FIG. 34, the instance segmentation component 3400 implements an instance segmentation model 3402. In one or more embodiments, the instance segmentation model 3402 includes the detection-masking neural network 300 discussed above with reference to FIG. 3. As shown in FIG. 34, the instance segmentation component 3400 utilizes the instance segmentation model 3402 to analyze an input image 3404 and identify objects 3406a-3406c portrayed therein based on the analysis. For instance, in some cases, the scene-based image editing system 106 outputs object masks and/or bounding boxes for the objects 3406a-3406c.

Figure 35:
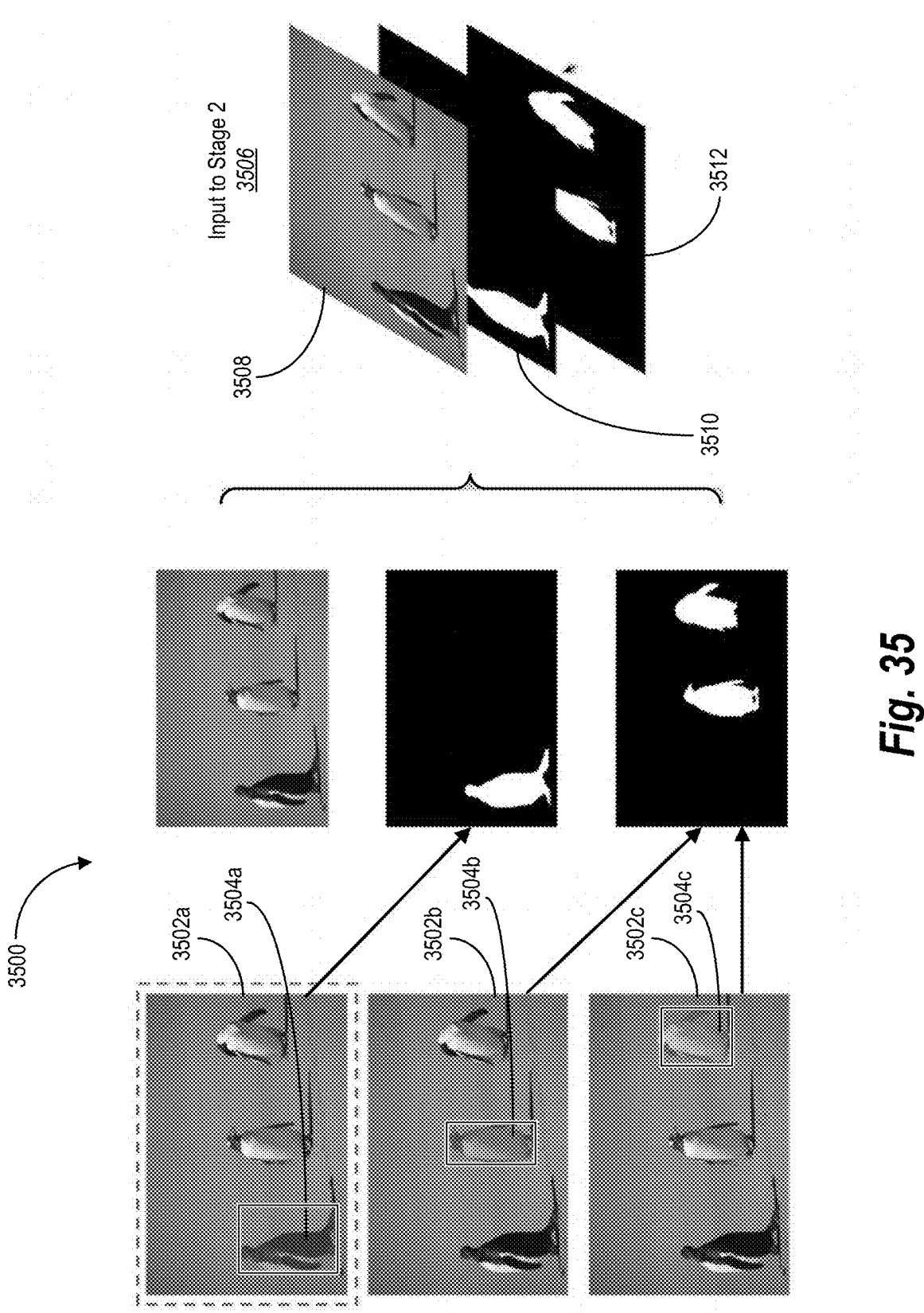
FIG. 35 illustrates an overview of an object awareness component of a shadow detection neural network in accordance with one or more embodiments.

FIG. 35 illustrates an overview of an object awareness component 3500 of a shadow detection neural network in accordance with one or more embodiments. In particular, FIG. 35 illustrates input image instances 3502*a*-3502*c* corresponding to each object detected within the digital image via the prior instance segmentation component. In particular, each input image instance corresponds to a different detected object and corresponds to an object mask and/or a bounding box generated for that digital image. For instance, the input image instance 3502*a* corresponds to the object 3504*a*, the input image instance 3502*b* corresponds to the object 3504*b*, and the input image instance 3502*c* corresponds to the object 3504*c*. Thus, the input image instances 3502*a*-3502*c* illustrate the separate object detections provided by the instance segmentation component of the shadow detection neural network.

In some embodiments, for each detected object, the scene-based image editing system 106 generates input for the second stage of the shadow detection neural network (i.e., the shadow prediction component). FIG. 35 illustrates the object awareness component 3500 generating input 3506 for the object 3504*a*. Indeed, as shown in FIG. 35, the object awareness component 3500 generates the input 3506 using the input image 3508, the object mask 3510 corresponding to the object 3504*a* (referred to as the object-aware channel) and a combined object mask 3512 corresponding to the objects 3504*b*-3504*c* (referred to as the object-discriminative channel). For instance, in some implementations, the object awareness component 3500 combines (e.g., concatenates) the input image 3508, the object mask 3510, and the combined object mask 3512. The object awareness component 3500 similarly generates second stage input for the other objects 3504*b*-3504*c* as well (e.g., utilizing their respective object mask and combined object mask representing the other objects along with the input image 3508).

In one or more embodiments, the scene-based image editing system 106 (e.g., via the object awareness component 3500 or some other component of the shadow detection neural network) generates the combined object mask 3512 using the union of separate object masks generated for the object 3504*b* and the object 3504*c*. In some instances, the object awareness component 3500 does not utilize the object-discriminative channel (e.g., the combined object mask 3512). Rather, the object awareness component 3500 generates the input 3506 using the input image 3508 and the object mask 3510. In some embodiments, however, using the object-discriminative channel provides better shadow prediction in the second stage of the shadow detection neural network.

Figure 36:
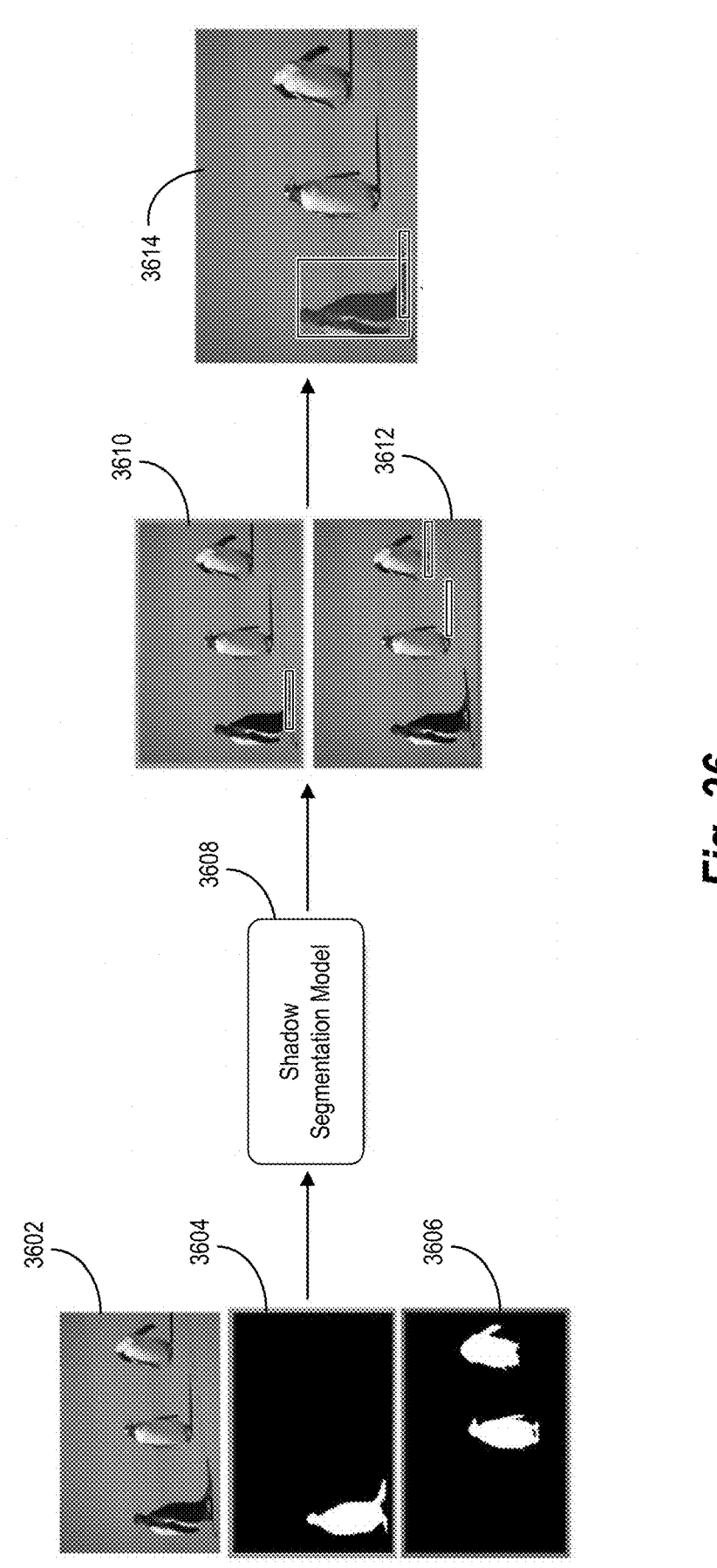
FIG. 36 illustrates an overview of a shadow prediction component of a shadow detection neural network in accordance with one or more embodiments.

FIG. 36 illustrates an overview of a shadow prediction component 3600 of a shadow detection neural network in accordance with one or more embodiments. As shown in FIG. 36, the shadow detection neural network provides, to the shadow prediction component 3600, input compiled by an object awareness component consisting of an input image 3602, an object mask 3604 for an object of interest, and a combined object mask 3606 for the other detected objects. The shadow prediction component 3600 utilizes a shadow segmentation model 3608 to generate a first shadow prediction 3610 for the object of interest and a second shadow prediction 3612 for the other detected objects. In one or more embodiments, the first shadow prediction 3610 and/or the second shadow prediction 3612 include shadow masks (e.g., where a shadow mask includes an object mask for a shadow) for the corresponding shadows. In other words, the shadow prediction component 3600 utilizes the shadow segmentation model 3608 to generate the first shadow prediction 3610 by generating a shadow mask for the shadow predicted for the object of interest. Likewise, the shadow prediction component 3600 utilizes the shadow segmentation model 3608 to generate the second shadow prediction 3612 by generating a combined shadow mask for the shadows predicted for the other detected objects.

Based on the outputs of the shadow segmentation model 3608, the shadow prediction component 3600 provides an object-shadow pair prediction 3614 for the object of interest. In other words, the shadow prediction component 3600 associates the object of interest with its shadow cast within the input image 3602. In one or more embodiments, the shadow prediction component 3600 similarly generates an object-shadow pair prediction for all other objects portrayed in the input image 3602. Thus, the shadow prediction component 3600 identifies shadows portrayed in a digital image and associates each shadow with its corresponding object.

In one or more embodiments, the shadow segmentation model 3608 utilized by the shadow prediction component 3600 includes a segmentation neural network. For instance, in some cases, the shadow segmentation model 3608 includes the detection-masking neural network 300 discussed above with reference to FIG. 3. As another example, in some implementations, the shadow segmentation model 3608 includes the DeepLabv3 semantic segmentation model described by Liang-Chieh Chen et al., *Rethinking Atrous Convolution for Semantic Image Segmentation*, arXiv: 1706.05587, 2017, or the DeepLab semantic segmentation model described by Liang-Chieh Chen et al., *Deeplab: Semantic Image Segmentation with Deep Convolutional Nets, Atrous Convolution, and Fully Connected CRFs*, arXiv:1606.00915, 2016, both of which are incorporated herein by reference in their entirety.

Figure 37:
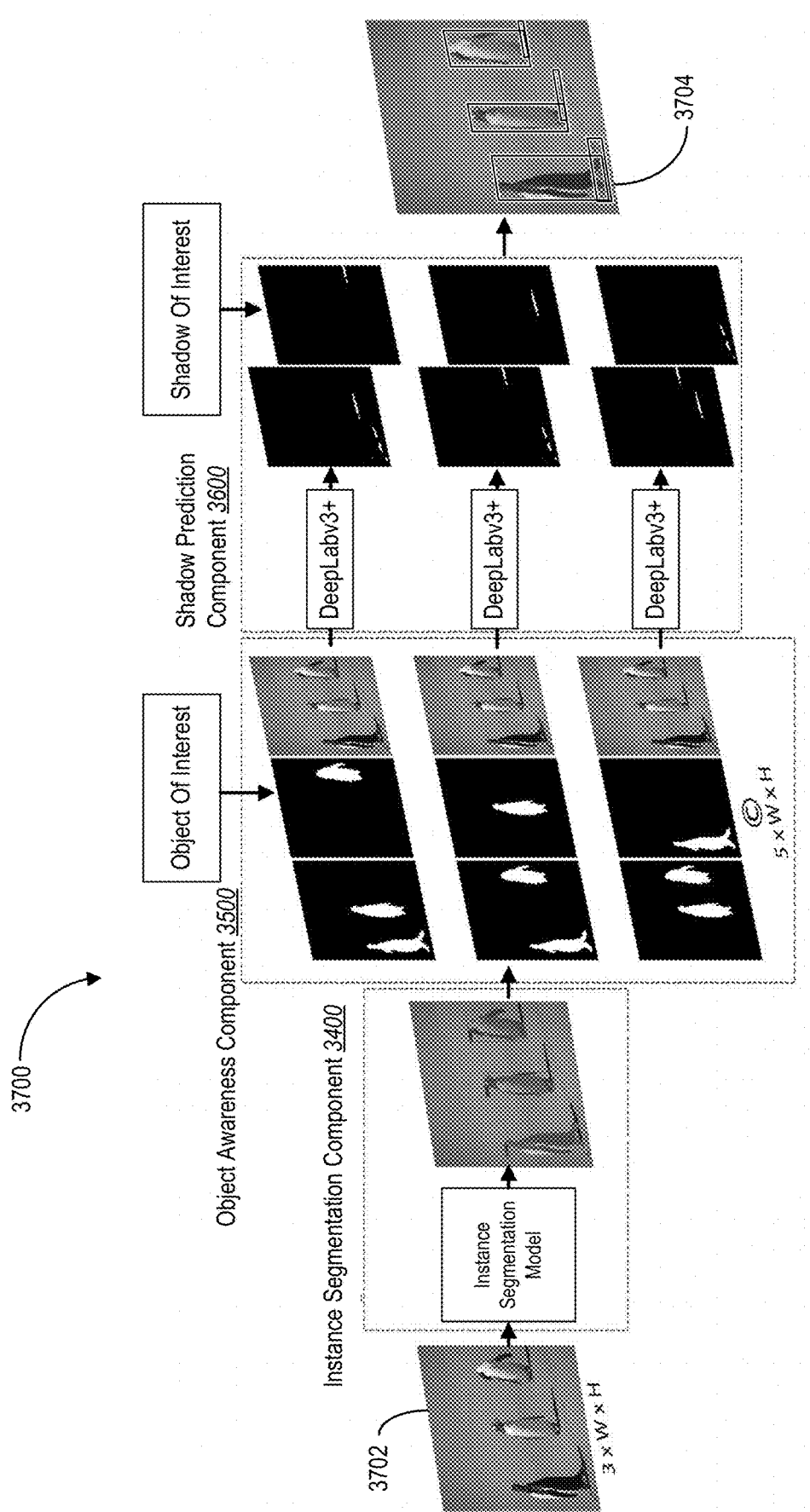
FIG. 37 illustrates an overview of the architecture of a shadow detection neural network in accordance with one or more embodiments.

FIG. 37 illustrates an overview of the architecture of a shadow detection neural network 3700 in accordance with one or more embodiments. In particular, FIG. 37 illustrates the shadow detection neural network 3700 consisting of the instance segmentation component 3400 discussed with reference to FIG. 34, the object awareness component 3500 discussed with reference to FIG. 35, and the shadow prediction component 3600 discussed with reference to FIG. 36. Further, FIG. 37 illustrates the shadow detection neural network 3700 generating object masks, shadow masks, and predictions with respect to each object portrayed in the input image 3702. Thus, the shadow detection neural network 3700 outputs a final prediction 3704 that associates each object portrayed in a digital image with its shadow. Accordingly, as shown in FIG. 37, the shadow detection neural network 3700 provides an end-to-end neural network framework that receives a digital image and outputs an association between objects and shadows depicted therein.

In some implementations, the shadow detection neural network 3700 determines that an object portrayed within a digital image does not have an associated shadow. Indeed, in some cases, upon analyzing the digital image utilizing its various components, the shadow detection neural network 3700 determines that there is not a shadow portrayed within the digital image that is associated with the object. In some cases, the scene-based image editing system 106 provides feedback indicating the lack of a shadow. For example, in some cases, upon determining that there are no shadows portrayed within a digital image (or that there is not a shadow associated with a particular object), the scene-based image editing system 106 provides a message for display or other feedback indicating the lack of shadows. In some instances, the scene-based image editing system 106 does not provide explicit feedback but does not auto-select or provide a suggestion to include a shadow within a selection of an object as discussed below with reference to FIGS. 39A-39C.

In some implementations, the scene-based image editing system 106 utilizes the second stage of the shadow detection neural network to determine shadows associated with objects portrayed in a digital image when the objects masks of the objects have already been generated. Indeed, FIG. 38 illustrates a diagram for using the second stage of the shadow detection neural network for determining shadows associated with objects portrayed in a digital image in accordance with one or more embodiments.

Figure 38:
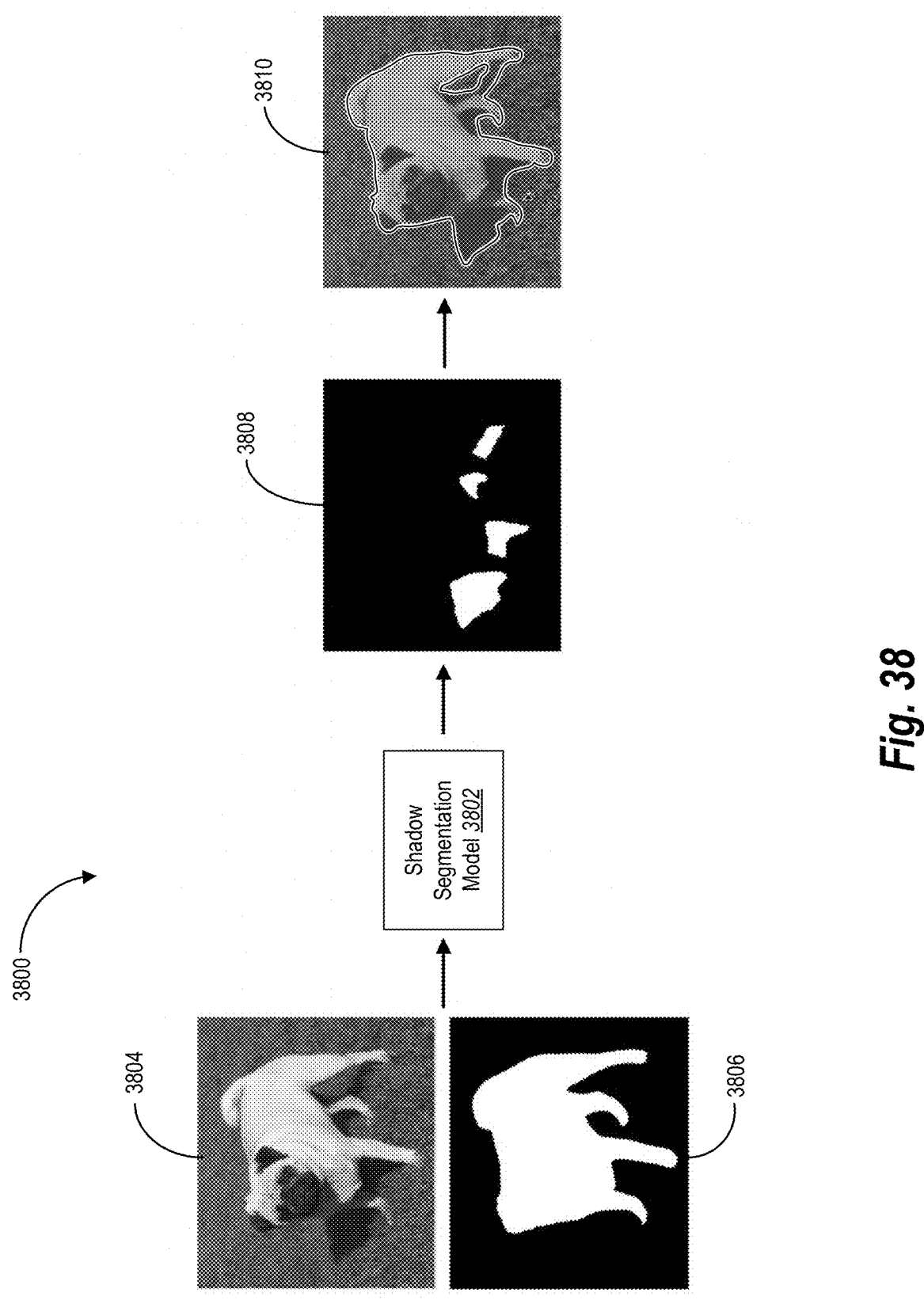
FIG. 38 illustrates a diagram for using the second stage of the shadow detection neural network for determining shadows associated with objects portrayed in a digital image in accordance with one or more embodiments.

As shown in FIG. 38, the scene-based image editing system 106 provides an input image 3804 to the second stage 3800 of a shadow detection neural network (i.e., a shadow prediction model 3802). Further, the scene-based image editing system 106 provides an object mask 3806 to the second stage 3800. The scene-based image editing system 106 utilizes the second stage 3800 of the shadow detection neural network to generate a shadow mask 3808 for the shadow of the object portrayed in the input image 3804, resulting in the association between the object and the shadow cast by the object within the input image 3804 (e.g., as illustrated in the visualization 3810).

By providing direct access to the second stage of the shadow detection neural network, the scene-based image editing system 106 provides flexibility in the shadow detection process. Indeed, in some cases, an object mask will already have been created for an object portrayed in a digital image. For instance, in some cases, the scene-based image editing system 106 implements a separate segmentation neural network to generate an object mask for a digital image as part of a separate workflow. Accordingly, the object mask for the object already exists, and the scene-based image editing system 106 leverages the previous work in determining the shadow for the object. Thus, the scene-based image editing system 106 further provides efficiency as it avoids duplicating work by accessing the shadow prediction model of the shadow detection neural network directly.

Figure 39B:
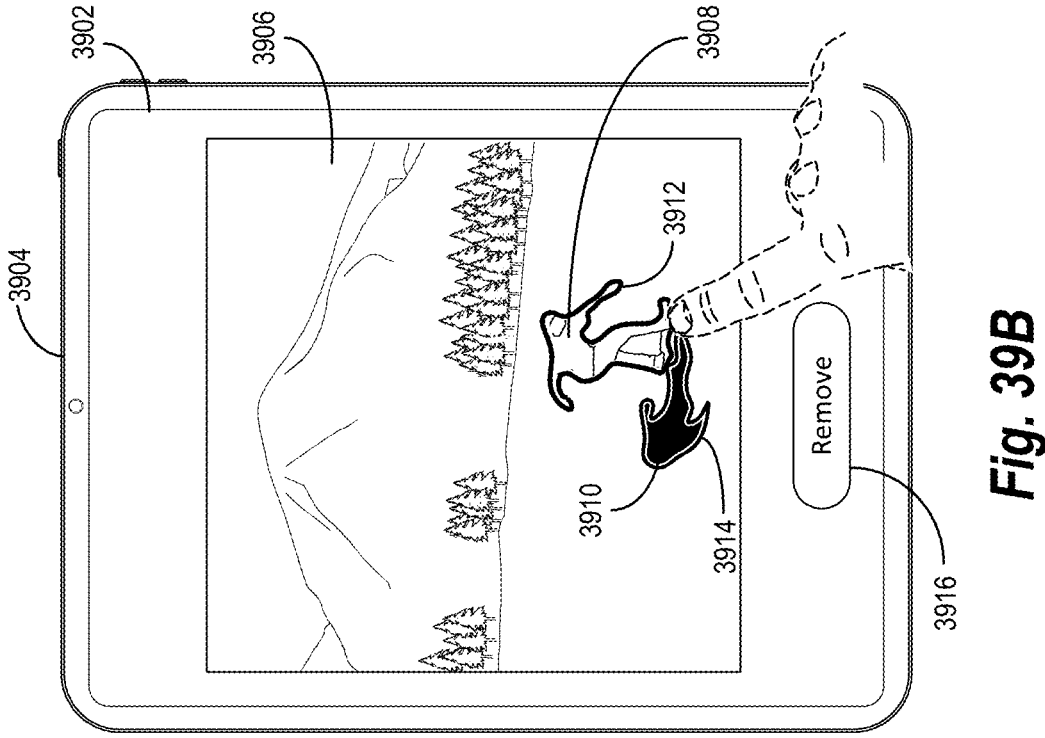
FIGS. 39A-39C illustrate a graphical user interface implemented by the scene-based image editing system to identify and remove shadows of objects portrayed in a digital image in accordance with one or more embodiments.
Figure 39A:
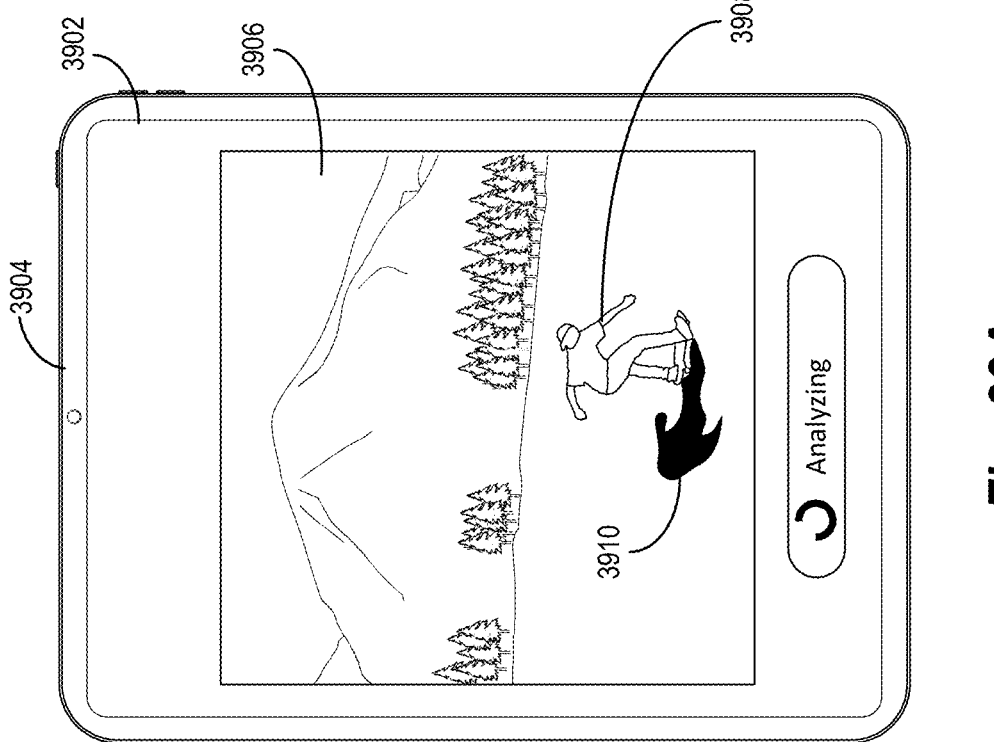
Figure 39C:
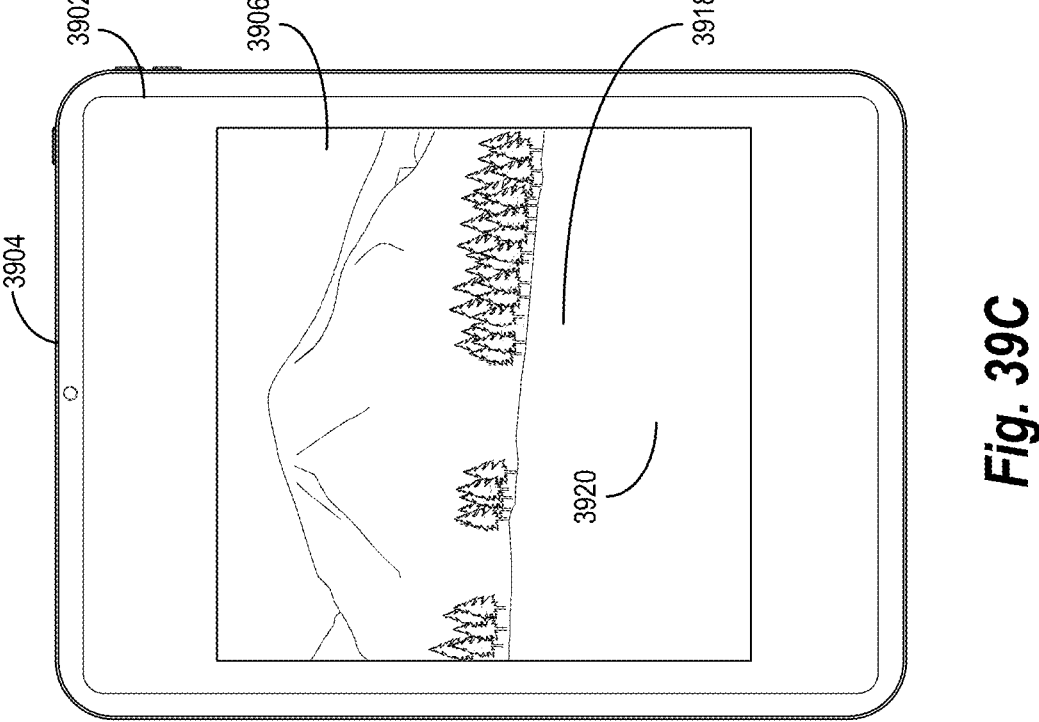

FIGS. 39A-39C illustrate a graphical user interface implemented by the scene-based image editing system 106 to identify and remove shadows of objects portrayed in a digital image in accordance with one or more embodiments. Indeed, as shown in FIG. 39A, the scene-based image editing system 106 provides, for display within a graphical user interface 3902 of a client device 3904, a digital image 3906 portraying an object 3908. As further shown, the object 3908 casts a shadow 3910 within the digital image 3906.

In one or more embodiments, upon receiving the digital image 3906, the scene-based image editing system 106 utilizes a shadow detection neural network to analyze the digital image 3906. In particular, the scene-based image editing system 106 utilizes the shadow detection neural network to identify the object 3908, identify the shadow 3910 cast by the object 3908, and further associate the shadow 3910 with the object 3908. As previously mentioned, in some implementations, the scene-based image editing system 106 further utilizes the shadow detection neural network to generate object masks for the object 3908 and the shadow 3910.

As previously discussed with reference to FIG. 26, in one or more embodiments, the scene-based image editing system 106 identifies shadows cast by objects within a digital image as part of a neural network pipeline for identifying distracting objects within the digital image. For instance, in some cases, the scene-based image editing system 106 utilizes a segmentation neural network to identify objects for a digital image, a distractor detection neural network to classify one or more of the objects as distracting objects, a shadow detection neural network to identify shadows and associate the shadows with their corresponding objects, and an inpainting neural network to generate content fills to replace objects (and their shadows) that are removed. In some cases, the scene-based image editing system 106 implements the neural network pipeline automatically in response to receiving a digital image.

Indeed, as shown in FIG. 39B, the scene-based image editing system 106 provides, for display within the graphical user interface 3902, a visual indication 3912 indicating a selection of the object 3908 for removal. As further shown, the scene-based image editing system 106 provides, for display, a visual indication 3914 indicating a selection of the shadow 3910 for removal. As suggested, in some cases, the scene-based image editing system 106 selects the object 3908 and the shadow 3910 for deletion automatically (e.g., upon determining the object 3908 is a distracting object). In some implementations, however, the scene-based image editing system 106 selects the object 3908 and/or the shadow 3910 in response to receiving one or more user interactions.

For instance, in some cases, the scene-based image editing system 106 receives a user selection of the object 3908 and automatically adds the shadow 3910 to the selection. In some implementations, the scene-based image editing system 106 receives a user selection of the object 3908 and provides a suggestion for display in the graphical user interface 3902, suggesting that the shadow 3910 be added to the selection. In response to receiving an additional user interaction, the scene-based image editing system 106 adds the shadow 3910.

As further shown in FIG. 39B, the scene-based image editing system 106 provides a remove option 3916 for display within the graphical user interface 3902. As indicated by FIG. 39C, upon receiving a selection of the remove option 3916, the scene-based image editing system 106 removes the object 3908 and the shadow 3910 from the digital image. As further shown, the scene-based image editing system 106 replaces the object 3908 with a content fill 3918 and replaces the shadow 3910 with a content fill 3920. In other words, the scene-based image editing system 106 reveals the content fill 3918 and the content fill 3920 upon removing the object 3908 and the shadow 3910, respectively.

Though FIGS. 39A-39C illustrates implementing shadow detection with respect to a delete operation, it should be noted that the scene-based image editing system 106 implements shadow detection for other operations (e.g., a move operation) in various embodiments. Further, thought FIGS. 39A-39C are discussed with respect to removing distracting objects from a digital image, the scene-based image editing system 106 implements shadow detection in the context of other features described herein. For instance, in some cases, the scene-based image editing system 106 implements shadow detection with respect to object-aware modifications where user interactions target objects directly. Thus, the scene-based image editing system 106 provides further advantages to object-aware modifications by segmenting objects and their shadows and generating corresponding content fills before receiving user interactions to modify the objects to allow for seamless interaction with digital images as if they were real scenes.

By identifying shadows cast by objects within digital images, the scene-based image editing system 106 provides improved flexibility when compared to conventional systems. Indeed, the scene-based image editing system 106 flexibly identifies objects within a digital image along with other aspects of those objects portrayed in the digital image (e.g., their shadows). Thus, the scene-based image editing system 106 provides a better image result when removing or moving objects as it accommodates these other aspects. This further leads to reduced user interaction with a graphical user interface as the scene-based image editing system 106 does not require user interactions for targeting the shadows of objects for movement or removal (e.g., user interactions to identify shadow pixels and/or tie the shadow pixels to the object).

In some implementations, the scene-based image editing system 106 implements one or more additional features to facilitate the modification of a digital image. In some embodiments, these features provide additional user-interface-based efficiency in that they reduce the amount of user interactions with a user interface typically required to perform some action in the context of image editing. In some instances, these features further aid in the deployment of the scene-based image editing system 106 on computing devices with limited screen space as they efficiently use the space available to aid in image modification without crowding the display with unnecessary visual elements.

In some cases, these additional features incorporate three-dimensional effects into the image editing process. For instance, in one or more embodiments, the scene-based image editing system 106 implements a perspective-aware object move operation when editing a digital image. In particular, the scene-based image editing system 106 moves an object within a digital image based on a three-dimensional perspective associated with the digital image. In some cases, the scene-based image editing system 106 further modifies the object (e.g., automatically) via perspective-based resizing based on moving the object. In other words, the scene-based image editing system 106 resizes the object as the object moves in accordance with the three-dimensional perspective of the digital image. FIGS. 40-45C illustrate the scene-based image editing system 106 implementing perspective-aware object move operations in accordance with one or more embodiments.

As mentioned above, in some implementations, full convolutional models suffer from slow growth of effective receptive field, especially at the early stage of the network. Accordingly, utilizing strided convolution within the encoder can generate invalid features inside the hole region, making the feature correction at decoding stage more challenging. Fast Fourier convolution (FFC) can assist early layers to achieve receptive field that covers an entire image. Conventional systems, however, have only utilized FFC at a bottleneck layer, which is computationally demanding. Moreover, the shallow bottleneck layer cannot capture global semantic features effectively. Accordingly, in one or more implementations the scene-based image editing system 106 replaces the convolutional block in the encoder with FFC for the encoder layers. FFC enables the encoder to propagate features at early stage and thus address the issue of generating invalid features inside the hole, which helps improve the results.

As further shown in FIG. 5, the cascaded modulation inpainting neural network 502 also includes the decoder 506. As shown, the decoder 506 includes a plurality of cascaded modulation layers 520*a*-520*n*. The cascaded modulation layers 520*a*-520*n* process input features (e.g., input global feature maps and input local feature maps) to generate new features (e.g., new global feature maps and new local feature maps). In particular, each of the cascaded modulation layers 520*a*-520*n* operate at a different scale/resolution. Thus, the first cascaded modulation layer 520*a* takes input features at a first resolution/scale and generates new features at a lower scale/higher resolution (e.g., via upsampling as part of one or more modulation operations). Similarly, additional cascaded modulation layers operate at further lower scales/higher resolutions until generating the inpainted digital image at an output scale/resolution (e.g., the lowest scale/highest resolution).

Moreover, each of the cascaded modulation layers include multiple modulation blocks. For example, with regard to FIG. 5 the first cascaded modulation layer 520*a* includes a global modulation block and a spatial modulation block. In particular, the cascaded modulation inpainting neural network 502 performs a global modulation with regard to input features of the global modulation block. Moreover, the cascaded modulation inpainting neural network 502 performs a spatial modulation with regard to input features of the spatial modulation block. By performing both a global modulation and spatial modulation within each cascaded modulation layer, the scene-based image editing system 106 refines global positions to generate more accurate inpainted digital images.

As illustrated, the cascaded modulation layers 520*a*-520*n* are cascaded in that the global modulation block feeds into the spatial modulation block. Specifically, the cascaded modulation inpainting neural network 502 performs the spatial modulation at the spatial modulation block based on features generated at the global modulation block. To illustrate, in one or more embodiments the cascaded modulation inpainting neural network 502 utilizes the global modulation block to generate an intermediate feature. The cascaded modulation inpainting neural network 502 further utilizes a convolutional layer (e.g., a 2-layer convolutional affine parameter network) to convert the intermediate feature to a spatial tensor. The cascaded modulation inpainting neural network 502 utilizes the spatial tensor to modulate the input features analyzed by the spatial modulation block.

For example, FIG. 6 provides additional detail regarding operation of global modulation blocks and spatial modulation blocks in accordance with one or more embodiments. Specifically, FIG. 6 illustrates a global modulation block 602 and a spatial modulation block 603. As shown in FIG. 6, the global modulation block 602 includes a first global modulation operation 604 and a second global modulation operation 606. Moreover, the spatial modulation block 603 includes a global modulation operation 608 and a spatial modulation operation 610.

For example, a modulation block (or modulation operation) includes a computer-implemented process for modulating (e.g., scaling or shifting) an input signal according to one or more conditions. To illustrate, modulation block includes amplifying certain features while counteracting/normalizing these amplifications to preserve operation within a generative model. Thus, for example, a modulation block (or modulation operation) includes a modulation layer, a convolutional layer, and a normalization layer in some cases. The modulation layer scales each input feature of the convolution, and the normalization removes the effect of scaling from the statistics of the convolution's output feature maps.

Indeed, because a modulation layer modifies feature statistics, a modulation block (or modulation operation) often includes one or more approaches for addressing these statistical changes. For example, in some instances, a modulation block (or modulation operation) includes a computer-implemented process that utilizes batch normalization or instance normalization to normalize a feature. In some embodiments, the modulation is achieved by scaling and shifting the normalized activation according to affine parameters predicted from input conditions. Similarly, some modulation procedures replace feature normalization with a demodulation process. Thus, in one or more embodiments, a modulation block (or modulation operation) includes a modulation layer, convolutional layer, and a demodulation layer. For example, in one or more embodiments, a modulation block (or modulation operation) includes the modulation approaches described by Tero Karras, Samuli Laine, Miika Aittala, Janne Hellsten, Jaakko Lehtinen, and Timo Aila in Analyzing and improving the image quality of StyleGAN, Proc. CVPR (2020) (hereinafter StyleGan2), which is incorporated by reference herein in its entirety. In some instances, a modulation block includes one or more modulation operations.

Moreover, in one or more embodiments, a global modulation block (or global modulation operation) includes a modulation block (or modulation operation) that modulates an input signal in a spatially-invariant manner. For example, in some embodiments, a global modulation block (or global modulation operation) performs a modulation according to global features of a digital image (e.g., that do not vary spatially across coordinates of a feature map or image). Thus, for example, a global modulation block includes a modulation block that modulates an input signal according to an image encoding (e.g., global feature code) generated by an encoder. In some implementations, a global modulation block includes multiple global modulation operations.

In one or more embodiments, a spatial modulation block (or spatial modulation operation) includes a modulation block (or modulation operation) that modulates an input signal in a spatially-varying manner (e.g., according to a spatially-varying feature map). In particular, in some embodiments, a spatial modulation block (or spatial modulation operation) utilizes a spatial tensor, to modulate an input signal in a spatially-varying manner. Thus, in one or more embodiments a global modulation block applies a global modulation where affine parameters are uniform across spatial coordinates, and a spatial modulation block applies a spatially-varying affine transformation that varies across spatial coordinates. In some embodiments, a spatial modulation block includes both a spatial modulation operation in combination with another modulation operation (e.g., a global modulation operation and a spatial modulation operation).

For instance, in some embodiments, a spatial modulation operation includes spatially-adaptive modulation as described by Taesung Park, Ming-Yu Liu, Ting-Chun Wang, and Jun-Yan Zhu in Semantic image synthesis with spatially-adaptive normalization, Proceedings of the IEEE Conference on Computer Vision and Pattern Recognition (2019), which is incorporated by reference herein in its entirety (hereinafter Taesung). In some embodiments, the spatial modulation operation utilizes a spatial modulation operation with a different architecture than Taesung, including a modulation-convolution-demodulation pipeline.

Thus, with regard to FIG. 6, the scene-based image editing system 106 utilizes a global modulation block 602. As shown, the global modulation block 602 includes a first global modulation operation 604 and a second global modulation operation 606. Specifically, the first global modulation operation 604 processes a global feature map 612. For example, the global feature map 612 includes a feature vector generated by the cascaded modulation inpainting neural network reflecting global features (e.g., high-level features or features corresponding to the whole digital image). Thus, for example, the global feature map 612 includes a feature vector reflecting global features generated from a previous global modulation block of a cascaded decoder layer. In some instances, the global feature map 612 also includes a feature vector corresponding to the encoded feature vectors generated by the encoder (e.g., at a first decoder layer the scene-based image editing system 106 utilizes an encoded feature vector, style code, global feature code, constant, noise vector, or other feature vector as input in various implementations).

As shown, the first global modulation operation 604 includes a modulation layer 604a, an upsampling layer 604b, a convolutional layer 604c, and a normalization layer 604d. In particular, the scene-based image editing system 106 utilizes the modulation layer 604a to perform a global modulation of the global feature map 612 based on a global feature code 614 (e.g., the global feature code 516). Specifically, the scene-based image editing system 106 applies a neural network layer (i.e., a fully connected layer) to the global feature code 614 to generate a global feature vector 616. The scene-based image editing system 106 then modulates the global feature map 612 utilizing the global feature vector 616.

In addition, the scene-based image editing system 106 applies the upsampling layer 604b (e.g., to modify the resolution scale). Further, the scene-based image editing system 106 applies the convolutional layer 604c. In addition, the scene-based image editing system 106 applies the normalization layer 604d to complete the first global modulation operation 604. As shown, the first global modulation operation 604 generates a global intermediate feature 618. In particular, in one or more embodiments, the scene-based image editing system 106 generates the global intermediate feature 618 by combining (e.g., concatenating) the output of the first global modulation operation 604 with an encoded feature vector 620 (e.g., from a convolutional layer of the encoder having a matching scale/resolution).

As illustrated, the scene-based image editing system 106 also utilizes a second global modulation operation 606. In particular, the scene-based image editing system 106 applies the second global modulation operation 606 to the global intermediate feature 618 to generate a new global feature map 622. Specifically, the scene-based image editing system 106 applies a global modulation layer 606a to the global intermediate feature 618 (e.g., conditioned on the global feature vector 616). Moreover, the scene-based image editing system 106 applies a convolutional layer 606b and a normalization layer 606c to generate the new global feature map 622. As shown, in some embodiments, the scene-based image editing system 106 applies a spatial bias in generating the new global feature map 622.

Furthermore, as shown in FIG. 6, the scene-based image editing system 106 utilizes a spatial modulation block 603. In particular, the spatial modulation block 603 includes a global modulation operation 608 and a spatial modulation operation 610. The global modulation operation 608 processes a local feature map 624. For example, the local feature map 624 includes a feature vector generated by the cascaded modulation inpainting neural network reflecting local features (e.g., low-level, specific, or spatially variant features). Thus, for example, the local feature map 624 includes a feature vector reflecting local features generated from a previous spatial modulation block of a cascaded decoder layer. In some cases, the global feature map 612 also includes a feature vector corresponding to the encoded feature vectors generated by the encoder (e.g., at a first decoder layer, the scene-based image editing system 106 utilizes an encoded feature vector, style code, noise vector or other feature vector in various implementations).

As shown, the scene-based image editing system 106 utilizes the global modulation operation 608 to generate a local intermediate feature 626 from the local feature map 624. Specifically, the scene-based image editing system 106 applies a modulation layer 608*a*, an upsampling layer 608*b*, a convolutional layer 608*c*, and a normalization layer 608*d*. Moreover, in some embodiments, the scene-based image editing system 106 applies spatial bias and broadcast noise to the output of the global modulation operation 608 to generate the local intermediate feature 626.

As illustrated in FIG. 6, the scene-based image editing system 106 utilizes the spatial modulation operation 610 to generate a new local feature map 628. Indeed, the spatial modulation operation 610 modulates the local intermediate feature 626 based on the global intermediate feature 618. Specifically, the scene-based image editing system 106 generates a spatial tensor 630 from the global intermediate feature 618. For example, the scene-based image editing system 106 applies a convolutional affine parameter network to generate the spatial tensor 630. In particular, the scene-based image editing system 106 applies a convolutional affine parameter network to generate an intermediate spatial tensor. The scene-based image editing system 106 combines the intermediate spatial tensor with the global feature vector 616 to generate the spatial tensor 630. The scene-based image editing system 106 utilizes the spatial tensor 630 to modulate the local intermediate feature 626 (utilizing the spatial modulation layer 610*a*) and generated a modulated tensor.

As shown, the scene-based image editing system 106 also applies a convolutional layer 610*b* to the modulated tensor. In particular, the convolutional layer 610*b* generates a convolved feature representation from the modulated tensor. In addition, the scene-based image editing system 106 applies a normalization layer 610*c* to convolved feature representation to generate the new local feature map 628.

Although illustrated as a normalization layer 610*c*, in one or more embodiments, the scene-based image editing system 106 applies a demodulation layer. For example, the scene-based image editing system 106 applies a modulation-convolution-demodulation pipeline (e.g., general normalization rather than instance normalization). In some cases, this approach avoids potential artifacts (e.g., water droplet artifacts) caused by instance normalization. Indeed, a demodulation/normalization layer includes a layer that scales each output feature map by a uniform demodulation/normalization value (e.g., by a uniform standard deviation instead of instance normalization that utilizes data-dependent constant normalization based on the contents of the feature maps).

As shown in FIG. 6, in some embodiments, the scene-based image editing system 106 also applies a shifting tensor 632 and broadcast noise to the output of the spatial modulation operation 610. For example, the spatial modulation operation 610 generates a normalized/demodulated feature. The scene-based image editing system 106 also generates the shifting tensor 632 by applying the affine parameter network to the global intermediate feature 618. The scene-based image editing system 106 combines the normalized/demodulated feature, the shifting tensor 632, and/or the broadcast noise to generate the new local feature map 628.

In one or more embodiments, upon generating the new global feature map 622 and the new local feature map 628, the scene-based image editing system 106 proceeds to the next cascaded modulation layer in the decoder. For example, the scene-based image editing system 106 utilizes the new global feature map 622 and the new local feature map 628 as input features to an additional cascaded modulation layer at a different scale/resolution. The scene-based image editing system 106 further utilizes the additional cascaded modulation layer to generate additional feature maps (e.g., utilizing an additional global modulation block and an additional spatial modulation block). In some cases, the scene-based image editing system 106 iteratively processes feature maps utilizing cascaded modulation layers until coming to a final scale/resolution to generate an inpainted digital image.

Although FIG. 6 illustrates the global modulation block 602 and the spatial modulation block 603, in some embodiments, the scene-based image editing system 106 utilizes a global modulation block followed by another global modulation block. For example, the scene-based image editing system 106 replaces the spatial modulation block 603 with an additional global modulation block. In such an embodiment, the scene-based image editing system 106 replaces APN (and spatial tensor) and corresponding spatial modulation illustrated in FIG. 6 with a skip connection. For example, the scene-based image editing system 106 utilizes the global intermediate feature to perform a global modulation with regard to the local intermediate vector. Thus, in some cases, the scene-based image editing system 106 utilizes a first global modulation block and a second global modulation block.

As mentioned, the decoder can also be described in terms of variables and equations to illustrate operation of the cascaded modulation inpainting neural network. For example, as discussed, the decoder stacks a sequence of cascaded modulation blocks to upsample the input feature map $$F_e^{(L)}.$$

Each cascaded modulation block takes the global code g as input to modulate the feature according to the global representation of the partial image. Moreover, in some cases, the scene-based image editing system 106 provides mechanisms to correct local error after predicting the global structure.

In particular, in some embodiments, the scene-based image editing system 106 utilizes a cascaded modulation block to address the challenge of generating coherent features both globally and locally. At a high level, the scene-based image editing system 106 follows the following approach: i) decomposition of global and local features to separate local details from the global structure, ii) a cascade of global and spatial modulation that predicts local details from global structures. In one or more implementations, the scene-based image editing system 106 utilizes spatial modulations generated from the global code for better predictions (e.g., and discards instance normalization to make the design compatible with StyleGAN2).

Specifically, the cascaded modulation takes the global and local feature $$F_g^{(i)} \text{ and } F_l^{(i)}$$

US 12,646,188 B2

85                                                          86 from previous scale and the global code g as input and produces the new global and local features $$F_g^{(i+1)} \text{ and } F_l^{(i+1)}$$                     5 at next scale/resolution. To produce the new global code $$F_g^{(i+1)} \text{ and } F_g^{(i)},$$

the scene-based image editing system 106 utilizes a global code modulation stage that includes a modulation-convolution-demodulation procedure, which generates an upsampled feature X.

Due to the limited expressive power of the global vector g on representing 2-d visual details, and the inconsistent features inside and outside the hole, the global modulation may generate distorted features inconsistent with the context. To compensate, in some cases, the scene-based image editing system 106 utilizes a spatial modulation that generates more accurate features. Specifically, the spatial modulation takes X as the spatial code and g as the global code to modulate the input local feature $$F_l^{(i)}$$

in a spatially adaptive fashion.

Moreover, the scene-based image editing system 106 utilizes a unique spatial modulation-demodulation mechanism to avoid potential "water droplet" artifacts caused by instance normalization in conventional systems. As shown, the spatial modulation follows a modulation-convolution-demodulation pipeline.

In particular, for spatial modulation, the scene-based image editing system 106 generates a spatial tensor $A_0$=APN (Y) from feature X by a 2-layer convolutional affine parameter network (APN). Meanwhile, the scene-based image editing system 106 generates a global vector $\alpha$=fc(g) from global gode g with a fully connected layer (fc) to capture global context. The scene-based image editing system 106 generates a final spatial tensor $A=A_0+\alpha$ as the broadcast summation of $A_0$ and $\alpha$ for scaling intermediate feature Y of the block with element-wise product $\odot$:

$$\bar{Y} = Y \odot A$$

Moreover, for convolution, the modulated tensor $\bar{Y}$ is convolved with a 3×3 learnable kernel K, resulting in:

$$\hat{Y} = \bar{Y} * K$$

For spatially-aware demodulation, the scene-based image editing system 106 applies a demodularization step to compute the normalized output $\tilde{Y}$. Specifically, the scene-based image editing system 106 assumes that the input features Y are independent random variables with unit variance and after the modulation, the expected variance of the output is not changed, i.e., $\mathbb{E}_{y \in \bar{Y}}[Var(y)]=1$. Accordingly, this gives the demodulation computation:

$$\tilde{Y} = \hat{Y} \odot D,$$

where $D=1/\sqrt{K^2 \odot \mathbb{E}_{a \in A}[a^2]}$ is the demodulation coefficient. In some cases, the scene-based image editing system 106 implements the foregoing equation with standard tensor operations.

In one or more implementations, the scene-based image editing system 106 also adds spatial bias and broadcast noise. For example, the scene-based image editing system 106 adds the normalized feature $\tilde{Y}$ to a shifting tensor B=APN(X) produced by another affine parameter network (APN) from feature X along with the broadcast noise n to product the new local feature $$F_l^{(i+1)}:$$

$$F_l^{(i+1)} = \tilde{Y} + B + n$$

Thus, in one or more embodiments, to generate a content fill having replacement pixels for a digital image having a replacement region, the scene-based image editing system 106 utilizes an encoder of a content-aware hole-filling machine learning model (e.g., a cascaded modulation inpainting neural network) to generate an encoded feature map from the digital image. The scene-based image editing system 106 further utilizes a decoder of the content-aware hole-filling machine learning model to generate the content fill for the replacement region. In particular, in some embodiments, the scene-based image editing system 106 utilizes a local feature map and α global feature map from one or more decoder layers of the content-aware hole-filling machine learning model in generating the content fill for the replacement region of the digital image.

Figure 7:
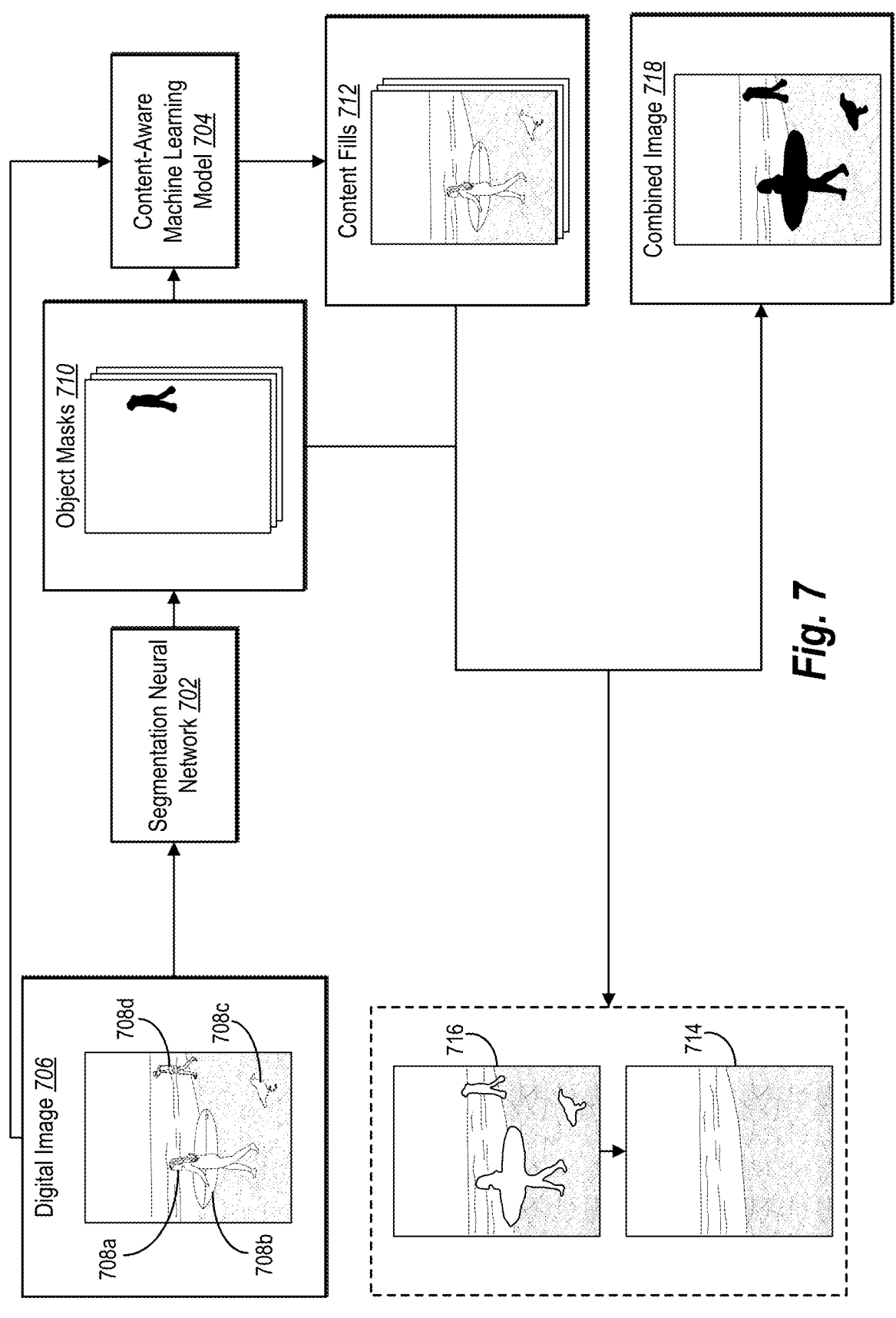
FIG. 7 illustrates a diagram for generating object masks and content fills to facilitate object-aware modifications to a digital image in accordance with one or more embodiments.

As discussed above with reference to FIGS. 3-6, in one or more embodiments, the scene-based image editing system 106 utilizes a segmentation neural network to generate object masks for objects portrayed in a digital image and α content-aware hole-filling machine learning model to generate content fills for those objects (e.g., for the object masks generated for the objects). As further mentioned, in some embodiments, the scene-based image editing system 106 generates the object mask(s) and the content fill(s) in anticipation of one or more modifications to the digital image before receiving user input for such modifications. For example, in one or more implementations, upon opening, accessing, or displaying the digital image 706, the scene-based image editing system 106 generates the object mask(s) and the content fill(s) automatically (e.g., without user input to do so). Thus, in some implementations the scene-based image editing system 106 facilitates object-aware modifications of digital images. FIG. 7 illustrates a diagram for generating object masks and content fills to facilitate object-aware modifications to a digital image in accordance with one or more embodiments.

In one or more embodiments, an object-aware modification includes an editing operation that targets an identified object in a digital image. In particular, in some embodiments, an object-aware modification includes an editing operation that targets an object that has been previously segmented. For instance, as discussed, the scene-based image editing system 106 generates a mask for an object portrayed in a digital image before receiving user input for modifying the object in some implementations. Accordingly, upon user selection of the object (e.g., a user selection of at least some of the pixels portraying the object), the scene-based image editing system 106 determines to target modifications to the entire object rather than requiring that the user specifically designate each pixel to be edited. Thus, in some cases, an object-aware modification includes a modification that targets an object by managing all the pixels portraying the object as part of a cohesive unit rather than individual elements. For instance, in some implementations an object-aware modification includes, but is not limited to, a move operation or a delete operation.

As shown in FIG. 7, the scene-based image editing system 106 utilizes a segmentation neural network 702 and a content-aware hole-filling machine learning model 704 to analyze/process a digital image 706. The digital image 706 portrays a plurality of objects 708a-708d against a background. Accordingly, in one or more embodiments, the scene-based image editing system 106 utilizes the segmentation neural network 702 to identify the objects 708a-708d within the digital image.

In one or more embodiments, the scene-based image editing system 106 utilizes the segmentation neural network 702 and the content-aware hole-filling machine learning model 704 to analyze the digital image 706 in anticipation of receiving user input for modifications of the digital image 706. Indeed, in some instances, the scene-based image editing system 106 analyzes the digital image 706 before receiving user input for such modifications. For instance, in some embodiments, the scene-based image editing system 106 analyzes the digital image 706 automatically in response to receiving or otherwise accessing the digital image 706. In some implementations, the scene-based image editing system 106 analyzes the digital image in response to a general user input to initiate pre-processing in anticipation of subsequent modification.

As shown in FIG. 7, the scene-based image editing system 106 utilizes the segmentation neural network 702 to generate object masks 710 for the objects 708a-708d portrayed in the digital image 706. In particular, in some embodiments, the scene-based image editing system 106 utilizes the segmentation neural network 702 to generate a separate object mask for each portrayed object.

As further shown in FIG. 7, the scene-based image editing system 106 utilizes the content-aware hole-filling machine learning model 704 to generate content fills 712 for the objects 708a-708d. In particular, in some embodiments, the scene-based image editing system 106 utilizes the content-aware hole-filling machine learning model 704 to generate a separate content fill for each portrayed object. As illustrated, the scene-based image editing system 106 generates the content fills 712 using the object masks 710. For instance, in one or more embodiments, the scene-based image editing system 106 utilizes the object masks 710 generated via the segmentation neural network 702 as indicators of replacement regions to be replaced using the content fills 712 generated by the content-aware hole-filling machine learning model 704. In some instances, the scene-based image editing system 106 utilizes the object masks 710 to filter out the objects from the digital image 706, which results in remaining holes in the digital image 706 to be filled by the content fills content fills 712.

As shown in FIG. 7, the scene-based image editing system 106 utilizes the object masks 710 and the content fills 712 to generate a completed background 714. In one or more embodiments, a completed background image includes a set of background pixels having objects replaced with content fills. In particular, a completed background includes the background of a digital image having the objects portrayed within the digital image replaced with corresponding content fills. In one or more implementations, a completed background comprises generating a content fill for each object in the image. Thus, the completed background may comprise various levels of completion when objects are in front of each other such that the background for a first object comprises part of a second object and the background of the second object comprises a semantic area or the furthest element in the image.

Indeed, FIG. 7 illustrates the background 716 of the digital image 706 with holes 718a-718d where the objects 708a-708d were portrayed. For instance, in some cases, the scene-based image editing system 106 filters out the objects 708a-708d using the object masks 710, causing the holes 718a-718d to remain. Further, the scene-based image editing system 106 utilizes the content fills 712 to fill in the holes 718a-718d, resulting in the completed background 714.

In other implementations, the scene-based image editing system 106 utilizes the object masks 710 as indicators of replacement regions in the digital image 706. In particular, the scene-based image editing system 106 utilizes the object masks 710 as indicators of potential replacement regions that may result from receiving user input to modify the digital image 706 via moving/removing one or more of the objects 708a-708d. Accordingly, the scene-based image editing system 106 utilizes the content fills 712 to replace pixels indicated by the object masks 710.

Though FIG. 7 indicates generating a separate completed background, it should be understood that, in some implementations, the scene-based image editing system 106 creates the completed background 714 as part of the digital image 706. For instance, in one or more embodiments, the scene-based image editing system 106 positions the content fills 712 behind their corresponding object (e.g., as a separate image layer) in the digital image 706. Further, in one or more embodiments, the scene-based image editing system 106 positions the object masks 710 behind their corresponding object (e.g., as a separate layer). In some implementations, the scene-based image editing system 106 places the content fills 712 behind the object masks 710.

Further, in some implementations, the scene-based image editing system 106 generates multiple filled-in backgrounds (e.g., semi-completed backgrounds) for a digital image. For instance, in some cases, where a digital image portrays a plurality of objects, the scene-based image editing system 106 generates a filled-in background for each object from the plurality of objects. To illustrate, the scene-based image editing system 106 generates a filled-in background for an object by generating a content fill for that object while treating the other objects of the digital image as part of the background. Thus, in some instances, the content fill includes portions of other objects positioned behind the object within the digital image.

Thus, in one or more embodiments, the scene-based image editing system 106 generates a combined image 718 as indicated in FIG. 7. Indeed, the scene-based image editing system 106 generates the combined image having the digital image 706, the object masks 710, and the content fills 712 as separate layers. Though, FIG. 7 shows the object masks 710 on top of the objects 708*a*-708*d* within the combined image 718, it should be understood that the scene-based image editing system 106 places the object masks 710 as well as the content fills 712 behind the objects 708*a*-708*d* in various implementations. Accordingly, the scene-based image editing system 106 presents the combined image 718 for display within a graphical user interface so that the object masks 710 and the content fills 712 are hidden from view until user interactions that trigger display of those components is received.

Further, though FIG. 7 shows the combined image 718 as separate from the digital image 706, it should be understood that the combined image 718 represents modifications to the digital image 706 in some implementations. In other words, in some embodiments, to generate the combined image 718 the scene-based image editing system 106 modifies the digital image 706 by adding additional layers composed of the object masks 710 and the content fills 712.

In one or more embodiments, the scene-based image editing system 106 utilizes the combined image 718 (e.g., the digital image 706, the object masks 710, and the content fills 712) to facilitate various object-aware modifications with respect to the digital image 706. In particular, the scene-based image editing system 106 utilizes the combined image 718 to implement an efficient graphical user interface that facilitates flexible object-aware modifications. FIGS. 8A-8D illustrate a graphical user interface implemented by the scene-based image editing system 106 to facilitate a move operation in accordance with one or more embodiments.

Figures 8A, 8B:
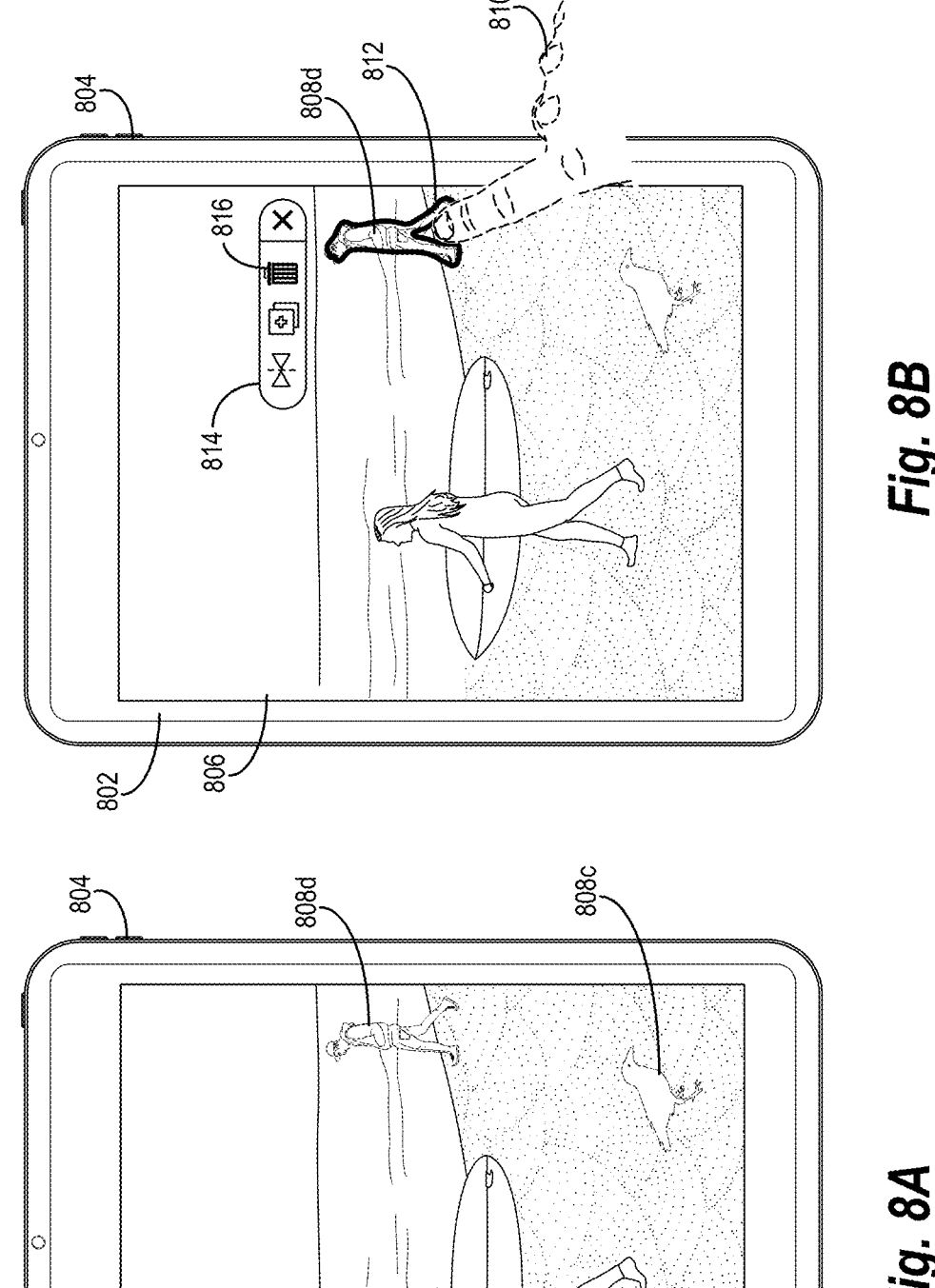
FIGS. 8A-8D illustrate a graphical user interface implemented by the scene-based image editing system to facilitate a move operation in accordance with one or more embodiments.

Indeed, as shown in FIG. 8A, the scene-based image editing system 106 provides a graphical user interface 802 for display on a client device 804, such as a mobile device. Further, the scene-based image editing system 106 provides a digital image 806 for display with the graphical user interface.

It should be noted that the graphical user interface 802 of FIG. 8A is minimalistic in style. In particular, the graphical user interface 802 does not include a significant number of menus, options, or other visual elements aside from the digital image 806. Though the graphical user interface 802 of FIG. 8A displays no menus, options, or other visual elements aside from the digital image 806, it should be understood that the graphical user interface 802 displays at least some menus, options, or other visual elements in various embodiments—at least when the digital image 806 is initially displayed.

As further shown in FIG. 8A, the digital image 806 portrays a plurality of objects 808*a*-808*d*. In one or more embodiments, the scene-based image editing system 106 pre-processes the digital image 806 before receiving user input for the move operation. In particular, in some embodiments, the scene-based image editing system 106 utilizes a segmentation neural network to detect and generate masks for the plurality of objects 808*a*-808*d* and/or utilizes a content-aware hole-filling machine learning model to generate content fills that correspond to the objects 808*a*-808*d*. Furthermore, in one or more implementations, the scene-based image editing system 106 generates the object masks, content fills, and a combined image upon loading, accessing, or displaying the digital image 806, and without, user input other than to open/display the digital image 806.

As shown in FIG. 8B, the scene-based image editing system 106 detects a user interaction with the object 808*d* via the graphical user interface 802. In particular, FIG. 8B illustrates the scene-based image editing system 106 detecting a user interaction executed by a finger (part of a hand 810) of a user (e.g., a touch interaction), though user interactions are executed by other instruments (e.g., stylus or pointer controlled by a mouse or track pad) in various embodiments. In one or more embodiments, the scene-based image editing system 106 determines that, based on the user interaction, the object 808*d* has been selected for modification.

The scene-based image editing system 106 detects the user interaction for selecting the object 808*d* via various operations in various embodiments. For instance, in some cases, the scene-based image editing system 106 detects the selection via a single tap (or click) on the object 808*d*. In some implementations, the scene-based image editing system 106 detects the selection of the object 808*d* via a double tap (or double click) or a press and hold operation. Thus, in some instances, the scene-based image editing system 106 utilizes the second click or the hold operation to confirm the user selection of the object 808*d*.

In some cases, the scene-based image editing system 106 utilizes various interactions to differentiate between a single object select or a multi-object select. For instance, in some cases, the scene-based image editing system 106 determines that a single tap is for selecting a single object and α double tap is for selecting multiple objects. To illustrate, in some cases, upon receiving a first tap on an object, the scene-based image editing system 106 selects the object. Further, upon receiving a second tap on the object, the scene-based image editing system 106 selects one or more additional objects. For instance, in some implementations, the scene-based image editing system 106 selects one or more additional object having the same or a similar classification (e.g., selecting other people portrayed in an image when the first tap interacted with a person in the image). In one or more embodiments, the scene-based image editing system 106 recognizes the second tap as an interaction for selecting multiple objects if the second tap is received within a threshold time period after receiving the first tap.

In some embodiments, the scene-based image editing system 106 recognizes other user interactions for selecting multiple objects within a digital image. For instance, in some implementations, the scene-based image editing system 106 receives a dragging motion across the display of a digital image and selects all object captured within the range of the dragging motion. To illustrate, in some cases, the scene-based image editing system 106 draws a box that grows with the dragging motion and selects all objects that falls within the box. In some cases, the scene-based image editing system 106 draws a line that follows the path of the dragging motion and selects all objects intercepted by the line.

In some implementations, the scene-based image editing system 106 further allows for user interactions to select distinct portions of an object. To illustrate, in some cases, upon receiving a first tap on an object, the scene-based image editing system 106 selects the object. Further, upon receiving a second tap on the object, the scene-based image editing system 106 selects a particular portion of the object (e.g., a limb or torso of a person or a component of a vehicle). In some cases, the scene-based image editing system 106 selects the portion of the object touched by the second tap. In some cases, the scene-based image editing system 106 enters into a "sub object" mode upon receiving the second tap and utilizes additional user interactions for selecting particular portions of the object.

Returning to FIG. 8B, as shown, based on detecting the user interaction for selecting the object 808d, the scene-based image editing system 106 provides a visual indication 812 in association with the object 808d. Indeed, in one or more embodiments, the scene-based image editing system 106 detects the user interaction with a portion of the object 808d—e.g., with a subset of the pixels that portray the object—and determines that the user interaction targets the object 808d as a whole (rather than the specific pixels with which the user interacted). For instance, in some embodiments, the scene-based image editing system 106 utilizes the pre-generated object mask that corresponds to the object 808d to determine whether the user interaction targets the object 808d or some other portion of the digital image 806. For example, in some cases, upon detecting that the user interacts with an area inside the object mask that corresponds to the object 808d, the scene-based image editing system 106 determines that the user interaction targets the object 808d as a whole. Thus, the scene-based image editing system 106 provides the visual indication 812 in association with the object 808d as a whole.

In some cases, the scene-based image editing system 106 utilizes the visual indication 812 to indicate, via the graphical user interface 802, that the selection of the object 808d has been registered. In some implementations, the scene-based image editing system 106 utilizes the visual indication 812 to represent the pre-generated object mask that corresponds to the object 808d. Indeed, in one or more embodiments, in response to detecting the user interaction with the object 808d, the scene-based image editing system 106 surfaces the corresponding object mask. For instance, in some cases, the scene-based image editing system 106 surfaces the object mask in preparation for a modification to the object 808d and/or to indicate that the object mask has already been generated and is available for use. In one or more embodiments, rather than using the visual indication 812 to represent the surfacing of the object mask, the scene-based image editing system 106 displays the object mask itself via the graphical user interface 802.

Additionally, as the scene-based image editing system 106 generated the object mask for the object 808d prior to receiving the user input to select the object 808d, the scene-based image editing system 106 surfaces the visual indication 812 without latency or delay associated with conventional systems. In other words, the scene-based image editing system 106 surfaces the visual indication 812 without any delay associated with generating an object mask.

As further illustrated, based on detecting the user interaction for selecting the object 808d, the scene-based image editing system 106 provides an option menu 814 for display via the graphical user interface 802. The option menu 814 shown in FIG. 8B provides a plurality of options, though the option menu includes various numbers of options in various embodiments. For instance, in some implementations, the option menu 814 includes one or more curated options, such as options determined to be popular or used with the most frequency. For example, as shown in FIG. 8B, the option menu 814 includes an option 816 to delete the object 808d.

Thus, in one or more embodiments, the scene-based image editing system 106 provides modification options for display via the graphical user interface 802 based on the context of a user interaction. Indeed, as just discussed, the scene-based image editing system 106 provides an option menu that provides options for interacting with (e.g., modifying) a selected object. In doing so, the scene-based image editing system 106 minimizes the screen clutter that is typical under many conventional systems by withholding options or menus for display until it is determined that those options or menus would be useful in the current context in which the user is interacting with the digital image. Thus, the graphical user interface 802 used by the scene-based image editing system 106 allows for more flexible implementation on computing devices with relatively limited screen space, such as smart phones or tablet devices.

Figures 8C, 8D:
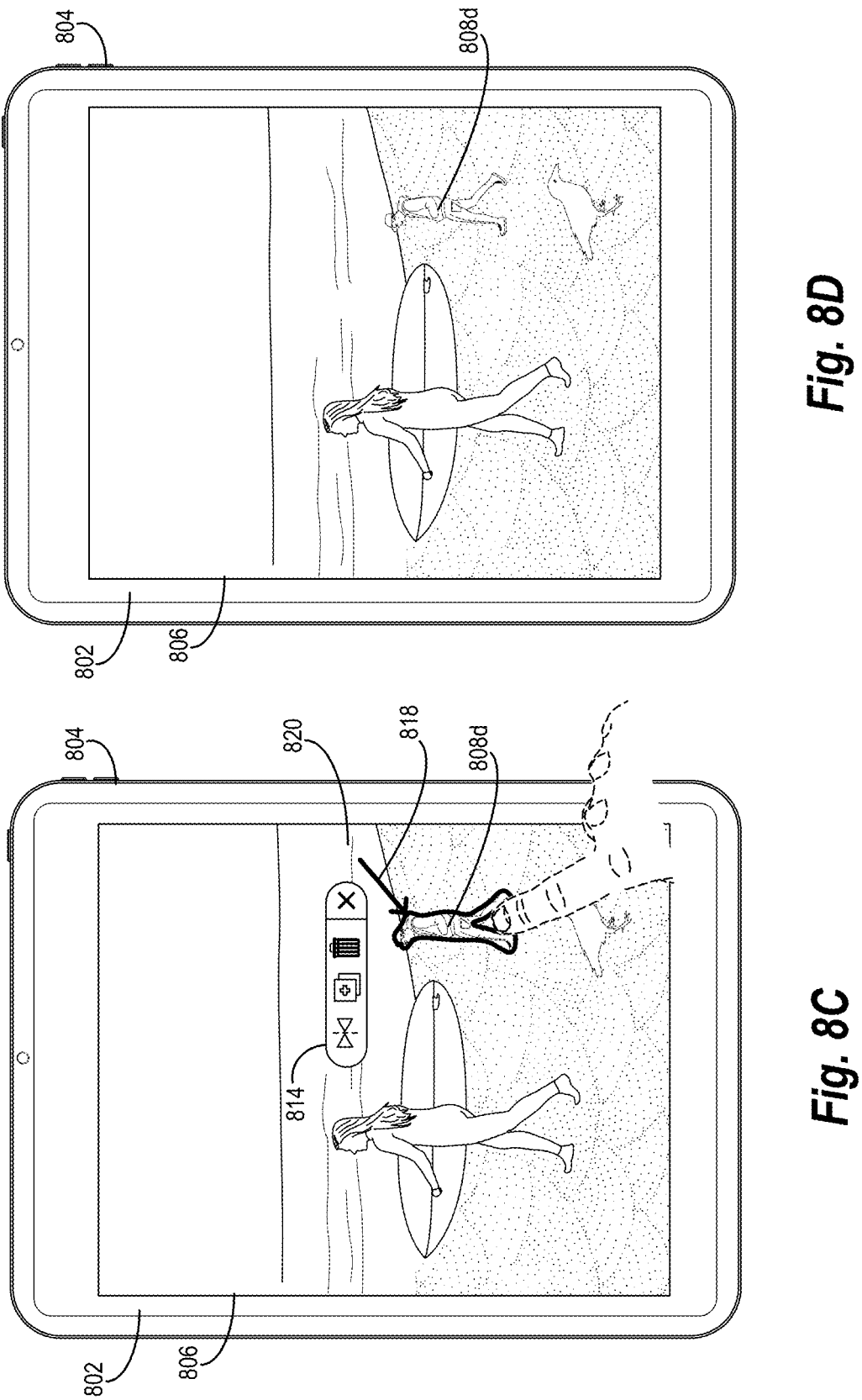

As shown in FIG. 8C, the scene-based image editing system 106 detects, via the graphical user interface 802, an additional user interaction for moving the object 808d across the digital image 806 (as shown via the arrow 818). In particular, the scene-based image editing system 106 detects the additional user interaction for moving the object 808d from a first position in the digital image 806 to a second position. For instance, in some cases, the scene-based image editing system 106 detects the second user interaction via a dragging motion (e.g., the user input selects the object 808d and moves across the graphical user interface 802 while holding onto the object 808d). In some implementations, after the initial selection of the object 808d, the scene-based image editing system 106 detects the additional user interaction as a click or tap on the second position and determines to use the second position as a new position for the object 808d. It should be noted that the scene-based image editing system 106 moves the object 808d as a whole in response to the additional user interaction.

As indicated in FIG. 8C, upon moving the object 808d from the first position to the second position, the scene-based image editing system 106 exposes the content fill 820 that was placed behind the object 808d (e.g., behind the corresponding object mask). Indeed, as previously discussed, the scene-based image editing system 106 places pre-generated content fills behind the objects (or corresponding object masks) for which the content fills were generated. Accordingly, upon removing the object 808d from its initial position within the digital image 806, the scene-based image editing system 106 automatically reveals the corresponding content fill. Thus, the scene-based image editing system 106 provides a seamless experience where an object is movable without exposing any holes in the digital image itself. In other words, the scene-based image editing system 106 provides the digital image 806 for display as if it were a real scene in which the entire background is already known.

Additionally, as the scene-based image editing system 106 generated the content fill 820 for the object 808d prior to receiving the user input to move the object 808d, the scene-based image editing system 106 exposes or surfaces the content fill 820 without latency or delay associated with conventional systems. In other words, the scene-based image editing system 106 exposes the content fill 820 incrementally as the object 808d is moved across the digital image 806 without any delay associated with generating content.

As further shown in FIG. 8D, the scene-based image editing system 106 deselects the object 808d upon completion of the move operation. In some embodiments, the object 808d maintains the selection of the object 808d until receiving a further user interaction to indicate deselection of the object 808d (e.g., a user interaction with another portion of the digital image 806). As further indicated, upon deselecting the object 808d, the scene-based image editing system 106 further removes the option menu 814 that was previously presented. Thus, the scene-based image editing system 106 dynamically presents options for interacting with objects for display via the graphical user interface 802 to maintain a minimalistic style that does not overwhelm the displays of computing devices with limited screen space.

Figures 9A, 9B, 9C:
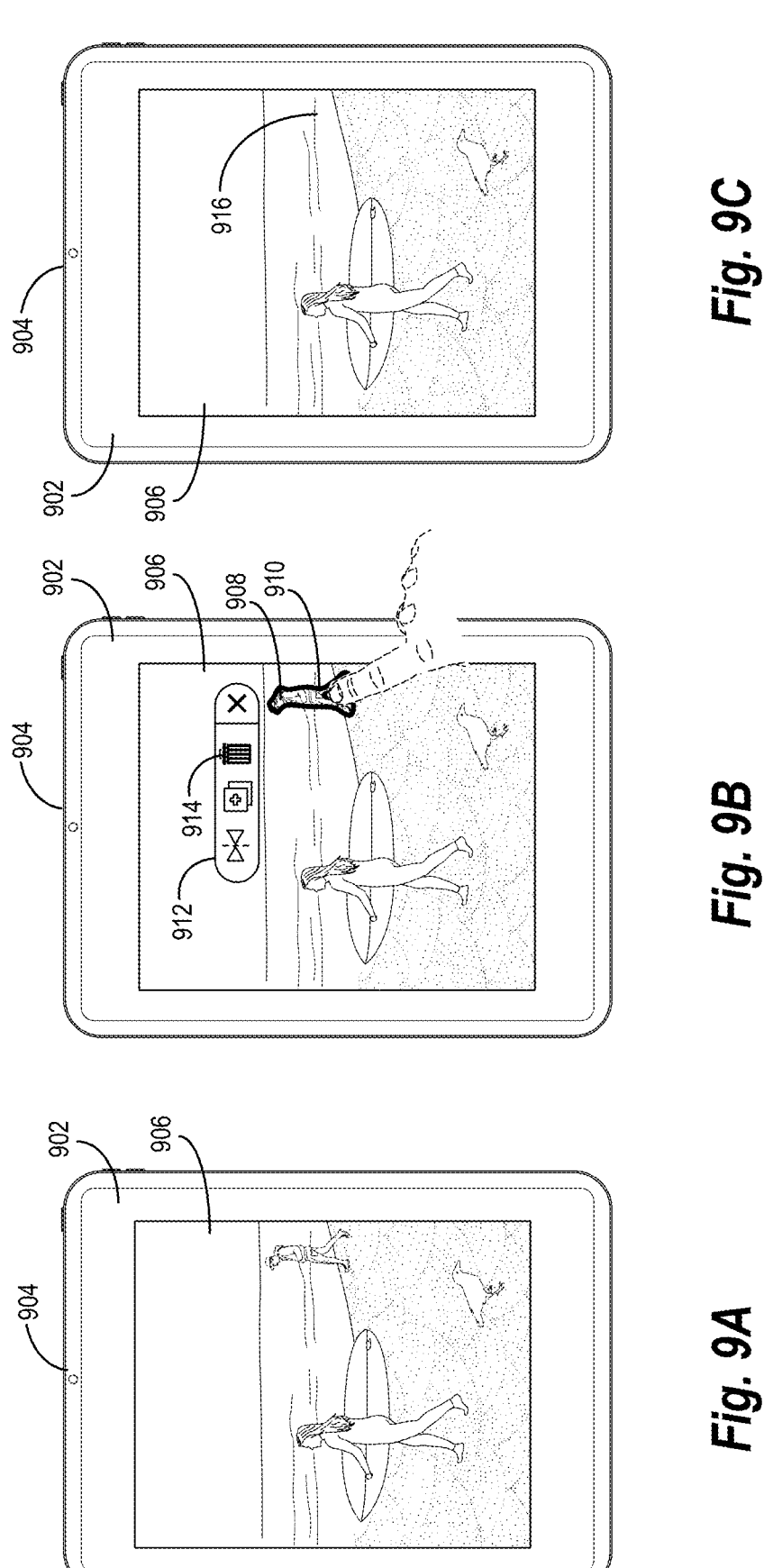
FIGS. 9A-9C illustrate a graphical user interface implemented by the scene-based image editing system to facilitate a delete operation in accordance with one or more embodiments.

FIGS. 9A-9C illustrate a graphical user interface implemented by the scene-based image editing system 106 to facilitate a delete operation in accordance with one or more embodiments. Indeed, as shown in FIG. 9A, the scene-based image editing system 106 provides a graphical user interface 902 for display on a client device 904 and provides a digital image 906 for display in the graphical user interface 902.

As further shown in FIG. 9B, the scene-based image editing system 106 detects, via the graphical user interface 902, a user interaction with an object 908 portrayed in the digital image 906. In response to detecting the user interaction, the scene-based image editing system 106 surfaces the corresponding object mask, providing the visual indication 910 (or the object mask itself) for display in association with the object 908, and provides the option menu 912 for display. In particular, as shown, the option menu 912 includes an option 914 for deleting the object 908 that has been selected.

Additionally, as shown in FIG. 9C, the scene-based image editing system 106 removes the object 908 from the digital image 906. For instance, in some cases, the scene-based image editing system 106 detects an additional user interaction via the graphical user interface 902 (e.g., an interaction with the option 914 for deleting the object 908) and removes the object 908 from the digital image 906 in response. As further shown, upon removing the object 908 from the digital image 906, the scene-based image editing system 106 automatically exposes the content fill 916 that was previously placed behind the object 908 (e.g., behind the corresponding object mask). Thus, in one or more embodiments, the scene-based image editing system 106 provides the content fill 916 for immediate display upon removal of the object 908.

While FIGS. 8B, 8C, and 9B illustrate the scene-based image editing system 106 providing a menu, in or more implementations, the scene-based image editing system 106 allows for object-based editing without requiring or utilizing a menu. For example, the scene-based image editing system 106 selects an object 808*d*, 908 and surfaces a visual indication 812, 910 in response to a first user interaction (e.g., a tap on the respective object). The scene-based image editing system 106 performs an object-based editing of the digital image in response to second user interaction without the use of a menu. For example, in response to a second user input dragging the object across the image, the scene-based image editing system 106 moves the object. Alternatively, in response to a second user input (e.g., a second tap), the scene-based image editing system 106 deletes the object.

The scene-based image editing system 106 provides more flexibility for editing digital images when compared to conventional systems. In particular, the scene-based image editing system 106 facilitates object-aware modifications that enable interactions with objects rather than requiring targeting the underlying pixels. Indeed, based on a selection of some pixels that contribute to the portrayal of an object, the scene-based image editing system 106 flexibly determines that the whole object has been selected. This is in contrast to conventional systems that require a user to select an option from a menu indicating an intention to selection an object, provide a second user input indicating the object to select (e.g., a bounding box about the object or drawing of another rough boundary about the object), and another user input to generate the object mask. The scene-based image editing system 106 instead provides for selection of an object with a single user input (a tap on the object).

Further, upon user interactions for implementing a modification after the prior selection, the scene-based image editing system 106 applies the modification to the entire object rather than the particular set of pixels that were selected. Thus, the scene-based image editing system 106 manages objects within digital images as objects of a real scene that are interactive and can be handled as cohesive units. Further, as discussed, the scene-based image editing system 106 offers improved flexibility with respect to deployment on smaller devices by flexibly and dynamically managing the amount of content that is displayed on a graphical user interface in addition to a digital image.

Additionally, the scene-based image editing system 106 offers improved efficiency when compared to many conventional systems. Indeed, as previously discussed, conventional systems typically require execution of a workflow consisting of a sequence of user interactions to perform a modification. Where a modification is meant to target a particular object, many of these systems require several user interactions just to indicate that the object is the subject of the subsequent modification (e.g., user interactions for identifying the object and separating the object from the rest of the image) as well as user interactions for closing the loop on executed modifications (e.g., filling in the holes remaining after removing objects). The scene-based image editing system 106, however, reduces the user interactions typically required for a modification by pre-processing a digital image before receiving user input for such a modification. Indeed, by generating object masks and content fills automatically, the scene-based image editing system 106 eliminates the need for user interactions to perform these steps.

In one or more embodiments, the scene-based image editing system 106 performs further processing of a digital image in anticipation of modifying the digital image. For instance, as previously mentioned, the scene-based image editing system 106 generates a semantic scene graph from a digital image in some implementations. Thus, in some cases, upon receiving one or more user interactions for modifying the digital image, the scene-based image editing system 106 utilizes the semantic scene graph to execute the modifications. Indeed, in many instances, the scene-based image editing system 106 generates a semantic scene graph for use in modifying a digital image before receiving user input for such modifications. FIGS. 10-15 illustrate diagrams for generating a semantic scene graph for a digital image in accordance with one or more embodiments.

Indeed, many conventional systems are inflexible in that they typically wait upon user interactions before determining characteristics of a digital image. For instance, such conventional systems often wait upon a user interaction that indicates a characteristic to be determined and then performs the corresponding analysis in response to receiving the user interaction. Accordingly, these systems fail to have useful characteristics readily available for use. For example, upon receiving a user interaction for modifying a digital image, conventional systems typically must perform an analysis of the digital image to determine characteristics to change after the user interaction has been received.

Further, as previously discussed, such operation results in inefficient operation as image edits often require workflows of user interactions, many of which are used in determining characteristics to be used in execution of the modification. Thus, conventional systems often require a significant number of user interactions to determine the characteristics needed for an edit.

The scene-based image editing system 106 provides advantages by generating a semantic scene graph for a digital image in anticipation of modifications to the digital image. Indeed, by generating the semantic scene graph, the scene-based image editing system 106 improves flexibility over conventional systems as it makes characteristics of a digital image readily available for use in the image editing process. Further, the scene-based image editing system 106 provides improved efficiency by reducing the user interactions required in determining these characteristics. In other words, the scene-based image editing system 106 eliminates the user interactions often required under conventional systems for the preparatory steps of editing a digital image. Thus, the scene-based image editing system 106 enables user interactions to focus on the image edits more directly themselves.

Additionally, by generating a semantic scene graph for a digital image, the scene-based image editing system 106 intelligently generates/obtains information that allows an image to be edited like a real-world scene. For example, the scene-based image editing system 106 generates a scene graph that indicates objects, object attributes, object relationships, etc. that allows the scene-based image editing system 106 to enable object/scene-based image editing.

In one or more embodiments, a semantic scene graph includes a graph representation of a digital image. In particular, in some embodiments, a semantic scene graph includes a graph that maps out characteristics of a digital image and their associated characteristic attributes. For instance, in some implementations, a semantic scene graph includes a node graph having nodes that represent characteristics of the digital image and values associated with the node representing characteristic attributes of those characteristics. Further, in some cases, the edges between the nodes represent the relationships between the characteristics.

Figure 10:
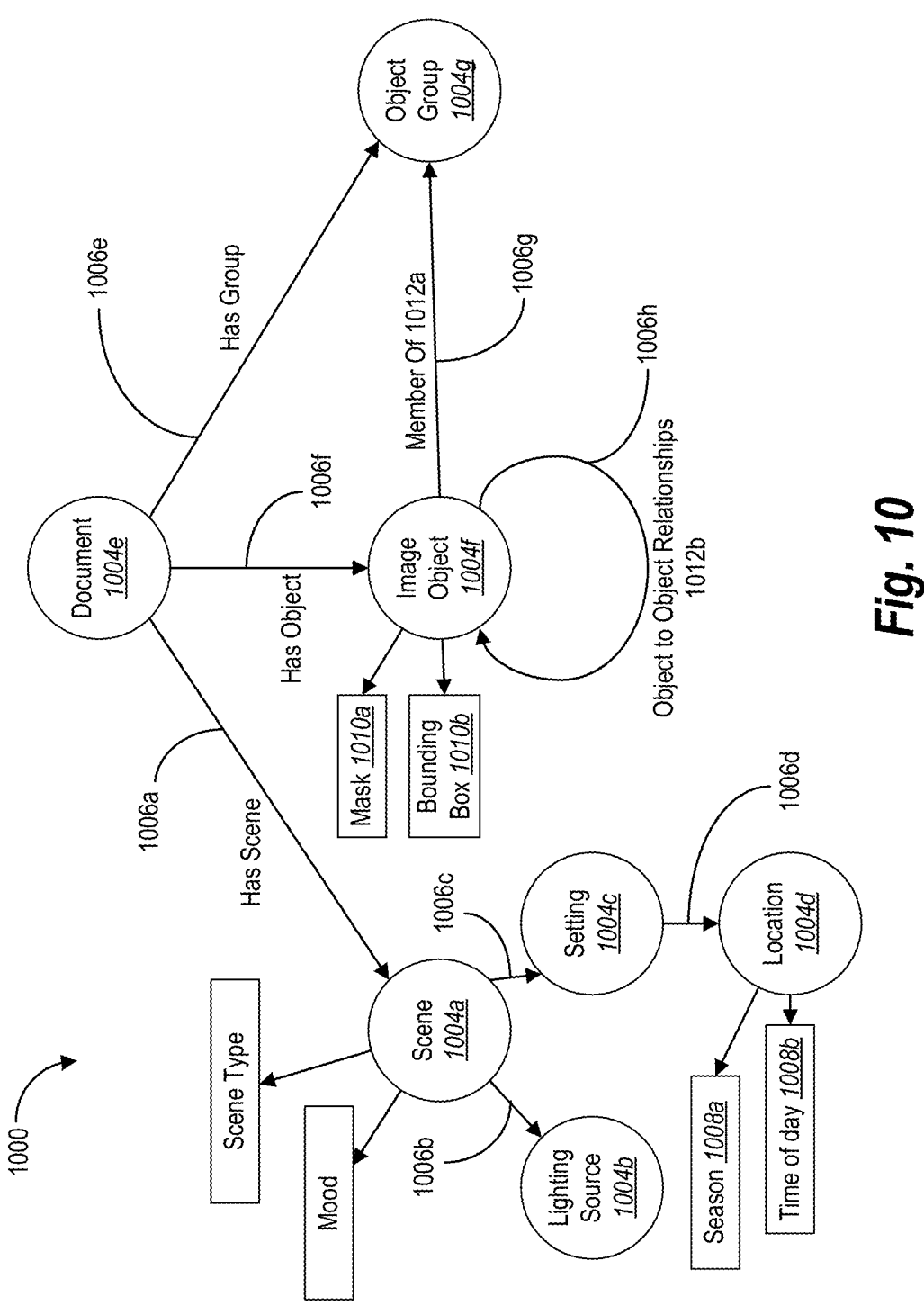
FIG. 10 illustrates an image analysis graph utilized by the scene-based image editing system in generating a semantic scene graph in accordance with one or more embodiments.

As mentioned, in one or more implementations, the scene-based image editing system 106 utilizes one or more predetermined or pre-generated template graphs in generating a semantic scene graph for a digital image. For instance, in some cases, the scene-based image editing system 106 utilizes an image analysis graph in generating a semantic scene graph. FIG. 10 illustrates an image analysis graph 1000 utilized by the scene-based image editing system 106 in generating a semantic scene graph in accordance with one or more embodiments.

In one or more embodiments, an image analysis graph includes a template graph for structing a semantic scene graph. In particular, in some embodiments, an image analysis graph includes a template graph providing a structural template used by the scene-based image editing system 106 to organize the information included in a semantic scene graph. For instance, in some implementations, an image analysis graph includes a template graph that indicates how to organize the nodes of the semantic scene graph representing characteristics of a digital image. In some instances, an image analysis graph additionally or alternatively indicates the information to be represented within a semantic scene graph. For instance, in some cases, an image analysis graph indicates the characteristics, relationships, and characteristic attributes of a digital image to be represented within a semantic scene graph.

Indeed, as shown in FIG. 10, the image analysis graph 1000 includes a plurality of nodes 1004a-1004g. In particular, the plurality of nodes 1004a-1004g correspond to characteristics of a digital image. For instance, in some cases, the plurality of nodes 1004a-1004g represent characteristic categories that are to be determined when analyzing a digital image. Indeed, as illustrated, the image analysis graph 1000 indicates that a semantic scene graph is to represent the objects and object groups within a digital image as well as the scene of a digital image, including the lighting source, the setting, and the particular location.

As further shown in FIG. 10, the image analysis graph 1000 includes an organization of the plurality of nodes 1004a-1004g. In particular, the image analysis graph 1000 includes edges 1006a-1006h arranged in a manner that organizes the plurality of nodes 1004a-1004g. In other words, the image analysis graph 1000 illustrates the relationships among the characteristic categories included therein. For instance, the image analysis graph 1000 indicates that the object category represented by the node 1004f and the object group category represented by the node 1004g are closely related, both describing objects that portrayed in a digital image.

Additionally, as shown in FIG. 10, the image analysis graph 1000 associates characteristic attributes with one or more of the nodes 1004a-1004g to represent characteristic attributes of the corresponding characteristic categories. For instance, as shown, the image analysis graph 1000 associates a season attribute 1008a and a time-of-day attribute 1008b with the setting category represented by the node 1004c. In other words, the image analysis graph 1000 indicates that the season and time of day should be determined when determining a setting of a digital image. Further, as shown, the image analysis graph 1000 associates an object mask 1010a and a bounding box 1010b with the object category represented by the node 1004f. Indeed, in some implementations, the scene-based image editing system 106 generates content for objects portrayed in a digital image, such as an object mask and a bounding box. Accordingly, the image analysis graph 1000 indicates that this pre-generated content is to be associated with the node representing the corresponding object within a semantic scene graph generated for the digital image.

As further shown in FIG. 10, the image analysis graph 1000 associates characteristic attributes with one or more of the edges 1006a-1006h to represent characteristic attributes of the corresponding characteristic relationships represented by these edges 1006a-1006h. For instance, as shown, the image analysis graph 1000 associates a characteristic attribute 1012a with the edge 1006g indicating that an object portrayed in a digital image will be a member of a particular object group. Further, the image analysis graph 1000 associates a characteristic attribute 1012b with the edge 1006h indicating that at least some objects portrayed in a digital image have relationships with one another. FIG. 10 illustrates a sample of relationships that are identified between objects in various embodiments, and additional detail regarding these relationships will be discussed in further detail below.

It should be noted that the characteristic categories and characteristic attributes represented in FIG. 10 are exemplary and the image analysis graph 1000 includes a variety of characteristic categories and/or characteristic attributes not shown in various embodiments. Further, FIG. 10 illustrates a particular organization of the image analysis graph 1000, though alternative arrangements are used in different embodiments. Indeed, in various embodiments, the scene-based image editing system 106 accommodates a variety of characteristic categories and characteristic attributes to facilitate subsequent generation of a semantic scene graph that supports a variety of image edits. In other words, the scene-based image editing system 106 includes those characteristic categories and characteristic attributes that it determines are useful in editing a digital image.

Further, in one or more embodiments, the scene-based image editing system 106 generates an image analysis graph, such as the image analysis graph 1000 of FIG. 10, for use in generating semantic scene graphs for digital images. Indeed, in some embodiments, the scene-based image editing system 106 generates (e.g., pre-generates-before analyzing a digital image for generating a semantic scene graph) an image analysis graph that provides a structural template of nodes and edges corresponding to characteristics potentially represented in one or more digital images. For instance, in one or more embodiments, the scene-based image editing system 106 generates an image analysis graph by generating template nodes corresponding to scene components potentially portrayed in a digital image (e.g., scenery, location, time of day, lighting source, etc.). Further, the scene-based image editing system 106 generates template nodes corresponding to objects potentially portrayed in a digital image. In some cases, an object is a particular instance of a scene component. In some implementations, the template nodes corresponding to potential objects are used as generic place holders for objects that are portrayed in digital images. In some embodiments, the scene-based image editing system 106 then generates edges connecting the template nodes created for the image analysis graph.

In some embodiments, the scene-based image editing system 106 utilizes a real-world class description graph in generating a semantic scene graph for a digital image. FIG. 11 illustrates a real-world class description graph 1102 utilized by the scene-based image editing system 106 in generating a semantic scene graph in accordance with one or more embodiments.

In one or more embodiments, a real-world class description graph includes a template graph that describes scene components (e.g., semantic areas) that may be portrayed in a digital image. In particular, in some embodiments, a real-world class description graph includes a template graph used by the scene-based image editing system 106 to provide contextual information to a semantic scene graph regarding scene components—such as objects—potentially portrayed in a digital image. Indeed, in some implementations, a real-world class description graph provides contextual information with respect to semantic areas (e.g., objects) potentially represented in digital images. For instance, in some implementations, a real-world class description graph provides a hierarchy of object classifications and/or an anatomy (e.g., object components) of certain objects that may be portrayed in a digital image. In some instances, a real-world class description graph further includes object attributes associated with the objects represented therein. For instance, in some cases, a real-world class description graph provides object attributes assigned to a given object, such as shape, color, material from which the object is made, weight of the object, weight the object can support, and/or various other attributes determined to be useful in subsequently modifying a digital image. Indeed, as will be discussed, in some cases, the scene-based image editing system 106 utilizes a semantic scene graph for a digital image to suggest certain edits or suggest avoiding certain edits to maintain consistency of the digital image with respect to the contextual information contained in the real-world class description graph from which the semantic scene graph was built.

As shown in FIG. 11, the real-world class description graph 1102 includes a plurality of nodes 1104a-1104h and a plurality of edges 1106a-1106e that connect some of the nodes 1104a-1104h. In particular, in contrast to the image analysis graph 1000 of FIG. 10, the real-world class description graph 1102 does not provide a single network of interconnected nodes. Rather, in some implementations, the real-world class description graph 1102 includes a plurality of node clusters 1108a-1108c that are separate and distinct from one another.

In one or more embodiments, each node cluster corresponds to a separate scene component (e.g., semantic area) class that may be portrayed in a digital image. Indeed, as shown in FIG. 11, each of the node clusters 1108a-1108c corresponds to a separate object class that may be portrayed in a digital image. As indicated above, the real-world class description graph 1102 is not limited to representing object classes and can represent other scene component classes in various embodiments.

As shown in FIG. 11, each of the node clusters 1108a-1108c portrays a hierarchy of class descriptions (otherwise referred to as a hierarchy of object classifications) corresponding to a represented object class. In other words, each of the node clusters 1108a-1108c portrays degrees of specificity/generality with which an object is described or labeled. Indeed, in some embodiments, the scene-based image editing system 106 applies all class descriptions/ labels represented in a node cluster to describe a corresponding object portrayed in a digital image. In some implementations, however, the scene-based image editing system 106 utilizes a subset of the class descriptions/labels to describe an object.

As an example, the node cluster 1108a includes a node 1104a representing a side table class and α node 1104b representing a table class. Further, as shown in FIG. 11, the node cluster 1108a includes an edge 1106a between the node 1104a and the node 1104b to indicate that the side table class is a subclass of the table class, thus indicating a hierarchy between these two classifications that are applicable to a side table. In other words, the node cluster 1108a indicates that a side table is classifiable either as a side table and/or more generally as a table. In other words, in one or more embodiments, upon detecting a side table portrayed in a digital image, the scene-based image editing system 106 labels the side table as a side table and/or as a table based on the hierarchy represented in the real-world class description graph 1102.

The degree to which a node cluster represents a hierarchy of class descriptions varies in various embodiments. In other words, the length/height of the represented hierarchy varies in various embodiments. For instance, in some implementations, the node cluster 1108a further includes a node representing a furniture class, indicating that a side table is classifiable as a piece of furniture. In some cases, the node cluster 1108a also includes a node representing an inanimate object lass, indicating that a side table is classifiable as such. Further, in some implementations, the node cluster 1108a includes a node representing an entity class, indicating that a side table is classifiable as an entity. Indeed, in some implementations, the hierarchies of class descriptions represented within the real-world class description graph 1102 include a class description/label—such as an entity class—at such a high level of generality that it is commonly applicable to all objects represented within the real-world class description graph 1102.

As further shown in FIG. 11, the node cluster 1108a includes an anatomy (e.g., object components) of the represented object class. In particular, the node cluster 1108a includes a representation of component parts for the table class of objects. For instance, as shown, the node cluster 1108a includes a node 1104c representing a table leg class. Further, the node cluster 1108a includes an edge 1106b indicating that a table leg from the table leg class is part of a table from the table class. In other words, the edge 1106*b* indicates that a table leg is a component of a table. In some cases, the node cluster 1108*a* includes additional nodes for representing other components that are part of a table, such as a tabletop, a leaf, or an apron.

As shown in FIG. 11, the node 1104*c* representing the table leg class of objects is connected to the node 1104*b* representing the table class of objects rather than the node 1104*a* representing the side table class of objects. Indeed, in some implementations, the scene-based image editing system 106 utilizes such a configuration based on determining that all tables include one or more table legs. Thus, as side tables are a subclass of tables, the configuration of the node cluster 1108*a* indicates that all side tables also include one or more table legs. In some implementations, however, the scene-based image editing system 106 additionally or alternatively connects the node 1104*c* representing the table leg class of objects to the node 1104*a* representing the side table class of objects to specify that all side tables include one or more table legs.

Many conventional image editing systems are inflexible and inefficient with respect to moving an object in accordance with the perspective of a digital image. For example, while having objects within a digital image conform to an associated three-dimensional perspective is a fundamental, intuitive concept, conventional systems typically fail to offer intuitive tools for incorporating such a concept when moving an object. Instead, these systems rigidly move objects as if their digital images portray a flat two-dimensional environment. These systems often rely on user manipulations of a moved object or the surrounding environment to give an overall three-dimensional appearance. As such, conventional systems often further require a specialized knowledge of the tools and steps necessary to properly move an object while adhering to a perspective.

Many conventional image editing systems further operate inefficiently in that they require a significant number of user interactions to move an object while adhering to a perspective. For example, conventional systems often require a first set of user interactions for moving the object and a second set of user interactions for separately resizing the object to conform to the associated perspective based on its location resulting from the move. Further, in many instances, resizing a moved object to conform to a perspective may be subject to trial-and-error until the size of the object appears correct, which leads to redundancy in the user interactions.

The scene-based image editing system 106 utilizes perspective-aware object move operations to offer improved flexibility over conventional systems. Indeed, by moving an object with respect to the three-dimensional perspective of a digital image, the scene-based image editing system 106 flexibly incorporates the three-dimensional perspective into the editing process. Further, by automatically resizing the object based on its movement, the scene-based image editing system 106 provides further three-dimensional effect in accordance with the perspective. Thus, the scene-based image editing system 106 flexibly folds the resizing modification into the movement modification, enabling for more intuitive perspective-based editing. Further, the scene-based image editing system 106 flexibly edits a digital image in accordance with the three-dimensional environment captured therein.

By implementing perspective-aware object move operations, the scene-based image editing system 106 further offers improved efficiency when compared to conventional systems. Indeed, where many conventional systems require a series of steps in multiple workflows to separately move and resize an object, the scene-based image editing system 106 operates based on a reduced set of user interactions. In particular, as the perspective-aware object move operation involves the automated resizing of an object, the scene-based image editing system 106 eliminates separate user interactions typically required under conventional systems for resizing objects.

In one or more embodiments, a perspective-aware object move operation includes an editing operation for moving and resizing an object within a digital image based on a perspective associated with the digital image. Indeed, in some cases, a perspective-aware object move operation includes a type of object-aware modification as it targets an object identified within a digital image. In some cases, when performing a perspective-aware object move operation, the scene-based image editing system 106 determines a movement of an object with respect to a perspective associated with the digital image by determining a movement of the object with respect to a vanishing point and/or a horizon line associated with the digital image. In some cases, a perspective-aware object move operation is different from a move operation in that a move operation allows for free movement of an object within a digital image while a perspective-aware object move operation restricts the movement of the object to movement toward or away from a vanishing point associated with the digital image while also resizing and/or occluding one or more objects as a result of the movement. For instance, as will be shown below, in some implementations, a perspective-aware object move restricts movement along a line that runs from the vanishing point and through the object (e.g., the center or some other portion of the object).

As indicated, in some cases, a perspective-aware object move operation involves resizing an object via a perspective-based resizing. In one or more embodiments, a perspective-based resizing includes a resizing of an object based on its movement with respect to the perspective of the digital image portraying the object. In particular, in some cases, a perspective-based resizing of an object includes a resizing of the object based on its movement with respect to a vanishing point and/or horizon line associated with the digital image portraying the object. For instance, in some cases a perspective-based resizing of an object includes increasing the size of the object as it moves away from the vanishing point of its digital image or diminishing the size of the object as it moves toward the vanishing point. In some cases, scene-based image editing system 106 increases or diminishes the size of the object in proportion to the distance with which the object moves away from or toward the vanishing point, respectively.

Figure 40:
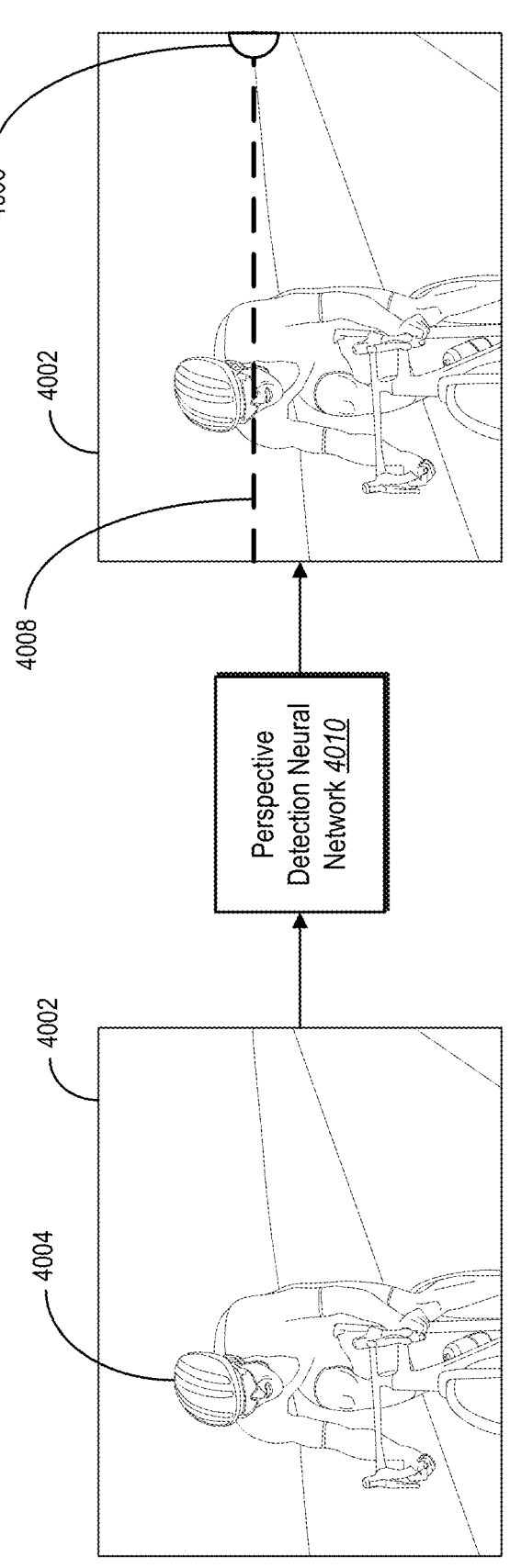
FIG. 40 illustrates determining a vanishing point and a horizon line for a digital image in accordance with one or more embodiments.

As mentioned, in one or more embodiments, the scene-based image editing system 106 performs a perspective-aware object move operation on an object portrayed in a digital image based on a perspective associated with the digital image. For instance, in some cases, the scene-based image editing system 106 performs the perspective-aware object move operation based on a vanishing point and/or a horizon line associate with the digital image. Accordingly, in some implementations, the scene-based image editing system 106 determines a vanishing point and/or a horizon line for a digital image. FIG. 40 illustrates the scene-based image editing system 106 determining a vanishing point and a horizon line for a digital image in accordance with one or more embodiments.

Indeed, as shown in FIG. 40, a digital image 4002 portrays an object 4004 (a person riding a bicycle down a path or road). As further shown, the scene-based image editing system 106 determines a vanishing point 4006 and a horizon line 4008 for the digital image 4002. FIG. 40 illustrates that the scene-based image editing system 106 provides visual indicators for the vanishing point 4006 and the horizon line 4008. For instance, in some cases, the scene-based image editing system 106 provides the visual indicators for display within a graphical user interface of a client device that is displaying the digital image 4002. In some implementations, however, the scene-based image editing system 106 does not provide such visual indicators.

As further shown in FIG. 40, the scene-based image editing system 106 utilizes a perspective detection neural network 4010 to determine the vanishing point 4006 and/or the horizon line 4008. In one or more embodiments, a perspective detection neural network includes a computer-implemented neural network for determining a vanishing point and/or a horizon line for a digital image. In particular, in some cases, a perspective detection neural network includes a computer-implemented neural network that analyzes a digital image (e.g., visual attributes of the digital image) and identifies a vanishing point and/or a horizon line for the digital image based on the analysis. In some cases, a perspective detection neural network further generates a visual indicator for the vanishing point and/or the horizon line for display.

In one or more embodiments, the perspective detection neural network 4010 includes a convolutional neural network. In particular, in some embodiments, the perspective detection neural network 4010 includes a convolutional neural network having dense connections (e.g., via dense blocks) between layers. To illustrate, in one or more embodiments, the perspective detection neural network 4010 includes a plurality of dense blocks that each include an equal number of layers. In some cases, before entering the first block, a convolution with a plurality of output channels is performed on the input image. In some cases, the scene-based image editing system 106 zero pads each side of the input by one or more pixels to keep the feature map size fixed. In some embodiment, the perspective detection neural network 4010 uses a convolution followed by an average pooling as transition layers between two contiguous dense blocks. In some implementations, the perspective detection neural network 4010 performs global average pooling at the end of the last dense block and follows up with a softmax classifier. In some embodiments, the scene-based image editing system 106 replaces the final layer of the perspective detection neural network 4010 (e.g., the softmax classification layer) with one or more separate heads to output the vanishing point and/or the horizon line associated with a digital image. In some instances, the perspective detection neural network 4010 utilizes the separate heads to provide more detail (e.g., the angle of the horizon line and/or the distance of the horizon line to the center of the digital image). In some implementations, the scene-based image editing system 106 utilizes, as the perspective detection neural network 4010, the DenseNet described by G. Huang et al., *Densely Connected Convolutional Networks*, in IEEE Conference on Computer Vision and Pattern Recognition, 2016 (hereinafter Huang), which is incorporated herein by reference in its entirety. In some cases, the scene-based image editing system 106 replaces the last layer of the DenseNet described by Huan with the one or more separate heads as described above.

Though FIG. 40 shows the scene-based image editing system 106 utilizing the perspective detection neural network 4010 to determine the vanishing point 4006 and/or the horizon line 4008, the scene-based image editing system 106 utilizes other means in various embodiments. For instance, in some cases, the scene-based image editing system 106 identifies the vanishing point 4006 and/or the horizon line 4008 based on user interactions that provide the vanishing point 4006 and/or the horizon line 4008.

As illustrated by FIG. 40, the scene-based image editing system 106 determines that the vanishing point 4006 and the horizon line 4008 are present within the digital image 4002. In other words, the scene-based image editing system 106 determines that the vanishing point 4006 and the horizon line 4008 appear within the boundaries of the digital image 4002. In some cases, however, the scene-based image editing system 106 determines that at least one of the vanishing point 4006 or the horizon line 4008 are outside the digital image 4002.

In some cases, the scene-based image editing system 106 enables changes to the vanishing point 4006 and/or the horizon line 4008. For instance, in some cases, the scene-based image editing system 106 detects one or more user interactions for moving the vanishing point 4006 and/or the horizon line 4008 (e.g., by detecting one or more user interactions with a visual indicator for the vanishing point 4006 and/or the horizon line 4008 via a graphical user interface of a client device displaying the digital image 4002). Accordingly, the scene-based image editing system 106 determines a modified location for the vanishing point 4006 and/or the horizon line 4008 based on the one or more user interactions. Further, in some instances, the scene-based image editing system 106 performs a perspective-aware object move operation on an object portrayed within the digital image 4002 based on the modified location(s).

Further, in some embodiments, the scene-based image editing system 106 determines the vanishing point 4006 and/or the horizon line 4008 via pre-processing of the digital image 4002. Indeed, as previously mentioned, the scene-based image editing system 106 pre-processes digital images automatically (e.g., before receiving user input regarding the digital image). In some cases, the scene-based image editing system 106 includes the vanishing point 4006 and/or the horizon line 4008 within a semantic scene graph generated for the digital image 4002. Accordingly, in some instances, the scene-based image editing system 106 references the semantic scene graph when performing a perspective-aware object move operation. For instance, in some cases, the scene-based image editing system 106 references the semantic scene graph to retrieve the vanishing point 4006 and/or the horizon line 4008 upon detecting a user selection for performing a perspective-aware object move operation.

Figure 41:
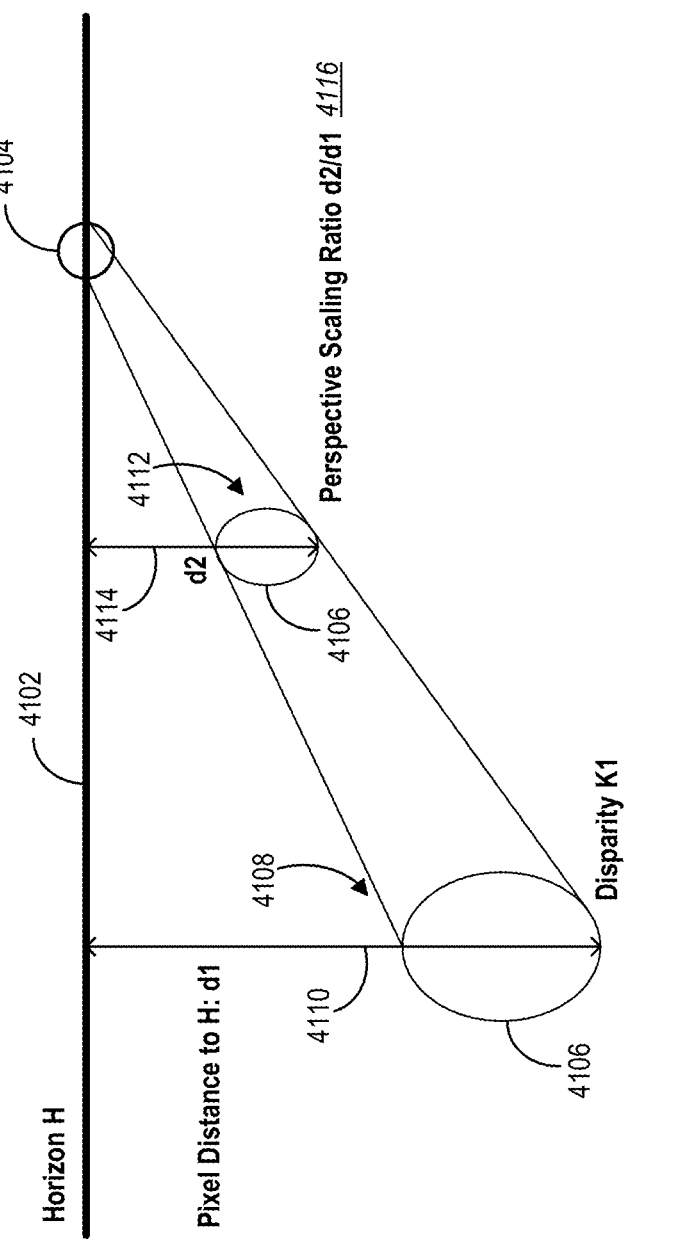
FIG. 41 illustrates using the perspective of a digital image to determine how to resize an object moving with respect to the perspective in accordance with one or more embodiments.

As mentioned, in some embodiments, the scene-based image editing system 106 utilizes the perspective of a digital image (e.g., the vanishing point and/or horizon line of the digital image) in performing a perspective-based resizing of an object that is moved within the digital image with respect to the perspective. For instance, the scene-based image editing system 106 utilizes the perspective to determine how to resize the object as it moves toward or away from the vanishing point associated with the digital image. FIG. 41 illustrates using the perspective of a digital image to determine how to resize an object moving with respect to the perspective in accordance with one or more embodiments.

As shown in FIG. 41, the scene-based image editing system 106 identifies a horizon line 4102 and a vanishing point 4104 for a digital image (the digital image is not shown). Additionally, as shown, the scene-based image editing system 106 identifies an object 4106 portrayed within the digital image. In particular, the scene-based image editing system 106 identifies the object 4106 at a first position 4108 within the digital image (e.g., a position of the object 4106 before being moved).

As further shown in FIG. 41, the scene-based image editing system 106 determines a first distance 4110 (labeled d1) from the object 4106 at the first position 4108 to the horizon line 4102 of the digital image. In one or more embodiments, the scene-based image editing system 106 determines the first distance 4110 as the distance between the horizon line 4102 and the top of the object 4106, the bottom of the object 4106, or the center of the object 4106. In some cases, the scene-based image editing system 106 utilizes another portion of the object 4106 for determining the first distance 4110, such as an average pixel coordinate pair for the object 4106 or some other portion designated via user input. Further, in some embodiments, the scene-based image editing system 106 measures the first distance 4110 in pixels. In some implementations, however, the scene-based image editing system 106 utilizes a different metric, such as a metric provided via user input.

As illustrated in FIG. 41, the scene-based image editing system 106 further determines a second position 4112 for the object 4106 within the digital image. For instance, in some cases, the scene-based image editing system 106 moves the object 4106 from the first position 4108 to the second position 4112 (e.g., in response to one or more user interactions). As indicated by FIG. 41, the movement of the object 4106 from the first position 4108 to the second position 4112 involves movement with respect to the vanishing point 4104 in that the object 4106 moves closer to the vanishing point 4104 (and closer to the horizon line 4102 as the vanishing point 4104 lies on the horizon line 4102). As further shown, the scene-based image editing system 106 determines a second distance 4114 (labeled d2) from the object 4106 at the second position 4112 to the horizon line 4102.

Additionally, as shown in FIG. 41, the scene-based image editing system 106 determines a perspective scaling ratio 4116 based on the first distance 4110 and the second distance 4114. In one or more embodiments, a perspective scaling ratio includes a metric for resizing an object based on movement of the object with respect to the perspective of a digital image. In particular, in some embodiments, a perspective scaling ratio includes a ratio that provides how an object is to be resized based on the amount the object has moved with respect to the perspective of a digital image. For instance, as suggested, in some cases, a perspective scaling ratio indicates the degree to which the size of an object is to be increased or diminished based on an amount the object has moved away from or toward the vanishing point (and horizon line) of a digital image.

Indeed, as shown in FIG. 41, the scene-based image editing system 106 determines that the perspective scaling ratio 4116 includes the ratio of the second distance 4114 to the first distance 4110. As the second distance 4114 shown in FIG. 41 is smaller than the first distance 4110, the perspective scaling ratio 4116 indicates that the size of the object 4106 is to be diminished. Further, the perspective scaling ratio 4116 provides a numerical indication of the degree to which the size of the object 4106 is to be diminished. For instance, the perspective scaling ratio 4116 indicates that the resulting size of the object 4106 at the second position 4112 is to be a determined ratio (or percentage or fraction) of the size of the object 4106 at the first position 4108 (the ratio being determined using the first distance 4110 and the second distance 4114). As such, in one or more embodiments, the scene-based image editing system

106 diminishes the size of the object 4106 at the second position 4112 based on the perspective scaling ratio.

To be clear, FIG. 41 illustrates an example in which the object 4106 is moved toward the vanishing point 4104 (and the horizon line 4102) of the digital image, resulting in the scene-based image editing system 106 diminishing the size of the object 4106 at the second position 4112. In one or more embodiments, where the object 4106 is moved away from the vanishing point 4104, the scene-based image editing system 106 increases the size of the object 4106 at its resulting position. Indeed, the scene-based image editing system 106 determines a perspective scaling ratio for the object 4106 based on the distances between the horizon line 4102 and the object 4106 at its first and resulting positions. In this case, the perspective scaling ratio would indicate an increase to the size of the object as the distance at the resulting position of the object would be greater than the distance at the first position. As such, the scene-based image editing system 106 increases the size of the object 4106 in accordance with the perspective scaling ratio.

Figures 42A, 42B, 42C:
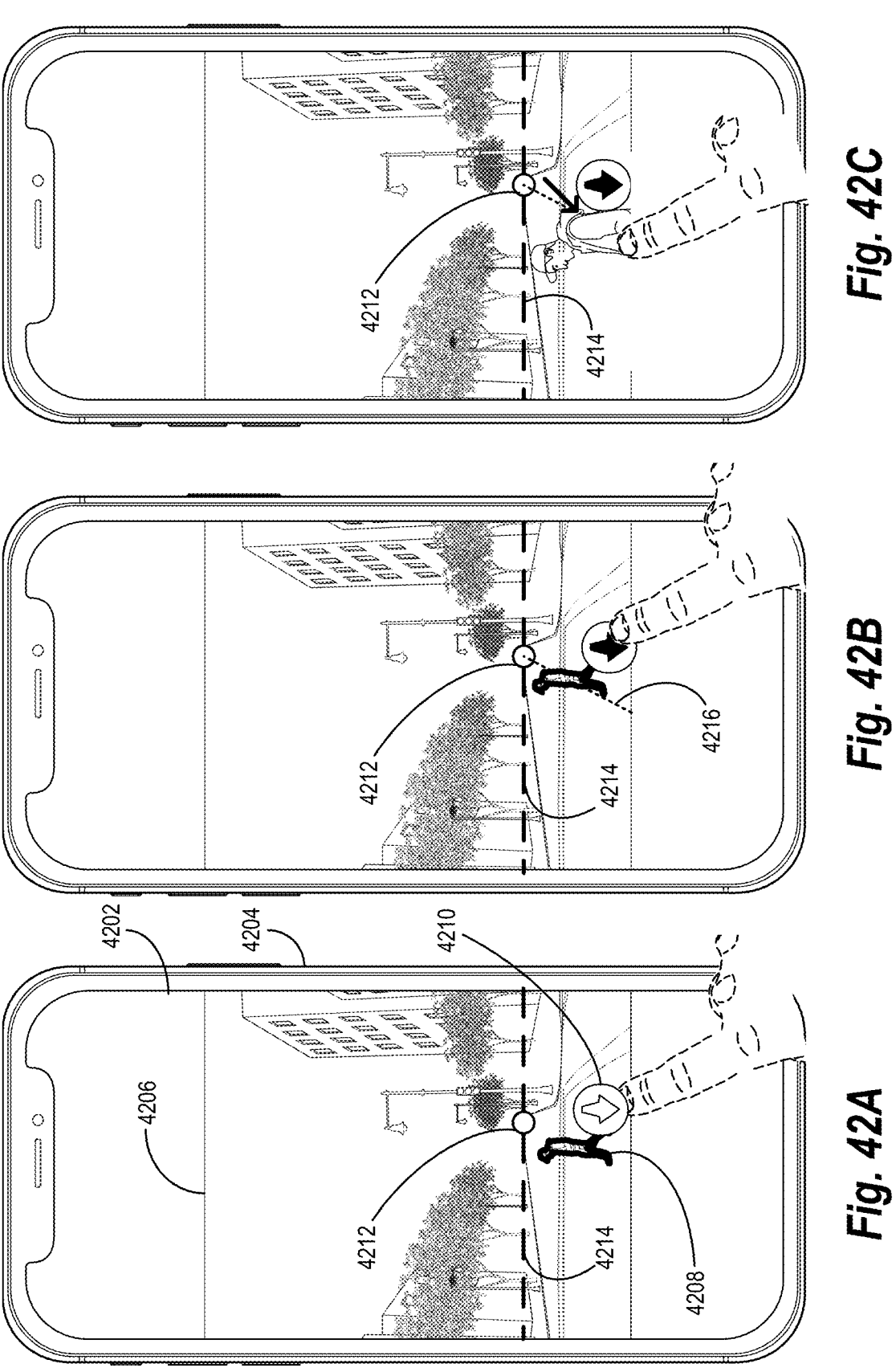
FIGS. 42A-42C illustrate a graphical user interface implemented by the scene-based image editing system to perform a perspective-aware object move operation on an object in accordance with one or more embodiments.

FIGS. 42A-42C illustrate a graphical user interface implemented by the scene-based image editing system 106 to perform a perspective-aware object move operation on an object in accordance with one or more embodiments. Indeed, as shown in FIG. 42A, the scene-based image editing system 106 provides, for display within a graphical user interface 4202 of a client device 4204, a digital image 4206 portraying an object 4208 at a first position. As further shown, the scene-based image editing system 106 determines a vanishing point 4212 and a horizon line 4214 for the digital image 4206 (though, as mentioned, the scene-based image editing system 106 does not actually display the vanishing point 4212 or the horizon line 4214 in some cases).

As shown by FIG. 42A, the scene-based image editing system 106 detects a user interaction for selecting the object 4208. In response to detecting the selection of the object 4208, the scene-based image editing system 106 provides, for display, a selectable option 4210 for performing a perspective-aware object move operation on the object 4208. In some cases, the scene-based image editing system 106 utilizes the selectable option 4210 to visually distinguish the option for performing the perspective-aware object move operation from an option for performing a standard move operation. For instance, in some cases, the scene-based image editing system 106 initiates a perspective-aware object move operation in response to a selection of the selectable option 4210 but initiates a standard move operation in response to selection of the object 4208 itself. Accordingly, the scene-based image editing system 106 allows for both types of move operations while providing a clear indication of which operation a user is selecting. In some cases, however, the scene-based image editing system 106 utilizes other interactive means for determining that a perspective-aware object move operation is to be used (e.g., a double tap interaction with the object 4208 or voice input calling for the perspective-aware object move operation).

Indeed, as shown in FIG. 42B, the scene-based image editing system 106 detects a user selection of the selectable option 4210. Accordingly, the scene-based image editing system 106 determines to perform a perspective-aware object move on the object 4208 based on further user interactions.

As previously suggested, and as indicated in FIG. 42B, the scene-based image editing system 106 determines a line 4216 that runs from the vanishing point 4212 to (and through) the object 4208. In one or more embodiments, the scene-based image editing system 106 determines the line 4216 upon selection of the object 4208 or upon selection of the selectable option 4210. In some cases, the scene-based image editing system 106 determines the line 4216 when pre-processing the digital image 4206. In some instances, the scene-based image editing system 106 does not provide the line 4216 for display but still uses the line 4216 as a reference for moving the object 4208 with respect to the vanishing point 4212. In other words, in one or more embodiments, the scene-based image editing system 106 performs the perspective-aware object move operation by moving the object 4208 along the line 4216 either toward or away from the vanishing point 4212. As previously indicated, in some cases, the scene-based image editing system 106 restricts the movement of the object 4208 via the perspective-aware object move operation to movement along the line 4216.

Indeed, as shown in FIG. 42C, the scene-based image editing system 106 moves the object 4208 within the digital image 4206 with respect to the vanishing point 4212. In particular, the scene-based image editing system 106 moves the object 4208 along the line 4216 away from the vanishing point 4212.

As illustrated in FIG. 42C, upon moving the object 4208, the scene-based image editing system 106 exposes a completed portion of the background for the digital image 4206. In particular, where the first position of the object 4208 represents the initial position of the object 4208 within the digital image, the completed portion of the background that is exposed includes content fill generated for the object 4208. Indeed, in one or more embodiments, the scene-based image editing system 106 pre-processes the digital image 4206 as discussed above to generate content fill for the object 4208. Further, in some cases, the scene-based image editing system 106 positions the content fill behind the object 4208 (e.g., behind a mask of the object). Accordingly, before the object is moved, the portion of the background covered by the object 4208 has already been filled in with pre-generated content and moving the object 4208 exposes the pre-generated content rather than a hole in the digital image 4206.

As further shown, the scene-based image editing system 106 increases the size of the object 4208 (via a perspective-based resizing) based on the movement of the object 4208 away from the vanishing point 4212. In one or more embodiments, the scene-based image editing system 106 resizes the object 4208 upon determining the resulting position of the object 4208 after being moved. In other words, the scene-based image editing system 106 determines that movement of the object 4208 has finished, uses the resulting position to determine a perspective scaling ratio as described above, and modifies the size of the object 4208 using the perspective scaling ratio. In some cases, however, the scene-based image editing system 106 resizes the object 4208 in real time as the object 4208 is moved. Indeed, in some cases, the scene-based image editing system 106 continuously resizes the object 4208 as it moves along the line 4216, allowing a user to view how the size of the object 4208 changes with the movement.

The above discussion for FIGS. 40-42C provides detail for the scene-based image editing system 106 resizing an object within a digital image in response to user input to move the object with respect to a vanishing point of the digital image. In one or more embodiments, however, the scene-based image editing system 106 receives user input to resize the object and determines a new position for the object based on the resizing input. To illustrate, in one or more embodiments, the scene-based image editing system 106 assigns a perspective scale attribute to an object portrayed in a digital image. Further, the scene-based image editing system 106 initializes the perspective scale (e.g., by giving an initial value of 1.0). In some embodiments, the scene-based image editing system 106 further receives user input to increase or decrease the size of the object (e.g., via a pinch gesture detected via the graphical user interface displaying the digital image) and resizes the object accordingly. For example, in some implementations, the scene-based image editing system 106 determines a scale factor based on the user input and multiplies the perspective scale of the object with the scale factor to get a new value for the perspective scale. The scene-based image editing system 106 determines the new size of the object using the new value of the perspective scale. The scene-based image editing system 106 further determines a new perspective-based location for the object via linear interpolation based on the original position of the object with respect to the vanishing point using the determined scale factor.

Figure 43:
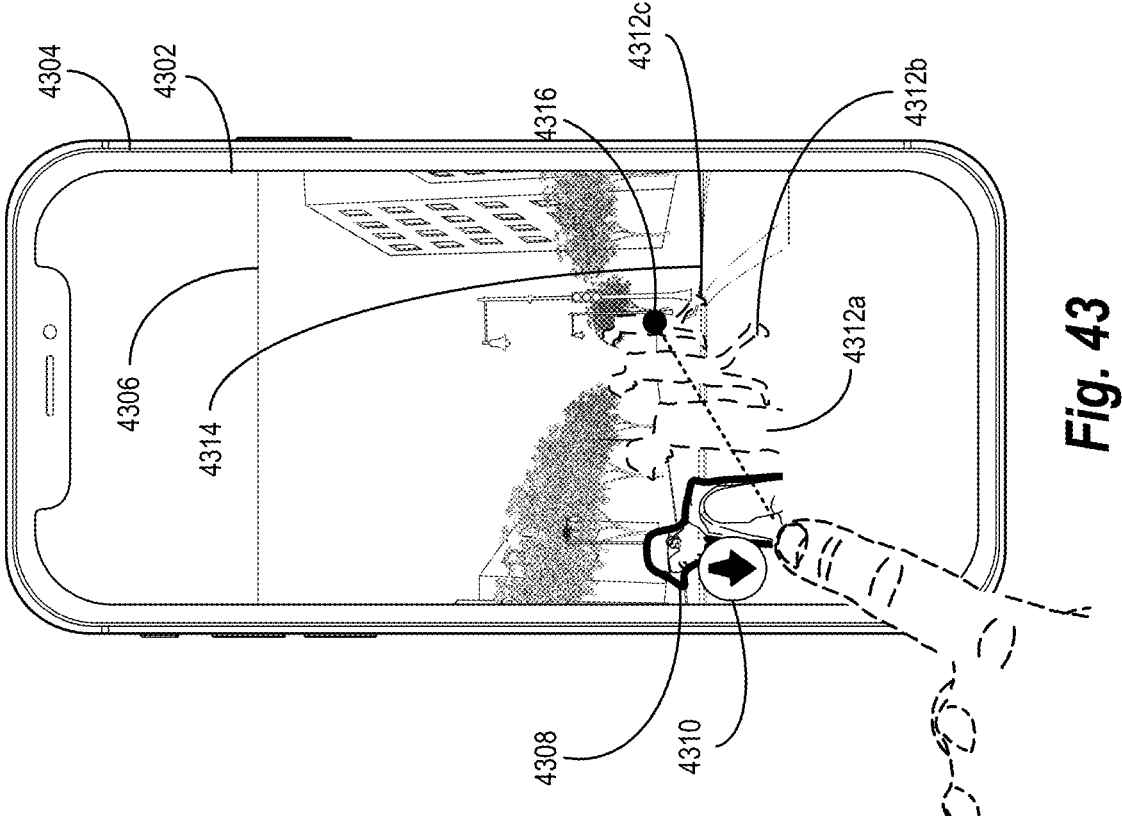
FIG. 43 illustrates a graphical user interface used by the scene-based image editing system to provide a plurality of perspective-based size previews for an object portrayed within a digital image in accordance with one or more embodiments.

In one or more embodiments, the scene-based image editing system 106 further generates one or more perspective-based size previews for an object portrayed within a digital image. Further, the scene-based image editing system 106 provides the perspective-based size preview(s) for display within a graphical user interface to support a perspective-aware object move operation on the object. FIG. 43 illustrates a graphical user interface used by the scene-based image editing system 106 to provide a plurality of perspective-based size previews for an object portrayed within a digital image in accordance with one or more embodiments.

In one or more embodiments, a perspective-based size preview includes a visual indication of how an object is to be resized upon the object being moved with respect to a perspective of the digital image portraying the object. In particular, in some embodiments, a perspective-based size preview includes a visual indication of the result of a perspective-based resizing of the object when moved within the digital image with respect to the perspective (e.g., with respect to the vanishing point lying on the horizon line) of the digital image. For example, in some cases, a perspective-based size preview includes a visual preview of the resulting size of an object at a position other than the current position of the object within the digital image, the other position lying on a line from the vanishing point to (and through) the object.

Indeed, as shown in FIG. 43, the scene-based image editing system 106 provides a digital image 4306 for display within a graphical user interface 4302 of a client device 4304. Additionally, as shown, the scene-based image editing system 106 detects a selection of an object 4308 portrayed within the digital image via one or more user interactions with the graphical user interface 4302 as well as a selection of a selectable option 4310 for performing a perspective-aware object move operation on the object 4308.

As indicated by FIG. 43, in response to detecting the selection of the selectable option 4310, the scene-based image editing system 106 provides perspective-based size previews 4312*a*-4312*c* for display within the graphical user interface 4302. In particular, the scene-based image editing system 106 provides the perspective-based size previews 4312*a*-4312*c* along a line 4314 from a vanishing point 4316 of the digital image 4306 through the object 4308.

In one or more embodiments, the scene-based image editing system 106 generates the perspective-based size previews 4312*a*-4312*c* upon selection of the object 4308 or upon selection of the selectable option 4310. In some cases, the scene-based image editing system 106 generates the perspective-based size previews 4312a-4312c when pre-processing the digital image 4306.

In some embodiments, the scene-based image editing system 106 generates the perspective-based size previews 4312a-4312c by selecting positions on the line 4314 and determining the resulting size of the object 4308 if moved to those positions. For instance, in some cases, the scene-based image editing system 106 selects positions along the line 4314 at regular intervals. In some cases, the scene-based image editing system 106 generates at least one perspective-based size preview that indicates a larger size than the size of the object 4308 at its current position if the object 4308 were moved away from the vanishing point 4316 and at least one perspective-based size preview indicating a smaller size than the size of the object 4308 at its current position if the object 4308 were moved toward the vanishing point 4316. In some cases, however, the scene-based image editing system 106 generates only perspective-based previews that indicate a larger size or a smaller size for the object 4308. For instance, as shown in FIG. 43, due to the object 4308 initially being positioned far away from the vanishing point 4316, the scene-based image editing system 106 generate the perspective-based size previews 4312a-4312c to indicate smaller sizes for the object 4308 upon the object 4308 being moved closer to the vanishing point 4316. The number of perspective-based size previews generated and provided for display varies in different embodiments.

In one or more embodiments, the scene-based image editing system 106 modifies the perspective-based size previews displayed within the graphical user interface 4302 upon moving the object 4308 along the line 4314. For instance, in some cases, upon moving the object 4308 along the line 4314, the scene-based image editing system 106 also moves the perspective-based size previews 4312a-4312c along the line. Further, the scene-based image editing system 106 resizes the perspective-based size previews 4312a-4312c based on their new positions on the line (e.g., using respective perspective scaling ratios). In some instances, the scene-based image editing system 106 adds a new perspective-based size preview as more space on the line 4314 becomes available or deletes a perspective-based size preview as space on the line 4314 decreases. For instance, in some embodiments, upon moving the object 4308 along the line 4314 toward the vanishing point 4316, the scene-based image editing system 106 determines that there is enough room on the portion of the line 4314 to the left of the object 4308 and generates and provides a perspective-based size preview for display along that portion of the line 4314 (indicating a larger size for the object 4308 if moved to the position of the perspective-based size preview). Accordingly, in some implementations, the scene-based image editing system 106 dynamically modifies a set of perspective-based size previews that are shown based on the current positioning of the object 4308.

Figure 44:
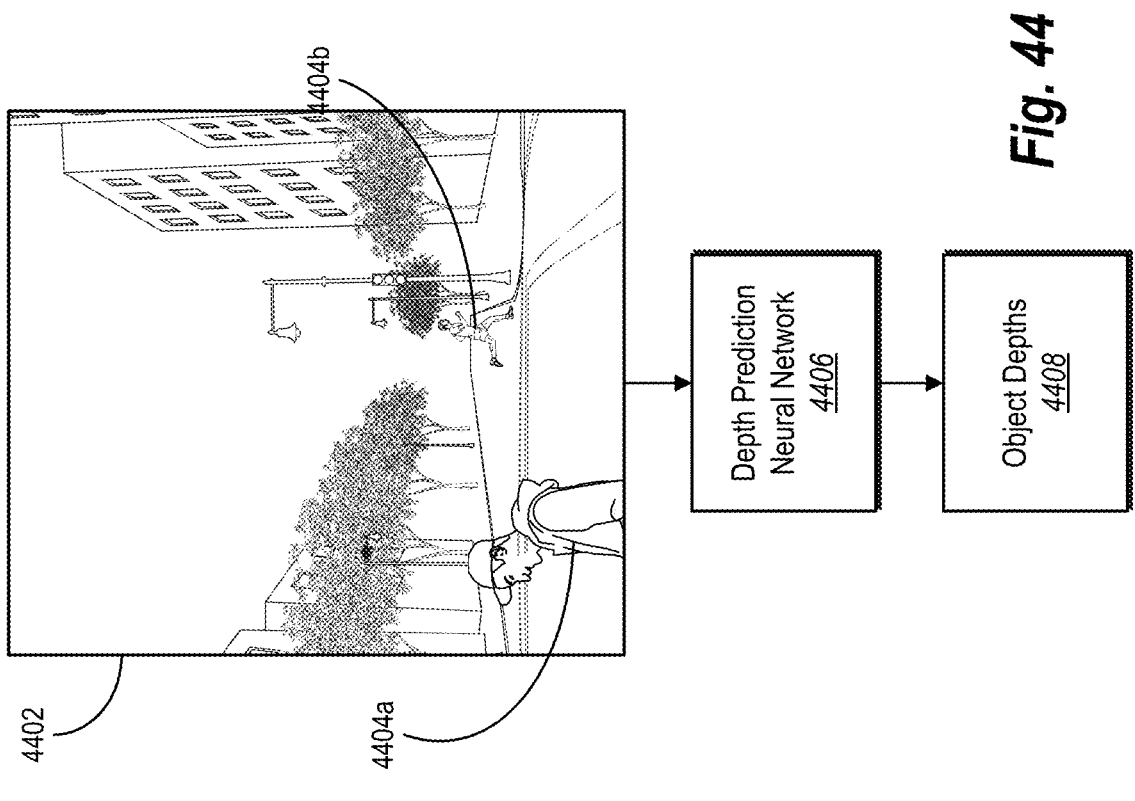
FIG. 44 illustrates determining object depths for objects portrayed within a digital image in accordance with one or more embodiments.

In one or more embodiments, when performing a perspective-aware object move operation on a digital image, the scene-based image editing system 106 further modifies the digital image to properly reflect the occlusion of objects portrayed within the digital image. In particular, when an object is moved to overlap with another object, the scene-based image editing system 106 modifies the object or the other object so that the overlapping portion is occluded. In some embodiments, to facilitate the proper occlusion of objects within a digital image, the scene-based image editing system 106 determines object depths for the objects. FIG. 44 illustrates the scene-based image editing system 106 determining object depths for objects portrayed within a digital image in accordance with one or more embodiments.

As shown in FIG. 44, the scene-based image editing system 106 analyzes a digital image 4402 portraying a first object 4404a and a second object 4404b. As shown, the first object 4404a and the second object 4404b are separated by a distance. In other words, the first object 4404a and the second object 4404b do not currently overlap.

As further illustrated, the scene-based image editing system 106 analyzes the digital image 4402 utilizing a depth prediction neural network 4406. In one or more embodiments, a depth prediction neural network includes a computer-implemented neural network that determines depth information for an object (e.g., an object depth) or other component portrayed within a digital image. In particular, in some embodiments, a depth prediction neural network includes a computer-implemented neural network that analyzes a digital image and determines depth information for an object or other portrayed component based on the analysis. It should be noted that the terms "depth prediction neural network" and "depth estimation neural network" may be used interchangeably. Accordingly, in one or more embodiments, the depth prediction neural network 4406 includes one of the depth estimation neural networks described above.

As further shown in FIG. 44, based on the analysis of the digital image 4402 using the depth prediction neural network 4406, the scene-based image editing system 106 determines object depths 4408. For instance, in some cases, the scene-based image editing system 106 determines the object depths 4408 by determining a first object depth for the first object 4404a and α second object depth for the second object 4404b.

In one or more embodiments, an object depth includes a metric or set of metrics corresponding to the depth of an object portrayed within a digital image. In particular, in some embodiments, an object depth includes one or more values that indicate a depth of an object with respect to the scene portrayed by the digital image. In some cases, the scene-based image editing system 106 measures object depth from the camera capturing the digital image (e.g., the distance between the object and the camera) or some other reference point whether that reference point appears within or outside the digital image.

The scene-based image editing system 106 uses various metrics to represent the object depth of an object in various embodiments. For instance, in some embodiments, the scene-based image editing system 106 uses a set of values where each value in the set represents a depth of a pixel that contributes to the portrayal of the object. In some instances, the scene-based image editing system 106 utilizes the largest depth value or the smallest depth value determined for a pixel contributing to the object. In some implementations, the scene-based image editing system 106 uses the total depth value (e.g., the value that results from adding the depth values of each pixel that contributes to the object). Further, in one or more embodiments, the scene-based image editing system 106 utilizes an average object depth as the object depth of an object. In one or more embodiments, the average object depth of an object includes the average depth value across the set of pixels that contribute to the portrayal of the object.

In one or more embodiments, the scene-based image editing system 106 determines the object depths 4408 as part of the pre-processing of the digital image 4402. In some cases, the scene-based image editing system 106 includes the object depths 4408 within a semantic scene graph generated for the digital image 4402. Accordingly, in some implementations, the scene-based image editing system 106 references the semantic scene graph when performing a perspective-aware object move operation. For example, in some cases, the scene-based image editing system 106 references the semantic scene graph to retrieve the object depths 4408 for comparison upon detecting a user selection to perform a perspective-aware object move operation.

In some cases, as will be described below, the scene-based image editing system 106 determines updated object depths as the first object 4404a or the second object 4404b are moved within the digital image 4402. Thus, in some implementations, the scene-based image editing system 106 modifies the digital image 4402 to reflect proper occlusion between the objects 4404a-4404b using the updated object depths.

Figures 45A, 45B, 45C:
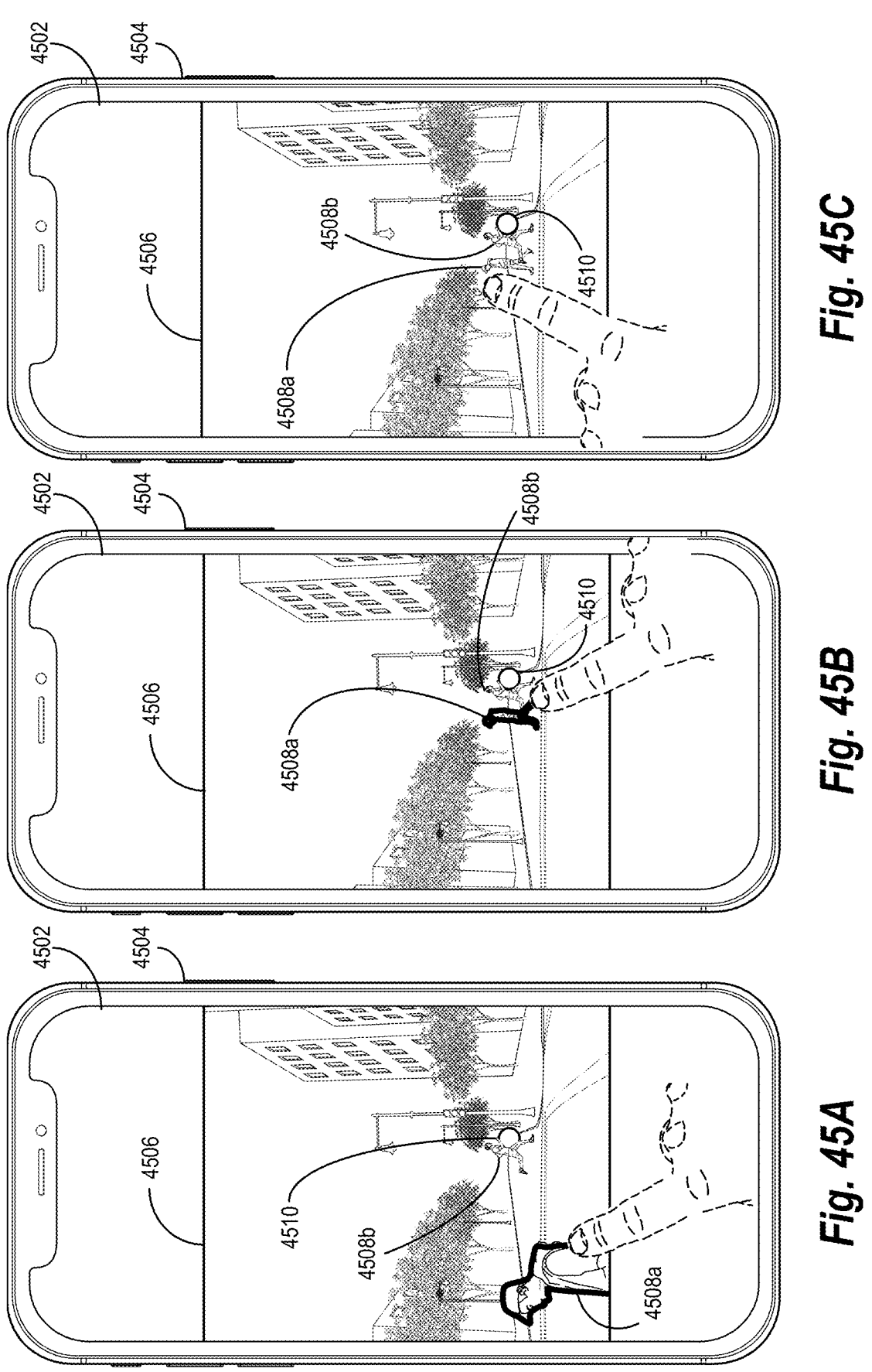
FIGS. 45A-45C illustrate a graphical user interface utilized by the scene-based image editing system to reflect occlusion between objects within a digital image in accordance with one or more embodiments.

FIGS. 45A-45C illustrate a graphical user interface utilized by the scene-based image editing system 106 to reflect occlusion between objects within a digital image in accordance with one or more embodiments. Indeed, as shown in FIG. 45A, the scene-based image editing system 106 provides a digital image 4506 portraying a first object 4508a and α second object 4508b for display within a graphical user interface 4502 of a client device 4504. FIG. 45A shows the first object 4508a positioned farther away from a vanishing point 4510 associated with the digital image 4506 than the second object 4508b. In one or more embodiments, the scene-based image editing system 106 determines that the object depth of the second object 4508b is greater than the object depth of the first object 4508a based on the positioning of the second object 4508b and the first object 4508a. As further shown, the scene-based image editing system 106 has detected a selection of the first object 4508a via a user interaction with the graphical user interface 4502.

As shown in FIG. 45B, the scene-based image editing system 106 moves and resizes the first object 4508a via a perspective-aware object move operation in response to further user interactions with the graphical user interface 4502. In particular, the scene-based image editing system 106 moves the first object 4508a toward the vanishing point 4510 and diminishes the size of the first object 4508a based on the movement. As further shown, the scene-based image editing system 106 moves the first object 4508a so that the first object 4508a is closer to the vanishing point 4510 than the second object 4508b. Additionally, the scene-based image editing system 106 moves the first object 4508a so that the first object 4508a overlaps with the second object 4508b. In particular, the scene-based image editing system 106 creates an overlap area in which a portion of the first object 4508a overlaps with a portion of the second object 4508b.

In one or more embodiments, the scene-based image editing system 106 determines an updated object depth for the first object 4508a based on the movement of the first object 4508a. In particular, the scene-based image editing system 106 determines the object depth for the first object 4508a at a position resulting from the move. In some cases, the scene-based image editing system 106 tracks (or continuously updates) the object depth of the first object 4508a as it moves. In some embodiments, the scene-based image editing system 106 determines an updated object depth when the first object 4508a stops moving or is deselected. In some cases, as suggested above, the scene-based image editing system 106 maintains a perspective scale attribute for the first object 4508a and updates the value of the perspective scale as the first object 4508a is resized and/or moved within the digital image 4806. Thus, in some embodiments, the scene-based image editing system 106 determines an updated object depth for the first object 4508a by multiplying the initial object depth of the first object 4508a (e.g., initial average object depth) by the updated value of the perspective scale.

In some implementations, based on the object depth of the first object 4508a at its position resulting from the move, the scene-based image editing system 106 determines that the object depth of the first object 4508a is now greater than the object depth of the second object 4508b. Indeed, in some instances, the scene-based image editing system 106 compares the object depth of the first object 4508a at its resulting position to the object depth of the second object 4508b and determines that the object depth of the first object 4508a is greater.

As shown in FIG. 45B, despite the object depth of the first object 4508a being greater, the scene-based image editing system 106 portrays the first object 4508a occluding the second object 4508b within the overlap area. Indeed, in some cases, the scene-based image editing system 106 portrays a selected object as occluding an object that is not selected when they overlap to provide the user a full view of the selected object (e.g., to facilitate the desired positioning). In some implementations, however, the scene-based image editing system 106 portrays the appropriate occlusion as soon as a selected object overlaps with another object. Indeed, in some cases, the scene-based image editing system 106 portrays the proper occlusion as soon as overlap is detected, providing a preview of the resulting occlusion upon finalization of the object movement.

As illustrated by FIG. 45C, the scene-based image editing system 106 modifies the digital image 4506 to occlude the first object 4508a with the second object 4508b based on the first object 4508a having a greater object depth than the second object 4508b (e.g., upon deselection of the first object 4508a). In particular, the scene-based image editing system 106 occludes the first object 4508a within the overlap area. In other words, the scene-based image editing system 106 occludes the portion of the first object 4508a within the overlap area using the portion of the second object 4508b that is within the overlap area.

Notably, FIGS. 45A-45C further illustrate the scene-based image editing system 106 completing the first object 4508a as it is moved within the digital image 4506. Indeed, as shown in FIG. 45A, the first object 4508a is only partially displayed within the digital image 4506. For instance, in some cases, when the digital image 4506 was captured, the top portion of the first object 4508a was within frame (and captured as part of the digital image 4506) while the bottom portion of the first object 4508a was not within frame (and not captured as part of the digital image 4506). Accordingly, in some instances, the scene-based image editing system 106 does not have data for the bottom portion of the first object 4508a.

As shown in FIGS. 45B-45C, however, the scene-based image editing system 106 provides the first object 4508a for display within its entirety within the digital image 4506. Accordingly, in some implementations, the scene-based image editing system 106 modifies the first object 4508a by completing the first object 4508a for display in its entirety within the digital image 4506. In other words, in some instances, the scene-based image editing system 106 generates data that corresponds to the bottom portion of the first object 4508a.

In particular, in some embodiments, the scene-based image editing system 106 modifies the first object 4508a by generating a bottom portion for the first object 4508a. For instance, in some cases, the scene-based image editing system 106 generates one or more infill modifications that complete the first object 4508a by filling in the bottom portion. In one or more embodiments, the scene-based image editing system 106 utilizes, to complete the first object 4508a, the semantic map model, the generative semantic machine learning model, and/or the generative image machine learning model described in U.S. application Ser. No. 18/190,513, filed Mar. 27, 2023, titled UTILIZING A GENERATIVE MACHINE LEARNING MODEL AND GRAPHICAL USER INTERFACE FOR CREATING MODIFIED DIGITAL IMAGES FROM AN INFILL SEMANTIC MAP, which is incorporated by reference herein in its entirety.

In one or more embodiments, the scene-based image editing system 106 completes the first object 4508a as part of a workflow for pre-processing the digital image 4506. Indeed, as previously suggested, before receiving user input to modify the digital image 4506, the scene-based image editing system 106 pre-processes the digital image 4506 in some cases. In some embodiments, the scene-based image editing system 106 pre-processes the digital image 4506 by analyzing the first object 4508a and generating one or more infill modifications that complete the first object 4508a. In some instances, however, the scene-based image editing system 106 completes the first object 4508a upon determining that the first object 4508a is being moved so as to expose previously unseen portions.

Though FIGS. 45A-45C illustrate the scene-based image editing system 106 completing the first object 4508a by generating portions that were not initially portrayed by the digital image 4506 due to being out of frame when the digital image 4506 was captured, the scene-based image editing system 106 similarly completes objects that partially blocked by other objects within a digital image in some embodiments. To illustrate, in some cases, the bottom portion of the first object 4508a is blocked by another object portrayed in the digital image 4506 (rather than being out of frame). Accordingly, the scene-based image editing system 106 modifies the first object 4508a by generating the bottom portion, such as by using the semantic map model, the generative semantic machine learning model, and/or the generative image machine learning model referenced above.

Thus, in one or more embodiments, the scene-based image editing system 106 provides proper occlusion for objects portrayed within digital images based on the movements of objects and their relative objects depths. Further, in some embodiments, the scene-based image editing system 106 provides proper disocclusion for objects within a digital image. In particular, when a digital image is modified so that an object is no longer occluded (or occluded to a lesser degree) by another object, the scene-based image editing system 106 modifies the object to expose more of the object. In some instances, where a portion of an object that was previously occluded was not originally captured as part of the digital image (e.g., because it was out of frame or blocked by another object), the scene-based image editing system 106 completes the object by generating the previously unseen portion(s) for display.

In one or more embodiments, rather than using object depth to reflect occlusion among overlapping object, the scene-based image editing system 106 utilizes a disparity metric. In some cases, the scene-based image editing system 106 establishes disparity as an inverse depth in which an object that is closer to a horizon line has a smaller disparity than an object that is farther from the horizon line. Accordingly, in some embodiments, the scene-based image editing system 106 determines that an object with greater disparity occludes an overlapping object with less disparity. In some implementations, the scene-based image editing system 106 utilizes a reference point or reference line other than the horizon line to determine disparity.

By performing a perspective-aware object move operation as described above, the scene-based image editing system 106 provides improved flexibility and efficiency when compared to conventional systems. For instance, the scene-based image editing system 106 flexibly performs image editing in accordance with the three-dimensional environments captured within digital images. In particular, by automatically resizing an object based on its movement with respect to the three-dimensional perspective (e.g., the vanishing point) of its digital image, the scene-based image editing system 106 flexibly incorporates that perspective into the editing process. Additionally, by automatically modifying a digital image to portray proper occlusion among overlapping objects based on their object depths, the scene-based image editing system 106 further incorporates the three-dimensional perspective. By automatically resizing and occluding objects based on their movement with respect to a digital image's perspective, the scene-based image editing system 106 further reduces the user interactions that are typically required under conventional systems to perform these edits. Indeed, the scene-based image editing system 106 folds multiple edits into a single perspective-aware object move operation that is implemented in response to a consolidated set of user interactions.

In one or more embodiments, the scene-based image editing system 106 implements a depth-aware object move operation when editing a digital image. In particular, when moving an object within a digital image, the scene-based image editing system 106 modifies the digital image to reflect the proper occlusion between the object and another object that overlaps with the moved object. In some implementations, the depth-aware object move operation differs from the perspective-aware object move operation in that the scene-based image editing system 106 does not move and resize an object in accordance with a perspective of the digital image when performing a depth-aware object move operation. In alternative implementations, the depth-aware object move is performed in connection with the perspective-aware move, such that once an object is moved and resized, the scene-based image editing system 106 also ensures proper occlusion with any other objects in the scene of the digital image. By incorporating object occlusion based on object depths, the scene-based image editing system 106 incorporates three-dimensional effects in the editing process. FIGS. 46-48C illustrate the scene-based image editing system 106 implementing depth-aware object move operations in accordance with one or more embodiments.

Many conventional image editing systems are inflexible and inefficient with respect to reflecting the proper occlusion between overlapping objects in a digital image. For instance, conventional systems typically fail to flexibly portray occlusion among objects unless the objects were overlapping when the digital image was captured (e.g., the occlusion was captured as part of the digital image). Indeed, conventional systems often fail to portray occlusion when one object is moved to overlap with another object without receiving user input to direct the occlusion. For instance, some conventional image editing systems rigidly require user input that indicates a layering for the objects within a digital image to properly occlude an object when it overlaps with another object. As such, many conventional systems rigidly manage a digital image as a flat surface in which the objects portrayed therein exist at the same depth.

As many conventional image editing systems rely on user input to provide proper occlusion among overlapping objects, such systems operate inefficiently. Indeed, such conventional systems typically require user interactions to indicate which object will occlude (i.e., the occluding object) and which object will be occluded (whether the user interactions indicate a top and bottom layer or otherwise indicate which object is meant to appear in front of the other object). Thus, these systems provide inefficient graphical user interfaces that rely on user interactions to properly react to the overlapping of objects within a digital image. Furthermore, with many conventional systems, the user must perform intensive editing operations to provide a realistic appearance between overlapping objects.

The scene-based image editing system 106 utilizes depth-aware object move operations to provide improved flexibility when compared to conventional systems. For instance, by automatically modifying a digital image when an object is moved to overlap with another object to portray occlusion between the overlapping objects, the scene-based image editing system 106 flexibly accommodates the depth differences between the objects within the scene captured in the digital image. Indeed, the scene-based image editing system 106 flexibly edits the digital image as a real-world scene in which the objects exist in a three-dimensional environment.

Further, by modifying a digital image to reflect the proper occlusion between a moved object and another object, the scene-based image editing system 106 reduces the user interactions typically required by conventional systems to incorporate such occlusion. For instance, the scene-based image editing system 106 eliminates the need for user input to indicate which object is occlude and which object is to be occluded and cutting or otherwise modifying the objects to provide the proper occlusion.

Figure 46:
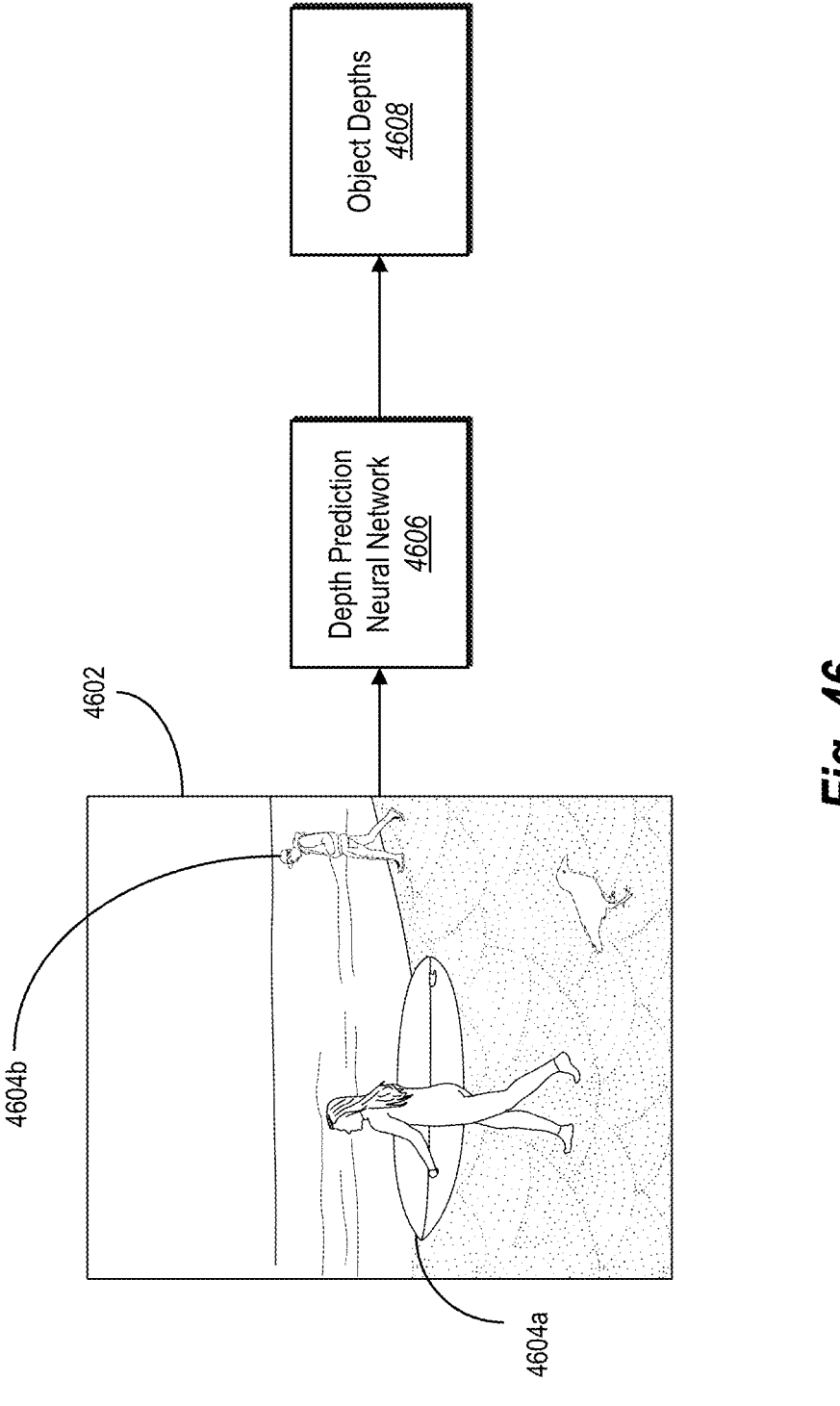
FIG. 46 illustrates determining the object depths of objects portrayed in a digital image in accordance with one or more embodiments.

As mentioned, in one or more embodiments, the scene-based image editing system 106 utilizes the object depths of the objects portrayed in a digital image to implement a depth-aware object move operation. Accordingly, in some embodiments, the scene-based image editing system 106 analyzes a digital image to determine the object depths of the objects portrayed therein. FIG. 46 illustrates the scene-based image editing system 106 determining the object depths of objects portrayed in a digital image in accordance with one or more embodiments.

In one or more embodiments, a depth-aware object move operation includes an editing operation for moving an object within a digital image and occluding at least one object based on the movement. Indeed, in some cases, a depth-aware object move operation includes a type of object-aware modification as it targets an object identified within a digital image. In some cases, a depth-aware object move operation is different from a standard move operation in that a depth-aware object move operation results in the automatic occlusion of one or more overlapping objects based on their respective object depths. Indeed, as will be discussed, in one or more embodiments, the scene-based image editing system 106 compares the object depths of objects that are overlapping as the result of an object move and occludes at least one of the objects based on the comparison.

Indeed, as shown in FIG. 46, the scene-based image editing system 106 analyzes a digital image 4602 portraying a first object 4604a and a second object 4604b. The scene-based image editing system 106 analyzes the digital image 4602 using a depth prediction neural network 4606 (e.g., one of the depth estimation neural networks described above)

and determines object depths 4608 based on the analysis. In particular, the scene-based image editing system 106 determines a first object depth for the first object 4604a and a second object depth for the second object 4604b.

As mentioned above, in some cases, the scene-based image editing system 106 updates the object depths when performing a perspective-aware object move operation as movement of an object with respect to a perspective of its digital image will change the object's depth. In contrast, in one or more embodiments, the scene-based image editing system 106 maintains the initial object depths for the objects when performing a depth-aware object move operation as such an operation does not change an object's depth when it is moved. In other words, in some cases, the scene-based image editing system 106 utilizes a depth-aware object move operation to move an object vertically or horizontally in the image plane of a digital image but does not change the objects distance to a vanishing point of the digital image.

Accordingly, in some instances, the scene-based image editing system 106 determines the object depths 4608 for the first object 4604a and the second object 4604b while they are positioned separately and uses the object depths when the first object 4604a or the second object 4604b is moved to overlap with the other. For instance, as previously suggested, the scene-based image editing system 106 pre-processes the digital image 4602 to determine the object depths 4608 in some implementations.

As further illustrated, the scene-based image editing system 106 analyzes the digital image 4602 utilizing a depth prediction neural network 4606. In one or more embodiments, a depth prediction neural network includes a computer-implemented neural network that determines depth information for an object (e.g., an object depth) or other component portrayed within a digital image. In particular, in some embodiments, a depth prediction neural network includes a computer-implemented neural network that analyzes a digital image and determines depth information for an object or other portrayed component based on the analysis. It should be noted that the terms "depth prediction neural network" and "depth estimation neural network" may be used interchangeably. Accordingly, in one or more embodiments, the depth prediction neural network 4606 includes one of the depth estimation neural networks described above.

As further shown in FIG. 46, based on the analysis of the digital image 4602 using the depth prediction neural network 4606, the scene-based image editing system 106 determines object depths 4608. For instance, in some cases, the scene-based image editing system 106 determines the object depths 4608 by determining a first object depth for the first object 4604a and α second object depth for the second object 4604b.

In one or more embodiments, an object depth includes a metric or set of metrics corresponding to the depth of an object portrayed within a digital image. In particular, in some embodiments, an object depth includes one or more values that indicate a depth of an object with respect to the scene portrayed by the digital image. In some cases, the scene-based image editing system 106 measures object depth the camera capturing the digital image (e.g., the distance between the object and the camera) or some other reference point whether that reference point appears within or outside the digital image.

The scene-based image editing system 106 uses various metrics to represent the object depth of an object in various embodiments. For instance, in some embodiments, the scene-based image editing system 106 uses a set of values where each value in the set represents a depth of a pixel that contributes to the portrayal of the object. In some instances, the scene-based image editing system 106 utilizes the largest depth value or the smallest depth value determined for a pixel contributing to the object. In some implementations, the scene-based image editing system 106 uses the total depth value (e.g., the value that results from adding the depth values of each pixel that contributes to the object). Further, in one or more embodiments, the scene-based image editing system 106 utilizes an average object depth as the object depth of an object. In one or more embodiments, the average object depth of an object includes the average depth value across the set of pixels that contribute to the portrayal of the object.

In one or more embodiments, the scene-based image editing system 106 determines the object depths 4608 as part of the pre-processing of the digital image 4602. In some cases, the scene-based image editing system 106 includes the object depths 4608 within a semantic scene graph generated for the digital image 4602. Accordingly, in some implementations, the scene-based image editing system 106 references the semantic scene graph when performing a perspective-aware object move operation. For example, in some cases, the scene-based image editing system 106 references the semantic scene graph to retrieve the object depths 4608 for comparison upon detecting a user selection to perform a perspective-aware object move operation.

In one or more implementations, the scene-based image editing system 106 utilizes a depth prediction neural network as described in U.S. application Ser. No. 17/186,436, filed Feb. 26, 2021, titled "GENERATING DEPTH IMAGES UTILIZING A MACHINE-LEARNING MODEL BUILT FROM MIXED DIGITAL IMAGE SOURCES AND MULTIPLE LOSS FUNCTION SETS," which is herein incorporated by reference in its entirety. Alternatively, the scene-based image editing system 106 utilizes a depth prediction neural network as described in U.S. application Ser. No. 17/658,873, filed Apr. 12, 2022, titled "UTILIZING MACHINE LEARNING MODELS TO GENERATE REFINED DEPTH MAPS WITH SEGMENTATION MASK GUIDANCE," which is herein incorporated by reference in its entirety. The scene-based image editing system 106 then accesses the depth information (e.g., average depth for an object) for an object from the semantic scene graph 1412 when editing an object to perform a realistic scene edit. For example, when moving an object within an image, the scene-based image editing system 106 then accesses the depth information for objects in the digital image from the semantic scene graph 1412 to ensure that the object being moved is not placed in front an object with less depth.

Figures 47A, 47B, 47C:
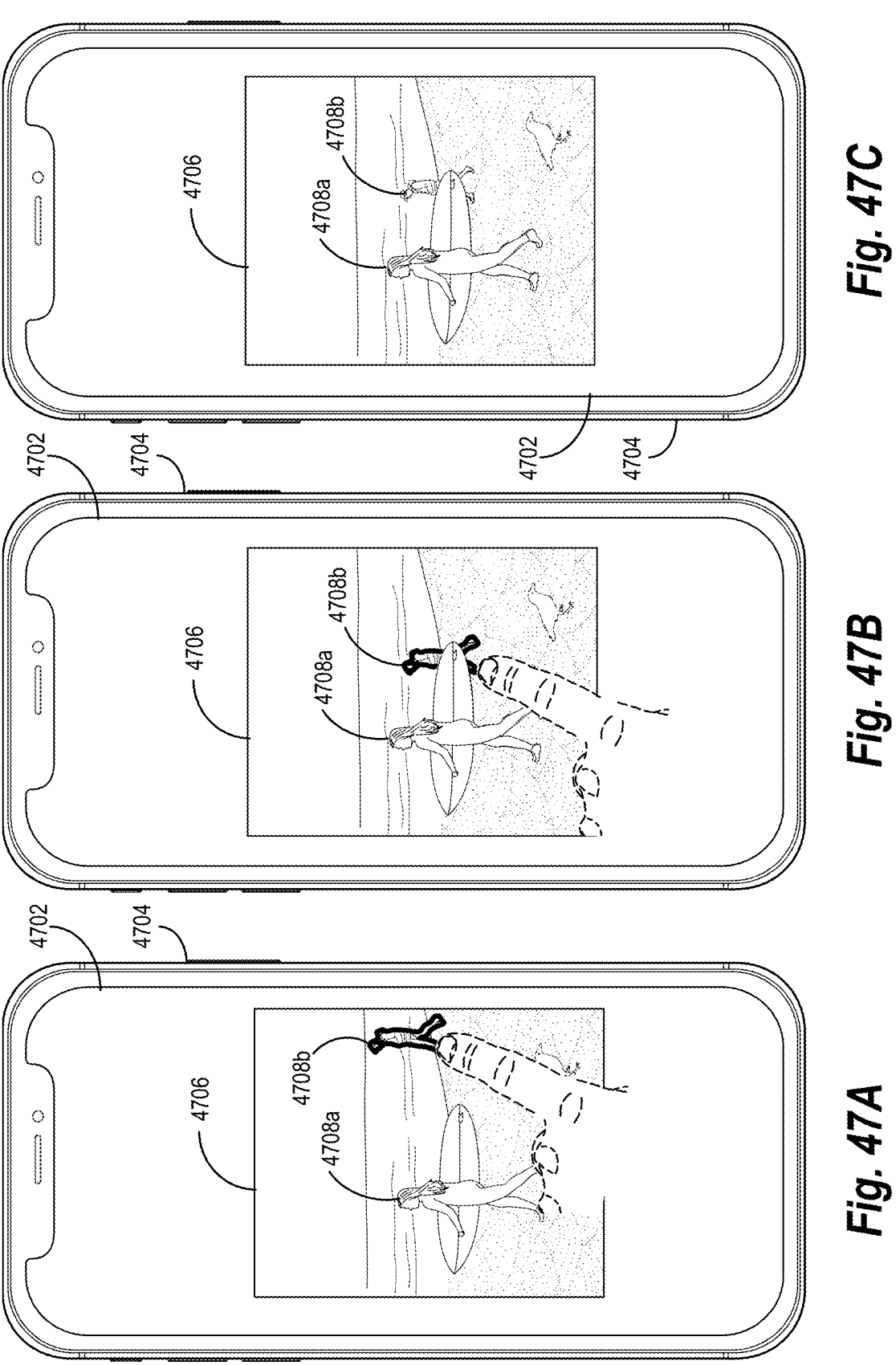
FIGS. 47A-47C illustrate a graphical user interface implemented by the scene-based image editing system to perform a depth-aware object move operation in accordance with one or more embodiments.

FIGS. 47A-47C illustrate a graphical user interface implemented by the scene-based image editing system 106 to perform a depth-aware object move operation in accordance with one or more embodiments. As shown in FIG. 47, the scene-based image editing system 106 provides, for display within a graphical user interface 4702 of a client device 4704, a digital image 4706 portraying a first object 4708a and a second object 4708b. As illustrated, the first object 4708a and the second object 4708b are positioned separately within the digital image 4706 so that they do not overlap. As further shown, the scene-based image editing system 106 determines that the second object 4708b is selected.

As shown in FIG. 47B, in response to one or more further user interactions with the graphical user interface 4702, the scene-based image editing system 106 moves the second object 4708b within the digital image 4706. In particular, the scene-based image editing system 106 moves the second object 4708b to create an overlap area between the first object 4708a and the second object 4708b. As shown in FIG. 47B, the scene-based image editing system occludes the second object 4708b with the first object 4708a as the second object 4708b is moved to overlap the first object 4708a. In particular, the scene-based image editing system 106 occludes the portion of the second object 4708 with the overlapping portion of the first object 4708a. Thus, the scene-based image editing system 106 provides a view of the occlusion between the objects even while the second object 4708b is still selected and is in the process of being moved.

In one or more embodiments, as previously described, the scene-based image editing system 106 pre-processes the digital image 4706 before receiving user interactions for modifying the digital image 4706. For instance, as discussed above, the scene-based image editing system 106 pre-processes the digital image 4706 to determine the object depths for the first object 4708a and the second object 4708b. Thus, in some cases, the scene-based image editing system 106 determines that the first object 4708a will be the occluding object and the second object 4708b will be the occluded object when an overlap exists before either object is moved. Indeed, in some cases, the scene-based image editing system 106 compares the object depths of the object to identify the occluding object and the occluding object when pre-processing the digital image 4706. In some implementations, however, the scene-based image editing system 106 compares the object depths to identify the occluding object and the occluded object upon detecting movement of one of the objects or upon determining that the objects are overlapping.

In some implementations, the scene-based image editing system 106 determines the object depths for the first object 4708a and the second object 4708b as part of a workflow of pre-processing the digital image. Thus, the scene-based image editing system 106 leverages the results of the pre-processing workflow when modifying the digital image.

To illustrate, in one or more embodiments, the scene-based image editing system 106 pre-processes the digital image 4706 to identify the first object 4708a and the second object 4708b within the digital image. Further, in some embodiments, the scene-based image editing system 106 pre-processes the digital image 4706 to generate object masks for the first object 4708a and the second object 4708b. In some cases, the scene-based image editing system 106 utilizes a segmentation neural network (e.g., the detection-masking neural network 300 discussed above with reference to FIG. 3) to detect and generate object masks for the first object 4708a and the second object 4708b. Thus, upon detecting the user interaction indicated by FIGS. 47A, the scene-based image editing system 106 determines that the user interaction is targeting the second object 4708b for selection as the second object 4708b has already been identified. Further, upon detecting the one or more user interactions indicated by FIG. 47B, the scene-based image editing system 106 moves the second object 4708b within the digital image 4706 as the second object 4708 has already been segmented. In some cases, the scene-based image editing system 106 determines the object depths for the first object 4708a and the second object 4708b using their respective object masks.

In some cases, the scene-based image editing system 106 generates content fill for the first object 4708a and the second object 4708b as part of the pre-processing workflow. For instance, in one or more embodiments, the scene-based image editing system 106 generates content fill for the first object 4708*a* and the second object 4708*b* using a content-aware hole-filling machine learning model (e.g., the cascaded modulation inpainting neural network 420 discussed above with reference to FIG. 4). In some cases, the scene-based image editing system 106 generates a completed background for the digital image 4706 using the content fill. For example, in some implementations, the scene-based image editing system 106 positions the generated content fill behind the corresponding object (or object mask) within the digital image. Thus, as shown in FIG. 47B, upon moving the second object 4708*b* from its initial position, the scene-based image editing system 106 exposes the corresponding content fill so that the background of the digital image 4706 already appears completed.

As shown in FIG. 47C, the scene-based image editing system 106 determines that the second object 4708*b* has been deselected. Accordingly, the scene-based image editing system 106 determines that movement of the second object 4708*b* has completed. Accordingly, upon deselection of the second object 4708*b*, the scene-based image editing system 106 provides the final occlusion based on the overlap between the first object 4708*a* and the second object 4708*b*.

As previously suggested, in one or more embodiments, the scene-based image editing system 106 adds the object depths to a semantic scene graph generated for the digital image 4706 (e.g., as part of the pre-processing workflow). Accordingly, in some cases, the scene-based image editing system 106 references the semantic scene graph when performing the depth-aware object move operation. For instance, in some cases, the scene-based image editing system 106 references the semantic scene graph to retrieve and compare the object depths in response to moving the second object 4708*b* to create the overlap area with the first object 4708*a*.

In some embodiments, as previously suggested, the scene-based image editing system 106 further compares the object depths to determine which object has the greater or lesser object depth before movement of the second object 4708*b*. For instance, in some cases, the scene-based image editing system 106 compares the object depths as part of the pre-processing of the digital image 4706. In some instances, the scene-based image editing system 106 uses the pre-processing to determine a ranking of the object depths and includes the ranking in the semantic scene graph generated for the digital image 4706. Accordingly, in some implementations, the scene-based image editing system 106 references the semantic scene graph (e.g., to retrieve the ranking) when performing the depth-aware object move operation.

FIG. 47C depicts a scenario in which the scene-based image editing system 106 determines that the object depth of the second object 4708*b* is greater than the object depth of the first object 4708*a* and occludes the second object 4708*b* with the first object 4708*a* within the overlap area accordingly. In particular, the scene-based image editing system 106 occludes the portion of the second object 4708*b* within the overlap area using the portion of the first object 4708*a* that is within the overlap area. In one or more embodiments, in a scenario in which the scene-based image editing system 106 determines that the object depth of the second object 4708*b* is less than the object depth of the first object 4708*a*, the scene-based image editing system 106 occludes the first object 4708*a* with the second object 4708*b* within the overlap area.

Thus, in some implementations, the scene-based image editing system 106 implements a depth-aware object move operation using various other features of image editing offered by the scene-based image editing system 106.

Indeed, in some cases, the scene-based image editing system 106 utilizes previous object detection and segmentation performed as part of a pre-processing workflow. Further, the scene-based image editing system 106 utilizes content fill generated as part of the pre-processing workflow. As such, when moving an object to create overlap with another object that results in occlusion, the scene-based image editing system 106 provides a seamless experience in which the background already appears completed and the object can be moved with the proper occlusion provided in real-time without the need to wait for further processing.

Figures 48A, 48B, 48C:
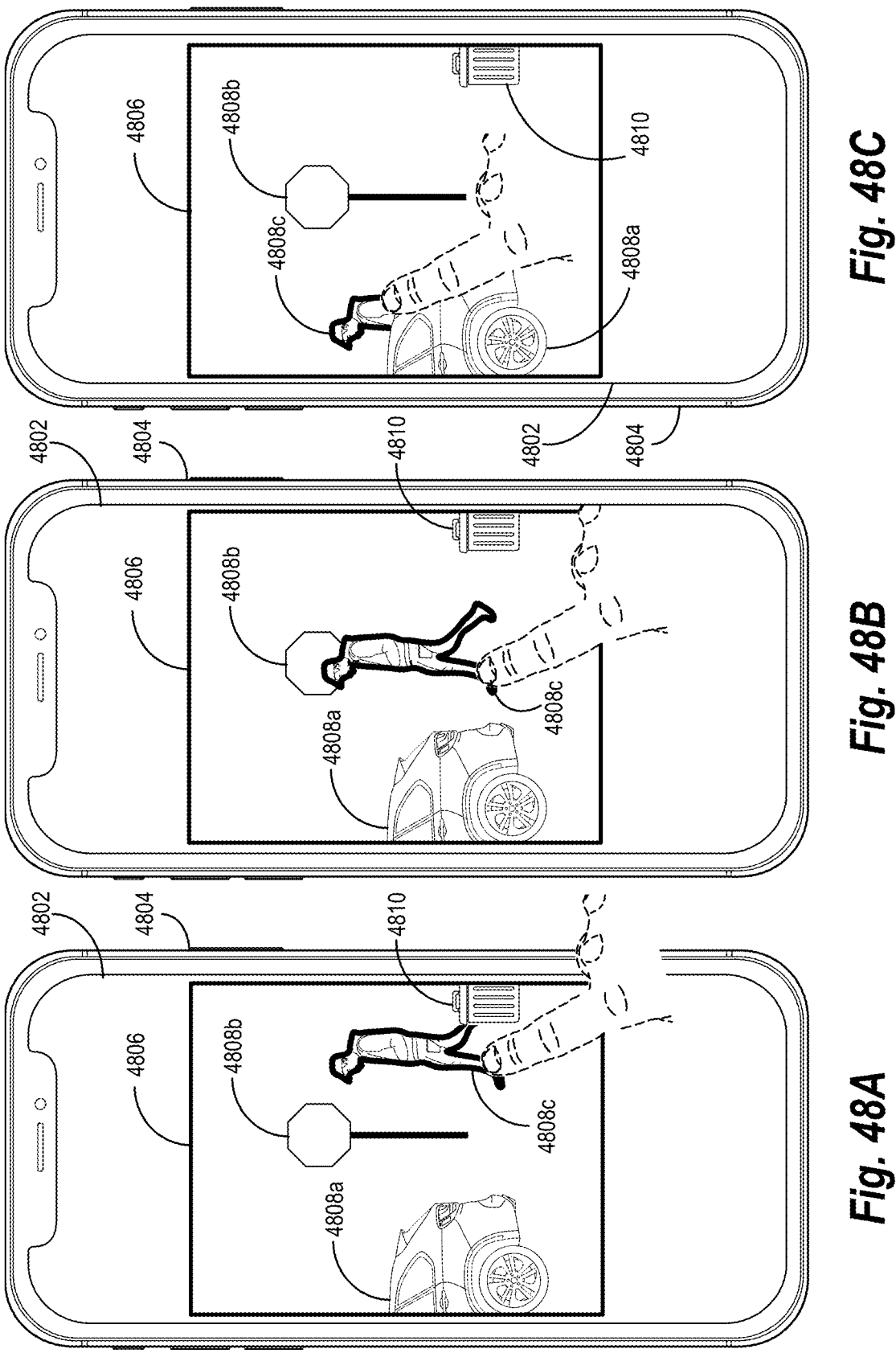
FIGS. 48A-48C illustrate another graphical user interface implement by the scene-based image editing system to perform a depth-aware object move operation in accordance with one or more embodiments.

FIGS. 48A-48C illustrate another graphical user interface implement by the scene-based image editing system 106 to perform a depth-aware object move operation in accordance with one or more embodiments. Indeed, as shown in FIG. 48A, the scene-based image editing system 106 provides, for display within a graphical user interface 4802 of a client device 4804, a digital image 4806 that portrays a first object 4808*a*, a second object 4808*b*, a third object 4808*c*, and a fourth object 4810. As there are four objects portrayed in the digital image 4806, the scene-based image editing system 106 determines four object depths. Further, the scene-based image editing system 106 determines a hierarchy or ranking of the object depths. In particular, the scene-based image editing system 106 identifies an object depth with a greatest depth value, an object depth with a least depth value, and object depths having a depth value in between. Accordingly, the scene-based image editing system 106 provides occlusion differently based on which objects overlap as a result of the movement of one of the objects. As shown in FIG. 48A, however, the digital image 4806 initially portrays the third object 4808*c* partially occluded by the fourth object 4810. In particular, the back foot of the third object 4808*c* is blocked from view by the fourth object 4810. Accordingly, in some cases, the scene-based image editing system 106 further provides disocclusion based on movement of one or more of the objects. As shown in FIG. 48A, the scene-based image editing system 106 has detected that the third object 4808*c* is selected via one or more user interactions with the graphical user interface 4802.

As shown in FIG. 48B, the scene-based image editing system 106 moves the third object 4808*c* to create an overlap area with the second object 4808*b*. As further shown, the scene-based image editing system 106 occludes the second object 4808*b* using the third object 4808*c* within the overlap area. In particular, the scene-based image editing system 106 determines that the object depth of the second object 4808*b* is greater than the object depth of the third object 4808*c* and occludes the second object 4808*b* within the overlap area accordingly. In some cases, the scene-based image editing system 106 determines which object has the greater object depth and which object has the lesser object depth upon detecting that the second object 4808*b* and the third object 4808*c* are overlapping. In some cases, as suggested above, the scene-based image editing system 106 determines which object has the greater object depth and which object has the lesser object depth before the objects overlap and, in some cases, before the third object 4808*c* is even selected for movement (e.g., as part of pre-processing).

As further shown in FIG. 48B, as the third object 4808*c* is moved away from the fourth object 4810, the scene-based image editing system 106 exposes the portion of the third object 4810*c* (i.e., the back foot) that was previously occluded by the fourth object 4810. In other words, the scene-based image editing system 106 disoccludes the portion of the third object 4810*c* by revealing it for display. In one or more embodiments, the scene-based image editing system 106 disoccludes the third object 4808*c* by generating the previously unseen portion. Indeed, as the digital image 4806 was initially captured with the back foot of the third object 4808*c* blocked by the fourth object 4810, the scene-based image editing system 106 did not capture data corresponding to the back foot. Accordingly, in some cases, the scene-based image editing system 106 generates content (e.g., an infill modification) to use as the back foot of the third object 4808*c*. In one or more embodiments, the scene-based image editing system 106 utilizes the semantic map model, the generative semantic machine learning model, and/or the generative image machine learning model described in U.S. application Ser. No. 18/190,513 to generate the content. Thus, the scene-based image editing system 106 occludes and/or disoccludes objects within a digital image as one or more of the objects are moved to create and/or remove areas of overlap.

As shown in FIG. 48C, the scene-based image editing system 106 moves the third object 4808*c* farther to create an overlap area between the first object 4808*a* and the third object 4808*c*. As further shown, the scene-based image editing system 106 occludes the third object 4808*c* using the first object 4808*a* within the overlap area. In particular, the scene-based image editing system 106 determines that the object depth of the third object 4808*c* is greater than the object depth of the first object 4808*a* and occludes the third object 4808*c* within the overlap area accordingly. Notably, the scene-based image editing system 106 occludes the third object 4808*c* while the third object 4808*c* is still selected. Thus, in such embodiments, the scene-based image editing system 106 facilitates a real-time view of the resulting occlusion before the movement of the third object 4808*c* has been finalized.

In some cases, the scene-based image editing system 106 occludes the third object 4808*c* with the first object 4808*a* as the third object 4808*c* begins to overlap with the first object 4808*a*. For instance, upon determining that a portion of the third object 4808*c* is overlapping with a portion of the first object 4808*a*, the scene-based image editing system 106 occludes the portion of the third object 4808*c*. As the third object 4808*c* moves further so that a larger portion of the third object 4808*c* overlaps with a larger portion of the first object 4808*a* (i.e., the overlap area grows), the scene-based image editing system 106 updates the occlusion to occlude the larger portion of the third object 4808*c*.

To put more generally, in one or more embodiments, the scene-based image editing system 106 dynamically modifies a digital image in real time to portray occlusion based on the current positioning of overlapping objects. Thus, when an occluding object (e.g., an object with relatively smaller object depth) begins to overlap with another object (e.g., having relatively greater object depth) the scene-based image editing system 106 occludes those pixels of the other object that are overlapping with the occluding object. As the area of overlap grows so that additional pixels of the other object are overlapping with the occluding object, the scene-based image editing system 106 modifies the digital image so that the additional pixels of the other object are also occluded. Conversely, when the occluding object is moved so that the area of overlap decreases and pixels of the other object leave the overlap area, the scene-based image editing system 106 modifies the digital image to expose those pixels of the other object that have left the overlap area.

Similarly, in one or more embodiments, as the portions of objects that are overlapping change, the scene-based image editing system 106 modifies the digital image to update the occlusion between the objects. To illustrate, where an occluding object overlaps with another object to create an initial overlap area, the scene-based image editing system 106 occludes the other object with the occluding object within the overlap area. Further, where either object has been moved to create a subsequent overlap area, the scene-based image editing system 106 modifies the digital image again so that the other object is occluded by the occluding object within the subsequent overlap area. Thus, in some cases, the scene-based image editing system 106 operates in real time to portray the occlusion that results from the current positioning of objects.

As further illustrated by FIG. 48C, upon moving the third object 4808*c* away from the second object 4808*b* (e.g., outside the overlap area), the scene-based image editing system 106 exposes the portion of the second object 4808*b* that was previously occluded by the third object 4808*c*. Additionally, as indicated by FIGS. 48B-48C, the scene-based image editing system 106 pre-generates content fill for the third object 4808*c* and exposes the content fill upon moving the third object 4808*c*.

By performing a depth-aware object move operation as described above, the scene-based image editing system 106 provides improved flexibility and efficiency when compared to conventional systems. For instance, by incorporating object depths of the objects portrayed in a digital image to occlude at least one of the objects, the scene-based image editing system 106 flexibly accommodates the positioning of the objects within the three-dimensional environment captured by the digital image. Indeed, the scene-based image editing system 106 facilitates the movement of the objects within the digital image while maintaining consistency of that three-dimensional environment. Further, by automatically occluding an object when the object or another object is moved within the digital image, the scene-based image editing system 106 eliminates the user interactions typically required under many conventional systems to provide occlusion. Indeed, the scene-based image editing system 106 provides a more efficient graphical user interface by providing the proper occlusion in response to user input for moving an object.

In one or more embodiments, the scene-based image editing system 106 occludes and/or disoccludes objects of a digital image as the object are moved using attributes of the digital image other than object depth. For instance, in some cases, the scene-based image editing system 106 determines a hierarchy, ranking, or order of objects within a digital image without the use of object depths. For example, in some cases, the scene-based image editing system 106 determines the order of objects based on user input received with respect to the digital image. In some implementations, the determines the order on its own. In particular, in some cases, the scene-based image editing system 106 implements an algorithm for positioning objects of a digital image within an ordering (e.g., going from left to right or right to left, using a size of the objects, or by identifying occlusions that are already present between the objects).

In some implementations, the scene-based image editing system 106 implements one or more additional features to facilitate the modification of a digital image. In some embodiments, these features provide additional user-interface-based efficiency in that they reduce the amount of user interactions with a user interface typically required to perform some action in the context of image editing. In some instances, these features further aid in the deployment of the scene-based image editing system 106 on computing devices with limited screen space as they efficiently use the space available to aid in image modification without crowding the display with unnecessary visual elements.

As mentioned above, in some implementations, the scene-based image editing system 106 utilizes machine learning models to generate and/or expand semantic guides to modify or complete digital images. Given a digital portrait or photo, client devices often seek to remove unwanted accessories, unexpected occluders, or undesired leg/feet cropping. The scene-based image editing system 106 provides an authentic and flexible solution for efficient, accurate, and flexible portrait photo editing. Indeed, the scene-based image editing system 106 leverages semantic map guidance in machine learning models to remove accessories or occlusions, uncrop digital images, and control content creation. For example, the scene-based image editing system 106 can utilize a diffusion model (or other generative machine learning model) to complete a semantic map to progressively generate an image layout. Then, using the map as guidance, the scene-based image editing system can generate an RGB image with authenticity.

The scene-based image editing system 106 can perform a variety of editing processes. For example, in some implementations, the scene-based image editing system utilizes semantic map guidance and machine learning models for accessory removal. In particular, the scene-based image editing system can crop an occlusion or accessory from a digital image, utilize a first generative machine learning model to generate a semantic map of the missing region, and then utilize a second generative machine learning model to generate a complete digital image from the semantic map (with the accessory or occlusion removed from the final digital image).

The scene-based image editing system 106 can also uncrop or expand digital images. To illustrate, the scene-based image editing system can expand the size or scope of a digital image, utilize a first generative machine learning model to generate a semantic map of the expanded region, and then utilize a second generative machine learning model to generate a complete digital image. In this manner, the scene-based image editing system can expand α close-up digital image of a person to include a more complete picture of the target subject (e.g., the person's legs, feet, or arms and corresponding background).

In one or more embodiments, the scene-based image editing system 106 performs progressive semantic completion and progressive image completion. For example, the scene-based image editing system 106 can iteratively utilize a diffusion model to generate progressively more accurate semantic maps and/or completed digital images. In this manner, the scene-based image editing system iteratively improves the accuracy of the resulting maps and images to generate a realistic/authentic result.

Moreover, the scene-based image editing system 106 can also provide more flexibility and controllability during editing. For example, the scene-based image editing system 106 can generate a diverse pool of possible solutions for user selection. Moreover, the scene-based image editing system 106 can allow a client device to provide user input of strokes, style guides, or color patches at a desired region to guide the image generation directly. Indeed, by including a style input within a region of a digital image, the scene-based image editing system 106 can utilize a machine learning model to expand/apply the style to the entire semantic region in generating a modified digital image. Similarly, by considering user input/modification of semantic regions, the scene-based image editing system 106 can flexibly guide generation of completed digital images to accurately reflect desired features.

Figure 49:
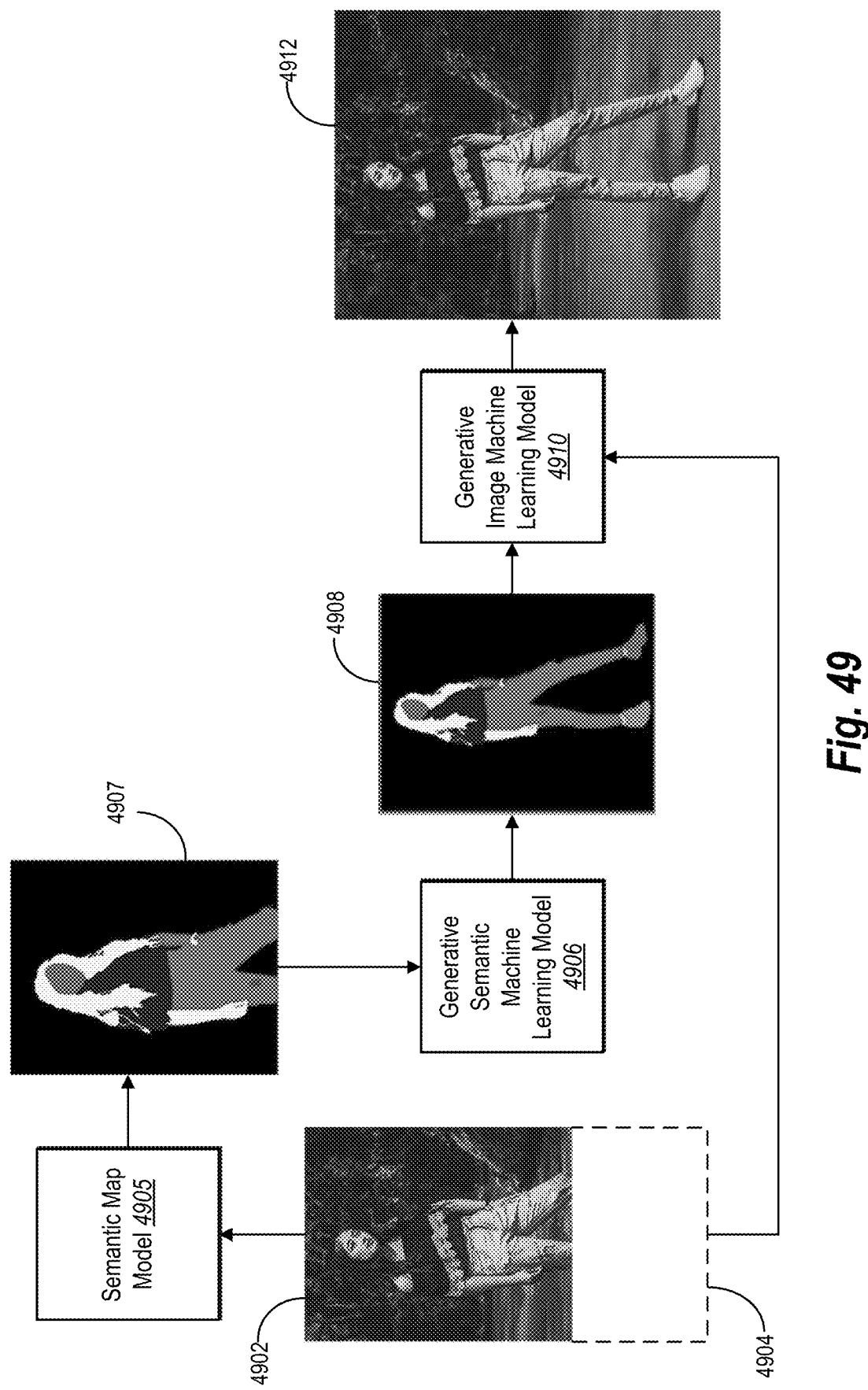
FIG. 49 illustrates an overview diagram of the scene-based image editing system performing infill modifications in accordance with one or more embodiments.

For example, FIG. 49 illustrates an overview of the scene-based image editing system 106 completing a digital image in accordance with one or more embodiments. For instance, the scene-based image editing system 106 generates a modified digital image 4912 from digital image 4902 by identifying an object or region to replace or remove and/or receiving a selection of a region to remove or expand (e.g., uncropping).

Furthermore, the scene-based image editing system 106 provides options to generate the modified digital image 4912 within a user interface. For instance, the scene-based image editing system 106 provides client devices with more flexibility and controllability during editing. The user interface has various options to indicate the type of modification (e.g., expanding the digital image or removing an object) and the scene-based image editing system 106 further provides customizable options for modifying the digital image 4902. For example, the scene-based image editing system 106 can generate a diverse pool of possible solutions for user selection. Moreover, the scene-based image editing system 106 can allow a client device to provide user input of strokes, style guides, or color patches at a desired region to guide image generation. Indeed, by including a style input within a region of digital image 4902, the scene-based image editing system 106 can utilize a machine learning model to expand/apply the style to the entire semantic region in generating the modified digital image 4912. Similarly, by considering user input/modification of semantic regions, the scene-based image editing system 106 can flexibly guide generation of completed digital images to accurately reflect desired features. More details relating to these features are given below starting at the description of FIG. 54A.

As mentioned above, the scene-based image editing system 106 generates the modified digital image 4912 from the digital image 4902. As shown, FIG. 49 illustrates the scene-based image editing system 106 receiving the digital image 4902. The scene-based image editing system 106 can receive the digital image 4902 from a repository of digital images (e.g., a cloud repository of digital images or local repository of digital images such as a camera roll). Similarly, the image editing system 104 can receive the digital image 4902 by capturing the digital image 4902 utilizing a camera device. For example, the digital image 4902 includes a digital frame (or boundary) that encompasses various pictorial elements defining the digital image 4902.

As shown in FIG. 49, the scene-based image editing system 106 also performs an act 4904 of determining an infill modification. For example, the infill modification includes adding pixel values to a region or replacing pixel values in a region portrayed within the digital image 4902. For instance, for adding pixel values to a region, the scene-based image editing system 106 adds pixel values to an expanded portion of the digital image (e.g., outside of the original digital frame of the digital image 4902). Further, upon initial expansion of the frame of the digital image 4902, the expanded portion is unpopulated. In other instances, for replacing pixel values, the scene-based image editing system 106 replaces existing pixel values in the digital image 4902 with new pixel values (e.g., within the original digital frame of the digital image 4902). In other words, the infill modification modifies existing pixels within the digital image or adds additional pixel values to an expanded portion of the digital image frame of the digital image 4902. Although not illustrated, the scene-based image editing system 106 can receive a variety of user inputs, such as user input of a mask identifying an object or region to replace, selection of an object to remove, an area or region to expand, or a style/color patch to expand within an input region.

As mentioned, the scene-based image editing system 106 replaces or adds pixel values to a region. For example, the region indicated for the infill modification includes a portion of the digital image 4902, either from the existing digital image or from an expanded version of the digital image. In some instances, the region includes one or more objects within the digital image 4902. While in other instances (as already mentioned) the region includes expanding the frame of the digital image and the region encompasses the portion corresponding to the expanded frame. As shown in FIG. 49, the scene-based image editing system 106 performs the act 4904 to determine the infill modification. In doing so, the scene-based image editing system 106 determines the infill modification region as an expanded digital frame of the digital image 4902.

Furthermore, FIG. 49 illustrates the scene-based image editing system 106 utilizing a semantic map model 4905 to generate a semantic map 4907 from the digital image 4902. For example, the semantic map model 4905 includes a segmentation image neural network. The scene-based image editing system 106 can utilize a variety of semantic segmentation models. For example, in some implementations, the scene-based image editing system 106 utilizes the segmentation image neural network described by Ke Sun, Yang Zhao, Borui Jian, Tianheng Cheng, Bin Xiao, Dong Liu, Yadong Mu, Xinggang Wang, Wenyu Liu, and Jingdong Wang in High-resolution Representations for Labeling Pixels and Regions, arXiv:1904.04515 (2019) (or other semantic segmentation models described herein). Additional details regarding a segmentation image neural network are given below (e.g., in regard to FIG. 53). As shown in FIG. 49, the scene-based image editing system 106 receives via the semantic map model 4905 the digital image 4902 as an input and generates the semantic map 4907.

As just mentioned, the scene-based image editing system 106 generates the semantic map 4907. For example, the scene-based image editing system 106 generates the semantic map 4907 (e.g., an initial semantic map) based on the portrayal within the digital image 4902. In particular, the semantic map 4907 includes classifications of pixels within the digital image 4902. The scene-based image editing system 106 via the semantic map model 4905 detects the classifications and objects portrayed within the digital image 4902. For the semantic map 4907, the scene-based image editing system 106 highlights each object of a single class with a different color shade (or other visual indicator) within a semantic boundary. To illustrate, the digital image 4902 depicts a human, the scene-based image editing system 106 generates a semantic map by segmenting the human from the background and highlighting each sub-portion of the human. For example, the semantic map 4907 as shown in FIG. 49 highlights each sub-portion of the human such as pants, legs, arms, shirt, face, and hair.

As mentioned above, the scene-based image editing system 106 detects and classifies various objects portrayed within the digital image 4902. For example, an object includes a collection of pixels in the digital image 4902 that depicts a person, place, or thing. To illustrate, in some embodiments, an object includes a person, an item, a natural object (e.g., a tree or rock formation) or a structure depicted in a digital image. In some instances, an object includes a plurality of elements that, collectively, can be distinguished from other elements depicted in the digital image 4902. For example, in some instances, an object includes a collection of buildings that make up a skyline. In some instances, an object more broadly includes a (portion of a) foreground or other element(s) depicted in the digital image 4902 as distinguished from a background. Specifically, for human semantic maps, the object includes sub-parts of the human such as body parts and articles of clothing associated with the human.

As further shown, FIG. 49 illustrates the scene-based image editing system 106 generating an infill semantic map 4908 utilizing a generative semantic machine learning model 4906. For example, as mentioned earlier, the scene-based image editing system 106 performs the act 4904 to determine the infill modification. FIG. 49 illustrates the scene-based image editing system 106 determining the infill modification as expanding the frame of the digital image 4902. Accordingly, as illustrated, FIG. 49 shows the scene-based image editing system 106 utilizing the generative semantic machine learning model 4906 to generate the infill semantic map 4908 from the semantic map 4907. Thus, the scene-based image editing system 106 via the generative semantic machine learning model 4906 expands the semantic map 4907 to include semantic labels for the added region (corresponding to the unpopulated expanded frame). Because the digital image 4902 did not include any pixel values within the indicated region to expand, the scene-based image editing system 106 infills (e.g., inpaints) semantic labels within the expanded region.

In one or more embodiments, machine learning models include generative machine learning models. In particular, generative machine learning models includes machine learning models that generate or create digital image content. For example, generative machine learning models include diffusion networks. Generative machine learning models also include generative adversarial neural networks (GANs). For instance, in a GAN, two machine learning models compete with each other in a zero-sum game.

As mentioned above, the scene-based image editing system 106 utilizes generative machine learning models. In particular, as already mentioned, the scene-based image editing system 106 utilizes the generative semantic machine learning model 4906. For instance, the generative semantic machine learning model 4906 is a generative machine learning model that generates semantic maps of the digital image. Specifically, the generative semantic machine learning model generates realistic semantic maps that fill in gaps of an expanded digital image or a semantic map of the digital image 4902. To illustrate, the generative semantic machine learning model 4906 generates the infill semantic map 4908 from the initially generated semantic map (e.g., the semantic map 4907).

As mentioned above, the scene-based image editing system 106 generates the infill semantic map 4908 that indicates semantic classifications corresponding to the digital image 4902 with the expanded portion infilled. For example, similar to the discussion above related to the semantic map 4907, the infill semantic map 4908 also includes classifications and boundaries of various objects within the digital image. However, the scene-based image editing system 106 generates the infill semantic map 4908 based on an infill modification that indicates a region to fill for an expanded digital image frame of the digital image 4902. To illustrate, if the infill modification indicates a region to fill that includes expanding the frame of the digital image 4902, then the scene-based image editing system 106 generates an infill semantic map that corresponds to the indicated region. In this instance, the infill semantic map 4908 includes semantic classifications and semantic boundaries for the expanded portion of the digital image. In other instances, when the infill modification indicates a region to fill that includes replacing a portion of the existing digital image, then the scene-based image editing system 106 generates an infill semantic map that generates a segmented portion corresponding to the portion to be replaced with corresponding semantic classifications and semantic boundaries. More details relating to semantic boundaries and classifications are given below in relation to FIG. 54A.

Additionally, as further shown, FIG. 49 illustrates the scene-based image editing system 106 utilizing a generative image machine learning model 4910 to generate a modified digital image 4912. For example, FIG. 49 illustrates the scene-based image editing system 106 generating the modified digital image 4912 from the infill semantic map 4908. As previously discussed, the scene-based image editing system 106 utilizes a generative machine learning model to generate realistic infill semantic maps. As shown, the scene-based image editing system 106 further utilizes the generative image machine learning model 4910 to generate a realistic digital image from the infill semantic map 4908. In particular, the generative image machine learning model 4910 receives as input the infill semantic map 4908 and the digital image 4902. The infill semantic map 4908 and the digital image 4902 guides the generative image machine learning model 4910 in generating the modified digital image 4912.

As shown in the modified digital image 4912, the scene-based image editing system 106 infills the portion below the knees of the person portrayed in the digital image 4902 (which only portrays the human from the knees up). The results generated by the scene-based image editing system 106 illustrate an efficient, accurate, and high-quality completion of the digital image 4902 by completing the semantic map 4907 and utilizing the infill semantic map 4908 to generate the modified digital image 4912.

Conventional systems have leveraged recent computing advancements to modify digital images utilizing a variety of digital tools and models. To illustrate, conventional systems utilize computer-implemented models to uncrop, inpaint, and modify digital objects portrayed in digital images. Despite these advancements, however, conventional systems continue to suffer from a number of technical deficiencies, particularly with regard to accuracy, efficiency, and flexibility of implementing systems in generating modified digital images.

For instance, conventional systems are able to uncrop and inpaint digital images, but these systems often generate inaccurate and unrealistic results. Similarly, conventional systems typically require a large number of user interactions and user interfaces. The user interactions and interfaces required to add or remove regions consumes valuable computational resources and time. In addition, conventional systems provide limited functional flexibility in inpainting digital images. For example, conventional systems seek to generate pixels that will blend with surrounding pixels but fail to provide additional functional control with regard to features or factors in implementing underlying models.

As just mentioned, the scene-based image editing system 106 can improve upon accuracy of conventional systems. For example, the scene-based image editing system 106 utilizes the infill semantic map 4908 and the digital image 4902 to create a realistically infilled digital image (e.g., the modified digital image 4912). In particular, the scene-based image editing system 106 by generating the infill semantic map 4908 (utilizing a generative machine learning model) and generating the modified digital image 4912 from the infill semantic map (utilizing a generative machine learning model), the scene-based image editing system 106 generates digital images that accurately and realistically portray target objects. Indeed, in some embodiments, the scene-based image editing system 106 conditions a diffusion neural network to more accurately generate infill semantic maps and accurately resulting digital images. Thus, as illustrated in FIG. 49, the scene-based image editing system 106 can accurately expand digital images or perform other modifications, such as infilling or modifying object/scene textures.

Furthermore, in one or more implementations the scene-based image editing system 106 also improves upon efficiency relative to conventional systems. For example, the scene-based image editing system 106 can generate a modified digital image with reduced user interactions, user interfaces, and time-consuming corrections/edits associated with many conventional systems. For example, the scene-based image editing system 106 generates the semantic map 4907, the infill semantic map 4908, and the modified digital image 4912 with various machine learning models. Accordingly, the scene-based image editing system 106 saves valuable time and computational resources by intelligently generating the modified digital image 4912. Moreover, the scene-based image editing system 106 can provide streamlined interfaces for an intuitive and simplified flow to generate the infill semantic map 4908 and/or the modified digital image 4912. In particular, the scene-based image editing system 106 can provide a unified user interface for generating both an infill semantic map and a modified digital image to that reduces or eliminates the need to alternate between multiple interfaces as utilized by conventional systems.

In addition to the above, the scene-based image editing system 106 also improves upon functional flexibility. For example, the scene-based image editing system 106 allows client devices to expand the frame of digital images, remove objects portrayed within a digital image, or modify textures within portions of a digital images. Moreover, the scene-based image editing system 106 provides improved functionality with user interfaces that allow for unique control over implementing models, such as the number of infill segmentation maps to generate, the number of modified images to generate, the number of layers to utilizes (e.g., within a diffusion neural network), textures for conditioning the generative model, and semantic editing input to guide generation infill semantic maps and/or modified digital images.

Figure 50A:
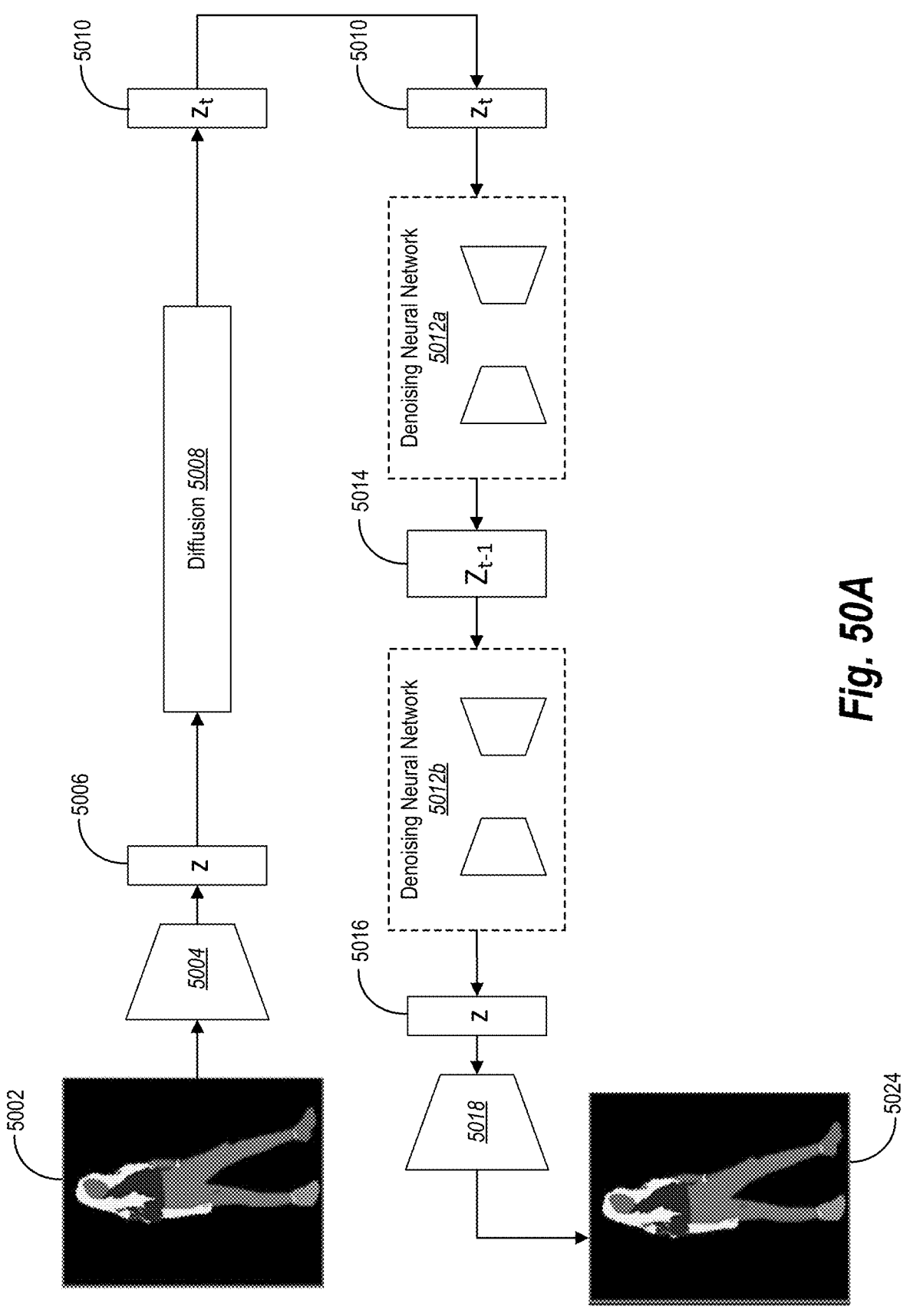
FIG. 50A illustrates an example diagram of the scene-based image editing system training a diffusion neural network to generate an infill semantic map in accordance with one or more embodiments.

As discussed above, the scene-based image editing system 106 utilizes various types of machine learning models. For example, FIG. 50A illustrates the scene-based image editing system 106 utilizing a diffusion neural network (also referred to as "diffusion probabilistic model" or "denoising diffusion probabilistic model") to generate an infill semantic map in accordance with one or more embodiments. In particular, FIG. 50A illustrates the diffusion neural network generating an infill semantic map 5024 while the subsequent figure (FIG. 51) illustrates the diffusion neural network generating the modified digital image conditioned on the infill semantic map 5024. For example, in one or more embodiments, the scene-based image editing system 106 utilizes a diffusion model (or diffusion neural network) as described by J. Ho, A. Jain, P Abbeel, Denoising Diffusion Probabilistic Models, arXiv:2006:11239 or by Jiaming Song, et al. in *Denoising diffusion implicit models*. In ICLR, 2021, which are incorporated by reference in their entirety herein.

As mentioned above, the scene-based image editing system 106 utilizes a diffusion neural network. In particular, a diffusion neural network receives as input a digital image and adds noise to the digital image through a series of steps. For instance, the scene-based image editing system 106 via the diffusion neural network maps a digital image to a latent space utilizing a fixed Markov chain that adds noise to the data of the digital image. Furthermore, each step of the fixed Markov chain relies upon the previous step. Specifically, at each step, the fixed Markov chain adds Gaussian noise with variance, which produces a diffusion representation (e.g., diffusion latent vector, a diffusion noise map, or a diffusion inversion). Subsequent to adding noise to the digital image at various steps of the diffusion neural network, the scene-based image editing system 106 utilizes a trained denoising neural network to recover the original data from the digital image. Specifically, the scene-based image editing system 106 utilizes a denoising neural network with a length T equal to the length of the fixed Markov chain to reverse the process of the fixed Markov chain.

As mentioned earlier, in one or more embodiments the scene-based image editing system 106 generates an infill semantic map. FIG. 50A illustrates the scene-based image editing system 106 training a diffusion neural network to generate an infill semantic map 5024. In particular, FIG. 50A illustrates the scene-based image editing system 106 analyzing an input infill semantic map 5002 to generate the infill semantic map 5024 (e.g., a reconstruction of the input infill semantic map 5002). Specifically, the scene-based image editing system 106 utilizes the diffusion process during training to get generate various diffusion representations, culminating in a final diffusion representation that is passed to the denoising network. The scene-based image editing system 106, during training, supervises the output of each denoising neural network layer based on the diffusion representations generated during the diffusion process.

As illustrated, FIG. 50A shows the scene-based image editing system 106 utilizing the encoder 5004 to generate a latent vector 5006 from the input infill semantic map 5002. In one or more embodiments, the encoder 5004 is a neural network (or one or more layers of a neural network) that extract features relating to the input infill semantic map 5002, e.g., in this instance relating to objects (human sub-portions) depicted within the input infill semantic map 5002. In some cases, the encoder 5004 includes a neural network that encodes features from the input infill semantic map 5002. For example, the encoder 5004 can include a particular number of layers including one or more fully connected and/or partially connected layers that identify and represent characteristics/features of the input infill semantic map 5002 through a latent feature vector. Thus, the latent vector 5006 includes a hidden (e.g., indecipherable to humans) vector representation of the input infill semantic map 5002. Specifically, the latent vector 5006 includes a numerical representation of features of the input infill semantic map 5002.

Furthermore, FIG. 50A illustrates the diffusion process 5008 of the diffusion neural network. In particular, FIG. 50A shows a diffusion of the latent vector 5006. At each step (based on the fixed Markov chain) of the diffusion process 5008, the scene-based image editing system 106 via the diffusion neural network generates a diffusion representation. For instance, the diffusion process 5008 adds noise to the diffusion representation at each step until the diffusion representation is diffused, destroyed, or replaced. Specifically, the scene-based image editing system 106 via the diffusion process 5008 adds Gaussian noise to the signal of the latent vector utilizing a fixed Markov Chain. The scene-based image editing system 106 can adjust the number of diffusion steps in the diffusion process 5008 (and the number of corresponding denoising layers in the denoising steps). Moreover, although FIG. 50A illustrates performing the diffusion process 5008 with the latent vector 5006, in some embodiments, the scene-based image editing system 106 applies the diffusion process 5008 to pixels of the input infill semantic map 5002 (without generating a latent vector representation of the input infill semantic map 5002).

As just mentioned, the diffusion process 5008 adds noise at each step of the diffusion process 5008. Indeed, at each diffusion step, the diffusion process 5008 adds noise and generates a diffusion representation. Thus, for a diffusion process 5008 with five diffusion steps, the diffusion process 5008 generates five diffusion representations. As shown in FIG. 50A the scene-based image editing system 106 generates a final diffusion representation 5010. In particular, FIG. 50A in the final diffusion representation 5010 comprises random Gaussian noise after the completion of the diffusion process. As part of the diffusion neural network, the denoising neural network 5012a denoises the final diffusion representation 5010 (e.g., reverses the process of adding noise to the diffusion representation performed by the diffusion process 5008).

As shown, FIG. 50A illustrates the denoising neural network 5012a generating a first denoised representation 5014 that partially denoises the final diffusion representation 5010 by generating a first denoised representation 5014. Furthermore, FIG. 50 also illustrates a denoising neural network 5012b receiving the first denoised representation 5014 for further denoising to generate the second denoised representation 5016. In particular, in one or more embodiments the number of denoising steps corresponds with the number of diffusion steps (e.g., of the fixed Markov chain). Furthermore, FIG. 50A illustrates the scene-based image editing system 106 processing the second denoised representation 5016 with a decoder 5018 to generate the infill semantic map 5024.

In one or more implementations, the scene-based image editing system 106 trains the denoising neural networks in a supervised manner based on the diffusion representations generates at the diffusion process 5008. For example, the scene-based image editing system 106 compares (utilizing a loss function) a diffusion representation at a first step of the diffusion process 5008 with a final denoised representation generated by the final denoising neural network. Similarly, the scene-based image editing system 106 can compare (utilizing a loss function) a second diffusion representation from a second step of the diffusion process 5008 with a penultimate denoised representation generated by a penultimate denoising neural network. The scene-based image editing system 106 can thus utilize corresponding diffusion representations of the diffusion process 5008 to teach or train the denoising neural networks to denoise random Gaussian noise and generate realistic digital images.

The scene-based image editing system 106 can utilize a variety of neural network formulations for the denoising neural networks 5012a, 5012b. For example, in some implementations, the scene-based image editing system 106 utilizes a time conditional U-Net, as described by O. Ronneberger, P. Fischer, and T. Brox, in U-net: Convolutional networks for biomedical image segmentation, MICCAI (3), Vol. 9351 of Lecture Notes in Computer Science, p. 234-250 (2015), which is incorporated by reference herein in its entirety. In one or more embodiments, the scene-based image editing system 106 utilizes the diffusion architecture and training approach described by R. Rombach, A. Blattmann, D. Lorenz, P. Esser, and B. Ommer, in High-Resolution Image Synthesis with Latent Diffusion Models, arXiv: 2112.10752v2, which is incorporated by reference in its entirety herein.

Figure 50B:
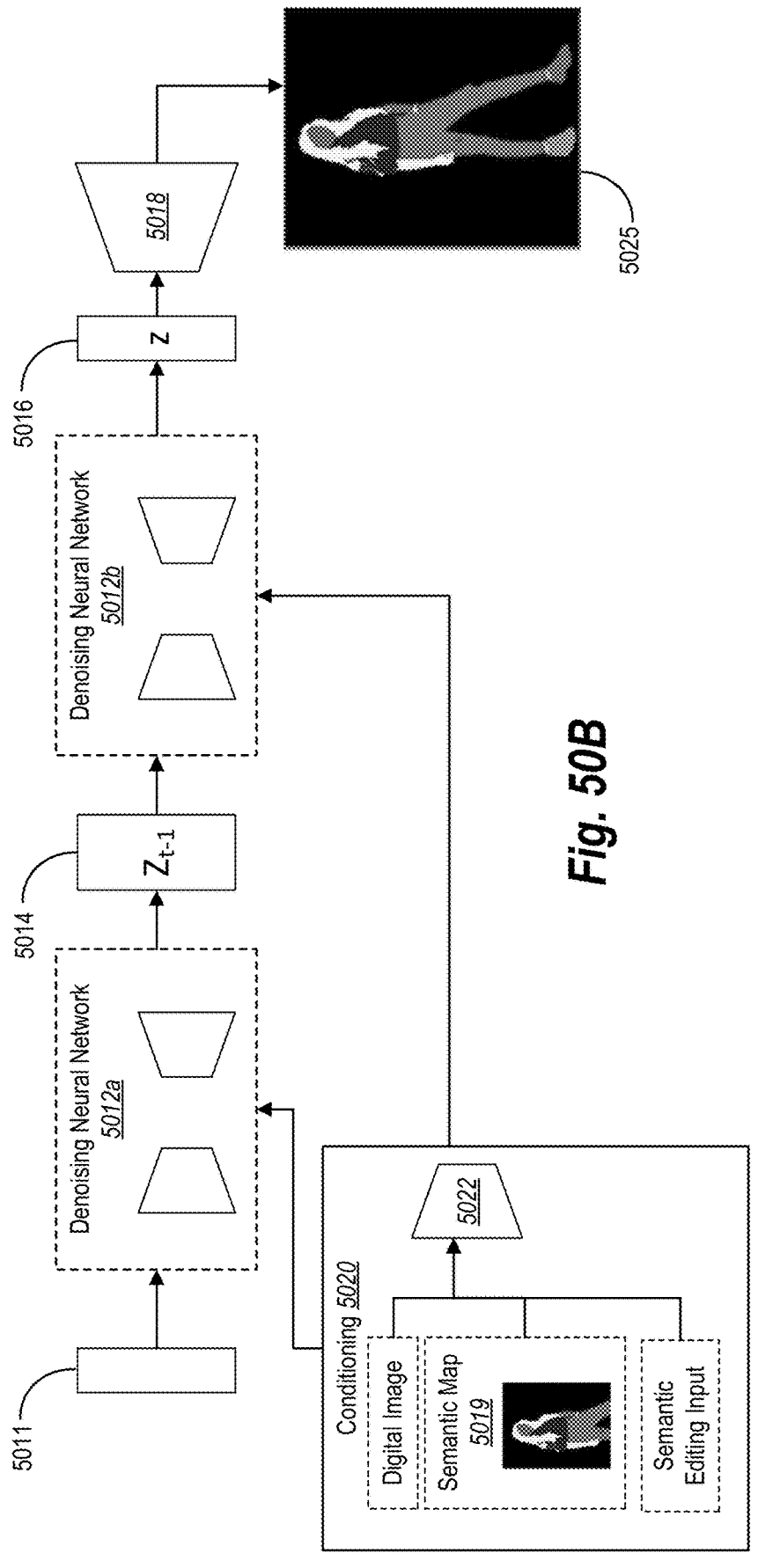
FIG. 50B illustrates an example diagram of the scene-based image editing system utilizing a diffusion neural network to generate an infill semantic map in accordance with one or more embodiments.

In addition to the training illustrated in FIG. 50A, FIG. 50B illustrates the scene-based image editing system 106 generating an infill semantic map (e.g., during inference) in accordance with one or more embodiments. In particular, the scene-based image editing system 106 utilizes a random noise input 5011 (together with conditioning) to generate an infill semantic map from a semantic map 5019 (i.e., an incomplete semantic map relative to the expanded frame of the uncropped digital image).

As shown, the scene-based image editing system 106 conditions the denoising neural network 5012a and the denoising neural network 5012b. For example, FIG. 50B illustrates the scene-based image editing system 106 performing an act 5020 of conditioning each layer of the denoising neural network 5012a and the denoising neural network 5012b. To illustrate, conditioning layers of a neural network includes providing context to the networks to guide the generation of the infill semantic map 5024. For instance, conditioning layers of neural networks include at least one of (1) transforming conditioning inputs (e.g., the digital image, the semantic map 5019, and the semantic editing input) into conditioning representations to combine with the denoising representations; and/or (2) utilizing attention mechanisms which causes the neural networks to focus on specific portions of the input and condition its predictions (e.g., outputs) based on the attention mechanisms. Specifically, for denoising neural networks, conditioning layers of the denoising neural networks includes providing an alternative input to the denoising neural networks (e.g., the digital image, the semantic map 5019, and the semantic editing input). In particular, the scene-based image editing system 106 provides alternative inputs to provide a guide in removing noise from the diffusion representation (e.g., the denoising process). Thus, the scene-based image editing system 106 conditioning layers of the denoising neural networks acts as guardrails to allow the denoising neural networks to learn how to remove noise from an input signal and produce a clean output.

For instance, FIG. 50B shows that prior to conditioning, the scene-based image editing system 106 utilizes an encoder 5022 to analyze conditioning information (such as one or all of the digital image, the semantic map 5019 of the digital image, and a semantic editing input). In some embodiments, the encoder 5022 generates a conditioning representation from this conditioning information. In one or more embodiments, the scene-based image editing system 106 provides an option to a user of a client device to indicate the semantic editing input. In particular, the scene-based image editing system 106 provides the semantic map 5019 to the user of the client device and an option to indicate a semantic classification/boundary. For instance, the scene-based image editing system 106 provides the option to indicate a classification and/or position to fill in from below the knees of the human portrayed in the semantic map 5019. Moreover, in one or more embodiments, the scene-based image editing system 106 provides an additional infill semantic map that includes an additional semantic classification within an additional semantic boundary. For instance, the scene-based image editing system 106 allows for the user of the client device to indicate multiple semantic classifications within multiple semantic boundaries.

Furthermore, in response to the user of the client device providing this indication, the scene-based image editing system 106 processes the semantic editing input for conditioning. Accordingly, the scene-based image editing system 106 can condition the network based on a combination of one or more of the digital images, the semantic map 5019 of the digital image, and/or the semantic editing input. More details relating to the scene-based image editing system 106 providing the option to a user of a client device to indicate the semantic editing input is given below.

Furthermore, the scene-based image editing system 106 utilizes the conditioning representation generated from the encoder 5022 to perform the act 5020 of conditioning the layers of the denoising neural network 5012a and denoising neural network 5012b. Specifically, conditioning the layers of the network includes modifying input into the layers of the denoising neural networks to combine with the random noise input 5011. For instance, the scene-based image editing system 106 combines (e.g., concatenates) the conditioning representation generated from the encoder 5022 at different layers of the denoising neural networks. For instance, the scene-based image editing system 106 combines one or more conditioning vectors with the input 5011 of random noise, the first denoised representation 5014, or other intermediate denoised representations analyzed by denoising layers. Thus, the denoising process considers the semantic map 5019 and the digital image to generate denoised representations.

As shown, FIG. 50B illustrates the scene-based image editing system 106 utilizing the second denoised representation 5016 (e.g., the final denoised representation illustrated in FIG. 50, although other embodiments can include additional steps and additional denoised representations). For example, the scene-based image editing system 106 utilizes the decoder 5018 to process the second denoised representation 5016. In particular, the scene-based image editing system 106 via the decoder 5018 generates the infill semantic map 5025 from the second denoised representation 5016. As shown, FIG. 50B illustrates the infill semantic map 5025 with infilled semantic labels from the knees down while the semantic map only illustrated semantic labels for the human from the knees up. Accordingly, the scene-based image editing system 106 utilizes the diffusion neural network to generate the infill semantic map 5025.

Although FIG. 50B illustrates generating the infill semantic map 5025 with the denoising architecture, in one or more implementations, the scene-based image editing system 106 utilizes a cross-attention layer that analyzes the representation from the encoder 5022 and denoised representations (intermediate representations of the UNet).

As mentioned above, FIG. 51 shows the scene-based image editing system 106 utilizing denoising neural networks to generate a modified digital image 5124 conditioned by an infill semantic map 5121 (e.g., a completed semantic map). Similar to the discussion above, the scene-based image editing system 106 utilizes the diffusion neural network for training purposes of generating the modified digital image 5124. In particular, during training the scene-based image editing system 106 utilizes an encoder to analyze an input digital image (instead of the semantic map) and generate a latent vector. Further, the scene-based image editing system 106 utilizes a diffusion process to process the latent vector and generate diffusion representations at each step (depending on the length of the fixed Markov chain). Moreover, the scene-based image editing system 106 generates a final diffusion representation for the input digital image (e.g., the expected output during training). The scene-based image editing system 106 trains by comparing diffusion representations generated by the diffusion process with corresponding denoised representations generated by the denoising neural network layers.

Figure 51:
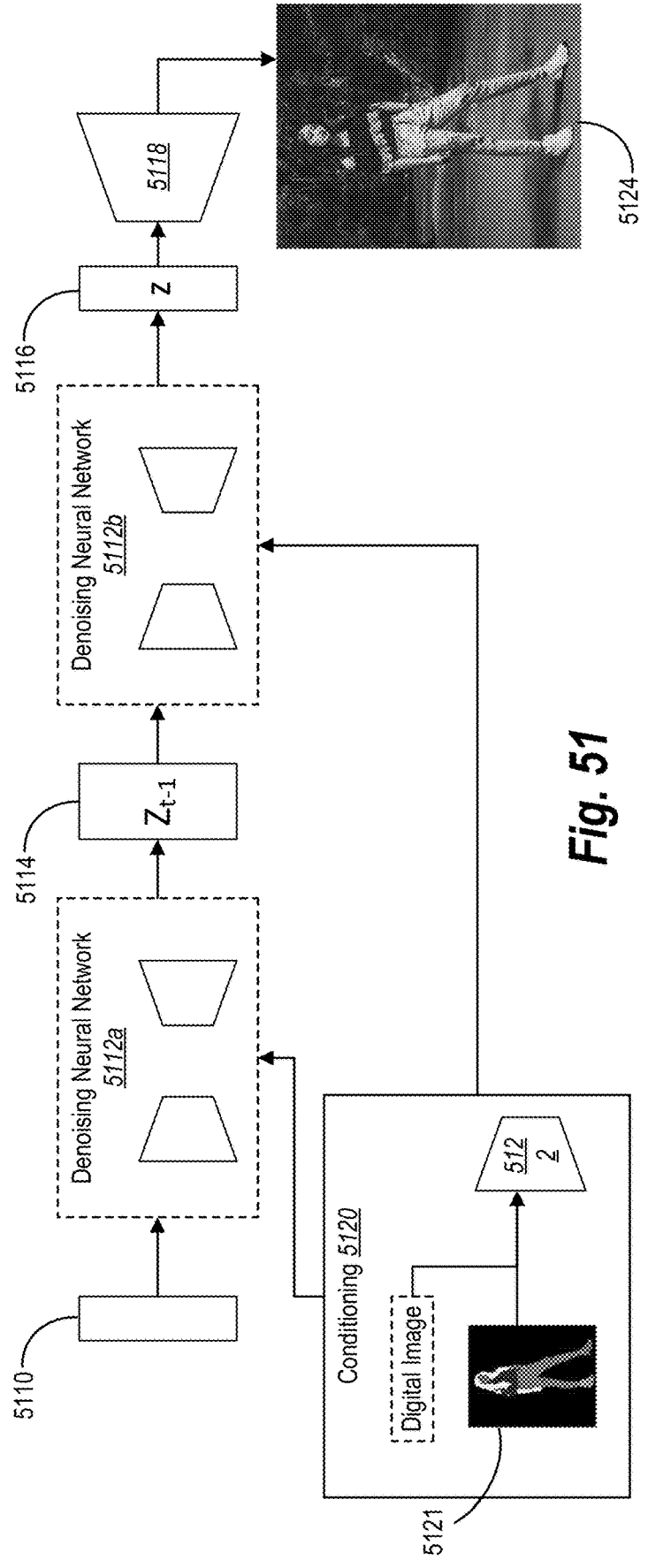
FIG. 51 illustrates an example diagram of the scene-based image editing system utilizing a diffusion neural network to generate a modified digital image in accordance with one or more embodiments.

As shown, FIG. 51 illustrates the scene-based image editing system 106 utilizing a trained diffusion network to generate a complete digital image. In particular, FIG. 51 shows the scene-based image editing system 106 utilizing the infill semantic map 5121 and a digital image (e.g., the digital image 4002 discussed in FIG. 49) as a conditioning input to the denoising neural networks. Further, the scene-based image editing system 106 utilizes a binary mask to indicate to the denoising neural networks a region to infill. The scene-based image editing system 106 can also utilize additional editing inputs to the infill semantic map 5121. In particular, the scene-based image editing system 106 provides an option to a user of a client device to provide color or texture patches as conditioning input. Based on the provided color or texture patches, the scene-based image editing system 106 then utilizes the infill semantic map 5121 and the digital image with the color or texture patches as a conditioning input to condition each layer of the denoising neural networks.

As further shown, FIG. 51 illustrates the scene-based image editing system 106 utilizing a random noise input 5110 with the denoising neural network 5112a (e.g., a first denoising layer). Similar to the discussion in FIG. 41B, the scene-based image editing system 106 utilizes the denoising neural network 5112a to reverse the diffusion process and generate a modified digital image 5124. FIG. 51 also shows the denoising neural network 5112a generating a denoised representation 5114 and utilizing a denoising neural network 5112b to further denoise the denoised representation (denoising here also corresponds with the number of steps in the diffusion process).

Moreover, FIG. 51 shows the scene-based image editing system 106 performing an act 5120. For example, the act 5120 includes conditioning the layers of the denoising neural network 5112a and the denoising neural network 5112b. Specifically, FIG. 51 shows the scene-based image editing system 106 performing the act 5120 of conditioning with the infill semantic map 5121. FIG. 51 illustrates an encoder 5122 analyzing the infill semantic map 5121 (generated in FIG. 50B), the digital image, and a binary mask. By conditioning the layers of the denoising neural network 5112a and the denoising neural network 5112b with the infill semantic map 5121 and the digital image, the scene-based image editing system 106 accurately generates the modified digital image 5124.

As just mentioned, the scene-based image editing system 106 generates the modified digital image 5124 by conditioning layers of the denoising neural networks. In particular, FIG. 51 illustrates the scene-based image editing system 106 via a decoder 5118 receiving the second denoised representation 5116 and generating the modified digital image 5124. Specifically, the modified digital image 5124 accurately depicts the legs of the human from the knees down. Accordingly, FIG. 51 illustrates the scene-based image editing system 106 via the diffusion neural network generating an infilled digital image corresponding to an expanded frame of the digital image 4002 shown in FIG. 49.

As also mentioned above, in one or more implementations the scene-based image editing system 106 generates a modified digital image utilizing an input texture. For example, FIG. 43 illustrates utilizing an input texture to generate a modified digital image utilizing a diffusion neural network, in accordance with one or more embodiments. Like FIGS. 50A and 51, the scene-based image editing system 106 trains the diffusion neural network. In particular, like the above discussion, during training the scene-based image editing system 106 utilizes the expected output as an input into the diffusion neural networks and utilizes diffusion representations to supervise training of the denoising layers of the neural network.

The scene-based image editing system 106 receives an indication to replace pixel values within a digital image 5215 and an input texture 5211 utilizing a trained denoising neural network. In particular, the scene-based image editing system 106 replaces the indicated pixel values with the input texture 5211. Specifically, the input texture 5211 includes a sample texture that portrays a pattern selected by a user of a client device. To illustrate, the scene-based image editing system 106 modifies an input digital image 5215 with the specifically selected pattern by localizing the input texture 5211 to the relevant region of the input digital image 5215. For example, the scene-based image editing system 106 receives the input texture 5211 from a client device or from a selection of a pre-defined texture option.

Figure 52:
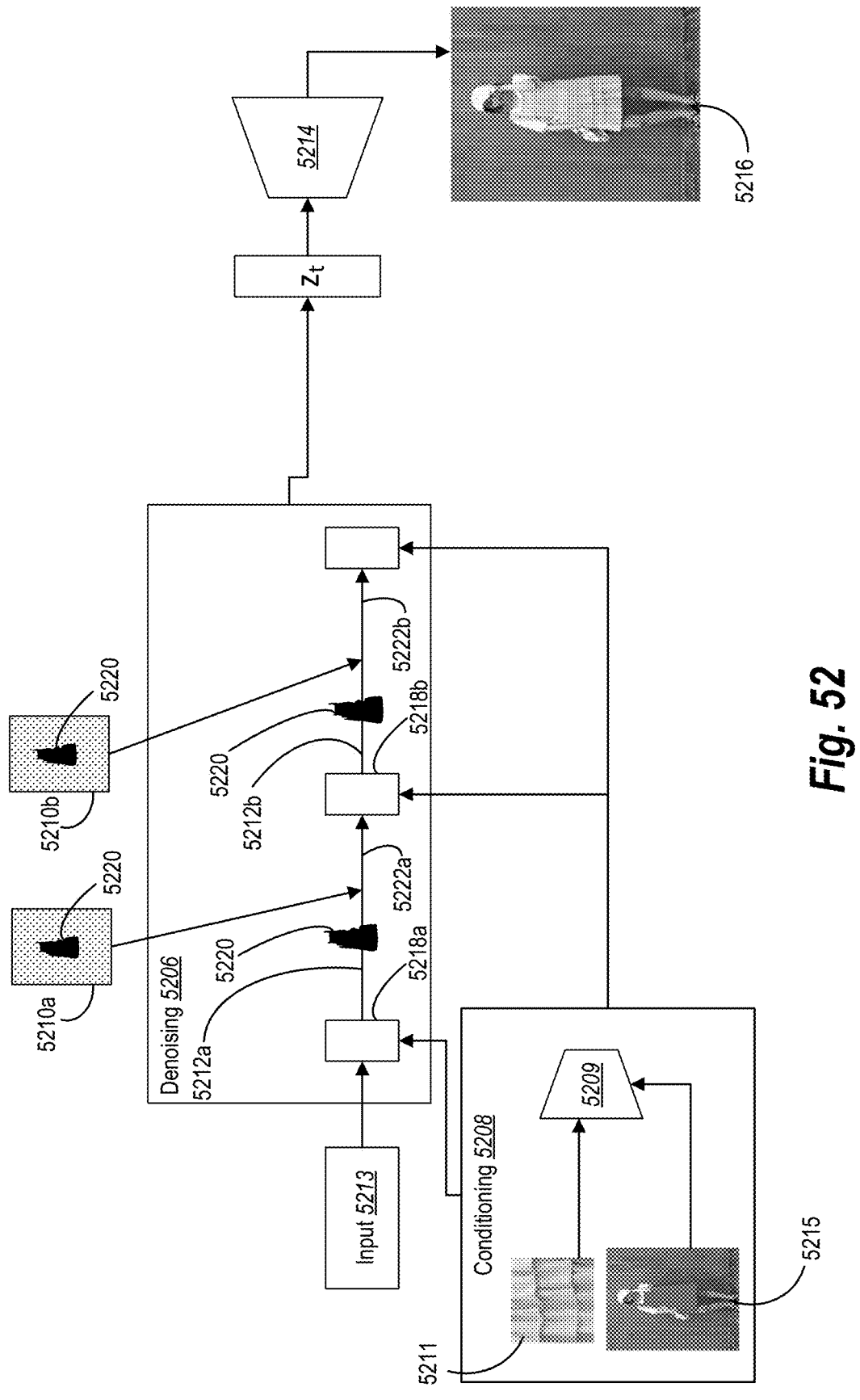
FIG. 52 illustrates an example diagram of the scene-based image editing system conditioning a diffusion neural network with an input texture in accordance with one or more embodiments.

In one or more embodiments, the scene-based image editing system 106 utilizes a diffusion neural network to generate the modified digital image 5216 that includes the input texture 5211. Similar to the discussion above, the scene-based image editing system 106 also utilizes diffusion neural networks to replace a region in the digital image 5215 with the input texture 5211. In some implementations, the scene-based image editing system 106 isolates texture modifications to certain portions of the digital image within the diffusion neural network. In particular, FIG. 52 illustrates the scene-based image editing system 106 generating a mask for relevant portion of the digital image 5215 to replace with the input texture 5211. For instance, in FIG. 52 the relevant portion includes the dress of the human portrayed in the digital image 5215. Moreover, the scene-based image editing system 106 generates the mask via a segmentation image neural network for the dress based on an input or query selection by a user of a client device. This is discussed in additional detail below (e.g., with regard to FIG. 53). As discussed above, the scene-based image editing system 106 can train the diffusion neural networks within the denoising process 5206 by reconstructing input digital images and supervising the diffusion neural networks with diffusion representations generated from steps of the diffusion process.

FIG. 52 illustrates the scene-based image editing system 106 performing an act 5208 of conditioning each denoising layer in the denoising process 5206 based on processing a random noise input 5213. In particular, the scene-based image editing system 106 utilizes an encoder 5209 to process the input texture 5211 and the input digital image 5215. Specifically, the scene-based image editing system 106 utilizes the encoder 5209 to generate one or more conditioning vectors that are combined with inputs (i.e., denoised representations) at each of the denoising layers. Furthermore, although not shown in FIG. 52, in one or more embodiments, the scene-based image editing system 106 also provides an option for user input. In particular, the user input includes modifications to the masked portion of the digital image 5215, or modifications to the input texture 5211. For instance, modifications include varying the input texture 5211 or modifying the portion included with the mask in the input digital image 5215. Accordingly, the scene-based image editing system 106 performs the act 5208 of conditioning each layer of the denoising neural networks with user input in addition to the other conditioning inputs.

As mentioned above, the scene-based image editing system 106 can apply the denoising and conditioning process so that a texture is localized to certain portions or regions of the modified digital image. Indeed, applying conditioning vectors based on the input texture 5211 throughout the denoising process in a global fashion could result in adding texture to the entire modified digital image. The scene-based image editing system 106 can localize the texture to a certain region (i.e., the area of the dress) by applying a mask between the denoising layers and utilizing an unconditioned representation of the input digital image for regions outside of the mask.

For instance, FIG. 52 shows the scene-based image editing system 106 applying a first denoising layer 5218a to generate a first denoised representation 5212a. The scene-based image editing system 106 applies a mask 5220 to the first denoised representation 5212a (i.e., to isolate the region that falls within the dress and omit the region outside of the dress). Accordingly, the scene-based image editing system 106 generates a first masked denoised representation 5222a. The first masked denoised representation 5222a thus represents a partially denoised signal that includes the input texture 5211 for the dress region.

The scene-based image editing system 106 then combines the first masked denoised representation 5222a with untextured image representation 5210a. Indeed, as shown, the scene-based image editing system 106 identifies or generates the untextured image representation 5210a as a representation of the digital image 5215 without texture. The scene-based image editing system 106 can generate the untextured image representation 5210a in a variety of ways. For example, in some implementations, the scene-based image editing system 106 utilizes the output of a diffusion layer at the same level of a corresponding denoising layer as the untextured image representation 5210a. In some implementations, the scene-based image editing system 106 applies the denoising layers without condition vectors to generate the untextured image representation 5210a.

Figure 53:
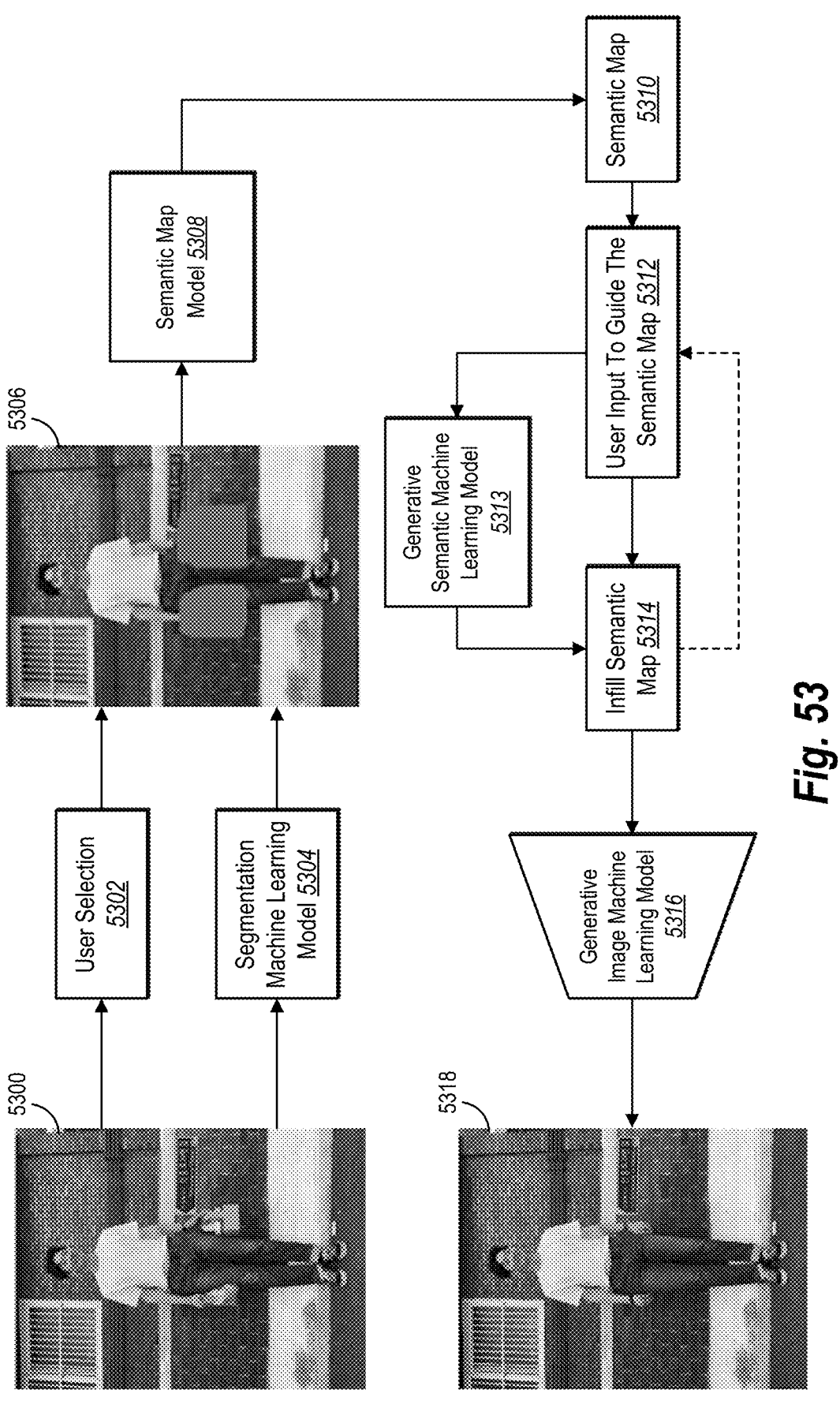
FIG. 53 illustrates an example diagram of a scene-based image editing system segmenting a portion of a digital image to replace in accordance with one or more embodiments.

As mentioned above, in one or more embodiments the scene-based image editing system 106 utilizes segmentation image neural networks. For example, FIG. 53 illustrates the scene-based image editing system 106 generating a modified digital image based on segmenting an input image in accordance with one or more embodiments. In particular, FIG. 53 shows a digital image 5300 that portrays a person holding two items, one in each hand. The scene-based image editing system 106 generates a modified digital image 5318 which removes the two items from the person's hands and infills the removed portion of the digital image 5300.

As shown, FIG. 53 illustrates the scene-based image editing system 106 segmenting the two items in the person's hands. For example, FIG. 53 shows the scene-based image editing system 106 utilizing either a user selection 5302 or a segmentation machine learning model 5304 to select and segment the two items in the person's hands. In particular, the segmentation machine learning model 5304 is a neural network that segments or selects objects in a digital image. Thus, as shown the segmentation machine learning model 5304 generates a segmented (or masked) digital image 5306.

The scene-based image editing system 106 can identify the user selection 5302 in a variety of ways. In some implementations, the scene-based image editing system 106 provides an editing tool to a client device and identifies the region to be removed based on user interaction with the editing tool. Specifically, the client device can identify a user interaction (e.g., a click, finger press, or drawing) to indicate scene-based image editing system 106 the portion to segment.

In some embodiments, the scene-based image editing system 106 utilizes the segmentation machine learning model 5304 to select the items. The segmentation machine learning model 5304 can also segment or select objects based on user input (or without user input). For example, in some implementations the scene-based image editing system 106 provides an option to the user of the client device to query a portion to be selected (via a selection or a natural language input). For instance, the user of the client device queries the scene-based image editing system 106 to select "bags" shown in the digital image 5300. Based on the query, the scene-based image editing system 106 utilizes the segmentation machine learning model 5304 to segment the portion of the digital image 5300 that portrays "bags." In other embodiments, the user of the client device queries the scene-based image editing system 106 to select "pants" or "shirt" or "hair."

In some implementations, the scene-based image editing system 106 utilizes the user selection 5302 with the segmentation machine learning model 5304 to segment or select an object in a digital image. For example, the scene-based image editing system 106 can utilize the segmentation machine learning model 5304 to analyze user inputs (e.g., clicks, drawings, outlines, or natural language) with the digital image to generate a segmentation. For example, the scene-based image editing system 106 can utilize the segmentation approach described in UTILIZING INTERACTIVE DEEP LEARNING TO SELECT OBJECTS IN DIGITAL VISUAL MEDIA, U.S. application Ser. No. 16/376, 704, filed on Apr. 5, 2019, which is incorporated by reference herein in its entirety.

As mentioned previously, the scene-based image editing system 106 can also generate a semantic map. In relation to FIG. 53, the scene-based image editing system 106 generates a semantic map 5310 utilizing the segmented (or masked) digital image 5306. In particular, the scene-based image editing system 106 utilizes the segmentation machine learning model 5304 to assign a label to pixels within the digital image 5300.

As further illustrated, FIG. 53 shows the scene-based image editing system 106 utilizing a semantic map model 5308 (already discussed above) to generate a semantic map 5310 from the segmented (or masked) digital image 5306. In particular, the scene-based image editing system 106 generates the semantic map 5310 for the masked portion (i.e., the infill region) from the segmented digital image 5306. In accordance with the embodiment illustrated in FIG. 53, the scene-based image editing system 106 further performs an act 5312. In particular, the act 5312 includes providing an option for a user of a client device to provide user input to guide the generation of an infill semantic map 5314. Specifically, the option for a user to provide user input to guide the generation of the infill semantic map 5314 from the semantic map includes indicating semantic classification/ boundaries in the semantic map 5310. For example, the scene-based image editing system 106 receives the user input to guide the semantic map and utilizing a generative semantic machine learning model 5313, the scene-based image editing system 106 generates the infill semantic map 5314. In particular, as mentioned above the scene-based image editing system 106 generates the infill semantic map 5314 by utilizing the semantic map and/or the user input to guide the semantic map (e.g., the semantic editing input) as a conditioning input. For instance, as discussed, the scene-based image editing system 106 utilizes the semantic map and/or the user input to guide the semantic map to condition each layer of the denoising neural networks.

Accordingly, for the scene-based image editing system 106 providing the option to provide user input to guide the semantic map, the scene-based image editing system 106 provides an option to indicate the direction and position of the hands beneath the items removed (e.g., the bags). This is discussed in additional detail below.

In response to the scene-based image editing system 106 performing the act 5312 of providing the option to provide user input to guide the generation of the infill semantic map 5314, the scene-based image editing system 106 further utilizes the generative semantic machine learning model 5313 to generate the infill semantic map 5314 based on the user input. As indicated by FIG. 53, the act 5312 can iteratively occur to re-generate the infill semantic map 5314 until the user of the client device is satisfied with the infill semantic map 5314.

Moreover, FIG. 53 illustrates the scene-based image editing system 106 utilizing a generative image machine learning model 5316 (e.g., generative image machine learning model 4910 discussed in FIG. 49) to generate the modified digital image 5318. Specifically, the modified digital image 5318 shows the digital image 5300 however without the items in the person's hands and the background and the hands infilled by the scene-based image editing system 106.

Although FIG. 53 illustrates the act 5312 of providing the user of the client device the option to provide user input to guide the scene-based image editing system 106 generating the infill semantic map 5314, in one or more embodiments, the scene-based image editing system 106 does not provide this user input option. For example, the scene-based image editing system 106 generates the semantic map 5310 and then generates the modified digital image 5318 via the generative image machine learning model 5316.

Figure 54A:
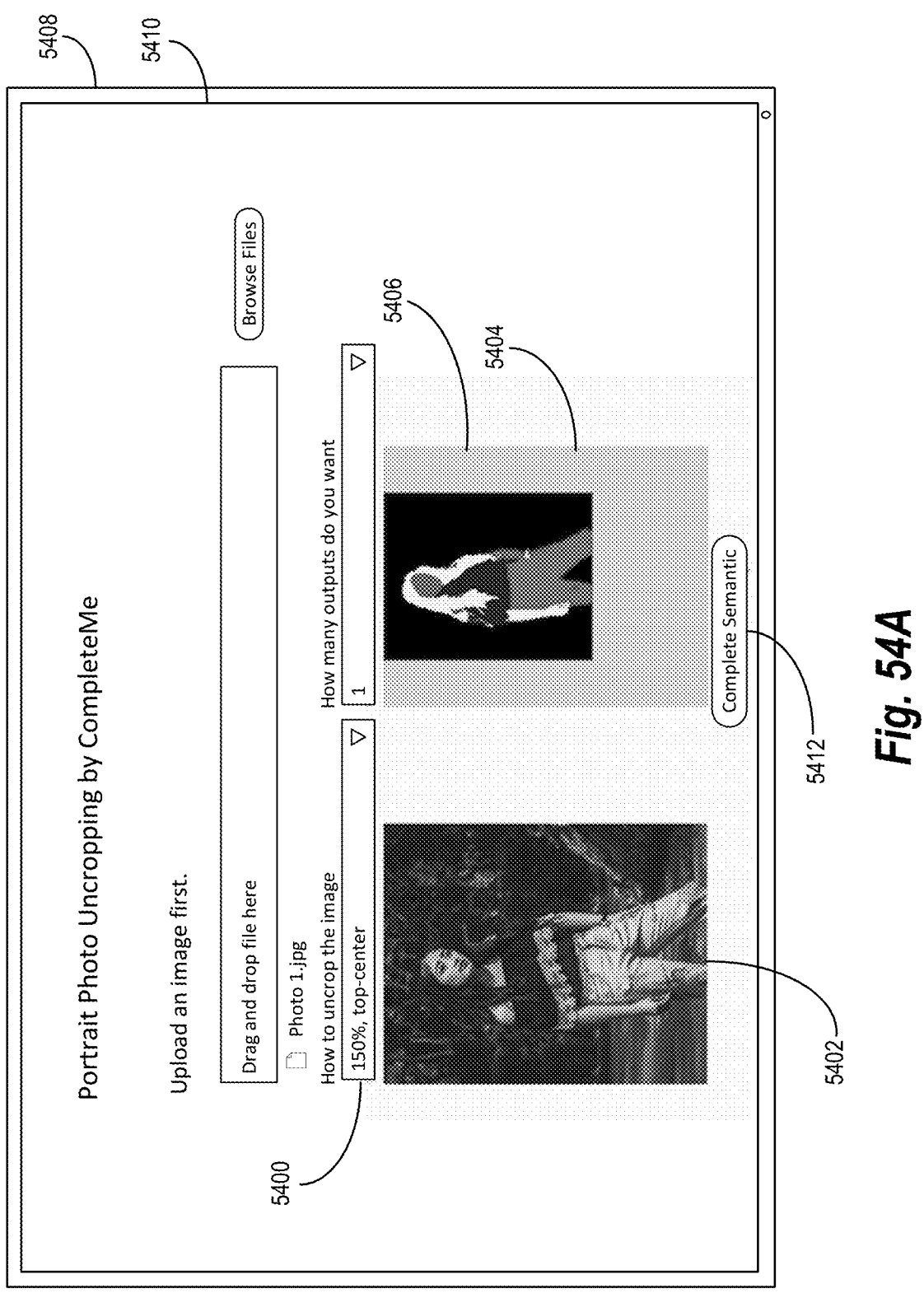
FIGS. 54A-54C illustrate an example graphical user interface of the scene-based image editing system providing parameters for generating a modified digital image in accordance with one or more embodiments.

As mentioned above, in some embodiments the scene-based image editing system 106 provides a user interface to a user of a client device to generate a modified digital image. For example, FIG. 54A illustrates a client device 5410 with a user interface 5408 for expanding a frame of a digital image (e.g., uncropping) in accordance with one or more embodiments. In particular, FIG. 54A shows a selectable expansion option 5400 for "how to uncrop the image" and a drop-down option to indicate the manner of expanding the digital image 5402. For instance, expanding the digital image 5402 includes the infill modification discussed above.

Furthermore, the selectable expansion option 5400 includes an option to indicate a percentage by which to expand the digital image 5402 and a position of the digital image 5402 within an expanded frame 5404. For instance, FIG. 54A shows an indication to expand the digital image 5402 by 150%. Furthermore, FIG. 54A also shows an indication to position the digital image 5402 at the top-center position of the expanded frame 5404. In other instances, the position of the digital image in the expanded frame 5404 includes top-left, top-right, bottom-left, bottom-right, bottom-center, middle-left, middle-right, and middle-center. Moreover, the scene-based image editing system 106 can place the digital image 5402 within the expanded frame 5404 and provide an option for the user of the client device to drag the digital image 5402 into a desired position.

In response to an indication of the parameters to expand the digital image 5402, the scene-based image editing system 106 shows next to the digital image 5402 a semantic map 5406. Similar to the above discussion, the scene-based image editing system 106 generates the semantic map 5406 utilizing a semantic map model. Furthermore, FIG. 54A also illustrates the semantic map within the expanded frame 5404 positioned in the "top-center." Additionally, FIG. 54A shows the scene-based image editing system 106 providing via the user interface a semantic completion option 5412 (labeled in FIG. 54A as "complete semantic"). The semantic completion option shown 5412 in FIG. 54A utilizes the process discussed above for generating an infill semantic map. Specifically, in response to a selection of the semantic completion option 5412 in the user interface 5408, the scene-based image editing system 106 infills the expanded frame 5404 based on the semantic map 5406 (e.g., the initial semantic map of the digital image 5402).

Figure 54B:
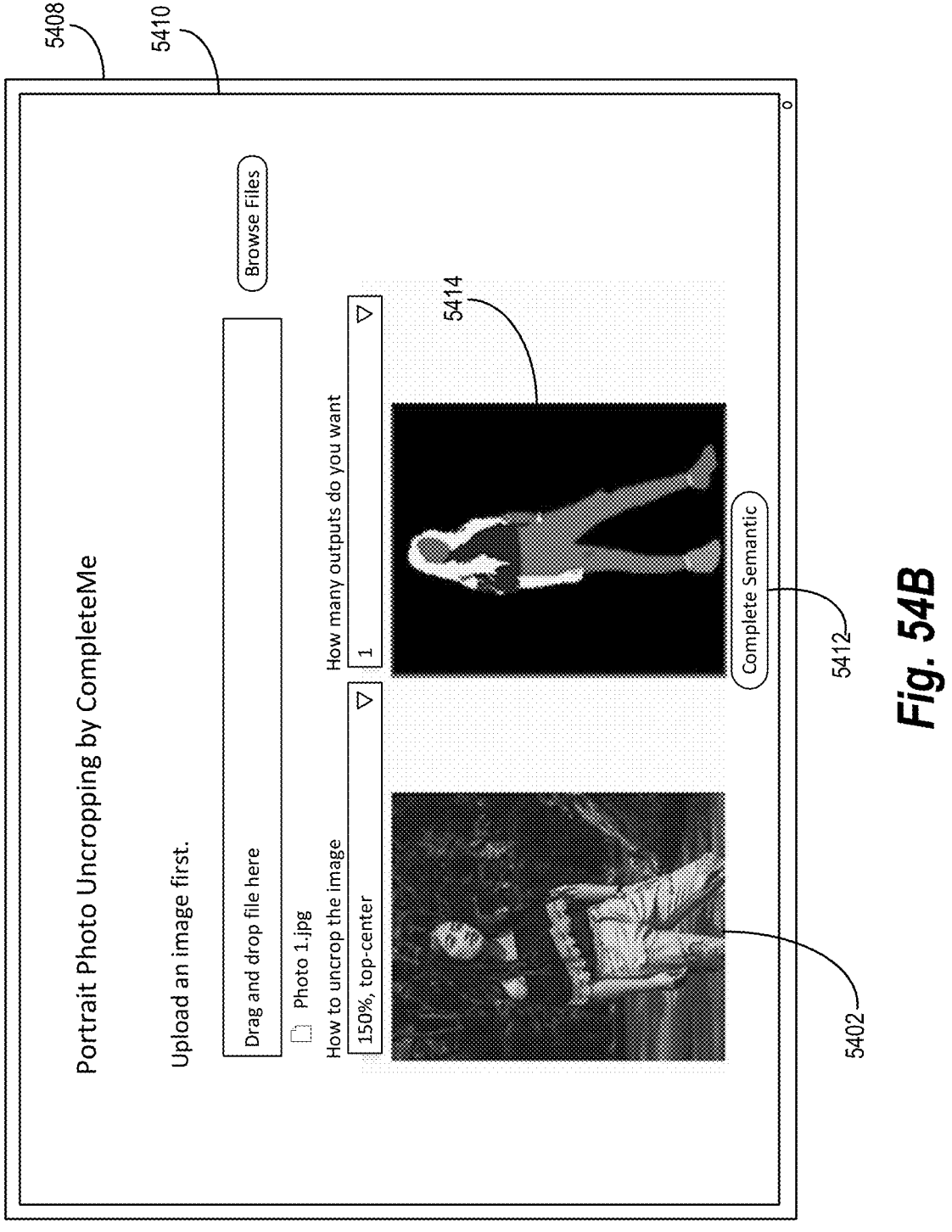

As just mentioned, the scene-based image editing system 106 receives a selection of the semantic completion option 5412. As illustrated, FIG. 54B shows the scene-based image editing system 106 receiving a selection of the semantic completion option 5412 to complete the semantic map and generating an infill semantic map 5414. Thus, comparing the semantic map 5406 shown in FIG. 54A within the expanded frame 5404 with the infill semantic map 5414, FIG. 54B illustrates the completion of the lower extremities (e.g., below the knee) that correspond with the expanded frame from FIG. 54B. For instance, the infill semantic map 5414 illustrates the semantic labels for the pants, ankles and, shoes/feet whereas the digital image 5402 only depicts the person from the knees up.

Figure 54C:
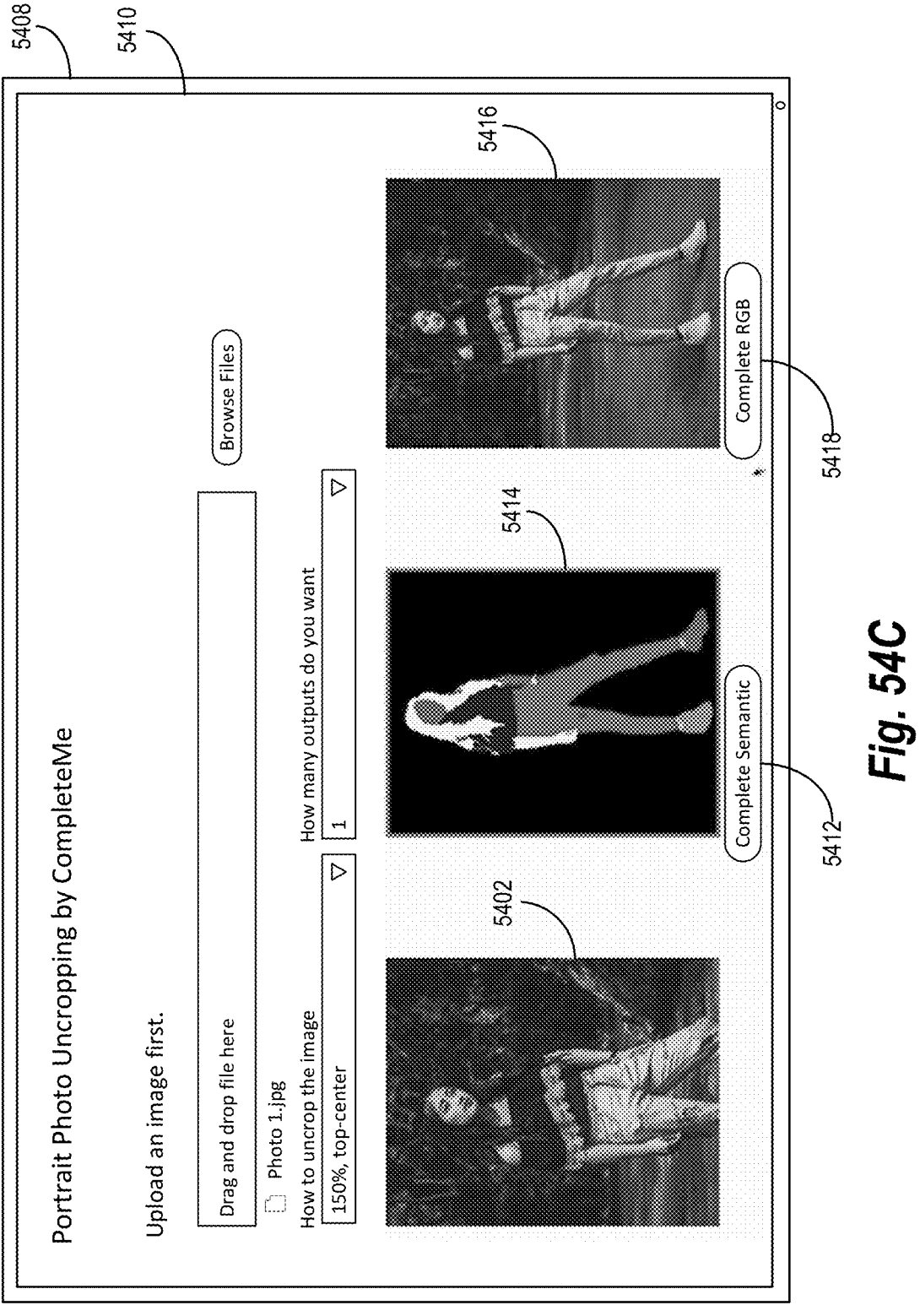

In addition, FIG. 54C illustrates the user interface 5408 for generating a modified digital image from an infill semantic map in accordance with one or more embodiments. For example, FIG. 54C illustrates a digital image completion option 5418 (labeled "complete RGB"). In particular, in response to selection of the digital image completion option 5418, the scene-based image editing system 106 generates a modified digital image 5416 based on the infill semantic map 5414. Accordingly, as shown in FIG. 54C, the scene-based image editing system 106 provides for display (via the user interface 5408) the modified digital image 5416 (e.g., the completed digital image) along with the infill semantic map 5414 and the digital image 5402. Similar to the discussion in FIG. 54B, the modified digital image 5416 shows the person in the digital image 5402 from the knees down. In particular, as already mentioned, the scene-based image editing system 106 guides the generation of the modified digital image 5416 with the infill semantic map 5414.

Figure 55A:
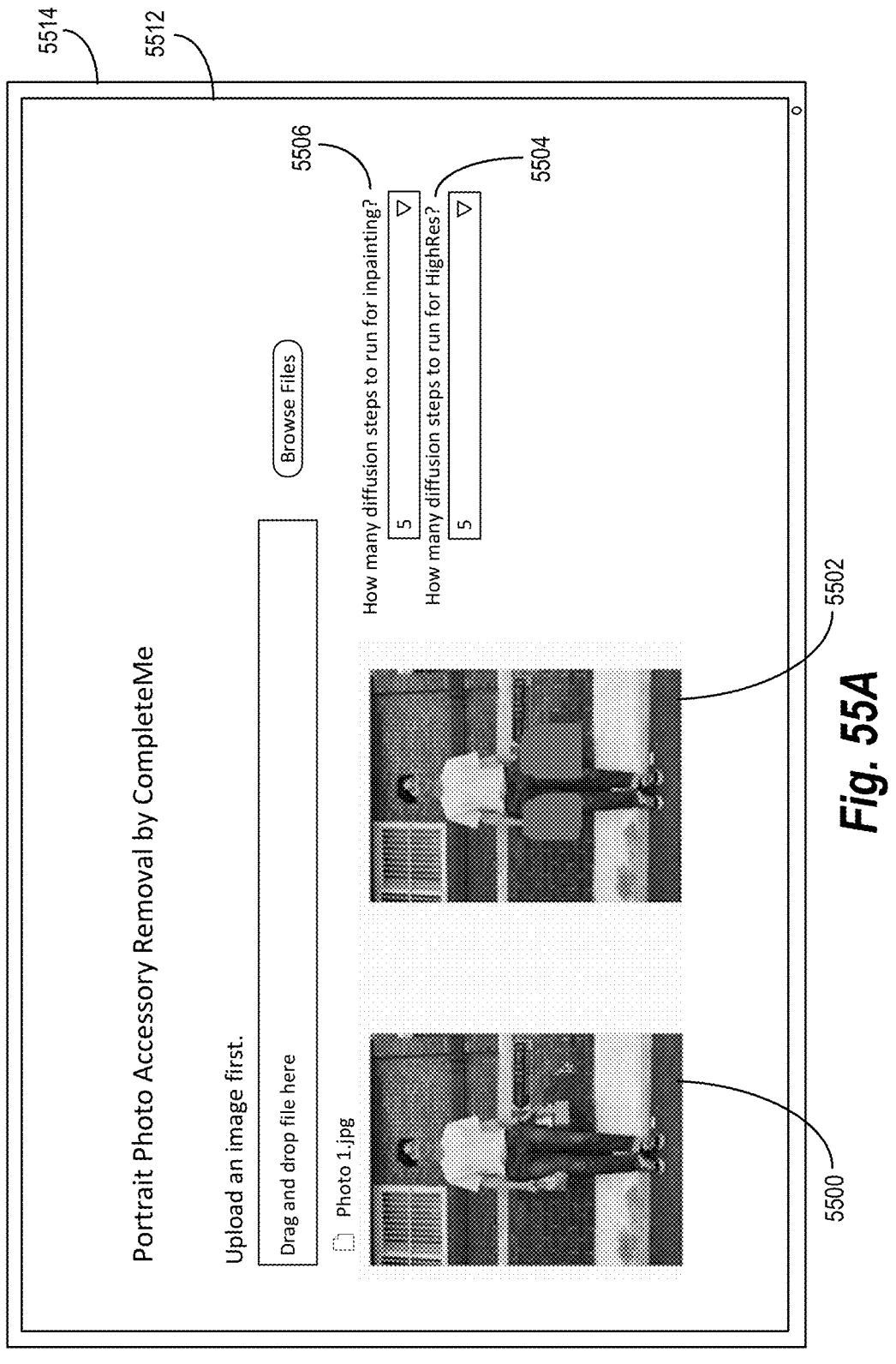
FIGS. 55A-55B illustrate an example graphical user interface of the scene-based image editing system removing an object and generating a modified digital image in accordance with one or more embodiments.

As mentioned, the scene-based image editing system 106 provides options for selecting regions in a digital image to remove. For example, FIG. 55A shows the scene-based image editing system 106 with a digital image 5500 and a masked digital image 5502 with the region to be removed masked. In particular, the digital image 5500 portrays a person with bags in each hand and the scene-based image editing system 106 provides a tool to select a portion to remove. For instance, the scene-based image editing system 106 receives an indication to remove the bags via a click selection or a query that designates the "bags."

FIG. 55A further illustrates the scene-based image editing system 106 utilizing a user interface 5512 of a client device 5514 to provide a diffusion step iteration option 5506 to designate the number of diffusion steps (e.g., sampling steps) for performing the infill modification. In response to receiving the designated number of diffusion iterations, the scene-based image editing system 106 can dynamically select a number of diffusion layers/denoising layers to utilize in generating the modified digital image from the masked digital image 5502 and the digital image 5500. In particular, diffusion iterations include the length of the fixed Markov chain (e.g., the number of diffusion layers and/or denoising layers). In other words, the diffusion iterations indicate the number of steps for forward diffusion and the number of steps for reverse diffusion (denoising). Moreover, the scene-based image editing system 106 takes just a few seconds in some implementations to generate a modified digital image or a high-resolution version of the digital image 5500.

Furthermore, FIG. 55A also illustrates a high-resolution option 5504 to designate the number of diffusion steps for generating a high-resolution version of the modified digital image. For example, based on conditioning from the infill semantic map, the diffusion neural network generates the modified digital image in a low-resolution version. In particular, in response to an indication to generate a high-resolution version of the digital image, the diffusion neural network receives the generated modified digital image (low-resolution) as an input and performs the number of diffusion iterations indicated to generate the high-resolution version of the modified digital image.

Although FIG. 55A shows various user interface options (e.g., the diffusion step iteration option 5506 and the high-resolution option 5504), in one or more embodiments, the scene-based image editing system 106 provides via the user interface 5512 of the client device 5514 the digital image 5500 and the masked digital image 5502 with the region to be removed without additional user interface elements. In particular, the scene-based image editing system 106 provides an intuitive and easy-to-use interface with the client device 5514 only displaying the digital image 5500 and the masked digital image 5502. In doing so, a user of the client device 5514 can via the user interface 5512 click/tap/select portions on the digital image 5500 and the scene-based image editing system 106 intelligently detects and performs acts such as generating a modified digital image. For instance, in response to detecting selection of an object in a person's hand, the scene-based image editing system 106 automatically generates an infill semantic map and infills the region defined by the object. Similarly, in response to a selection expanding the boundary or frame of a digital image, the scene-based image editing system 106 automatically generates an infill semantic map and infills the expanded frame. Thus, in some embodiments, the scene-based image editing system 106 eliminates user interface elements.

Figure 55B:
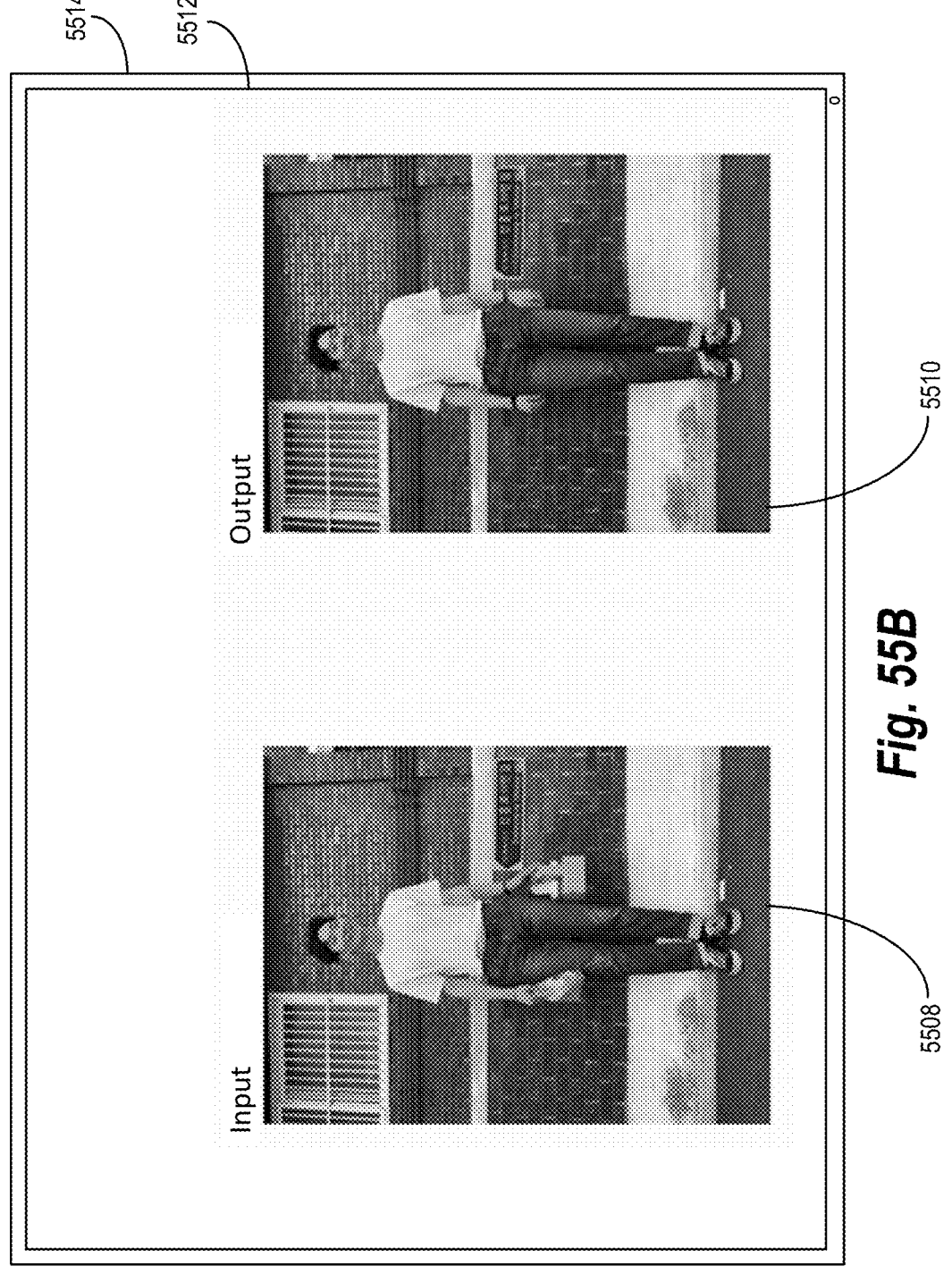

Moreover, FIG. 55B illustrates example results of the scene-based image editing system 106 removing items from an input digital image 5508. In particular, FIG. 55B illustrates the input digital image 5508 received as input by the scene-based image editing system 106 and in response to user interactions, generating a modified digital image 5510 that conforms with the user interactions. Specifically, FIG. 55B illustrates an accurate and high-quality modification of the input digital image 5508 to infill the hands and the background portion behind the removed bags.

In one or more embodiments, the scene-based image editing system 106 intelligently utilizes the features discussed in FIGS. 49-55B to perform infill modifications. For example, if a user of a client device uploads a cropped digital image into an existing digital image being edited in an image editing application, the scene-based image editing system 106 intelligently determines modifications. In particular, the scene-based image editing system 106 determines a percentage to expand the digital frame of the uploaded cropped digital image based on the uploaded cropped digital image not aligning with the bottom frame of the existing digital image. Moreover, the scene-based image editing system 106 generates an infill modification to fill in the expanded portion (e.g., completes a human/object to be cropped into the digital image so that the human/object aligns with the boundaries of the new digital image and then combines/ composites the completed human with the new digital image). Additionally, the scene-based image editing system 106 intelligently provides multiple outputs of generated digital images based on the uploaded cropped digital image. In particular, the multiple outputs include different variations of the scene-based image editing system 106 generating infill modifications for an expanded digital image frame.

Furthermore, in one or more embodiments, the scene-based image editing system 106 intelligently detects occluders or detractors in a digital image. For example, the scene-based image editing system 106 detects occluders/detractors covering part of a human portrayed within a digital image and removes the occluders/detractors. In particular, the scene-based image editing system 106 removes the occluders/detractors and generates an infill modification in place of the removed occluders/detractors. For instance, the scene-based image editing system 106 intelligently removes portions of an uploaded digital image and infills the removed portion.

Moreover, in one or more embodiments, the scene-based image editing system 106 intelligently detects textures within a digital image and recommends alternative textures. For example, the scene-based image editing system 106 detects apparel portrayed within a digital image and extracts the texture of the apparel. In particular, the scene-based image editing system 106 then provides a recommendation of texture options to replace the current texture shown within the digital image.

In addition, in one or more embodiments, the scene-based image editing system 106 intelligently detects other portions within a digital image and recommends options to replace detected portions. For example, the scene-based image editing system 106 detects apparel, background, hair, and other accessories (e.g., purse, backpack, hat, glasses, etc.). In particular, the scene-based image editing system 106 detects various portions of the digital image and provides multiple recommendations for each detected portion to replace the detected portion. Accordingly, for each of the above embodiments, the scene-based image editing system 106 intelligently and automatically performs infill modifications or infill recommendations to a user of a client device in real-time or near real-time (e.g., seconds).

As briefly mentioned above, in one or more implementations the scene-based image editing system 106 generates modified digital images by inpainting indicated portions of a digital image. Specifically, in one or more embodiments the scene-based image editing system 106 performs partial human inpainting with generative machine learning models specially trained to accommodate inpainting of human subjects from digital images. For example, for a digital image that portrays a human with an object covering (e.g., obstructing or occluding) part of the human, the scene-based image editing system 106 utilizes a human inpainting GAN to perform human inpainting. In particular, the scene-based image editing system 106 generates a modified digital image by utilizing a structural guidance map and a digital image portraying a human.

In addition, in one or more embodiments the scene-based image editing system 106 performs human inpainting to generate a modified digital image by utilizing two-dimensional modulation. For example, the scene-based image editing system 106 generates utilizing an encoder, a visual appearance encoding from the digital image portraying the human. Moreover, the scene-based image editing system 106 further utilizes a parameter neural network to generate a local appearance feature tensor, which includes spatially varying scaling and shifting tensors. In other words, the scene-based image editing system 106 modulates a structural encoding generated from a structure guidance map at the human inpainting GAN. The two-dimensional modulation aids in generating accurate and high-quality human inpainted digital images.

Further, in one or more embodiments, the scene-based image editing system 106 generates human inpainted digital images by utilizing hierarchical encoders. For example, the scene-based image editing system 106 utilizes a hierarchical encoder to generate the structural encoding and the visual appearance encoding. In particular, the scene-based image editing system 106 utilizes the hierarchical encoder which includes multiple downsampling and upsampling layers connected via skip connections (e.g., skip connections for matching resolutions between various layers). By utilizing the hierarchical encoder, the scene-based image editing system 106 can preserve nuance and details when generating the human inpainted digital images.

Moreover, as mentioned, in one or more embodiments the scene-based image editing system 106 utilizes structure guidance map(s) for generating the structural encoding. For example, the structure guidance maps include at least one of a keypoint map, a densepose map, a segmentation map, or a digital image. In particular, in some embodiments, the scene-based image editing system 106 utilizes a separate neural network branch to generate a segmentation map of a digital image for further use as the structure guidance map. For instance, the scene-based image editing system 106 generates an infill segmentation map of the digital image portraying the human with an unclassified region corresponding to the region to inpaint.

Furthermore, in other embodiments, the scene-based image editing system 106 utilizes multiple machine learning models for human inpainting and background inpainting. For example, the scene-based image editing system 106 utilizes a background GAN in addition to a human inpainting GAN. In particular, the scene-based image editing system 106 generates a modified background portion of the digital image utilizing a background GAN and generates modified pixels of the region of the human portrayed within the digital image with a human inpainting GAN. k Moreover, the scene-based image editing system 106 can train a human inpainting GAN. For example, in some implementations, the scene-based image editing system 106 utilizes a combination of partial reconstruction loss and adversarial loss for training the human inpainting GAN. Indeed, because occluder images often fail to include underlying ground truth information behind the occlusion, the scene-based image editing system 106 can utilize a partial reconstruction loss where the measure of loss is based on the portions of the human outside of the region to inpaint.

Figure 56:
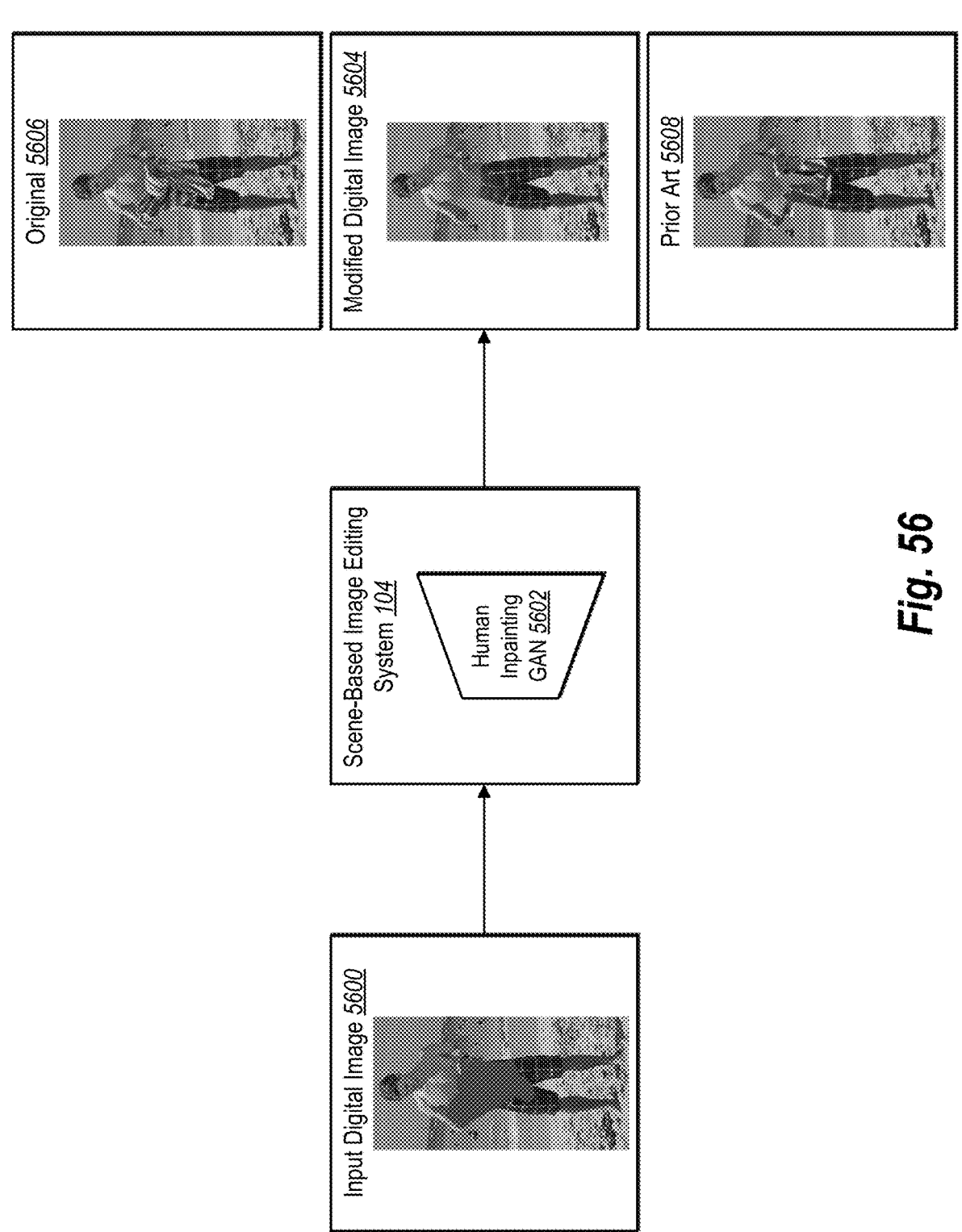
FIG. 56 illustrates an overview diagram of the scene-based image editing system performing human inpainting in accordance with one or more embodiments.

As mentioned above, the scene-based image editing system 106 performs acts for generating modified digital images. For example, the scene-based image editing system 106 utilizes multiple machine learning model instances to generate a modified digital image by performing partial human inpainting. In particular, FIG. 56 illustrates an overview of the scene-based image editing system 106 performing partial human inpainting in accordance with one or more embodiments. For instance, the scene-based image editing system 106 generates a realistic and accurate modified digital image 5604 from an input digital image 5600 by inpainting a portion of the input digital image 5600. Specifically, the scene-based image editing system 106 analyzes an indication from a user of a client device of a region for inpainting such as a segmented portion or an indication to remove an object obstructing a human portrayed within a digital image. Additionally, the indication from a user of a client device includes an indication of at least one of removing an object from the digital image (e.g., obstructing a human), expanding a digital image frame (e.g., the expanded portion requires infilling of the human), or removing a blemish from the region of the human.

As shown, FIG. 56 illustrates the scene-based image editing system 106 receiving the input digital image 5600 which portrays a human (e.g., from an upload or selection at the image editing application). For example, the scene-based image editing system 106 determines a depiction of a human within the input digital image 5600. For instance, the depiction of the human can include the input digital image 5600 only showing the human from the chest up or from the chest down or any other sub-portion of the human. Furthermore, the depiction of the human can include the input digital image 5600 with a frame that encompasses the entire body of the human however with an occlusion or hole covering a part of the human. For instance, the input digital image 5600 depicts a human holding a towel, the towel obstructing a portion of the human.

As shown, for the input digital image 5600, the scene-based image editing system 106 determines a region to inpaint corresponding with the depiction of the human. In particular, the region of the human includes a portion of the input digital image 5600 that either only covers a part of the depicted human or a portion of the input digital image 5600 that overlaps with part of the depicted human and another part of the input digital image 5600. Specifically, the input digital image 5600 depicts a human and also depicts the human holding an object, the region of the human to inpaint in this instance includes the object held by the human.

As also shown, FIG. 56 illustrates the scene-based image editing system 106 utilizing a human inpainting GAN 5602 to generate the modified digital image 5604. As already mentioned above, the scene-based image editing system 106 utilizes various generative models to generate realistic features. The scene-based image editing system 106 trains the human inpainting GAN 5602 specifically for human inpainting. More details relating to training of the human inpainting GAN 5602 is given below in the description of FIG. 64. Moreover, details relating to the specific architectural components of the human inpainting GAN 5602 are given below in the description of FIG. 54.

Moreover, as further shown, FIG. 56 illustrates the scene-based image editing system 106, via the human inpainting GAN 5602, generating the modified digital image 5604. As previously discussed, the scene-based image editing system 106 determines infill modifications (e.g., the act 4904 for determining an infill modification discussed in FIG. 49) and infill modifications include infilling a region or in other words, inpainting the region. For example, inpainting includes adding pixel values, replacing pixel values with new pixel values, or adding pixel values to an expanded frame of a digital image, where the expanded frame is unpopulated. Accordingly, inpainting includes the addition of pixel values to a digital image to either fill a gap, replace an object, or add to an expanded portion of the digital image. Specifically, as shown in FIG. 56, the scene-based image editing system 106 inpaints the "hole" depicted in the input digital image 5600 with the addition of pixel values to generate a realistic-looking digital image that depicts the portion behind the "hole" in the input digital image 5600. Accordingly, the human inpainting performed by the scene-based image editing system 106 via the human inpainting GAN 5602, includes realistically filling in regions corresponding to a human's stomach, hands, and pants.

In one or more embodiments, the scene-based image editing system 106 segments the input digital image 5600 utilizing a segmentation model. In particular, the scene-based image editing system 106 utilizes a segmentation image neural network (e.g., segmentation machine learning model 5304 discussed in FIG. 53 or other segmentation models discussed herein). For instance, the scene-based image editing system 106 processes a selection by a user of a client device or a query to select a class of object(s) within the input digital image 5600. Furthermore, in response to a selection or a query, the scene-based image editing system 106 generates a segmentation mask. Thus, as shown, the input digital image 5600 includes the relevant portion segmented by the scene-based image editing system 106.

FIG. 56 also further illustrates a comparison with the modified digital image 5604 relative to an original digital image 5606. As shown, the scene-based image editing system 106 inpaints a realistic depiction of the portion of the human behind the towel. Specifically, FIG. 56 illustrates the scene-based image editing system 106 performing realistic and accurate inpainting of the hands, stomach, and swimsuit worn by the human portrayed within the original digital image 5606.

Conventional systems have leveraged recent computing advancements to modify digital images utilizing a variety of digital tools and models. To illustrate, conventional systems utilize computer-implemented models to inpaint digital images. Despite these advancements, however, conventional systems continue to suffer from a number of technical deficiencies, particularly with regard to accuracy, efficiency, and flexibility of implementing systems in generating inpainted digital images.

For example, FIG. 56 also shows the results of a conventional system generating inpainted humans. In particular, FIG. 56 illustrates a prior art digital image 5608. For instance, the prior art digital image 5608 also corresponds with the input digital image 5600. Specifically, the prior art digital image 5608 depicts the same human as the input digital image 5600, however the result of inpainting the portion behind the segmented region shows a failure of conventional systems to accurately and realistically generate an inpainted human. In comparing the results of the modified digital image 5604 generated by the scene-based image editing system 106 and the prior art digital image 5608 generated by conventional systems, the prior art digital image 5608 erroneously incorporates elements of the water background in place of the human's stomach and swimsuit. Furthermore, the prior art digital image 5608 also depicts vestiges of the towel held by the human in the original digital image 5606. For instance, a residual outline of the towel remains in the prior art digital image 5608 and the hands once holding the towel unclearly portray the human's hands. Thus, unlike the prior art digital image 5608, the modified digital image 5604 accurately and realistically shows the inpainted human without leaking the background into the human and including vestiges of the towel. Accordingly, as shown by the prior art digital image 5608, conventional systems inaccurately inpaint humans. Moreover, as discussed previously, conventional systems are also inefficient in the number of user interactions for inpainting digital images (e.g., to correct erroneous inpainting pixels).

The scene-based image editing system 106 can improve accuracy relative to conventional systems. For example, in one or more implementations the scene-based image editing system 106 improves upon the accuracy of conventional systems by utilizing a local appearance feature tensor (e.g., spatially variant parameters) to generate smooth, natural, realistic, and accurate human inpainting. Unlike conventional machine learning models that merely utilize global features of a digital image (e.g., feature representations that do not change or vary across pixels of the digital image), the use of the local appearance feature tensor can add more nuance, depth, and details to generating the fills. Accordingly, in some implementations the scene-based image editing system 106 more accurately generates inpainted digital images.

Moreover, the scene-based image editing system 106 improves upon accuracy of conventional systems by utilizing the human inpainting GAN 5602. In particular, in one or more implementations, the scene-based image editing system 106 utilizes the human inpainting GAN 5602 which is trained specifically for performing human inpainting. Thus, unlike conventional systems which are generally trained for filling in regions, the scene-based image editing system 106 can utilize a specifically trained and specialized generative model for inpainting humans portrayed within digital images.

Additionally, the scene-based image editing system 106 can improve upon accuracy by utilizing structure guidance maps. Specifically, the scene-based image editing system 106 utilizes structural guidance maps, such as keypoint maps, pose maps, or segmentation maps to inform the human inpainting GAN 5602 to more accurately generate modified digital images.

In addition to improving accuracy, the scene-based image editing system 106 improves upon the efficiency of conventional systems. For example, the scene-based image editing system 106 reduces the need for excessive user interactions for generating modified digital images. Indeed, by intelligently and accurately inpainting regions of a digital image, the scene-based image editing system 106 reduces user interactions and user interfaces needed to remove occluders, correct digital images, and generate accurate portrayals of human subjects.

Figure 57:
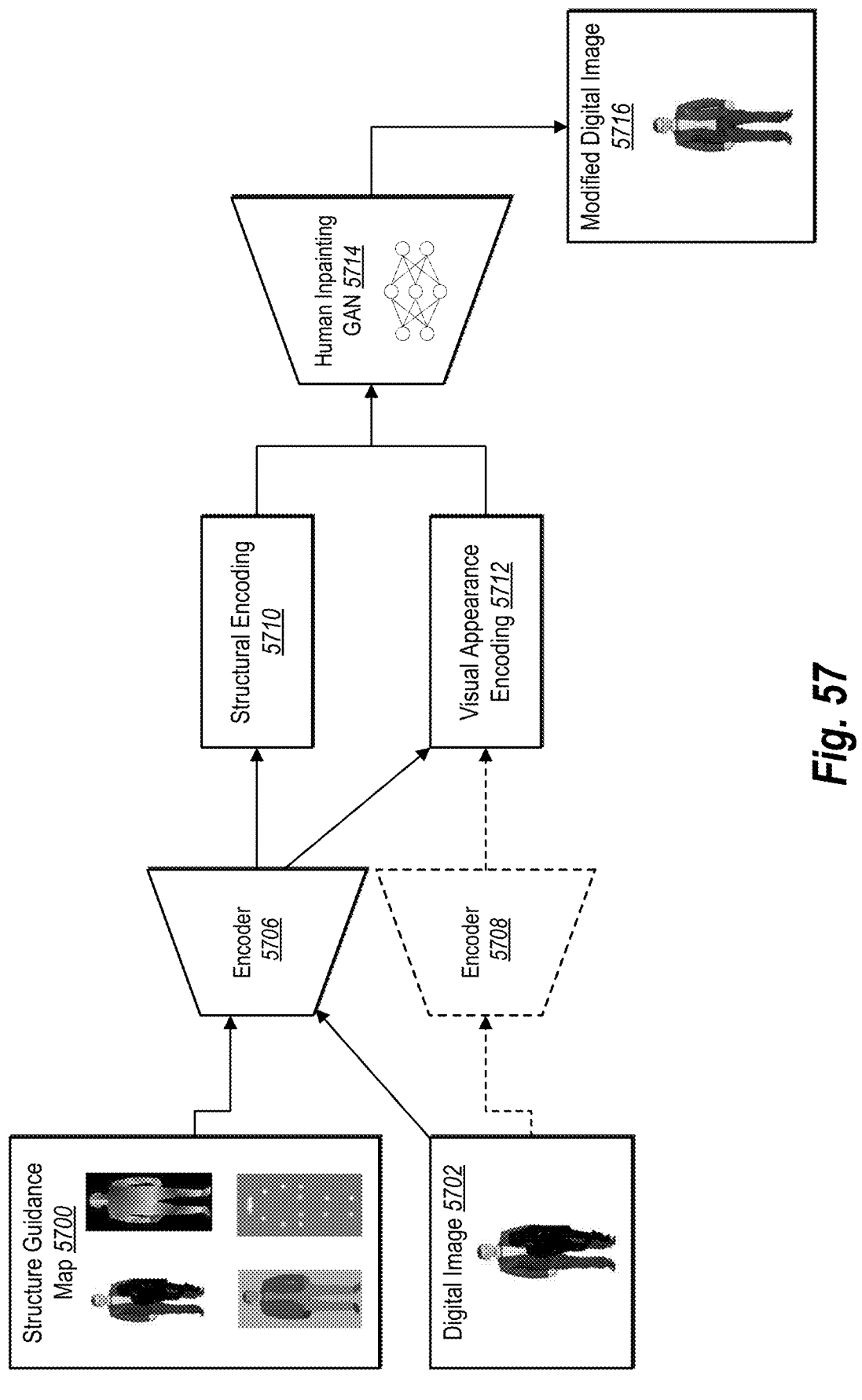
FIG. 57 illustrates an example diagram of the scene-based image editing system generating encodings in accordance with one or more embodiments.

As illustrated, FIG. 57 shows additional details relating to the scene-based image editing system 106 generating a modified digital image from various encodings in accordance with one or more embodiments. For example, FIG. 57 shows the scene-based image editing system 106 utilizing a structure guidance map 5700 to assist in generating the modified digital image 5716. In particular, the structure guidance map 5700 includes a structural representation of a human depicted within the digital image 5702. For instance, the structure guidance map 5700 contains data points regarding the structural position, shape, and/or pose of the human depicted within the digital image 5702. Thus, the structure guidance map 5700 can include a keypoint map, a pose map, or a segmentation map. In one or more embodiments, the scene-based image editing system 106 generates the structure guidance map utilizing a machine learning model (e.g., a segmentation machine learning model, a keypoint machine learning model, a shape machine learning model, or a pose machine learning model).

As shown in FIG. 57, the scene-based image editing system 106 utilizes an encoder 5706 to extract structural data from the structure guidance map 5700. As further shown, the scene-based image editing system 106 generates a structural encoding 5710 from the structure guidance map 5700 utilizing the encoder 5706. In particular, the structural encoding 5710 includes a low-dimensional representation for high-dimensional features from a structural guidance map.

In addition to generating the structural encoding 5710, FIG. 57 also illustrates the scene-based image editing system 106 utilizing the encoder 5706 to generate the visual appearance encoding 5712 from the digital image 5702. For example, the visual appearance encoding 5712 includes visual information pertaining to the digital image 5702. In particular, the visual appearance encoding 5712 includes visual features of the human portrayed within the digital image 5702 as a numerical representation.

As shown, FIG. 57 illustrates the scene-based image editing system 106 utilizing the encoder 5706 to generate the structural encoding 5710 and the visual appearance encoding 5712. Thus, the scene-based image editing system 106 can utilize a single encoder to generate the structural encoding 5710 (from the structure guidance map 5700) and the visual appearance encoding 5712 (from the digital image 5702). In some implementations, the use of a single encoder can improve the efficiency of the scene-based image editing system 106. Specifically, the use of a single encoder (e.g., the encoder 5706) reduces the amount of computational resources required for training and implementation.

In some embodiments, the scene-based image editing system 106 utilizes multiple encoders. For example, FIG. 57 also shows the scene-based image editing system 106 optionally utilizing an encoder 5708. Thus, in some embodiments the scene-based image editing system 106 utilizes the encoder 5708 to generate the visual appearance encoding 5712 from the digital image 5702 while utilizing the encoder 5706 to generate the structural encoding 5710 from the structure guidance map 5700.

As further shown, FIG. 57 illustrates the scene-based image editing system 106 utilizing the human inpainting GAN 5714 to generate a modified digital image 5716 from both the structural encoding 5710 and the visual appearance encoding 5712. As mentioned previously, the scene-based image editing system 106 utilizes the human inpainting GAN to generate a realistic-looking inpainted human within the digital image 5702. Specifically, the scene-based image editing system 106 tunes the human inpainting GAN 5714 specifically for humans within digital images to generate realistic inpainted humans.

As mentioned above, in some implementations the scene-based image editing system 106 generates a local appearance feature tensor to improve the accuracy of human inpainting. For example, FIG. 58 illustrates additional details relating to modulating a human inpainting GAN 5814 with a local appearance feature tensor in accordance with one or more embodiments.

Figure 58:
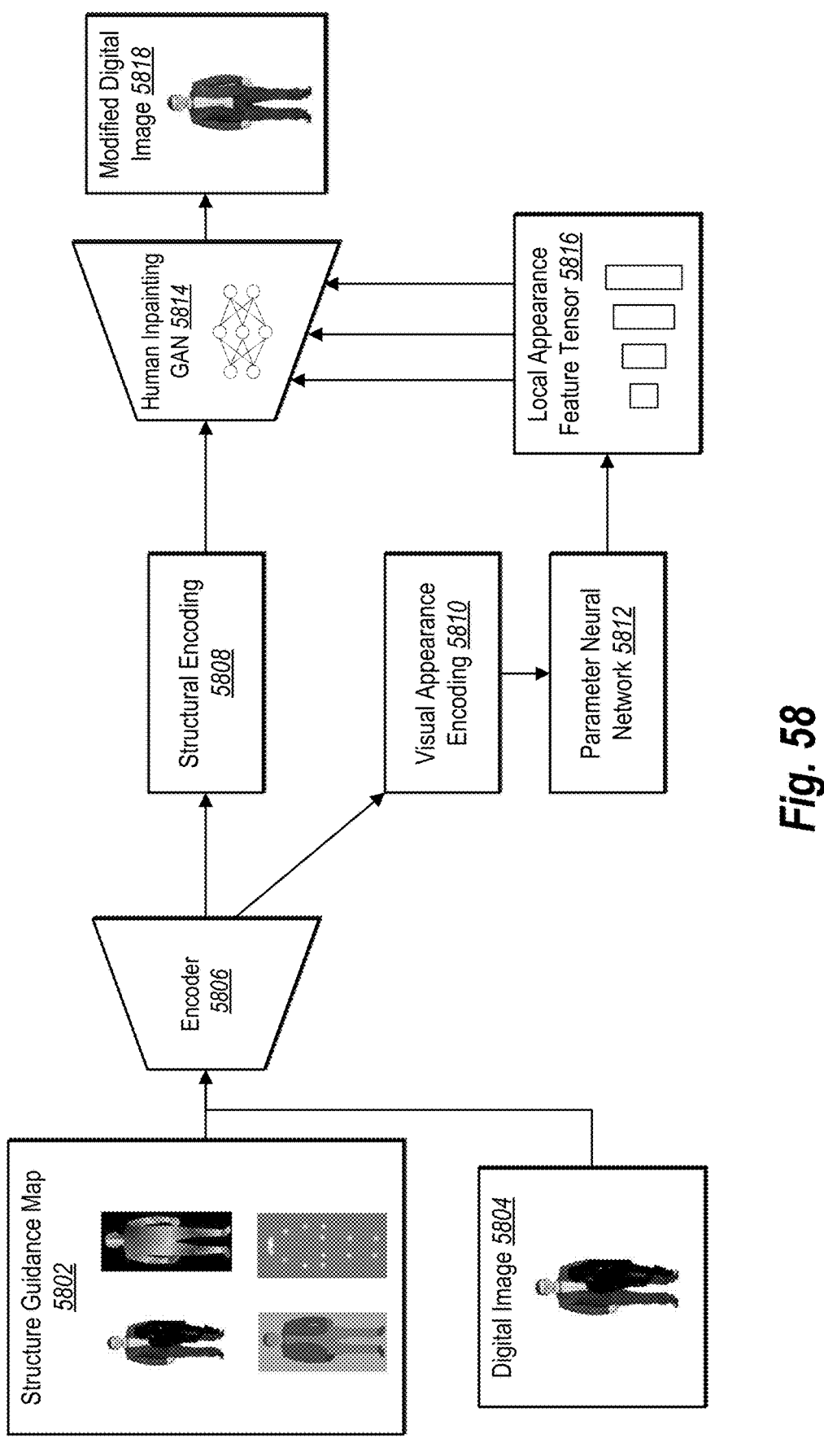
FIG. 58 illustrates an example diagram of the scene-based image editing system generating a local appearance feature tensor in accordance with one or more embodiments.

In particular, FIG. 58 shows the scene-based image editing system 106 utilizing a structure guidance map 5802. As mentioned above, the structure guidance map 5802 can include a keypoint map, a pose map, a segmentation map, and α digital image. A keypoint map includes a representation of points that make up a human figure. For instance, the keypoint map defines the structure of the human with various points (e.g., points corresponding to head, joints, members, etc.). Accordingly, the keypoint map includes the key structural form of the human depicted within the digital image 5804.

In some embodiments, the scene-based image editing system 106 utilizes a pose map. In particular, a pose map includes a dense pose representation. For instance, in generating the pose map, the scene-based image editing system 106 maps known pixels of the digital image 5804 to a 3-dimensional surface of a human body. The pose map includes a dense keypoint sequence representation of the digital image 5804. In some embodiments, the scene-based image editing system 106 generates the dense keypoint sequence representation utilizing a pose estimation algorithm such as DensePose. For example, the scene-based image editing system 106 can utilize a pose estimation algorithm that maps pixels portraying a human within a digital image to a 3D surface of the human body (e.g., by quantizing UV values).

Furthermore, in one or more embodiments, the scene-based image editing system 106 utilizes segmentation maps (such as a semantic map as discussed above). For example, the segmentation map utilized as the structure guidance map 5802 includes the depiction of the human within the digital image 5804 segmented according to various classifications. For example, the segmentation map includes a segmentation between the background and the human. In particular, the segmentation map further segments sub-portions of the human such as a jacket the human is wearing, pants, shoes, head, and hair.

Moreover, in some embodiments, the scene-based image editing system 106 utilizes the digital image 5804 (or a portion of the digital image 5804) as the structure guidance map 5802. For example, the scene-based image editing system 106 utilizes the digital image 5804 that depicts the human as the structure guidance map 5802. In particular, the digital image 5804 contains structural information such as the boundary of the human and the various sub-portions of the human reflected by different color shades within the digital image 5804. As such, the scene-based image editing system 106 utilizes the human from the digital image 5804 as the structure guidance map 5802.

As further shown, the scene-based image editing system 106 utilizes an encoder 5806 to generate a structural encoding 5808 and a visual appearance encoding 5810 from the structure guidance map 5802 and the digital image 5804. Specifically, the scene-based image editing system 106 generates the structural encoding 5808 and the visual appearance encoding 5810 for each resolution of the digital image 5804. More details relating to generating the structural encoding 5808 and the visual appearance encoding 5810 are given below in the description of FIGS. 56-57.

Additionally, FIG. 58 shows the scene-based image editing system 106 utilizing a parameter neural network 5812. For example, the scene-based image editing system 106 generates a local appearance feature tensor 5816 utilizing the parameter neural network 5812 from the visual appearance encoding 5810. In particular, the parameter neural network 5812 includes generating a scaling and shifting parameter that applies locally (e.g., varies across individual regions or pixel representations). Specifically, the parameter neural network 5812 generates the local appearance feature tensor 5816 (scaling and shifting parameter) for modulating a style block/layer of the human inpainting GAN 5814. In other words, the local appearance feature tensor 5816 for the visual appearance encoding 5810 includes a scaling tensor and a shifting tensor that locally modify the digital image 5804 such that the scaling tensor and shifting tensor vary across different portions or regions. Accordingly, the scene-based image editing system 106 utilizes the parameter neural network 5812 to generate a feature tensor (scaling and shifting tensor) from the visual appearance encoding 5810 at a specific resolution corresponding to a specific resolution of a particular style block. Moreover, the scene-based image editing system 106 utilizes the parameter neural network 5812 to generate different feature tensors (different locally varying scaling and shifting tensors) at different resolutions for the varying style blocks of the human inpainting GAN 5814.

For example, a feature tensor includes a multi-dimensional array of numerical values that represent features or characteristics of underlying data (such as a digital image, structural representation, and/or visual appearance representation). The scene-based image editing system 106 utilizes a feature tensor for modulating style blocks within a human inpainting GAN.

In one or more embodiments, the human inpainting GAN utilizes a StyleGAN or StyleGAN2 architecture (as discussed and incorporated above with regard to StyleGAN2). For instance, the scene-based image editing system 106 utilizes convolutional layers (e.g., multiple fully connected convolutional layers) to convert a digital image into intermediate latent vectors (e.g., w vectors in a W or W+ space). In turn, the scene-based image editing system 106 converts the Intermediate latent vectors into latent style vectors utilizing a series of learned transformations.

The scene-based image editing system 106 converts style vectors into a feature representation utilizing a series of layers referred to as style blocks. In particular, the scene-based image editing system 106 utilizes a first style block to process a first style vector. The first style block generates a first intermediate feature vector and passes the first intermediate feature vector to a second style block. The second style block processes the first intermediate feature vector and the second style vector to generate a second intermediate feature vector. The second style block generates the second intermediate feature vector. Thus, the scene-based image editing system 106 iteratively utilizes the style blocks to generate a series of intermediate feature vectors. The scene-based image editing system 106 can also modulate these style blocks by combining additional representations with the style vectors/and/or intermediate feature vectors.

As mentioned above, the scene-based image editing system 106 generates the local appearance feature tensor 5816. For example, the local appearance feature tensor 5816 includes a scaling and/or a shifting tensor. In other words, depending on the pixel value location of the digital image 5804, the scene-based image editing system 106 utilizes a different scaling and shifting tensor to modulate the feature representations for a particular style block. Accordingly, the scene-based image editing system 106 utilizes the local appearance feature tensor 5816 from the visual appearance encoding 5810 that corresponds to a specific resolution of a particular style block to modulate (scale and shift) the feature representations of the human inpainting GAN 5814. Moreover, as shown, the scene-based image editing system 106 via the human inpainting GAN 5814 generates the modified digital image 5818.

For example, in one or more embodiments, the scene-based image editing system utilizes a scaling tensor and shifting tensor to perform 2D modulation as described by B. AlBahar, J. Lu, J. Yang, Z. Shu, E. Shechtman, and J. Huang in Pose with Style: Detail-Preserving Pose-Guided Image Synthesis with Conditional StyleGAN, SIGGRAPH Asia 2021 (Pose with Style), which is incorporated by reference herein in its entirety. Unlike Pose with Style, in one or more embodiments, the scene-based image editing system 106 performs modulation with regard to different features and inputs, with a different architecture, and with regard to generating different results.

As mentioned above, FIG. 58 shows the scene-based image editing system 106 generating a single visual appearance encoding 5810 and further utilizing the parameter neural network 5812 to generate the local appearance feature tensor 5816 (which includes a spatially varying shifting tensor and/or a spatially varying scaling tensor). Although not illustrated in FIG. 58, in some implementations, the scene-based image editing system 106 generates visual appearance encodings and structural encodings for each resolution of style blocks within the human inpainting GAN 5814. For each visual appearance encoding, the scene-based image editing system 106 utilizes the parameter neural network 5812 to generate a local appearance feature tensor from the visual appearance encoding corresponding to a resolution of a corresponding channel or style block. Accordingly, each generated local appearance feature tensor modulates a structural encoding at a different style block of the human inpainting GAN 5814. More details relating to the modulation of the human inpainting GAN 5814 is given below in the description of FIG. 58.

Although the description above illustrates the scene-based image editing system 106 utilizing a single structure guidance map, in one or more embodiments, the scene-based image editing system 106 utilizes multiple structure guidance maps. In particular, the scene-based image editing system 106 generates the structural encoding 5808 from a combination of a keypoint map and a pose map. In other instances, the scene-based image editing system 106 generates the structural encoding from a combination of the segmentation map and a digital image. Moreover, the scene-based image editing system 106 can utilize various combinations of the available structure guidance maps to generate the structural encoding 5808.

Figure 59:
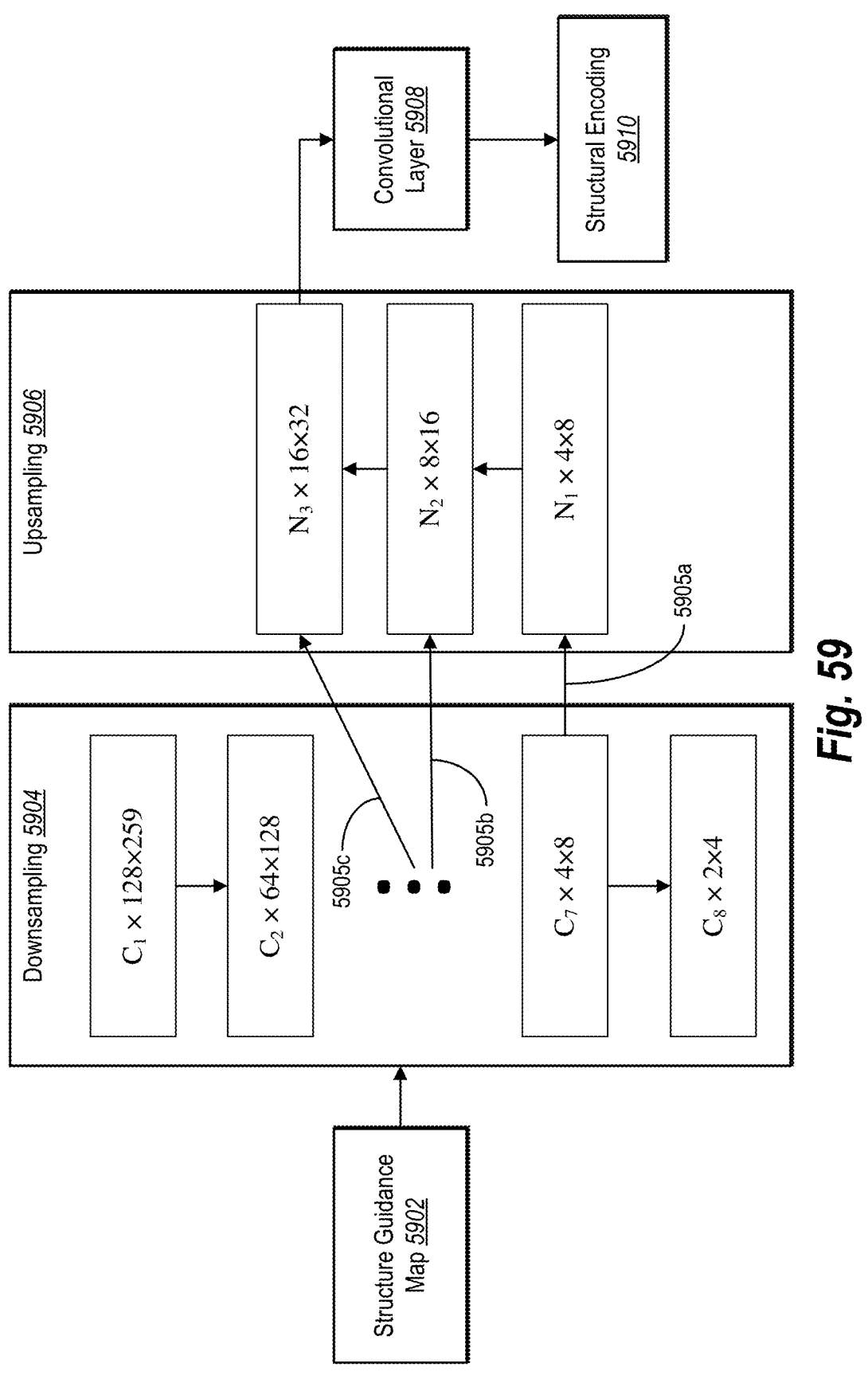
FIG. 59 illustrates an example diagram of the scene-based image editing system utilizing a hierarchical encoder to generate a structural encoding in accordance with one or more embodiments.

As mentioned above, FIG. 59 provides more details relating to generating a structural encoding in accordance with one or more embodiments. For example, FIG. 59 illustrates the scene-based image editing system 106 utilizing a hierarchical encoder to generate a structural encoding 5910. In particular, the hierarchical encoder includes a plurality of layers, and each layer of the hierarchical encoder corresponds with a different resolution of the style blocks of the human inpainting GAN. Specifically, the scene-based image editing system 106 utilizes a hierarchical encoder with a U-shaped architecture and generates a structural encoding corresponding to each resolution of a structure guidance map 5902.

As shown in FIG. 59, the scene-based image editing system 106 utilizes the hierarchical encoder for the structure guidance map 5902 to generate the structural encoding 5910. The hierarchical encoder includes both downsampling layers 5904 and upsampling layers 5906. For downsampling, the hierarchical encoder moves from a high resolution to a lower resolution. In particular, downsampling includes moving from a higher resolution (e.g., 256×512) to a lower resolution that corresponds with the style blocks of the human inpainting GAN. Furthermore, the scene-based image editing system 106 for downsampling also utilizes skip connections to a corresponding upsampling layer.

For example, upsampling includes moving from a lower resolution to a higher resolution corresponding with the style blocks of the human inpainting GAN. In particular, prior to moving to a next upsampling layer, the scene-based image editing system 106 utilizes the aforementioned skip connections to receive the encodings from a corresponding downsampling layer. In response to receiving the encodings from the downsampling layers 5904 via skip connections, the scene-based image editing system 106 combines the encodings. Specifically, the scene-based image editing system 106 concatenates the encodings from the corresponding downsampling layer and upsampling layer. The scene-based image editing system 106 then passes the combined encoding to the next upsampling layer and the process repeats.

As FIG. 59 illustrates, the scene-based image editing system 106 generates the structural encoding 5910 from the structure guidance map 5902 by utilizing the hierarchical encoder. In particular, FIG. 59 shows the downsampling layers 5904 with downsample blocks at each resolution utilized by the scene-based image editing system 106. Specifically, the downsampling layers 5904 contain downsample blocks ranging from 128×256 to 2×4. Furthermore, FIG. 59 shows upsample blocks increasing in resolution. Specifically, the upsample blocks range from 4×8 to 128× 259. Additionally, as shown, FIG. 59 has skip connections 5905a-5905c between corresponding downsampled and upsampled layers. For example, skip connections 5905a-5905c include skipping layers within the neural network and feeding the output from one layer as the input to another layer. In particular, skip connections 5905a-5905c assist in preventing degradation of features within the structure guidance map 5902. Moreover, FIG. 59 shows the scene-based image editing system 106 generating the structural encoding 5910 from a convolutional layer 5908. For example, via the skip connections 5905a-5905c between the downsampling layers 5904 and the upsampling layers 5906, the scene-based image editing system 106 passes the output from the hierarchical encoder to the convolutional layer 5908 to generate the structural encoding 5910.

As mentioned previously, the hierarchical encoder generates an encoding for a variety of resolutions (i.e., each resolution of the channels/style blocks of the human inpainting GAN). As illustrated, FIG. 59 shows the scene-based image editing system 106 utilizing the convolutional layer 5908 and generating the structural encoding 5910 that corresponds with the 16×32 resolution of a style block. Although not shown, the scene-based image editing system 106 via the hierarchical encoder generates a structural encoding for each resolution of the different style blocks utilizes to analyze the different resolutions of the structural encodings 5808.

Figure 60:
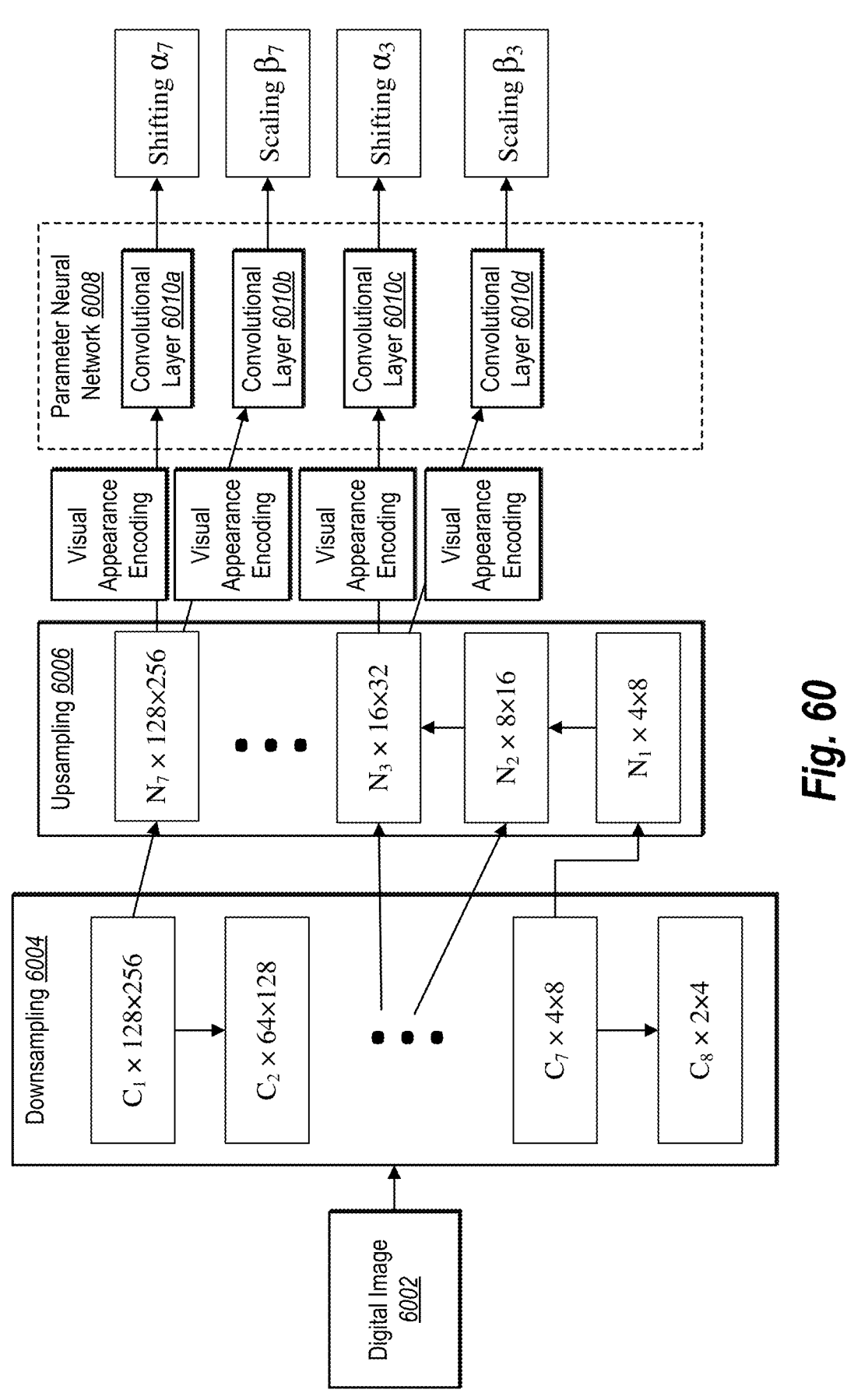
FIG. 60 illustrates an example diagram of the scene-based image editing system utilizing a hierarchical encoder to generate local appearance feature tensors in accordance with one or more embodiments.

FIG. 60 also shows a hierarchical encoder, however the scene-based image editing system 106 utilizes the hierarchical encoder in FIG. 60 for generating a local appearance feature tensor in accordance with one or more embodiments. For example, FIG. 60 illustrates the scene-based image editing system 106 utilizing the hierarchical encoder to generate the local appearance feature tensor with various downsampling layers 6004 and upsampling layers 6006. Downsampling layers 6004 and upsampling layers 6006 were discussed previously in relation to the description of FIG. 56. As mentioned previously, the scene-based image editing system 106 combines the encodings from the downsampling layers 6004 with the upsampling layers 6006 via skip connections. FIG. 60 however, further illustrates the scene-based image editing system 106 passing the combination to a parameter neural network 6008 (e.g., the parameter neural network 5812 discussed in FIG. 58). Within the parameter neural network 6008, the scene-based image editing system 106 utilizes an additional convolutional layer to generate various scaling and shifting tensors.

As an example, FIG. 60 shows the scene-based image editing system 106 passing the encoding from each resolution (e.g., 128×256 and 16×32) to the parameter neural network 6008. In particular, FIG. 60 shows the scene-based image editing system 106 passing the encoding from the 128×256 resolution to convolutional layer 6010a and convolutional layer 6010b. In addition, FIG. 60 also illustrates the scene-based image editing system 106 passing the encoding from the 16×32 resolution to convolutional layer 6010c and convolutional layer 6010d. Although FIG. 60 only shows the scene-based image editing system 106 generating a scaling and shifting tensor for two different resolutions (e.g., 128×256 and 16×32), in one or more embodiments, the scene-based image editing system 106 generates a scaling and shifting tensor for each resolution of the digital image 6002.

As shown in FIG. 60, the scene-based image editing system 106 generates a shifting and scaling tensor (e.g., alpha and beta) for each resolution. The local appearance feature tensor was discussed above, and the local appearance feature tensor includes a scaling and shifting tensor. For example, another description of the local appearance feature tensor includes spatially varying scaling tensor and spatially varying shifting tensor. In particular, the spatially varying aspect of the scaling and shifting tensor means that depending on the spatial location, the scaling and shifting tensor varies. Accordingly, different locations of the digital image 6002 utilize different scaling and shifting tensors. For example, the scene-based image editing system 106 can modulate a first region of a first intermediate feature vector of a first style block (corresponding to a first resolution) utilizing a first scaling value and a first shifting value. The scene-based image editing system 106 can modulate a second region of the first intermediate feature vector of the first style block utilizing a second scaling value and a second shifting value.

Similarly, the scene-based image editing system 106 can modulate a third region of a second intermediate feature vector of a second style block (corresponding to a second resolution) utilizing a third scaling value and a third shifting value. Moreover, the scene-based image editing system 106 can modulate a fourth region of the second intermediate feature vector of the second style block utilizing a fourth scaling value and a fourth shifting value.

Figure 61:
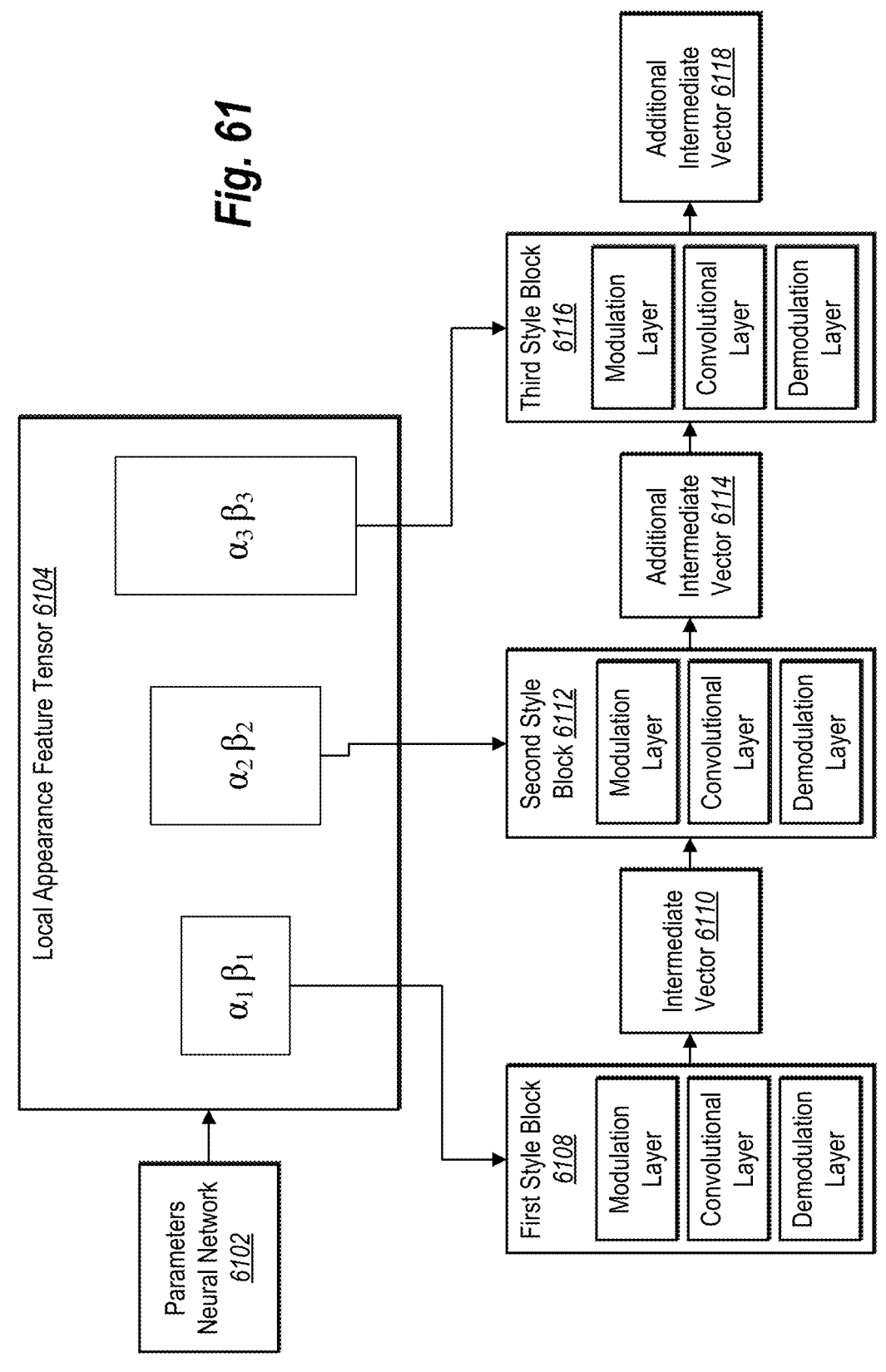
FIG. 61 illustrates an example diagram of the scene-based image editing system modulating style blocks in accordance with one or more embodiments.

As mentioned above, FIG. 61 provides more details regarding modulation in accordance with one or more embodiments. For example, FIG. 61 illustrates the scene-based image editing system 106 utilizing a local appearance feature tensor 6104 to modulate vectors at each style block of the human inpainting GAN. In particular, FIG. 61 shows the scene-based image editing system 106 via a parameters neural network 6102 generating the local appearance feature tensor 6104. As mentioned, the local appearance feature tensor 6104 includes spatially varying scaling and shifting tensors at different resolutions, as indicated by the first alpha, first beta, second alpha, second beta, etc. Furthermore, FIG. 61 shows the scene-based image editing system 106 utilizing the local appearance feature tensor 6104 to modulate each style block of the human inpainting GAN.

For example, as shown, the scene-based image editing system 106 utilizes the human inpainting GAN with multiple style blocks. In particular, FIG. 61 shows the scene-based image editing system 106 generating an intermediate vector 6110 utilizing a first style block 6108. In other words, the human inpainting GAN includes each of the style blocks shown in FIG. 61. For instance, FIG. 61 illustrates the scene-based image editing system 106 utilizing the first style block 6108 including a set of layers of the human inpainting GAN that correspond with a certain resolution of the digital image. To illustrate, the first style block 6108 includes a first resolution of the digital image, whereas a second style block 6112 increases to a second resolution. As shown, the first style block 6108 of the human inpainting GAN utilizes a corresponding scaling and shifting tensor (the first alpha and beta). The scene-based image editing system 106 utilizes the corresponding scaling and shifting tensor from the local appearance feature tensor 6104 to modulate the vectors (e.g., style vectors and/or intermediate vector representations) at each style block of the human inpainting GAN. In particular, FIG. 61 shows the first style block 6108 which includes a modulation layer, a convolutional layer and a demodulation layer. For instance, the scene-based image editing system 106 via the first style block 6108 generates the intermediate vector 6110 utilizing the modulation layer, the convolutional layer, and the demodulation layer.

Modulation in a neural network refers to the process of adjusting the strength or influence of certain inputs or pathways in the network. This can be done by adjusting the weights or biases of specific neurons or groups of neurons. Modulation can be used to improve the performance of a network, such as by increasing the sensitivity of certain neurons to important features in the input data, or by reducing the influence of noise or irrelevant information. It can also be used to control the behavior of a network, such as by adjusting the strength of certain pathways to control the output of the network. For example, in FIG. 61, modulation includes scaling and shifting vectors of the human inpainting GAN. Specifically, scaling and shifting structural feature representations to influence the output of the human inpainting GAN. By utilizing the local appearance feature tensor 6104, the modulation includes spatially variant scaling tensors and spatially variant shifting tensors. For instance, the scene-based image editing system 106 generates an inpainted human within the modified digital image by modulating layers of the human inpainting GAN based on the local appearance feature tensor 6104 (e.g., the information that is locally applicable to specific locations within the digital image).

As mentioned above, for the human inpainting GAN, each style block contains multiple layers (e.g., the modulation layer, the convolutional layer, and the demodulation layer). The scene-based image editing system 106 modulates a first vector at the modulation layer, passes the modulated structural encoding to the convolutional layer, then to the demodulation layer (or normalization layer) to generate the intermediate vector 6110. Indeed, in one or more implementations, the scene-based image editing system 106 modulates the mean and standard deviation of the features (e.g., the style vectors) using the scaling and shifting tensors (at the modulation layer), applies the convolutional layer, and normalizes (at the demodulation layer) the output of the convolution to zero mean and unit standard deviation before adding the bias and StyleGAN 2 noise broadcast operation. In some embodiments, the scene-based image editing system 106 utilizes the modulation approach described in Pose with Style.

As further shown, the scene-based image editing system 106 utilizes the human inpainting GAN at the second style block 6112 to generate an additional intermediate vector 6114 from the intermediate vector 6110 (and/or style vectors analyzed/processed by each style block but unshown in FIG. 61) and the local appearance feature tensor 6104. The process of passing the intermediate vector 6110 through the modulation layer, convolutional layer, and demodulation layer continues, specifically, the scene-based image editing system 106 modulates a second vector with a second alpha and beta (e.g., an additional spatially varying scaling tensor and an additional spatially varying shifting tensor at a second resolution). As shown, the second style block 6112 generates the additional intermediate vector 6114 and a third style block 6116 generates an additional intermediate vector 6118 from the additional intermediate vector 6114.

Figure 62:
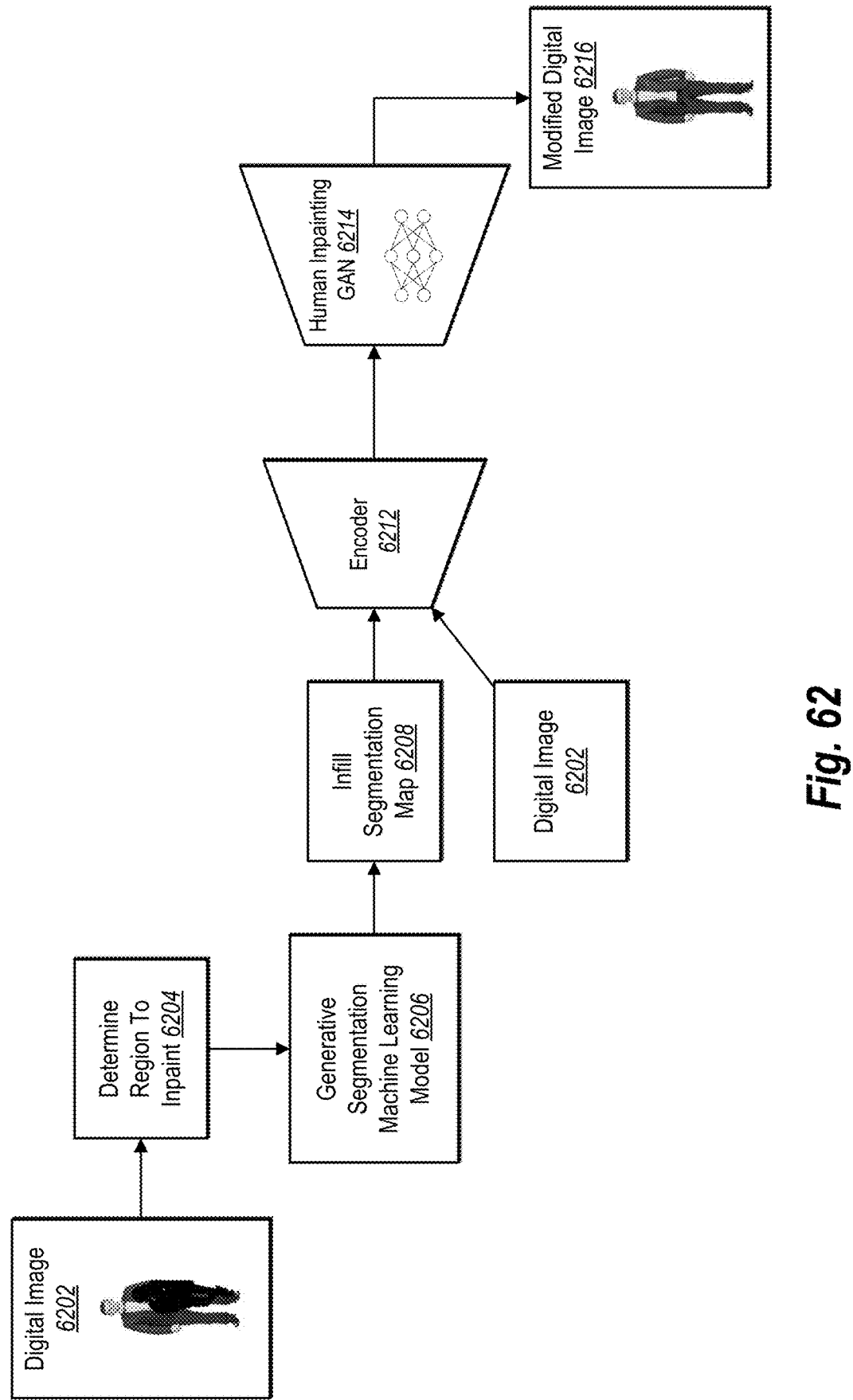
FIG. 62 illustrates an example diagram of the scene-based image editing system utilizing a separate segmentation map branch in accordance with one or more embodiments.

As mentioned previously, the scene-based image editing system 106 generates segmented digital images (e.g., segmented digital image 5306 discussed in the description of FIG. 53). As shown, FIG. 62 illustrates an overview of the scene-based image editing system 106 utilizing a separate segmentation branch to generate an infill segmentation map and a modified digital image in accordance with one or more embodiments. For example, FIG. 62 shows the scene-based image editing system 106 performing an act 6204 based on a digital image 6202. In particular, the act 6204 includes determining a region to inpaint within the digital image 6202. As discussed previously, determining the region to inpaint includes a selection by a user of a client device or a query to a segmentation machine learning model.

Furthermore, as shown, FIG. 62 illustrates the scene-based image editing system 106 utilizing a generative segmentation machine learning model 6206. However, prior to utilizing the generative segmentation machine learning model 6206, the scene-based image editing system 106 utilizes a segmentation machine learning model to generate an initial segmentation map (not shown in FIG. 62). In particular, prior to generating an infill segmentation map 6208, the scene-based image editing system 106 generates an initial segmentation map via a segmentation machine learning model, which was previously discussed above (e.g., segmentation machine learning model as discussed above). In particular, the scene-based image editing system 106 generates the initial segmentation map from the digital image 6202 and subsequently generates the infill segmentation map 6208 based on the initial segmentation map and the digital image 6202 with the region determined for inpainting.

As just mentioned, the scene-based image editing system 106 generates the initial segmentation map. However, due to a hole or occlusion of the human portrayed within the digital image 6202, the segmentation map includes an unclassified region. In particular, the unclassified region corresponds to the region of the human to inpaint. The scene-based image editing system 106 utilizes a generative semantic machine learning model (e.g., generative semantic machine learning model 4906 discussed in the description of FIG. 49) to generate an infill semantic map. Here, for example, the scene-based image editing system 106 utilizes the generative segmentation machine learning model 6206 to generate the infill segmentation map 6208.

Accordingly, the scene-based image editing system 106 utilizes a generative model specifically for segmentation maps to generate a realistic and accurate infill segmentation for the determined region to inpaint. For the infill segmentation map 6208 the scene-based image editing system 106 assigns a label to various pixels within the digital image 6202. Specifically, the scene-based image editing system 106 assigns labels to every pixel within the digital image 6202. For instance, the scene-based image editing system 106 assigns a label to pixels in a manner that groups pixels together that share certain characteristics (e.g., background portion or foreground portion). Furthermore, the infill segmentation map 6208 assigns labels to the region determined to be inpainted. Accordingly, various models utilize the infill segmentation map 6208 to determine how to infill the region indicated to be inpainted.

For example, as mentioned, the scene-based image editing system 106 generates the infill segmentation map and, for the region determined for inpainting, the scene-based image editing system 106 assigns a human segmentation classification. In particular, the inpainting of a region corresponds with a human portrayed within the digital image 6202, as such, the region for inpainting includes a human segmentation classification. Specifically, the human segmentation classification corresponds with a sub-portion of the human such as the hands, feet, arms, legs, torso, or head. Further as shown, the scene-based image editing system 106 utilizes an encoder 6212 that generates outputs based on the infill segmentation map 6208 and the digital image 6202. In particular, the scene-based image editing system 106 further utilizes an output of the encoder 6212 and via a human inpainting GAN 6214, the scene-based image editing system 106 generates a modified digital image 6216.

Figure 63:
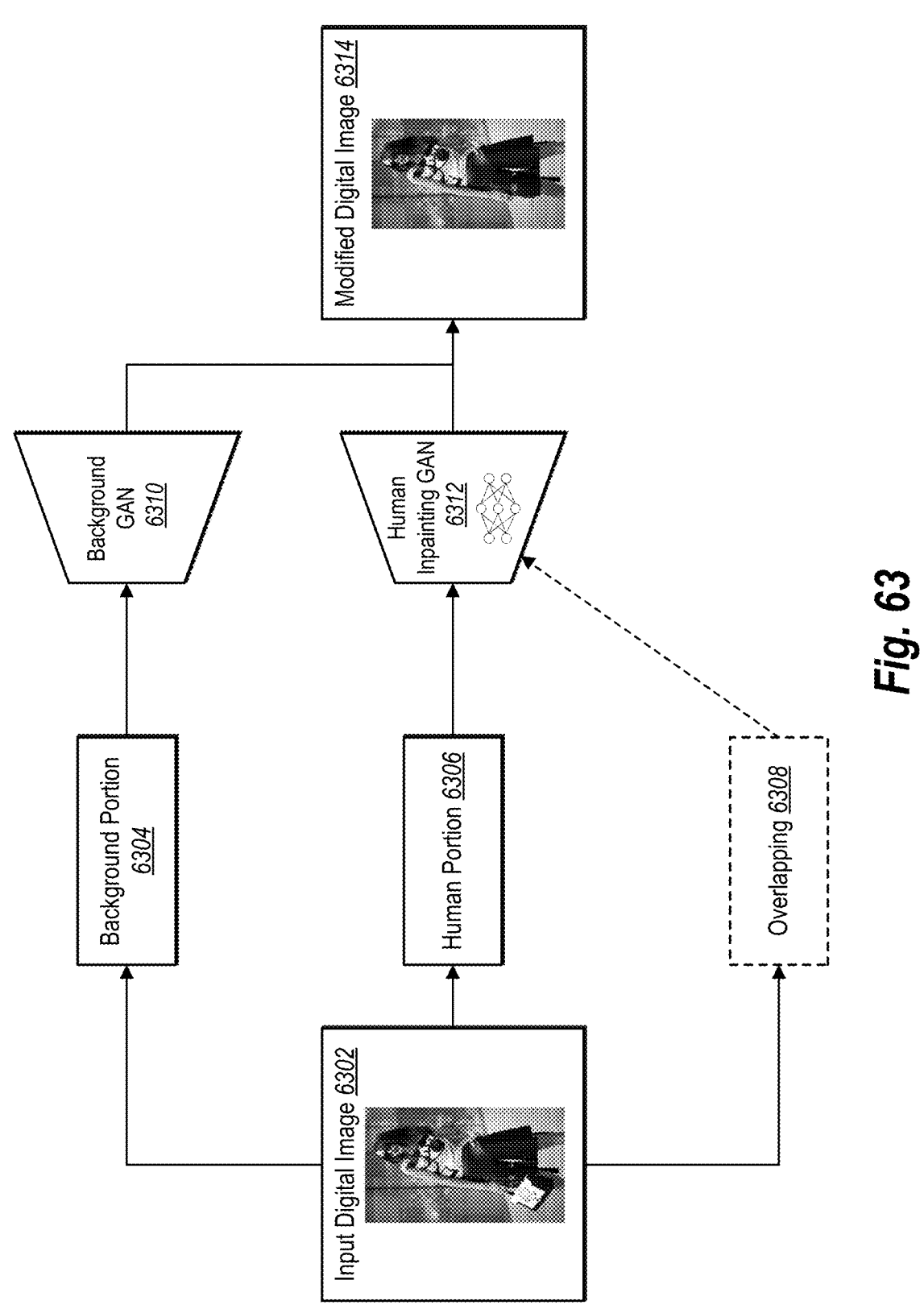
FIG. 63 illustrates an example diagram of the scene-based image editing system generating a modified digital image utilizing a background GAN and a human inpainting GAN in accordance with one or more embodiments.

As mentioned earlier, in one or more embodiments the scene-based image editing system 106 utilizes a human inpainting GAN and background GAN. FIG. 63 illustrates details relating to the scene-based image editing system 106 generating a modified digital image 6314 by utilizing both a background GAN 6310 and a human inpainting GAN 6312. For example, FIG. 63 shows the scene-based image editing system 106 utilizing an input digital image 6302 to segment or identify various portions within the input digital image 6302. For instance, the scene-based image editing system 106 determines a background portion 6304. The background portion 6304 includes non-foreground elements such pixel values corresponding to scenery, buildings, mountains, and sky. For instance, for the input digital image 6302, the background portion 6304 includes the portions of the input digital image 6302 not overlapping with the portrayed human. Furthermore, the scene-based image editing system 106 utilizes the background GAN 6310 to generate a modified background portion of the input digital image 6302. In one or more implementations, the scene-based image editing system 106 utilizes a foreground/background segmentation machine learning model to separate/segment the foreground (human) portion of the digital image from the background portion of the digital image.

The scene-based image editing system 106 utilizes the modified background portion of the input digital image 6302 to generate the modified digital image 6314. The background GAN 6310 includes a GAN that generates a modified background portion of a digital image. In particular, the background GAN 6310 replaces or adds pixel values to the background portion 6304 to generate a realistic-looking background portion 6304. For example, in one or more embodiments, the scene-based image editing system 106 utilizes a cascaded modulation inpainting neural network (or another architecture such as CoModGAN) as the background GAN 6310.

In addition to determining the background portion 6304, the scene-based image editing system 106 also determines a human portion 6306 of the input digital image 6302. For example, the scene-based image editing system 106 determines the human portion 6306 and generates modified pixels of the region corresponding to the human. In particular, the scene-based image editing system 106 utilizes a human inpainting GAN 6312 to generate the modified pixels for the human portion 6306 portrayed within the input digital image 6302. As shown, the scene-based image editing system 106 utilizes a combination of the modified background portion and the modified human portion to generate the modified digital image 6314. Thus, as just discussed in some embodiments, the scene-based image editing system 106 utilizes separate generative models to modify the background portion 6304 and the human portion 6306.

The scene-based image editing system 106 can utilize a variety of approaches to combine the background and human portions of a digital image generated by the human inpainting GAN 6312 and the background GAN 6310. In some implementations, the scene-based image editing system 106 masks an indicated object for removal, inpaints background pixels utilizing the background GAN 6310, and inpaints human pixels (for the hole or infill portion) utilizing the human inpainting GAN 6312. In particular, the scene-based image editing system 106 inpaints the remaining background pixels independent of the pixels corresponding to the human inpainted region.

In some circumstances, this approach can lead to bleeding of the human region into the background pixels. In one or more embodiments, the scene-based image editing system 106 utilizes a different approach to account for this potential bleeding. For example, in one or more implementations, the scene-based image editing system 106 utilizes the human inpainting GAN 6312 to complete the human pixels, but segments and removes the human from the digital image. The scene-based image editing system 106 utilizes the background GAN 6310 to inpaint background pixels (without the human in the digital image), and then reinserts the human within the digital image.

To illustrate, the scene-based image editing system 106 generates the modified digital image 6314 by generating an intermediate digital image. For instance, the scene-based image editing system 106 generates the intermediate digital image by removing the region of the human in the input digital image 6302. Specifically, the scene-based image editing system 106 masks the region corresponding with the human and removes the masked region. Furthermore, for the intermediate digital image, the scene-based image editing system 106 inpaints the remaining portion which includes the background portion 6304 utilizing the background GAN 6310. In doing so, the intermediate digital image contains the background portion 6304 with the human portion 6306 temporarily removed.

In addition, the scene-based image editing system 106 generates modified pixels for the region corresponding to the human portion 6306 (e.g., the human segmentation classification) by utilizing the human inpainting GAN 6312. For example, the scene-based image editing system 106 generates modified pixels for the human portion 6306 separately and inserts the modified pixels corresponding to the human portion 6306 into the intermediate digital image. In doing so, the scene-based image editing system 106 generates the modified digital image 6314.

In some circumstances, this approach can also lead to artifacts along the boundary of the human and background pixels, particularly where the segmentation is not precise. As shown in FIG. 63, in one or more embodiments, the scene-based image editing system 106 determines an overlapping portion 6308 of the input digital image 6302. In particular, the overlapping portion 6308 includes determining an overlap between the human portion 6306 and the background portion 6304. For instance, in one or more embodiments, the scene-based image editing system 106 determines the overlapping portion 6308 by determining a first set of pixels from the inpainting portion of the digital image that correspond to human pixels and determining a second set of pixels from the inpainting portion of the digital image that correspond to background pixels. The scene-based image editing system 106 can expand the first set of pixels (and/or the second set of pixels) to determine an overlapping portion.

In one or more embodiments, the scene-based image editing system utilizes the human inpainting GAN 6312 to generate modified pixel values corresponding to the human portion 6306 and the overlapping portion 6308. Further, the scene-based image editing system 106 utilizes the background inpainting GAN on the background portion 6304. In particular, the scene-based image editing system 106 performs background inpainting for the background portion 6304 based on the human inpainted pixels (e.g., the scene-based image editing system 106 utilizing the human inpainting GAN 6312 to generate modified pixel values corresponding to the human portion 6306 and the overlapping portion 6308). Thus, the combination of the inpainted background portion, the inpainted human portion, and the inpainted overlapping portion generates the modified digital image 6314. In other words, the scene-based image editing system 106 first inpaints the pixels corresponding to the human portion 6306 and then the scene-based image editing system 106 inpaints the background portion 6304 conditioned on the inpainting performed for the human portion 6306.

As mentioned, the scene-based image editing system 106 determines various portions of the input digital image 6302. In one or more embodiments, the scene-based image editing system 106 masks the various determined portions of the input digital image 6302. For example, the scene-based image editing system 106 generates masks for the region of the human portion 6306 and a mask for the background portion 6304. In particular, the mask includes segmenting a portion of the input digital image 6302. For instance, the scene-based image editing system 106 generates a mask by utilizing a segmentation machine learning model to identify pixels corresponding to an indicated region (e.g., the human portion 6306, the background portion 6304, and/or the overlapping portion 6308).

As just mentioned, the scene-based image editing system 106 utilizes masks for the various portions of the input digital image 6302. In particular, the scene-based image editing system 106 first determines the human portion 6306 and the overlapping portion 6308 (the human and the background overlapping), generates masks, and inpaints the masked human portion and the masked overlapping portion utilizing the human inpainting GAN 6312. Subsequently, the scene-based image editing system 106 inpaints the masked background portion utilizing the background GAN 6310. Moreover, the scene-based image editing system 106 combines the inpainted masked background portion with the inpainted masked human portion and masked overlapping portion to generate the modified digital image 6314.

Figure 64:
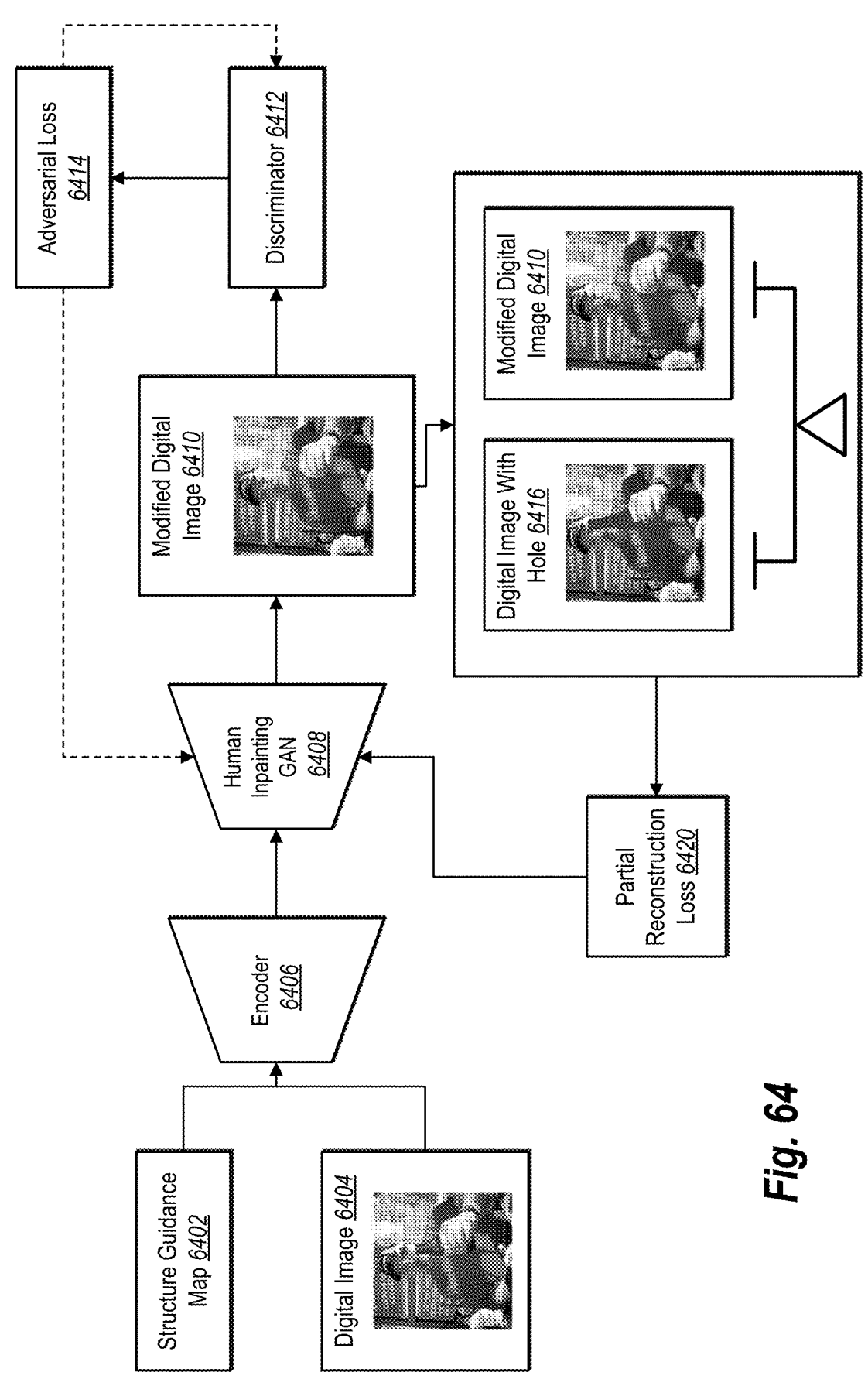
FIG. 64 illustrates an example diagram of the scene-based image editing system training the human inpainting GAN in accordance with one or more embodiments.

As shown, FIG. 64 illustrates details of the scene-based image editing system 106 training a human inpainting GAN in accordance with one or more embodiments. For example, FIG. 64 shows the scene-based image editing system 106 training a human inpainting GAN 6408 with a partial reconstruction loss 6420 and/or an adversarial loss 6414. As mentioned previously, training data for inpainting of occlusions can be difficult to generate because of the lack of ground truth information underlying the occlusion. In one or more embodiments, the scene-based image editing system 106 addresses this problem by utilizing a partial reconstruction loss that determines a measure of loss for portions of the digital image outside of the hole/occlusion to improve the accuracy of the network. In other words, in some implementations the scene-based image editing system 106 does not utilize reconstruction loss on occluder objects so that the human inpainting GAN 6408 does not generate occluder objects.

For example, FIG. 64 shows the scene-based image editing system 106 utilizing an encoder 6406 based on a structure guidance map 6402 and a digital image 6404. Furthermore, utilizing the human inpainting GAN 6408, the scene-based image editing system 106 generates a modified digital image 6410. The scene-based image editing system 106 then compares the modified digital image 6410 and the digital image with hole 6416 to determine the partial reconstruction loss 6420.

Reconstruction loss refers to a measure a similarity or fidelity between a digital image and a generated digital image. For example, a reconstruction loss includes the degree of closeness for a decoder output relative to the original input. In one or more implementations, the scene-based image editing system 106 determines a reconstruction loss utilizing a loss function, such as a mean-squared error or other measure of loss.

In one or more embodiments, the scene-based image editing system 106 determines the partial reconstruction loss 6420 by focusing on a particular portion of the digital image. For example, in one or more implementations, the scene-based image editing system 106 determines the partial reconstruction loss 6420 between the region of the digital image 6404 outside of the hole/occlusion. For instance, the scene-based image editing system 106 in utilizing the human inpainting GAN 6408, inpaints a portion of the digital image 6404. In doing so, the scene-based image editing system 106 determines a reconstruction loss between the non-inpainted portion and the corresponding portion (non-inpainted portion) of the digital image 6404. Thus, as illustrated, the scene-based image editing system 106 compares the modified digital image 6410 with a digital image with a hole 6416 to generate the partial reconstruction loss 6420.

Upon determining the partial reconstruction loss 6420, the scene-based image editing system 106 utilizes the partial reconstruction loss to train the human inpainting GAN 6408. For example, the scene-based image editing system 106 modifies parameters of the human inpainting GAN 6408 to reduce the partial reconstruction loss 6420. In one or more implementations, the scene-based image editing system 106 back propagates the partial reconstruction loss 6420 to the human inpainting GAN 6408.

As further shown, the scene-based image editing system 106 also determines the adversarial loss 6414. As mentioned previously, a discriminator 6412 and generative model attempt to generate a realistic-looking digital image. For example, the scene-based image editing system 106 determines adversarial loss for a generative model. In particular, as mentioned, the adversarial loss includes the generative model and the discriminator 6412 attempting to trick one another in a zero-sum game. As shown in FIG. 64 the scene-based image editing system 106 back propagates the adversarial loss 6414 to the human inpainting GAN 6408. Accordingly, the scene-based image editing system 106 modifies parameters of the human inpainting GAN 6408 based on the adversarial loss 6414 and the partial reconstruction loss 6420.

In some embodiments, the scene-based image editing system 106 detects the human and an obstruction/occlusion within a digital image and provides recommendations. For example, the scene-based image editing system 106 provides various recommendations to remove detected obstructions/occlusions and provides an option for a user of a client device to select the provided recommendations. In particular, the scene-based image editing system 106 can also provide a generated sample of various objects removed from a digital image and inpainting of a human and/or background.

Moreover, in some embodiments, the scene-based image editing system 106 intelligently detects an upload of a digital image portraying a human in addition to an existing digital image being edited within an image editing application. In particular, the scene-based image editing system 106 receives the upload of the digital image portraying a human and automatically removes objects (e.g., objects occluding or obstructing the human) and performs human inpainting. Moreover, in this instance, the scene-based image editing system 106 can also perform background inpainting to conform with the already existing digital image. Furthermore, in response to receiving additionally uploaded digital images, the scene-based image editing system 106 performs human inpainting for humans portrayed within the existing digital image being edited within the image editing application.

Figure 65:
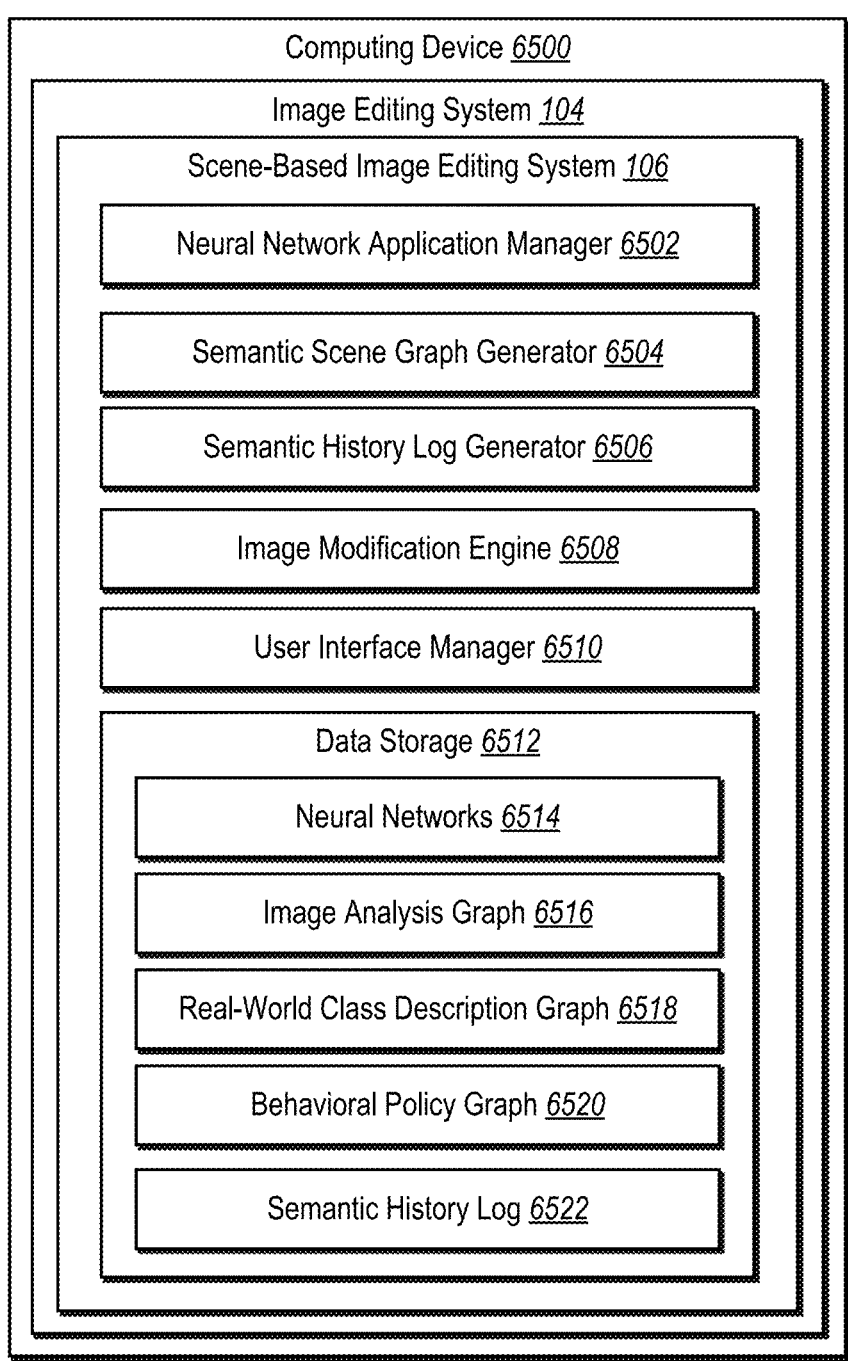
FIG. 65 illustrates an example schematic diagram of a scene-based image editing system in accordance with one or more embodiments.

Turning to FIG. 65, additional detail will now be provided regarding various components and capabilities of the scene-based image editing system 106. In particular, FIG. 65 shows the scene-based image editing system 106 implemented by the computing device 6500 (e.g., the server(s) 102 and/or one of the client devices 110a-110n). Additionally, the scene-based image editing system 106 is also part of the image editing system 104. As shown, in one or more embodiments, the scene-based image editing system 106 includes, but is not limited to, a neural network application manager 6502, a semantic scene graph generator 6504, a semantic history log generator 6506 an image modification engine 6508, a user interface manager 6510, and data storage 6512 (which includes neural networks 6514, an image analysis graph 6516, a real-world class description graph 6518, a behavioral policy graph 6520, and a semantic history log 6522).

As just mentioned, and as illustrated in FIG. 65, the scene-based image editing system 106 includes the neural network application manager 6502. In one or more embodiments, the neural network application manager 6502 implements one or more neural networks used for editing a digital image, such as a segmentation neural network, an inpainting neural network, a shadow detection neural network, an attribute classification neural network, or various other machine learning models used in editing a digital image. In some cases, the neural network application manager 6502 implements the one or more neural network automatically without user input. For instance, in some cases, the neural network application manager 6502 utilizes the one or more neural networks to pre-process a digital image before receiving user input to edit the digital image. Accordingly, in some instances, the neural network application manager 6502 implements the one or more neural networks in anticipation of modifying the digital image.

Additionally, as shown in FIG. 65, the scene-based image editing system 106 includes the semantic scene graph generator 6504. In one or more embodiments, the semantic scene graph generator 6504 generates a semantic scene graph for a digital image. For instance, in some cases, the scene-based image editing system 106 utilizes information about a digital image gathered via one or more neural networks (e.g., as implemented by the neural network application manager 6502) and generates a semantic scene graph for the digital image. In some cases, the semantic scene graph generator 6504 generates a semantic scene graph for a digital image automatically without user input (e.g., in anticipation of modifying the digital image). In one or more embodiments, the semantic scene graph generator 6504 generates a semantic scene graph for a digital image using an image analysis graph, a real-world class description graph, and/or a behavioral policy graph.

Further, as shown in FIG. 65, the scene-based image editing system 106 includes the semantic history log generator 6506. In one or more embodiments, the semantic history log generator 6506 generates semantic history logs for digital images. In particular, the semantic history log generator 6506 tracks the semantic states of a digital image and generates a semantic history log having representations (e.g., visual representations) of those semantic states.

As shown in FIG. 65, the scene-based image editing system 106 also includes the image modification engine 6508. In one or more embodiments, the image modification engine 6508 modifies a digital image. For instance, in some cases, the image modification engine 6508 modifies a digital image by modifying one or more objects portrayed in the digital image. For instance, in some cases, the image modification engine 6508 deletes an object from a digital image or moves an object within the digital image. In some implementations, the image modification engine 6508 modifies one or more attributes of an object. In some embodiments, the image modification engine 6508 modifies an object in a digital image based on a relationship between the object and another object in the digital image.

Further, as shown in FIG. 65, the scene-based image editing system 106 includes the user interface manager 6510. In one or more embodiments, the user interface manager 6510 manages the graphical user interface of a client device. For instance, in some cases, the user interface manager 6510 detects and interprets user interactions with the graphical user interface (e.g., detecting selections of objects portrayed in a digital image). In some embodiments, the user interface manager 6510 also provides visual elements for display within the graphical user interface, such as visual indications of object selections, interactive windows that display attributes of objects, and/or user interactions for modifying an object.

Additionally, as shown in FIG. 65, the scene-based image editing system 106 includes data storage 6512. In particular, data storage 6512 includes neural networks 6514, an image analysis graph 6516, a real-world class description graph 6518, a behavioral policy graph 6520, and a semantic history log 6522.

Each of the components 6502-6522 of the scene-based image editing system 106 optionally include software, hardware, or both. For example, the components 6502-6522 include one or more instructions stored on a computer-readable storage medium and executable by processors of one or more computing devices, such as a client device or server device. When executed by the one or more processors, the computer-executable instructions of the scene-based image editing system 106 cause the computing device(s) to perform the methods described herein. Alternatively, the components 6502-6522 include hardware, such as a special-purpose processing device to perform a certain function or group of functions. Alternatively, the components 6502-6522 of the scene-based image editing system 106 include a combination of computer-executable instructions and hardware.

Furthermore, the components 6502-6522 of the scene-based image editing system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 6502-6522 of the scene-based image editing system 106 may be implemented as a stand-alone application, such as a desktop or mobile application. Furthermore, the components 6502-6522 of the scene-based image editing system 106 may be implemented as one or more web-based applications hosted on a remote server. Alternatively, or additionally, the components 6502-6522 of the scene-based image editing system 106 may be implemented in a suite of mobile device applications or "apps." For example, in one or more embodiments, the scene-based image editing system 106 comprises or operates in connection with digital software applications such as ADOBE® PHOTOSHOP®, ADOBE STARDUST, or ADOBE® ILLUSTRATOR®. The foregoing are either registered trademarks or trademarks of Adobe Inc. in the United States and/or other countries.

FIGS. 1-65, the corresponding text, and the examples provide a number of different methods, systems, devices, and non-transitory computer-readable media of the scene-based image editing system 106. In addition to the foregoing, one or more embodiments can also be described in terms of flowcharts comprising acts for accomplishing the particular result, as shown in FIGS. 66-67. FIGS. 66-67 may be performed with more or fewer acts. Further, the acts may be performed in different orders. Additionally, the acts described herein may be repeated or performed in parallel with one another or in parallel with different instances of the same or similar acts.

FIG. 66 illustrates a flowchart for a series of acts 6600 for implementing a perspective-aware object move operation on a digital image in accordance with one or more embodiments. FIG. 66 illustrates acts according to one embodiment, alternative embodiments may omit, add to, reorder, and/or modify any of the acts shown in FIG. 66. In some implementations, the acts of FIG. 66 are performed as part of a method. For example, in some embodiments, the acts of FIG. 66 are performed as part of a computer-implemented method. Alternatively, a non-transitory computer-readable medium can store instructions thereon that, when executed by at least one processor, cause the at least one processor to perform operations comprising the acts of FIG. 66. In some embodiments, a system performs the acts of FIG. 66. For example, in one or more embodiments, a system includes at least one memory device comprising a depth prediction neural network. The system further includes at least one processor configured to cause the system to perform the acts of FIG. 66.

The series of acts 6600 includes an act 6602 determining a vanishing point associated with a digital image portraying an object. For example, in some implementations, the act 6602 involves analyzing a digital image and identifying a vanishing point for the digital image based on the analysis.

The series of acts 6600 also includes an act 6604 for detecting one or more user interactions for moving the object within the digital image. To illustrate, in some embodiments, the act 6604 involves detecting a user selection of the object and a further user interaction for moving the object.

The series of acts 6600 further includes an act 6606 for resizing the object based on moving the object with respect to the vanishing point. For instance, in one or more embodiments, the act 6606 involves performing a perspective-based resizing of the object within the digital image based on moving the object with respect to the vanishing point.

As shown in FIG. 66, the act 6606 includes a sub-act 6608 for moving the object toward the vanishing point and diminishing a size of the object. For example, in one or more embodiments, moving the object within the digital image with respect to the vanishing point comprises moving the object on a line from the object to the vanishing point towards the vanishing point; and performing the perspective-based resizing of the object based on moving the object with respect to the vanishing point comprises diminishing a size of the object based on moving the object towards the vanishing point.

As shown in FIG. 66, the act 6606 further includes a sub-act 6610 for moving the object away from the vanishing point and increasing the size of the object. For instance, in some embodiments, moving the object within the digital image with respect to the vanishing point comprises moving the object on a line from the object to the vanishing point away from the vanishing point; and performing the perspective-based resizing of the object based on moving the object with respect to the vanishing point comprises increasing a size of the object based on moving the object away from the vanishing point. Thus, in some cases, the scene-based image editing system 106 changes the size of the object based on whether the object moves toward or away from the vanishing point.

In one or more embodiments, the scene-based image editing system 106 generates a perspective scaling ratio for the object based on moving the object within the digital image. Accordingly, in some instances, performing the perspective-based resizing of the object within the digital image comprises performing the perspective-based resizing of the object using the perspective scaling ratio for the object. In some implementations, generating the perspective scaling ratio for the object based on moving the object within the digital image comprises: determining a first distance of the object from a horizon line associated with the digital image before the object is moved; determining a second distance of the object from the horizon line after the object is moved; and generating the perspective scaling ratio using the first distance and the second distance.

In some embodiments, the series of acts 6600 further includes acts for occluding objects within a digital image based on object movement. For example, in some cases, moving the object within the digital image with respect to the vanishing point comprises moving the object to a position where a portion of the object overlaps with a portion of an additional object portrayed within the digital image. Accordingly, in some cases, the scene-based image editing system 106 modifies the digital image to occlude the portion of the object or the portion of the additional object based on comparing an object depth of the object to an object depth of the additional object. For instance, in some implementations, the scene-based image editing system 106 determines that the object depth of the object is greater than the object depth of the additional object based on comparing the object depth of the object to the object depth of the additional object. Accordingly, in some embodiments, modifying the digital image to occlude the portion of the object or the portion of the additional object comprises modifying the digital image to occlude the portion of the object using the portion of the additional object based on determining that the object depth of the object is greater than the object depth of the additional object.

In some cases, the series of acts 6600 further include acts for providing additional features related to moving an object with respect to a vanishing point. For instance, in one or more embodiments, the acts include providing, for display within the digital image, one or more perspective-based size previews along a line from the object to the vanishing point upon selection of the object for movement within the digital image. In some instances, the acts include generating a content fill for the object within the digital image before detecting the one or more user interactions for moving the object; and exposing the content fill within the digital image in response to moving the object with respect to the vanishing point.

To provide an illustration, in one or more embodiments, the scene-based image editing system 106 determines a vanishing point associated with a digital image portraying an object at a first position within the digital image; moves the object with respect to the vanishing point to a second position within the digital image in response to one or more user interactions with the object; determines a perspective scaling ratio for the object based on the first position and the second position; and performs a perspective-based resizing of the object within the digital image using the perspective scaling ratio.

In some cases, determining the perspective scaling ratio for the object based on the first position and the second position comprises: detecting a horizon line associated with the digital image; determining a first distance from the first position to the horizon line and a second distance from the second position to the horizon line; and determining the perspective scaling ratio using the first distance and the second distance. In some instances, detecting the horizon line for the digital image comprises detecting the horizon line using a neural network. In some embodiments, determining the vanishing point associated the digital image comprises determining a vanishing point located outside of the digital image.

In one or more embodiments, the scene-based image editing system 106 further generates a plurality of perspective-based size previews for the object that indicate sizes for the object at positions within the digital image other than the first position; detects a selection of the object for movement within the digital image; and provides, for display within the digital image in response to the selection, the plurality of perspective-based size previews along a line from the object to the vanishing point. In some cases, generating the plurality of perspective-based size previews for the object comprises that indicate the sizes for the object at the positions within the digital image other than the first position comprises: generating a first perspective-based size preview indicating a larger size than a size of the object at the first position, the larger size corresponding to a position that is farther from the vanishing point than the first position; and generating a second perspective-based size preview indicating a smaller size than the size of the object as the first position, the smaller size corresponding to a position that is closer to the vanishing point than the first position.

In some cases, the scene-based image editing system 106 moves the vanishing point associated with the digital image to a modified location in response to at least one user interaction with the vanishing point. Accordingly, in some embodiments, moving the object with respect to the vanishing point to the second position within the digital image comprises moving the object with respect to the vanishing point at the modified location to the second position within the digital image.

To provide another illustration, in one or more embodiments, the scene-based image editing system 106 detects one or more user interactions for moving a first object portrayed within a digital image with respect to a vanishing point associated with the digital image; and modifies the digital image in response to the one or more user interactions with the first object by: moving the first object with respect to the vanishing point from a first position to a second position within the digital image, a portion of the first object at the second position overlapping with a portion of a second object portrayed within the digital image; performing a perspective-based resizing of the first object within the digital image based on moving the first object from the first position to the second position; and occluding the portion of the first object with the portion of the second object based on the object depth of the first object and an object depth of the second object.

In some embodiments, determining, using the depth prediction neural network, the object depth for the first object at the second position comprises determining, using the depth prediction neural network, a first average object depth for the first object at the second position; and occluding the portion of the first object with the portion of the second object based on the object depth of the first object and the object depth of the second object comprises occluding the portion of the first object with the portion of the second object based on the first average object depth of the first object and a second average object depth of the second object. For instance, in some cases, occluding the portion of the first object with the portion of the second object based on the first average object depth of the first object and the second average object depth of the second object comprises occluding the portion of the first object with the portion of the second object based on determining that the first average object depth is greater than the second average object depth.

In some embodiments, the scene-based image editing system 106 further moves the first object with respect to the vanishing point from the second position to a third position within the digital image, an additional portion of the first object at the third position overlapping with an additional portion of the second object; determines, using the depth prediction neural network, an additional object depth for the first object at the third position; and occlude the additional portion of the second object with the additional portion of the first object based on the additional object depth of the first object and the object depth of the second object.

FIG. 67 illustrates a flowchart for a series of acts 6700 for implementing a depth-aware object move operation on a digital image in accordance with one or more embodiments. FIG. 67 illustrates acts according to one embodiment, alternative embodiments may omit, add to, reorder, and/or modify any of the acts shown in FIG. 67. In some implementations, the acts of FIG. 67 are performed as part of a method. For example, in some embodiments, the acts of FIG. 67 are performed as part of a computer-implemented method. Alternatively, a non-transitory computer-readable medium can store instructions thereon that, when executed by at least one processor, cause the at least one processor to perform operations comprising the acts of FIG. 67. In some embodiments, a system performs the acts of FIG. 67. For example, in one or more embodiments, a system includes at least one memory device comprising a depth prediction neural network. The system further includes at least one processor configured to cause the system to perform the acts of FIG. 67.

The series of acts 6700 includes an act 6702 for determining object depths for a first object and a second object portrayed in a digital image. For example, in some embodiment, the act 6702 involves determining a first object depth for a first object portrayed within a digital image and a second object depth for a second object portrayed within the digital image.

In one or more embodiments, determining the first object depth for the first object comprises determining a first average object depth for the first object; and determining the second object depth for the second object comprises determining a second average object depth for the second object. In some cases, determining the first object depth and the second object depth comprises determining the first object depth and the second object depth using a depth prediction neural network.

In some embodiments, determining the first object depth and the second object depth comprises pre-processing the digital image without user input to determine the first object depth and the second object depth. Further, in some cases, the scene-based image editing system 106 adds the first object depth and the second object depth to a semantic scene graph associated with the digital image. Thus, in some instances, the scene-based image editing system 106 references the semantic scene graph to compare the first object depth and the second object depth in response to moving the first object to create the overlap area between the first object and the second object.

The series of acts 6700 also includes an act 6704 for moving the first object to create an overlap area with the second object. For instance, in some cases, the act 6704 involves moving the first object to create an overlap area between the first object and the second object within the digital image.

The series of acts 6700 further includes an act 6706 for modifying the digital image to occlude one of the objects within the overlap area based on the object depths. To illustrate, in some instances, the act 6706 involves modifying the digital image to occlude the first object or the second object within the overlap area based on the first object depth and the second object depth.

As shown in FIG. 67, the act 6706 includes a sub-act 6708 for occluding the second object with the first object based on the object depth for the first object being less. For instance, in some cases, the scene-based image editing system 106 determines that the first object depth for the first object is less than the second object depth for the second object. Accordingly, in some embodiments, modifying the digital image to occlude the first object or the second object within the overlap area based on the first object depth and the second object depth comprises modifying the digital image to occlude the second object with the first object within the overlap area based on determining that the first object depth is less than the second object depth. In some implementations, the scene-based image editing system 106 further moves the second object outside of the overlap area within the digital image; and modifies the digital image to expose a portion of the second object that was occluded by the first object.

As shown in FIG. 67, the act 6706 also includes a sub-act 6710 for occluding the first object with the second object based on the object depth for the first object being greater. To illustrate, in some cases, the scene-based image editing system 106 determines that the first object depth for the first object is greater than the second object depth for the second object. Accordingly, in some embodiments, modifying the digital image to occlude the first object or the second object within the overlap area based on the first object depth and the second object depth comprises modifying the digital image to occlude the first object with the second object within the overlap area based on determining that the first object depth is greater than the second object depth.

To provide an illustration, in one or more embodiments, the scene-based image editing system 106 determines a first object depth for a first object portrayed within a digital image and α second object depth for a second object portrayed within the digital image; moves the first object within the digital image so that a portion of the first object overlaps with a portion of the second object; compares the first object depth and the second object depth to identify an occluding object from the first object or the second object based on moving the first object; and modifies the digital image to occlude the portion of the first object or the portion of the second object using the occluding object.

In one or more embodiments, comparing the first object depth and the second object depth to identify the occluding object from the first object or the second object comprises comparing the first object depth and the second object depth to determine an object having a relatively smaller object depth; and modifying the digital image to occlude the portion of the first object or the portion of the second object using the occluding object comprises modifying the digital image to occlude the portion of the first object or the portion of the second object using the object having the relatively smaller object depth.

In some embodiments, the scene-based image editing system 106 further determines a third object depth for a third object portrayed within the digital image; moves the third object within the digital image so that a portion of the third object overlaps with the first object and the second object; and compares the first object depth, the second object depth, and the third object depth to identify a first occluding object and a second occluding object from the first object, the second object and the third object based on moving the third object. In some embodiments, comparing the first object depth, the second object depth, and the third object depth to identify the first occluding object and the second occluding object comprises: determining that the first object is the first occluding object based on determining that the first object depth is less than the second object depth and the third object depth; and determining that the third object is the second occluding object based on determining that the third object depth is greater than the first object depth and less than the second object depth. In some instances, the scene-based image editing system 106 further modifies the digital image by: occluding the second object with the portion of the third object based on determining that the third object is the second occluding object; and occluding the portion of the third object with the first object based on determining that the first object is the first occluding object.

In some instances, the scene-based image editing system 106 further generates a content fill for the first object before detecting one or more user interactions for moving the first object; generates a completed background for the digital image using the content fill for the first object; and exposes, via the completed background, the content fill for the first object upon moving the first object within the digital image. In some cases, the scene-based image editing system 106 further generates a semantic scene graph for the digital image that includes the first object depth for the first object and the second object depth for the second object; and references the semantic scene graph to retrieve the first object depth and the second object depth upon determining upon moving the first object so that the portion of the first object overlaps with the portion of the second object. In some implementations, modifying the digital image to occlude the portion of the first object or the portion of the second object using the occluding object comprises modifying the digital image in real time to reflect occlusion of pixels from the first object or pixels of the second object by the occluding object as the portion of the first object begins to overlap the portion of the second object.

To provide another illustration, in one or more embodiments, the scene-based image editing system 106 pre-processes a digital image utilizing the depth prediction neural network to determine a first average object depth for a first object portrayed in the digital image and α second average object depth for a second object portrayed in the digital image; detects one or more user interactions for moving the first object to overlap with the second object; and modifies the digital image in response to the one or more user interactions by: moving the first object within the digital image to create an overlap area between the first object and the second object; determining that the first average object depth of the first object is less than the second average object depth of the second object based on moving the first object to overlap with the second object; and occluding the second object with the first object within the overlap area based on determining that the first average object depth is less than the second average object depth.

In one or more embodiments, moving the first object within the digital image to create the overlap area between the first object and the second object comprises moving the first object within the digital image so that an entirety of the second object overlaps with the first object; and occluding the second object with the first object comprises occluding the entirety of the second object with the first object. In some cases, the scene-based image editing system 106 further modifies a position of the first object or a position of the second object to create a subsequent overlap area between the first object and the second object; and occludes the second object with the first object within the subsequent overlap area in response to creating the subsequent overlap area. In some instances, the scene-based image editing system 106 further moves the first object within the digital image to create an additional overlap area between the first object and α third object portrayed in the digital image; determines that the first average object depth of the first object is greater than a third average object depth of the third object; and occludes the first object with the third object within the additional overlap area based on determining that the first average object depth is greater than the third average object depth.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 68:
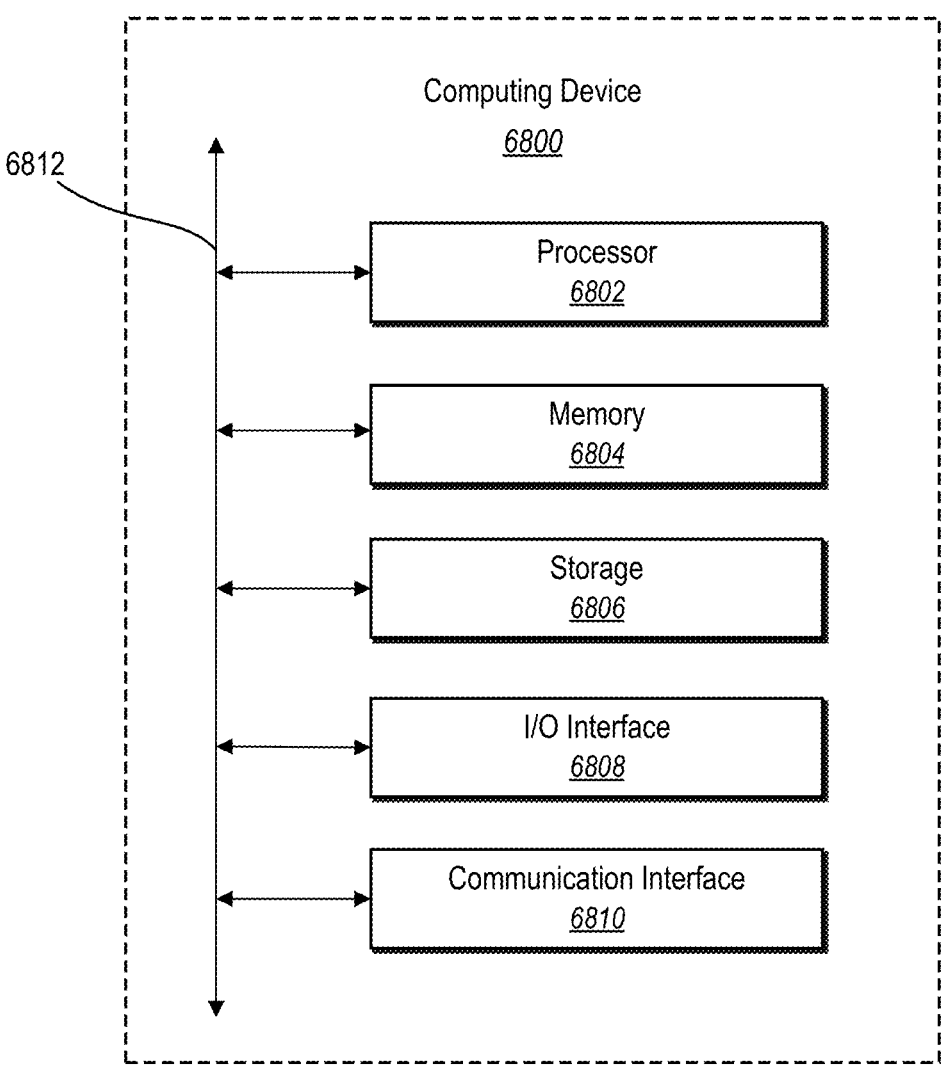
FIG. 68 illustrates a block diagram of an exemplary computing device in accordance with one or more embodiments.

FIG. 68 illustrates a block diagram of an example computing device 6800 that may be configured to perform one or more of the processes described above. One will appreciate that one or more computing devices, such as the computing device 6800 may represent the computing devices described above (e.g., the server(s) 102 and/or the client devices 110a-110n). In one or more embodiments, the computing device 6800 may be a mobile device (e.g., a mobile telephone, a smartphone, a PDA, a tablet, a laptop, a camera, a tracker, a watch, a wearable device). In some embodiments, the computing device 6800 may be a non-mobile device (e.g., a desktop computer or another type of client device). Further, the computing device 6800 may be a server device that includes cloud-based processing and storage capabilities.

As shown in FIG. 68, the computing device 6800 can include one or more processor(s) 6802, memory 6804, a storage device 6806, input/output interfaces 6808 (or "I/O interfaces 6808"), and a communication interface 6810, which may be communicatively coupled by way of a communication infrastructure (e.g., bus 6812). While the computing device 6800 is shown in FIG. 68, the components illustrated in FIG. 68 are not intended to be limiting. Additional or alternative components may be used in other embodiments. Furthermore, in certain embodiments, the computing device 6800 includes fewer components than those shown in FIG. 68. Components of the computing device 6800 shown in FIG. 68 will now be described in additional detail.

In particular embodiments, the processor(s) 6802 includes hardware for executing instructions, such as those making up a computer program. As an example, and not by way of limitation, to execute instructions, the processor(s) 6802 may retrieve (or fetch) the instructions from an internal register, an internal cache, memory 6804, or a storage device 6806 and decode and execute them.

The computing device 6800 includes memory 6804, which is coupled to the processor(s) 6802. The memory 6804 may be used for storing data, metadata, and programs for execution by the processor(s). The memory 6804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 6804 may be internal or distributed memory.

The computing device 6800 includes a storage device 6806 including storage for storing data or instructions. As an example, and not by way of limitation, the storage device 6806 can include a non-transitory storage medium described above. The storage device 6806 may include a hard disk drive (HDD), flash memory, a Universal Serial Bus (USB) drive or a combination these or other storage devices.

As shown, the computing device 6800 includes one or more I/O interfaces 6808, which are provided to allow a user to provide input to (such as user strokes), receive output from, and otherwise transfer data to and from the computing device 6800. These I/O interfaces 6808 may include a mouse, keypad or a keyboard, a touch screen, camera, optical scanner, network interface, modem, other known I/O devices or a combination of such I/O interfaces 6808. The touch screen may be activated with a stylus or a finger.

The I/O interfaces 6808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 6808 are configured to provide graphical data to a display for presentation to a user. The graphical data may be representative of one or more graphical user interfaces and/or any other graphical content as may serve a particular implementation.

The computing device 6800 can further include a communication interface 6810. The communication interface 6810 can include hardware, software, or both. The communication interface 6810 provides one or more interfaces for communication (such as, for example, packet-based communication) between the computing device and one or more other computing devices or one or more networks. As an example, and not by way of limitation, communication interface 6810 may include a network interface controller (NIC) or network adapter for communicating with an Ethernet or other wire-based network or a wireless NIC (WNIC) or wireless adapter for communicating with a wireless network, such as a WI-FI. The computing device 6800 can further include a bus 6812. The bus 6812 can include hardware, software, or both that connects components of computing device 6800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:
1. A computer-implemented method comprising:
determining a first object depth for a first object portrayed within a digital image and a second object depth for a second object portrayed within the digital image;

detecting a user interaction with the digital image for moving the first object;

moving the first object within the digital image, in response to the user interaction, to create an overlap area between the first object and the second object within the digital image; and modifying the digital image to occlude the first object or the second object within the overlap area based on the first object depth and the second object depth.

2. The computer-implemented method of claim 1, further comprising determining that the first object depth for the first object is less than the second object depth for the second object, wherein modifying the digital image to occlude the first object or the second object within the overlap area based on the first object depth and the second object depth comprises modifying the digital image to occlude the second object with the first object within the overlap area based on determining that the first object depth is less than the second object depth.

3. The computer-implemented method of claim 2, further comprising:

moving the second object outside of the overlap area within the digital image; and modifying the digital image to expose a portion of the second object that was occluded by the first object.

4. The computer-implemented method of claim 1, further comprising determining that the first object depth for the first object is greater than the second object depth for the second object, wherein modifying the digital image to occlude the first object or the second object within the overlap area based on the first object depth and the second object depth comprises modifying the digital image to occlude the first object with the second object within the overlap area based on determining that the first object depth is greater than the second object depth.

5. The computer-implemented method of claim 1, wherein:

determining the first object depth for the first object comprises determining a first average object depth for the first object; and determining the second object depth for the second object comprises determining a second average object depth for the second object.

6. The computer-implemented method of claim 1, wherein determining the first object depth and the second object depth comprises determining the first object depth and the second object depth using a depth prediction neural network.

7. The computer-implemented method of claim 1, wherein determining the first object depth and the second object depth comprises pre-processing the digital image without user input to determine the first object depth and the second object depth; and further comprising adding the first object depth and the second object depth to a semantic scene graph associated with the digital image.

8. The computer-implemented method of claim 7, further comprising referencing the semantic scene graph to compare the first object depth and the second object depth in response to moving the first object to create the overlap area between the first object and the second object.

9. A non-transitory computer-readable medium storing instructions thereon that, when executed by at least one processor, cause the at least one processor to perform operations comprising:

determining a first object depth for a first object portrayed within a digital image and a second object depth for a second object portrayed within the digital image;

detecting a user interaction with the digital image for moving the first object;

moving the first object within the digital image, in response to the user interaction, so that a portion of the first object overlaps with a portion of the second object;

comparing the first object depth and the second object depth to identify an occluding object from the first object or the second object based on moving the first object; and modifying the digital image to occlude the portion of the first object or the portion of the second object using the occluding object.

10. The non-transitory computer-readable medium of claim 9, wherein:

comparing the first object depth and the second object depth to identify the occluding object from the first object or the second object comprises comparing the first object depth and the second object depth to determine an object having a relatively smaller object depth; and modifying the digital image to occlude the portion of the first object or the portion of the second object using the occluding object comprises modifying the digital image to occlude the portion of the first object or the portion of the second object using the object having the relatively smaller object depth.

11. The non-transitory computer-readable medium of claim 9, wherein the operations further comprise:

determining a third object depth for a third object portrayed within the digital image;

moving the third object within the digital image so that a portion of the third object overlaps with the first object and the second object; and comparing the first object depth, the second object depth, and the third object depth to identify a first occluding object and a second occluding object from the first object, the second object and the third object based on moving the third object.

12. The non-transitory computer-readable medium of claim 11, wherein comparing the first object depth, the second object depth, and the third object depth to identify the first occluding object and the second occluding object comprises:

determining that the first object is the first occluding object based on determining that the first object depth is less than the second object depth and the third object depth; and determining that the third object is the second occluding object based on determining that the third object depth is greater than the first object depth and less than the second object depth.

13. The non-transitory computer-readable medium of claim 12, wherein the operations further comprise modifying the digital image by:

occluding the second object with the portion of the third object based on determining that the third object is the second occluding object; and occluding the portion of the third object with the first object based on determining that the first object is the first occluding object.

14. The non-transitory computer-readable medium of claim 9, wherein the operations further comprise:

generating a content fill for the first object before detecting the user interaction for moving the first object;

generating a completed background for the digital image using the content fill for the first object; and exposing, via the completed background, the content fill for the first object upon moving the first object within the digital image.

15. The non-transitory computer-readable medium of claim 9, wherein the operations further comprise:

generating a semantic scene graph for the digital image that includes the first object depth for the first object and the second object depth for the second object; and referencing the semantic scene graph to retrieve the first object depth and the second object depth upon determining upon moving the first object so that the portion of the first object overlaps with the portion of the second object.

16. The non-transitory computer-readable medium of claim 9, wherein modifying the digital image to occlude the portion of the first object or the portion of the second object using the occluding object comprises modifying the digital image in real time to reflect occlusion of pixels from the first object or pixels of the second object by the occluding object as the portion of the first object begins to overlap the portion of the second object.

17. A system comprising:

at least one memory device comprising a depth prediction neural network; and at least one processor configured to cause the system to:

pre-process a digital image utilizing the depth prediction neural network to determine a first average object depth for a first object portrayed in the digital image and a second average object depth for a second object portrayed in the digital image;

detect one or more user interactions for moving the first object to overlap with the second object; and modify the digital image in response to the one or more user interactions by:

moving the first object within the digital image to create an overlap area between the first object and the second object;

determining that the first average object depth of the first object is less than the second average object depth of the second object based on moving the first object to overlap with the second object; and occluding the second object with the first object within the overlap area based on determining that the first average object depth is less than the second average object depth.

18. The system of claim 17, wherein:

moving the first object within the digital image to create the overlap area between the first object and the second object comprises moving the first object within the digital image so that an entirety of the second object overlaps with the first object; and occluding the second object with the first object comprises occluding the entirety of the second object with the first object.

19. The system of claim 17, wherein the at least one processor is further configured to cause the system to:

modify a position of the first object or a position of the second object to create a subsequent overlap area between the first object and the second object; and occlude the second object with the first object within the subsequent overlap area in response to creating the subsequent overlap area.

20. The system of claim 17, wherein the at least one processor is further configured to cause the system to:

move the first object within the digital image to create an additional overlap area between the first object and a third object portrayed in the digital image;

determine that the first average object depth of the first object is greater than a third average object depth of the third object; and occlude the first object with the third object within the additional overlap area based on determining that the first average object depth is greater than the third average object depth.

* * * * *